(12) United States Patent
Dolente et al.

(10) Patent No.: US 12,479,849 B2
(45) Date of Patent: Nov. 25, 2025

(54) EGFR INHIBITORS FOR THE TREATMENT OF CANCER

(71) Applicant: Hoffmann-La Roche Inc., Little Falls, NJ (US)

(72) Inventors: Cosimo Dolente, Allschwil (CH); Annick Goergler, Colmar (FR); David Hewings, Basel (CH); Georg Jaeschke, Basel (CH); Bernd Kuhn, Reinach BL (CH); Yvonne Alice Nagel, Basel (CH); Christa Ulrike Obst-Sander, Reinach BL (CH); Antonio Ricci, Biel-Benken (CH); Daniel Rueher, Raedersdorf (FR); Sandra Steiner, Sursee (CH)

(73) Assignee: Hoffmann-La Roche Inc., Little Falls, NJ (US)

( * ) Notice: Subject to any disclaimer, the term of this patent is extended or adjusted under 35 U.S.C. 154(b) by 861 days.

(21) Appl. No.: 17/620,242

(22) PCT Filed: Jun. 19, 2020

(86) PCT No.: PCT/EP2020/067093
§ 371 (c)(1),
(2) Date: Dec. 17, 2021

(87) PCT Pub. No.: WO2020/254572
PCT Pub. Date: Dec. 24, 2020

(65) Prior Publication Data
US 2023/0054473 A1 Feb. 23, 2023

(30) Foreign Application Priority Data

Jun. 21, 2019 (EP) ..................... 19181754

(51) Int. Cl.
| | |
|---|---|
| *C07D 487/04* | (2006.01) |
| *A61K 9/08* | (2006.01) |
| *A61K 9/20* | (2006.01) |
| *A61K 9/48* | (2006.01) |
| *A61K 47/10* | (2017.01) |
| *A61K 47/12* | (2006.01) |
| *A61P 35/00* | (2006.01) |
| *C07D 519/00* | (2006.01) |

(52) U.S. Cl.
CPC .............. *C07D 487/04* (2013.01); *A61K 9/08* (2013.01); *A61K 9/2013* (2013.01); *A61K 9/2018* (2013.01); *A61K 9/2054* (2013.01); *A61K 9/485* (2013.01); *A61K 9/4858* (2013.01); *A61K 9/4866* (2013.01); *A61K 47/10* (2013.01); *A61K 47/12* (2013.01); *A61P 35/00* (2018.01); *C07D 519/00* (2013.01)

(58) Field of Classification Search
None
See application file for complete search history.

(56) References Cited

U.S. PATENT DOCUMENTS

| | | |
|---|---|---|
| 10,882,848 B2 | 1/2021 | Duplessis et al. |
| 11,117,890 B2 | 9/2021 | Jaeschke et al. |
| 11,708,354 B2 | 7/2023 | Duplessis et al. |
| 12,209,091 B2 | 1/2025 | Duplessis et al. |
| | (Continued) | |

FOREIGN PATENT DOCUMENTS

| | | |
|---|---|---|
| JP | 2022-537301 A | 8/2022 |
| JP | 2022-537769 A | 8/2022 |
| | (Continued) | |

OTHER PUBLICATIONS

Patani et. al. ((1996), Bioisosterism a rational approach in drug design, Chem. Rev., 96, 3147-3176) (Year: 1996).*

(Continued)

*Primary Examiner* — Juliet C Switzer
*Assistant Examiner* — Dawanna Shar-Day White

(57) ABSTRACT

The application relates to (106) specific heterocyclic compounds comprising a thiazole ring, an indazol and a 6,7-dihydro-5H-pyrrolo[1,2-c]imidazole system, to pharmaceutical compositions containing them and their medical use. The compounds are described as selective allosteric inhibitors of T790M/L858R, T790M/L858R/C797S, L858R, L858R/C797S containing EGFR mutants and thus useful for the treatment of cancer, in particular non-small cell lung cancer.

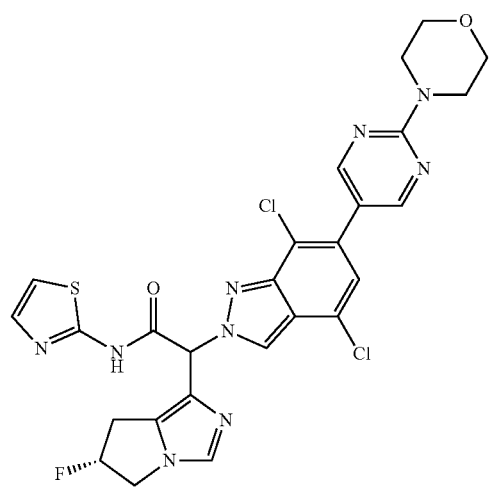

8 Claims, No Drawings

(56) References Cited

U.S. PATENT DOCUMENTS

| | | |
|---|---|---|
| 12,344,613 B2 | 7/2025 | Dolente et al. |
| 2019/0308955 A1 | 10/2019 | Duplessis et al. |
| 2021/0070739 A1 | 3/2021 | Duplessis et al. |
| 2021/0079005 A1 | 3/2021 | Duplessis et al. |
| 2022/0112199 A1 | 4/2022 | Dolente et al. |
| 2022/0135571 A1 | 5/2022 | Dolente et al. |
| 2022/0315577 A1 | 10/2022 | Jaeschke et al. |
| 2022/0315591 A1 | 10/2022 | Dolente et al. |
| 2022/0315592 A1 | 10/2022 | Dolente et al. |
| 2022/0315593 A1 | 10/2022 | Dolente et al. |
| 2023/0034696 A1 | 2/2023 | Jaeschke et al. |
| 2023/0057891 A1 | 2/2023 | Hewings et al. |
| 2024/0002390 A1 | 1/2024 | Dolente et al. |
| 2024/0018154 A1 | 1/2024 | Dolente et al. |
| 2024/0059692 A1 | 2/2024 | Dolente et al. |

FOREIGN PATENT DOCUMENTS

| | | | |
|---|---|---|---|
| JP | 2022-537771 A | 8/2022 | |
| JP | 2022-537772 A | 8/2022 | |
| JP | 2022-538055 A | 8/2022 | |
| JP | 2022-538403 A | 9/2022 | |
| JP | 7411588 B2 | 12/2023 | |
| WO | 2009/158369 A1 | 12/2009 | |
| WO | 2011/128279 A1 | 10/2011 | |
| WO | 2016/183534 A1 | 11/2016 | |
| WO | 2017/004383 A1 | 1/2017 | |
| WO | WO-2018115218 A1 * | 6/2018 | ........... A61K 9/0019 |
| WO | 2018/220149 A1 | 12/2018 | |
| WO | WO-2020002487 A1 * | 1/2020 | ........... A61K 31/496 |
| WO | 2020/254544 A1 | 12/2020 | |
| WO | 2020/254546 A1 | 12/2020 | |
| WO | 2020/254547 A1 | 12/2020 | |
| WO | 2020/254562 A1 | 12/2020 | |
| WO | 2020/254565 A1 | 12/2020 | |
| WO | 2020/254568 A1 | 12/2020 | |
| WO | 2021/123084 A1 | 6/2021 | |
| WO | 2021/123087 A1 | 6/2021 | |
| WO | 2022/117475 A1 | 6/2022 | |
| WO | 2022/117477 A1 | 6/2022 | |
| WO | 2022/117487 A1 | 6/2022 | |
| WO | 2023/217923 A1 | 11/2023 | |
| WO | 2023/217924 A1 | 11/2023 | |

OTHER PUBLICATIONS

"International Preliminary Report on Patentability—PCT/EP2020/067093" (Report Issuance Date: Dec. 21, 2021; Chapter I), :pp. 1-9 (Dec. 30, 2021).

"International Search Report—PCT/EP2020/067093" (w/Written Opinion), :pp. 1-16 (Jul. 28, 2020).

Jia, Y., et al., "Overcoming EGFR(T790M) and EGFR(C797S) resistance with mutant-selective allosteric inhibitors" Nature 534(7605):129-132 (May 25, 2016).

\* cited by examiner

EGFR INHIBITORS FOR THE TREATMENT OF CANCER

The present invention provides compounds which are selective allosteric inhibitors of T790M/L858R, T790M/L858R/C797S, L858R, L858R/C797S containing EGFR mutants, their manufacture, pharmaceutical compositions containing them and their use as therapeutically active substances.

The present invention provides a novel compounds selected from 2-(4,7-Dichloro-6-(4-(piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide 2,2,2-trifluoroacetate;

2-(4,7-Dichloro-6-(4-(4-ethylpiperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(2-morpholinopyrimidin-5-yl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-cyclopropylpiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-[4,7-Dichloro-6-(6-morpholin-4-ylpyridin-3-yl)indazol-2-yl]-2-[rac-(6R)-6-fluoro-6,7-dihydro-5H-pyrrolo[1,2-c]imidazol-1-yl]-N-(1,3-thiazol-2-yl)acetamide;

2-[4,7-Dichloro-6-(4-piperidin-4-ylphenyl)indazol-2-yl]-2-[rac-(6R)-6-fluoro-6,7-dihydro-5H-pyrrolo[1,2-c]imidazol-1-yl]-N-(1,3-thiazol-2-yl)acetamide hydrochloride;

2-[4,7-Dichloro-6-[4-(1-ethylpiperidin-4-yl)phenyl]indazol-2-yl]-2-[rac-(6R)-6-fluoro-6,7-dihydro-5H-pyrrolo[1,2-c]imidazol-1-yl]-N-(1,3-thiazol-2-yl)acetamide;

2-(4,7-Dichloro-6-(4-(rac-(3R,4R)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-fluoroethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-[4,7-Dichloro-6-[4-[2-(dimethylamino)ethoxy]phenyl]indazol-2-yl]-2-[rac-(6R)-6-fluoro-6,7-dihydro-5H-pyrrolo[1,2-c]imidazol-1-yl]-N-(1,3-thiazol-2-yl)acetamide;

2-(4,7-Dichloro-6-(4-(2-(dimethylamino)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(3-cyano-4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3R,4R)-1-ethyl-3-fluoropiperidin-4-yl)phenyl)-2H-indazol-2-yl) ((R)-6-fluoro-6,7-dihydro-5H-pyrrolo[1,2-c]imidazol-1-yl)-N-(thiazol-2-yl)acetamide;

2-(4,7-dichloro-6-(4-((3S,4S)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-[4,7-Dichloro-6-[4-[rac-(3S,4S)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;

2-[4,7-Dichloro-6-[4-[rac-(3R,4R)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;

rac-2-(4,7-Dichloro-6-(4-(4-hydroxypiperidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(2-(dimethylamino)ethoxy)-3-ethylphenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((2-(dimethylamino)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(2-(pyrrolidin-1-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3aR,6aS)-2-ethyloctahydrocyclopenta[c]pyrrol-5-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-fluoropropyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-(4-(hydroxymethyl)piperidin-1-yl)propyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((dimethylamino)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((dimethylamino)methyl)-3-fluorophenyl)-2H-indazol-2-yl) ((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-(hydroxymethyl)piperidin-1-yl)methyl)bicyclo[1.1.1]pentan-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-(hydroxymethyl)piperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(3-(hydroxymethyl)pyrrolidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-(hydroxymethyl)piperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3S,4S)-3-fluoro-1-(2-hydroxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3R,4R)-3-fluoro-1-(2-hydroxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3S,4S)-3-fluoro-1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-dichloro-6-(4-((3R,4R)-3-fluoro-1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3S,4S)-3-fluoro-1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-dichloro-6-(4-((3R,4R)-3-fluoro-1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol yl)acetamide;

rac-2-(4,7-Dichloro-6-(4-(3-(4-hydroxypiperidin-1-yl)propyl)phenyl)-2H-indazol-2-yl) ((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-hydroxypiperidin-1-yl)methyl)phenyl)-2H-indazol-2-yl) ((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-(hydroxymethyl)piperidin-1-yl)methyl)azetidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-(1-hydroxyethyl)piperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-(2-hydroxyethyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((6-hydroxy-2-azaspiro[3.3]heptan-2-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(6-(4-((2-Oxa-6-azaspiro[3.3]heptan-6-yl)methyl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-hydroxypiperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((4-fluoro-4-(hydroxymethyl)piperidin-1-yl)methyl)phenyl)-2H-indazol-2-yl)-2-(R)-6-fluoro-6,7-dihydro-5H-pyrrolo[1,2-c]imidazol-1-yl)-N-(thiazol-2-yl)acetamide;

rac-2-(4,7-Dichloro-6-(4-(4-(3-hydroxycyclobutyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(hydroxymethyl)morpholino)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-(hydroxymethyl)piperidin-1-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(2,7-Diazaspiro[3.5]nonan-2-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(3-hydroxypyrrolidin-1-yl)ethyl)phenyl)-2H-indazol-2-yl) ((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-(2-hydroxypropyl)piperazin-1-yl)phenyl)-2H-indazol-2-yl) ((R)-6-fluoro-6,7-dihydro-5H-pyrrolo[1,2-c]imidazol-1-yl)-N-(thiazol-2-yl)acetamide;

rac-2-(6-(4-(1,4-Diazabicyclo[3.2.1]octan-4-yl)phenyl)-4,7-dichloro-2H-indazol-2-yl) ((R)-6-fluoro-6,7-dihydro-5H-pyrrolo[1,2-c]imidazol-1-yl)-N-(thiazol-2-yl)acetamide;

2-(4,7-Dichloro-6-(4-(6-ethyl-2,6-diazaspiro[3.5]nonan-2-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-((3-hydroxypyrrolidin-1-yl)methyl)piperidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-(hydroxymethyl)piperidin-1-yl)methyl)cyclobutyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-hydroxypiperidin-1-yl)methyl)cyclobutyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-hydroxypiperidin-1-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((4-(2-hydroxyethyl)piperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(4-(hydroxymethyl)piperidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(4-hydroxypiperidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3aR,6aS)-5-ethylhexahydropyrrolo[3,4-c]pyrrol-2(1H)-yl)phenyl)-2H-indazol-2-yl)-2-((R)-6-fluoro-6,7-dihydro-5H-pyrrolo[1,2-c]imidazol-1-yl)-N-(thiazol yl)acetamide;

2-(4,7-Dichloro-6-(4-(2-ethyl-2,6-diazaspiro[3.5]nonan-6-yl)phenyl)-2H-indazol-2-yl) ((R)-6-fluoro-6,7-dihydro-5H-pyrrolo[1,2-c]imidazol-1-yl)-N-(thiazol-2-yl)acetamide;

2-(4,7-Dichloro-6-(4-(1-ethylazetidin-3-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-hydroxyethyl)azetidin-3-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((1-methylpiperidin-4-yl)oxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-[4,7-Dichloro-6-[4-[[1-(3-hydroxy-1-methyl-propyl)-4-piperidyl]oxy]phenyl]indazol-2-yl]-2-[rac-(6R)-6-fluoro-6,7-dihydro-5H-pyrrolo[1,2-c]imidazol-1-yl]-N-thiazol-2-yl-acetamide;

rac-2-(4,7-Dichloro-6-(4-(1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(2-(6-hydroxy-2-azaspiro[3.3]heptan-2-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(3-(hydroxymethyl)azetidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(3-hydroxyazetidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((2-hydroxy-7-azaspiro[3.5]nonan-7-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(2-hydroxy-7-azaspiro[3.5]nonan-7-yl)ethoxy)phenyl)-2H-indazol-2-yl)-2-((R)-6-fluoro-6,7-dihydro-5H-pyrrolo[1,2-c]imidazol-1-yl)-N-(thiazol yl)acetamide;

2-(4,7-Dichloro-6-(4-((7R,8aS)-7-hydroxyhexahydropyrrolo[1,2-a]pyrazin-2(1H)-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(((4-hydroxycyclohexyl)(methyl)amino)methyl)phenyl)-2H-indazol-2-yl)-2-((R)-6-fluoro-6,7-dihydro-5H-pyrrolo[1,2-c]imidazol-1-yl)-N-(thiazol yl)acetamide;

rac-2-(4,7-Dichloro-6-(4-(((3-hydroxycyclohexyl)(methyl)amino)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-methylpiperazin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-hydroxy-4-methylpiperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((3-methoxypyrrolidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(((3aR,6aS)-tetrahydro-1H-furo[3,4-c]pyrrol-5(3H)-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(3-(1-hydroxyethyl)azetidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-((2-methoxyethyl)amino)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-ethyl-1,4-diazepan-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-fluoroethyl)piperidin-4-yl)phenyl)-2H-indazol-2-yl)-2-(6,7-dihydro-5H-pyrrolo[1,2-c]imidazol-1-yl)-N-(thiazol-2-yl)acetamide;

2-(4,7-Dichloro-6-(4-(1-ethylpiperidin-4-yl)phenyl)-2H-indazol-2-yl)-2-(6,7-dihydro-5H-pyrrolo[1,2-c]imidazol-1-yl)-N-(thiazol-2-yl)acetamide;

2-(4-Chloro-7-methyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4-Chloro-7-(difluoromethyl)-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4-Chloro-6-(4-(1-ethylpiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dimethyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-((3S,4S)-1-Ethyl-3-fluoropiperidin-4-yl)phenyl)-4,7-dimethyl-2H-indazol-2-yl) ((R)-6-fluoro-6,7-dihydro-5H-pyrrolo[1,2-c]imidazol-1-yl)-N-(thiazol-2-yl)acetamide;

2-(6-(4-((3R,4R)-1-Ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)acetamide;

2-(6-(4-(1-Ethylpiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(4-Ethylpiperazin-1-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(1-((Diethylamino)methyl)cyclopropyl)phenyl)-4,7-dimethyl-2H-indazol-2-yl)-2-((R)-6-fluoro-6,7-dihydro-5H-pyrrolo[1,2-c]imidazol-1-yl)acetamide;

2-(6-(4-(2-(Ethyl(methyl)amino)ethyl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dimethyl-6-(6-morpholinopyridin-3-yl)-2H-indazol-2-yl)-2-((R)-6-fluoro-6,7-dihydro-5H-pyrrolo[1,2-c]imidazol-1-yl)-N-(thiazol-2-yl)acetamide;

2-(4-Chloro-7-ethyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide;

2-(7-Chloro-4-methyl-6-(4-morpholinophenyl)-2H-indazol-2-yl)-2-(6,7-dihydro-5H-pyrrolo[1,2-c]imidazol-1-yl)-N-(thiazol-2-yl)acetamide;

2-(7-Chloro-6-(4-((3S,4S)-1-ethyl-3-fluoropiperidin-4-yl)phenyl)-4-methyl-2H-indazol-2-yl)-2-(6,7-dihydro-5H-pyrrolo[1,2-c]imidazol-1-yl)-N-(thiazol-2-yl)acetamide;

2-(7-Chloro-6-(4-((3R,4R)-1-ethyl-3-fluoropiperidin-4-yl)phenyl)-4-methyl-2H-indazol-2-yl)-2-(6,7-dihydro-5H-pyrrolo[1,2-c]imidazol-1-yl)-N-(thiazol-2-yl)acetamide;

2-(7-Chloro-4-methyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide;

2-[7-Chloro-4-methyl-6-[4-[(3S,4S)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;

2-[7-Chloro-4-methyl-6-[4-[(3R,4R)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;

2-(7-Chloro-6-(4-(1-(2-methoxyethyl)piperidin-4-yl)phenyl)-4-methyl-2H-indazol-2-yl) ((R)-6-fluoro-6,7-dihydro-5H-pyrrolo[1,2-c]imidazol-1-yl)-N-(thiazol-2-yl)acetamide;

rac-2-(7-Chloro-6-(4-(1-(2-fluoropropyl)piperidin-4-yl)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide;

rac-2-(7-Chloro-6-(4-(2-(4-(hydroxymethyl)piperidin-1-yl)ethoxy)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide;

2-(7-Bromo-4-chloro-6-(4-morpholinophenyl)-2H-indazol-2-yl)-2-(6,7-dihydro-5H-pyrrolo[1,2-c]imidazol-1-yl)-N-(thiazol-2-yl)acetamide;

or pharmaceutically acceptable salts.

The HER family receptor tyrosine kinases are mediators of cell growth, differentiation and survival. The receptor family includes four distinct members, i.e. epidermal growth factor receptor (EGFR, ErbB1, or HER1) HER2 (ErbB2), HER3 (ErbB3) and HER4 (ErbB4). Upon ligand binding the receptors form homo and heterodimers and subsequent activation of the intrinsic tyrosine kinase activity leads to receptor auto-phosphorylation and the activation of downstream signaling molecules (Yarden, Y., Sliwkowski, M X. Untangling the ErbB signalling network. Nature Review Mol Cell Biol. 2001 February; 2(2): 127-37). De-regulation of EGFR by overexpression or mutation has been implicated in many types of human cancer including colorectal, pancreatic, gliomas, head and neck and lung cancer, in particular non-small cell lung cancer (NSCLC) and several EGFR targeting agents have been developed over the years (Ciardiello, F., and Tortora, G. (2008). EGFR antagonists in cancer treatment. The New England journal of medicine 358, 1160-1174). Erlotinib (Tarceva®), a reversible inhibitor of the EGFR tyrosine kinase was approved in numerous countries for the treatment of recurrent NSCLC.

An impressive single agent activity of EGFR tyrosine kinase inhibitors is observed in a subset of NSCLC patients whose tumors harbor somatic kinase domain mutations, whereas clinical benefit in wild-type EGFR patients is greatly diminished (Paez, J. et al. (2004). EGFR mutations in lung cancer: correlation with clinical response to gefitinib therapy. Science (New York, NY 304, 1497-1500). The most common somatic mutations of EGFR are exon 19 deletions with delta 746-750 the most prevalent mutation and the exon 21 amino acid substitutions with L858R the most frequent mutation (Sharma S V, Bell D W, Settleman J, Haber D A. Epidermal growth factor receptor mutations in lung cancer. Nat Rev Cancer. 2007 March; 7(3): 169-81).

Treatment resistance arises frequently, often due to the secondary T790M mutation within the ATP site of the receptor. Some developed mutant-selective irreversible inhibitors are highly active against the T790M mutant, but their efficacy can be compromised by acquired mutation of C797S, that is the cysteine residue with which they form a key covalent bond (Thress, K. S. et al. Acquired EGFR C797S mutation mediates resistance to AZD9291 in non-small cell lung cancer harboring EGFR T790M. Nat. Med. 21, 560-562 (2015)). C797S mutation was further reported by Wang to be a major mechanism for resistance to T790M-targeting EGFR inhibitors (Wang et al. EGFR C797S mutation mediates resistance to third-generation inhibitors in T790M-positive non-small cell lung cancer, J Hematol Oncol. 2016; 9: 59). Additional mutations that cause resistance to Osimertinib are described by Yang, for example L718Q. (Yang et al, Investigating Novel Resistance Mechanisms to Third-Generation EGFR Tyrosine Kinase Inhibitor Osimertinib in Non-Small Cell Lung Cancer Patients, Clinical Cancer Research, DOI: 10.1158/1078-0432.CCR-17-2310) Lu et al. (Targeting $EGFR^{L858R/T790M}$ and $EGFR^{L858R/T790M/C797S}$ resistance mutations in NSCLC: Current developments in medicinal chemistry, Med Res Rev 2018; 1-32) report in a review article on Targeting $EGFR^{L858R/T790M}$ and $EGFR^{L858R/T790M/C797S}$ resistance mutations in NSCLC treatment.

As most available EGFR tyrosine kinase inhibitors target the ATP-site of the kinase, there is a need for new therapeutic agents that work differently, for example through targeting drug-resistant EGFR mutants.

Recent studies suggest that purposefully targeting allosteric sites might lead to mutant-selective inhibitors (Jia et al. Overcoming EGFR(T790M) and EGFR(C797S) resistance with mutant-selective allosteric inhibitoRS, June 2016, Nature 534, 129-132)

There is just a need in the generation of selective molecules that specifically inhibit T790M/L858R, T790M/L858R/C797S, L858R, L858R/C797S containing EGFR mutants useful for the therapeutic and/or prophylactic treatment of cancer, in particular T790M and C797S containing EGFR mutants.

WO2009158369 describes certain heterocyclic antibacterial agents. WO2016183534 describes certain heterocyclic compounds suitable as EBNA1 inhibitors. WO2011128279 describes certain heterocyclic compounds suitable as mGluR5 modulators.

The term "pharmaceutically acceptable salts" refers to those salts which retain the biological effectiveness and properties of the free bases or free acids, which are not biologically or otherwise undesirable. The salts are formed with inorganic acids such as hydrochloric acid, hydrobromic acid, sulfuric acid, nitric acid, phosphoric acid and the like, in particular hydrochloric acid, and organic acids such as acetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, N-acetylcysteine and the like. In addition, these salts may be prepared by addition of an inorganic base or an organic base to the free acid. Salts derived from an inorganic base include, but are not limited to, the sodium, potassium, lithium, ammonium, calcium, magnesium salts and the like. Salts derived from organic bases include, but are not limited to salts of primary, secondary, and tertiary amines, substituted amines including naturally occurring substituted amines, cyclic amines and basic ion exchange resins, such as isopropylamine, trimethylamine, diethylamine, triethylamine, tripropylamine, ethanolamine, lysine, arginine, N-ethylpiperidine, piperidine, polyimine resins and the like. Particular pharmaceutically acceptable salts of compounds of the present invention are the hydrochloride salts, methanesulfonic acid salts and citric acid salts.

The abbreviation uM means microMolar and is equivalent to the symbol µM.

The abbreviation uL means microliter and is equivalent to the symbol µL.

The abbreviation ug means microgram and is equivalent to the symbol µg.

The compounds of the present invention can contain several asymmetric centers and can be present in the form of optically pure enantiomers, mixtures of enantiomers such as, for example, racemates, optically pure diastereoisomers, mixtures of diastereoisomers, diastereoisomeric racemates or mixtures of diastereoisomeric racemates.

According to the Cahn-Ingold-Prelog Convention the asymmetric carbon atom can be of the "R" or "S" configuration.

Also an embodiment of the present invention is a compound as described herein and pharmaceutically acceptable salts thereof, more particularly a compound as described herein.

In another embodiment a compound as described herein is selected from 2-(4,7-Dichloro-6-(4-(piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide 2,2,2-trifluoroacetate;

2-(4,7-Dichloro-6-(4-(4-ethylpiperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(2-morpholinopyrimidin-5-yl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-cyclopropylpiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-[4,7-Dichloro-6-(6-morpholin-4-ylpyridin-3-yl)indazol-2-yl]-2-[rac-(6R)-6-fluoro-6,7-dihydro-5H-pyrrolo[1,2-c]imidazol-1-yl]-N-(1,3-thiazol-2-yl)acetamide;

2-[4,7-Dichloro-6-(4-piperidin-4-ylphenyl)indazol-2-yl]-2-[rac-(6R)-6-fluoro-6,7-dihydro-5H-pyrrolo[1,2-c]imidazol-1-yl]-N-(1,3-thiazol-2-yl)acetamide hydrochloride;

2-[4,7-Dichloro-6-[4-(1-ethylpiperidin-4-yl)phenyl]indazol-2-yl]-2-[rac-(6R)-6-fluoro-6,7-dihydro-5H-pyrrolo[1,2-c]imidazol-1-yl]-N-(1,3-thiazol-2-yl)acetamide;

2-(4,7-Dichloro-6-(4-(rac-(3R,4R)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-fluoroethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-[4,7-Dichloro-6-[4-[2-(dimethylamino)ethoxy]phenyl]indazol-2-yl]-2-[rac-(6R)-6-fluoro-6,7-dihydro-5H-pyrrolo[1,2-c]imidazol-1-yl]-N-(1,3-thiazol-2-yl)acetamide;

2-(4,7-Dichloro-6-(4-(2-(dimethylamino)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(3-cyano-4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3R,4R)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-dichloro-6-(4-((3S,4S)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-[4,7-Dichloro-6-[4-[rac-(3S,4S)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;

2-[4,7-Dichloro-6-[4-[rac-(3R,4R)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;

rac-2-(4,7-Dichloro-6-(4-(4-hydroxypiperidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(2-(dimethylamino)ethoxy)-3-ethylphenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((2-(dimethylamino)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(2-(pyrrolidin-1-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3aR,6aS)-2-ethyloctahydrocyclopenta[c]pyrrol-5-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-fluoropropyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-(4-(hydroxymethyl)piperidin-1-yl)propyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((dimethylamino)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((dimethylamino)methyl)-3-fluorophenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-(hydroxymethyl)piperidin-1-yl)methyl)bicyclo[1.1.1]pentan-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-(hydroxymethyl)piperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(3-(hydroxymethyl)pyrrolidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-(hydroxymethyl)piperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3S,4S)-3-fluoro-1-(2-hydroxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3R,4R)-3-fluoro-1-(2-hydroxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol yl)acetamide;

2-(4,7-Dichloro-6-(4-((3S,4S)-3-fluoro-1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-dichloro-6-(4-((3R,4R)-3-fluoro-1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3S,4S)-3-fluoro-1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-dichloro-6-(4-((3R,4R)-3-fluoro-1-(2-methoxyethyl) piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-(4-hydroxypiperidin-1-yl)propyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-hydroxypiperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-(hydroxymethyl)piperidin-1-yl)methyl)azetidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-(1-hydroxyethyl)piperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-(2-hydroxyethyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((6-hydroxy-2-azaspiro[3.3]heptan-2-yl)methyl)phenyl)-2H-indazol-2-yl)-2-((R)-6-fluoro-6,7-dihydro-5H-pyrrolo[1,2-c]imidazol-1-yl)-N-(thiazol yl)acetamide;

rac-2-(6-(4-((2-Oxa-6-azaspiro[3.3]heptan-6-yl)methyl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-hydroxypiperidin-1-yl)ethyl)phenyl)-2H-indazol-2-yl) ((R)-6-fluoro-6,7-dihydro-5H-pyrrolo[1,2-c]imidazol-1-yl)-N-(thiazol-2-yl)acetamide;

2-(4,7-Dichloro-6-(4-((4-fluoro-4-(hydroxymethyl)piperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-(3-hydroxycyclobutyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(hydroxymethyl)morpholino)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-(hydroxymethyl)piperidin-1-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(2,7-Diazaspiro[3.5]nonan-2-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(3-hydroxypyrrolidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-(2-hydroxypropyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(6-(4-(1,4-Diazabicyclo[3.2.1]octan-4-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(6-ethyl-2,6-diazaspiro[3.5]nonan-2-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-((3-hydroxypyrrolidin-1-yl)methyl)piperidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-(hydroxymethyl)piperidin-1-yl)methyl)cyclobutyl)phenyl)-2H-indazol-2-yl)-2-((R)-6-fluoro-6,7-dihydro-5H-pyrrolo[1,2-c]imidazol-1-yl)-N-(thiazol yl)acetamide;

rac-2-(4,7-Dichloro-6-(4-(3-((4-hydroxypiperidin-1-yl)methyl)cyclobutyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-hydroxypiperidin-1-yl)ethoxy)phenyl)-2H-indazol-2-yl) ((R)-6-fluoro-6,7-dihydro-5H-pyrrolo[1,2-c]imidazol-1-yl)-N-(thiazol-2-yl)acetamide;

2-(4,7-Dichloro-6-(4-((4-(2-hydroxyethyl)piperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(4-(hydroxymethyl)piperidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(4-hydroxypiperidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3aR,6aS)-5-ethylhexahydropyrrolo[3,4-c]pyrrol-2(1H)-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(2-ethyl-2,6-diazaspiro[3.5]nonan-6-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-ethylazetidin-3-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-hydroxyethyl)azetidin-3-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((1-methylpiperidin-4-yl)oxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-[4,7-Dichloro-6-[4-[[1-(3-hydroxy-1-methyl-propyl)-4-piperidyl]oxy]phenyl]indazol-2-yl]-2-[rac-(6R)-6-fluoro-6,7-dihydro-5H-pyrrolo[1,2-c]imidazol-1-yl]-N-thiazol-2-yl-acetamide;

rac-2-(4,7-Dichloro-6-(4-(1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(2-(6-hydroxy-2-azaspiro[3.3]heptan-2-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(3-(hydroxymethyl)azetidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol yl)acetamide;

2-(4,7-Dichloro-6-(4-((2-(3-hydroxyazetidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((2-hydroxy-7-azaspiro[3.5]nonan-7-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(2-hydroxy-7-azaspiro[3.5]nonan-7-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((7R,8aS)-7-hydroxyhexahydropyrrolo[1,2-a]pyrazin-2(1H)-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(((4-hydroxycyclohexyl)(methyl)amino)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(((3-hydroxycyclohexyl)(methyl)amino)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-methylpiperazin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-hydroxy-4-methylpiperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((3-methoxypyrrolidin-1-yl)methyl)phenyl)-2H-indazol-2-yl) ((R)-6-fluoro-6,7-dihydro-5H-pyrrolo[1,2-c]imidazol-1-yl)-N-(thiazol-2-yl)acetamide;

rac-2-(4,7-Dichloro-6-(4-(((3aR,6aS)-tetrahydro-1H-furo[3,4-c]pyrrol-5(3H)-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(3-(1-hydroxyethyl)azetidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-((2-methoxyethyl)amino)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-ethyl-1,4-diazepan-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-fluoroethyl)piperidin-4-yl)phenyl)-2H-indazol-2-yl)-2-(6,7-dihydro-5H-pyrrolo[1,2-c]imidazol-1-yl)-N-(thiazol-2-yl)acetamide;

2-(4,7-Dichloro-6-(4-(1-ethylpiperidin-4-yl)phenyl)-2H-indazol-2-yl)-2-(6,7-dihydro-5H-pyrrolo[1,2-c]imidazol-1-yl)-N-(thiazol-2-yl)acetamide;

2-(4-Chloro-7-methyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4-Chloro-7-(difluoromethyl)-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4-Chloro-6-(4-(1-ethylpiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dimethyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-((3S,4S)-1-Ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-((3R,4R)-1-Ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(1-Ethylpiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(4-Ethylpiperazin-1-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(1-((Diethylamino)methyl)cyclopropyl)phenyl)-4,7-dimethyl-2H-indazol-2-yl) ((R)-6-fluoro-6,7-dihydro-5H-pyrrolo[1,2-c]imidazol-1-yl)-N-(thiazol-2-yl)acetamide;

2-(6-(4-(2-(Ethyl(methyl)amino)ethyl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dimethyl-6-(6-morpholinopyridin-3-yl)-2H-indazol-2-yl)-2-((R)-6-fluoro-6,7-dihydro-5H-pyrrolo[1,2-c]imidazol-1-yl)-N-(thiazol-2-yl)acetamide;

2-(4-Chloro-7-ethyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide;

2-(7-Chloro-4-methyl-6-(4-morpholinophenyl)-2H-indazol-2-yl)-2-(6,7-dihydro-5H-pyrrolo[1,2-c]imidazol-1-yl)-N-(thiazol-2-yl)acetamide;

2-(7-Chloro-6-(4-((3S,4S)-1-ethyl-3-fluoropiperidin-4-yl)phenyl)-4-methyl-2H-indazol-2-yl)-2-(6,7-dihydro-5H-pyrrolo[1,2-c]imidazol-1-yl)-N-(thiazol-2-yl)acetamide;

2-(7-Chloro-6-(4-((3R,4R)-1-ethyl-3-fluoropiperidin-4-yl)phenyl)-4-methyl-2H-indazol-2-yl)-2-(6,7-dihydro-5H-pyrrolo[1,2-c]imidazol-1-yl)-N-(thiazol-2-yl)acetamide;

2-(7-Chloro-4-methyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide;

2-[7-Chloro-4-methyl-6-[4-[(3S,4S)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;

2-[7-Chloro-4-methyl-6-[4-[(3R,4R)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;

2-(7-Chloro-6-(4-(1-(2-methoxyethyl)piperidin-4-yl)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide;

rac-2-(7-Chloro-6-(4-(1-(2-fluoropropyl)piperidin-4-yl)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide;

rac-2-(7-Chloro-6-(4-(2-(4-(hydroxymethyl)piperidin-1-yl)ethoxy)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide;

2-(7-Bromo-4-chloro-6-(4-morpholinophenyl)-2H-indazol-2-yl)-2-(6,7-dihydro-5H-pyrrolo[1,2-c]imidazol-1-yl)-N-(thiazol-2-yl)acetamide.

Processes for the manufacture of a compound of the present invention as described herein are also an object of the invention.

The corresponding pharmaceutically acceptable salts with acids can be obtained by standard methods known to the person skilled in the art, e.g. by dissolving the compound of the present invention in a suitable solvent such as e.g. dioxane or tetrahydrofuran and adding an appropriate amount of the corresponding acid. The products can usually be isolated by filtration or by chromatography. The conversion of a compound of the present invention into a pharmaceutically acceptable salt with a base can be carried out by treatment of such a compound with such a base. One possible method to form such a salt is e.g. by addition of 1/n equivalents of a basic salt such as e.g. $M(OH)_n$, wherein M=metal or ammonium cation and n=number of hydroxide anions, to a solution of the compound in a suitable solvent (e.g. ethanol, ethanol-water mixture, tetrahydrofuran-water mixture) and to remove the solvent by evaporation or lyophilisation. Particular salts are hydrochloride, formate and trifluoroacetate.

Insofar as their preparation is not described in the examples, the compounds of the present invention as well as all intermediate products can be prepared according to analogous methods or according to the methods set forth herein. Starting materials are commercially available, known in the art or can be prepared by methods known in the art or in analogy thereto.

It will be appreciated that the compounds of the present invention may be derivatised at functional groups to provide derivatives which are capable of conversion back to the parent compound in vivo.

A certain embodiment of the invention relates to the compound of the present invention as described herein, or a pharmaceutically acceptable salt thereof, for use as therapeutically active substance.

A certain embodiment of the invention relates to the compound of the present invention as described herein, or a pharmaceutically acceptable salt thereof, for the use in the therapeutic and/or prophylactic treatment of cancer, in particular non-small-cell lung cancer.

A certain embodiment of the invention relates to the compound of the present invention as described herein, or a pharmaceutically acceptable salt thereof, for the use in the therapeutic and/or prophylactic treatment of non-small-cell lung cancer.

A certain embodiment of the invention relates to the compound of the present invention as described herein, or a pharmaceutically acceptable salt thereof, for the manufacture of a medicament for the therapeutic and/or prophylactic treatment of cancer, in particular non-small-cell lung cancer.

A certain embodiment of the invention relates to a pharmaceutical composition comprising the compound of the present invention as described herein, or a pharmaceutically acceptable salt thereof, and a pharmaceutically acceptable auxiliary substance.

A certain embodiment of the invention relates to a method for the therapeutic and/or prophylactic treatment of cancer, in particular non-small-cell lung cancer by administering the compound of the present invention as described herein, or a pharmaceutically acceptable salt thereof, to a patient.

A certain embodiment of the invention relates to the compound of the present invention as described herein, or a pharmaceutically acceptable salt thereof, for the use as a medicament in therapeutic and/or prophylactic treatment of a patient with EGFR activating mutations suffering from cancer, in particular non-small-cell lung cancer, comprising determining the EGFR activating mutations status in said patient and then administering the compound of the present invention as described herein, or a pharmaceutically acceptable salt thereof, to said patient.

A certain embodiment of the invention relates to the compound of the present invention as described herein, or a pharmaceutically acceptable salt thereof, for the use as a medicament in therapeutic and/or prophylactic treatment of a patient with EGFR mutations T790M/L858R, T790M/L858R/C797S, L858R and/or L858R/C797S suffering from cancer, in particular non-small-cell lung cancer, comprising determining the EGFR activating mutations status in said patient and then administering the compound of the present invention as described herein, or a pharmaceutically acceptable salt thereof, to said patient.

A certain embodiment of the invention relates to the compound of the present invention as described herein, or a pharmaceutically acceptable salt thereof, for the use as a medicament in therapeutic and/or prophylactic treatment of a patient with EGFR activating mutations as determined with a Cobas® EGFR Mutation Test v2 suffering from cancer, in particular non-small-cell lung cancer, comprising determining the EGFR activating mutations status in said patient and then administering the compound of the present invention as described herein, or a pharmaceutically acceptable salt thereof, to said patient.

Furthermore, the invention includes all substituents in its corresponding deuterated form, wherever applicable, of the compounds of the present invention.

Furthermore, the invention includes all optical isomers, i.e. diastereoisomers, diastereomeric mixtures, racemic mixtures, all their corresponding enantiomers and/or tautomers as well as their solvates, wherever applicable, of the compounds of the present invention.

The compounds of the present invention may contain one or more asymmetric centers and can therefore occur as racemates, racemic mixtures, single enantiomers, diastereomeric mixtures and individual diastereomers. Additional asymmetric centers may be present depending upon the nature of the various substituents on the molecule. Each such asymmetric center will independently produce two optical isomers and it is intended that all of the possible optical isomers and diastereomers in mixtures and as pure or partially purified compounds are included within this invention. The present invention is meant to encompass all such isomeric forms of these compounds. The independent syntheses of these diastereomers or their chromatographic separations may be achieved as known in the art by appropriate modification of the methodology disclosed herein. Their absolute stereochemistry may be determined by the x-ray crystallography of crystalline products or crystalline intermediates which are derivatized, if necessary, with a reagent containing an asymmetric center of known absolute configuration. If desired, racemic mixtures of the compounds may be separated so that the individual enantiomers are isolated. The separation can be carried out by methods well known in the art, such as the coupling of a racemic mixture of compounds to an enantiomerically pure compound to form a diastereomeric mixture, followed by separation of the individual diastereomers by standard methods, such as fractional crystallization or chromatography.

In the embodiments, where optically pure enantiomers are provided, optically pure enantiomer means that the compound contains >90% of the desired isomer by weight, particularly >95% of the desired isomer by weight, or more particularly >99% of the desired isomer by weight, said weight percent based upon the total weight of the isomer(s) of the compound. Chirally pure or chirally enriched compounds may be prepared by chirally selective synthesis or by separation of enantiomers. The separation of enantiomers may be carried out on the final product or alternatively on a suitable intermediate.

Also an embodiment of the present invention are compounds of the present invention as described herein, when manufactured according to any one of the described processes.

Assay Procedures
HTRF Phospho EGFR TMLR Assay (Cellular)
Cell Line and Media

H1975 cell line (CRL-5908; Lot BA70803) was obtained from American Type Culture Collection (Manassas, VA, USA). Cells were maintained at 37° C., 5% $CO_2$ in complete Media RPMI 1640 without phenol red containing 0.3 mg/ml glutamine, 100 IU/ml penicillin, and 100 mg/ml streptomycin (Gibco, 15140-122) supplemented with 10% fetal bovine serum (FBS, Gibco, 10091-148). Compounds were diluted into starving medium RPMI 1640 Media (Gibco, 11835-030) without phenol red containing 0.3 mg/ml glutamine, 100 IU/ml penicillin, and 100 mg/ml streptomycin (Gibco).

Protocol

Cells were cultured for 24 h in a 384-well plate (Greiner Bio-One, Nr. 784-080; 5000 cells/well) using 8 µl of complete medium/well. Then 4 µl/well of the 3× compound solution, containing a factor 3 dilution series of the compound or DMSO in starving medium, were added to the cells (final DMSO 0.33%). After 16 hours at 37° C., 5% CO2, 95% rel. humidity cells were lysed by adding to the compound mix 4 µl/well of the supplemented lysis buffer (Cis-bio, Phospho-EGFR HTRF kit, 64EG1PEH), followed by incubation for 30 min at room temperature with shaking (400 rpm). Then 4 µl of a mixture of anti-Phospho-EGFR Cryptate and of anti-Phospho-EGFR-d2 antibody solutions prepared in the detection buffer was added. The plates were then incubated for 4 h at room temperature before reading the fluorescence emission at 620 and 665 nm using an Envision reader (Perkin Elmer).

HTRF Phospho EGFR TMLRCS Assay (Cellular)
Cell Line and Media

BaF3-TMLRCS cell line were obtained from Crownbio (San Diego, CA, USA). Cells were maintained at 37° C., 5% $CO_2$ in RPMI ATCC (Gibco 31870)+2 mM Glutamine+0.5 µg/ml Puromycin supplemented with 10% fetal bovine serum (FBS) (Gibco).

Protocol
Cells are transferred as above to Greiner Bio-One, Nr. 784-08 micro-titerplate at 20000 cells/well in 12.5 µl of growth medium/well after the plates had been pre-filled with 12.5 nl of DMSO solutions of the to be tested compounds (in dose response) or DMSO only. After spinning the plates at 300×g for 30 seconds the cells were incubated for 4 hours at 37 C, 5% CO2, 95% humidity. The cells were lysed by adding to the compound mix 4 µl/well of the supplemented lysis buffer (Cis-bio, Phospho-EGFR HTRF kit, 64EG1PEH), followed by incubation for 30 min at room temperature with shaking (400 rpm). The plates were then frozen and stored overnight at −80 C. On the next day and after thawing the plates, 4 µl of a mixture of anti-Phospho-EGFR Cryptate and of anti-Phospho-EGFR-d2 antibody solutions prepared in the supplied detection buffer was added to each well. The lidded plates were then incubated for 4 h at room temperature before reading the fluorescence emission at 616 and 665 nm using an Envision reader (Perkin Elmer). Data was analyzed in similar fashion as above using the normalized ratio of the 665 to 616 signals multiplied by 10000.

The results are shown in Table 1

| Example | $IC_{50}$ (BaF3) µM |
|---|---|
| 26 | 0.004 |
| 27 | 0.005 |
| 28 | 0.017 |
| 29 | 0.006 |
| 30 | 0.033 |
| 31 | 0.010 |
| 32 | 0.004 |
| 33 | 0.007 |
| 34 | 0.006 |
| 35 | 0.006 |
| 36 | 0.009 |
| 37 | 0.010 |
| 38 | 0.010 |
| 39 | 0.004 |
| 40 | 0.008 |
| 41 | 0.010 |
| 42 | 0.012 |
| 43 | 0.011 |
| 44 | 0.013 |
| 45 | 0.004 |
| 47 | 0.008 |
| 48 | 0.008 |
| 49 | 0.008 |
| 50 | 0.012 |
| 51 | 0.010 |
| 52 | 0.006 |
| 53 | 0.005 |
| 54 | 0.005 |
| 55 | 0.005 |
| 56 | 0.013 |
| 57 | 0.007 |
| 58 | *0.005 |
| 59 | 0.005 |
| 60 | 0.009 |
| 61 | 0.003 |
| 62 | 0.008 |
| 63 | 0.005 |
| 64 | 0.007 |
| 65 | 0.004 |
| 66 | 0.002 |
| 67 | 0.003 |
| 68 | 0.004 |
| 69 | 0.004 |
| 70 | 0.008 |
| 71 | 0.008 |
| 72 | 0.005 |
| 73 | 0.010 |
| 74 | 0.012 |
| 75 | 0.008 |
| 76 | 0.011 |
| 77 | 0.001 |
| 78 | 0.003 |
| 79 | 0.007 |
| 80 | 0.008 |
| 81 | 0.009 |
| 82 | 0.011 |
| 83 | 0.010 |
| 84 | 0.012 |
| 85 | 0.004 |
| 86 | 0.006 |
| 87 | 0.009 |
| 88 | 0.007 |
| 89 | 0.010 |
| 90 | 0.012 |
| 91 | 0.008 |
| 92 | 0.013 |
| 93 | 0.006 |
| 94 | 0.004 |
| 95 | 0.006 |
| 96 | 0.006 |
| 97 | 0.005 |

-continued

| Example | IC$_{50}$ (BaF3) μM |
|---|---|
| 98 | 0.006 |
| 99 | 0.006 |
| 100 | 0.012 |
| 101 | 0.010 |
| 103 | 0.020 |
| 104 | 0.012 |
| 105 | 0.008 |
| 106 | 0.008 |
| 117 | 0.009 |
| 118 | 0.007 |
| 119 | 0.014 |
| 120 | 0.015 |
| 121 | 0.008 |
| 122 | 0.019 |
| 123 | 0.015 |
| 124 | 0.005 |
| 125 | 0.011 |
| 126 | 0.009 |
| 127 | 0.009 |
| 128 | 0.005 |
| 129 | 0.010 |
| 130 | 0.012 |
| 131 | 0.192 |
| 132 | 0.007 |
| 134 | 0.032 |

The compounds of the present invention and their pharmaceutically acceptable salts can be used as medicaments (e.g. in the form of pharmaceutical preparations). The pharmaceutical preparations can be administered internally, such as orally (e.g. in the form of tablets, coated tablets, dragées, hard and soft gelatin capsules, solutions, emulsions or suspensions), nasally (e.g. in the form of nasal sprays), rectally (e.g. in the form of suppositories) or topical ocularly (e.g. in the form of solutions, ointments, gels or water soluble polymeric inserts). However, the administration can also be effected parenterally, such as intramuscularly, intravenously, or intraocularly (e.g. in the form of sterile injection solutions).

The compounds of the present invention and their pharmaceutically acceptable salts can be processed with pharmaceutically inert, inorganic or organic adjuvants for the production of tablets, coated tablets, dragées, hard gelatin capsules, injection solutions or topical formulations Lactose, corn starch or derivatives thereof, talc, stearic acid or its salts etc. can be used, for example, as such adjuvants for tablets, dragées and hard gelatin capsules.

Suitable adjuvants for soft gelatin capsules, are, for example, vegetable oils, waxes, fats, semi-solid substances and liquid polyols, etc.

Suitable adjuvants for the production of solutions and syrups are, for example, water, polyols, saccharose, invert sugar, glucose, etc.

Suitable adjuvants for injection solutions are, for example, water, alcohols, polyols, glycerol, vegetable oils, etc.

Suitable adjuvants for suppositories are, for example, natural or hardened oils, waxes, fats, semi-solid or liquid polyols, etc.

Suitable adjuvants for topical ocular formulations are, for example, cyclodextrins, mannitol or many other carriers and excipients known in the art.

Moreover, the pharmaceutical preparations can contain preservatives, solubilizers, viscosity-increasing substances, stabilizers, wetting agents, emulsifiers, sweeteners, colorants, flavorants, salts for varying the osmotic pressure, buffers, masking agents or antioxidants. They can also contain still other therapeutically valuable substances.

The dosage can vary in wide limits and will, of course, be fitted to the individual requirements in each particular case. In general, in the case of oral administration a daily dosage of about 0.1 mg to 20 mg per kg body weight, preferably about 0.5 mg to 4 mg per kg body weight (e.g. about 300 mg per person), divided into preferably 1-3 individual doses, which can consist, for example, of the same amounts, should it be appropriate. In the case of topical administration, the formulation can contain 0.001% to 15% by weight of medicament and the required dose, which can be between 0.1 and 25 mg in can be administered either by single dose per day or per week, or by multiple doses (2 to 4) per day, or by multiple doses per week It will, however, be clear that the upper or lower limit given herein can be exceeded when this is shown to be indicated.

Preparation of Pharmaceutical Compositions Comprising Compounds of the Invention Tablets of the Following Composition are Manufactured in the Usual Manner:

| | mg/tablet | | | |
|---|---|---|---|---|
| Ingredient | 5 | 25 | 100 | 500 |
| Compound | 5 | 25 | 100 | 500 |
| Lactose Anhydrous DTG | 125 | 105 | 30 | 150 |
| Sta-Rx 1500 | 6 | 6 | 6 | 60 |
| Microcrystalline Cellulose | 30 | 30 | 30 | 450 |
| Magnesium Stearate | 1 | 1 | 1 | 1 |
| Total | 167 | 167 | 167 | 831 |

Manufacturing Procedure
1. Mix ingredients 1, 2, 3 and 4 and granulate with purified water.
2. Dry the granules at 50° C.
3. Pass the granules through suitable milling equipment.
4. Add ingredient 5 and mix for three minutes; compress on a suitable press.

Capsules of the Following Composition are Manufactured:

| | mg/capsule | | | |
|---|---|---|---|---|
| Ingredient | 5 | 25 | 100 | 500 |
| Compound | 5 | 25 | 100 | 500 |
| Hydrous Lactose | 159 | 123 | 148 | — |
| Corn Starch | 25 | 35 | 40 | 70 |
| Talk | 10 | 15 | 10 | 25 |
| Magnesium Stearate | 1 | 2 | 2 | 5 |
| Total | 200 | 200 | 300 | 600 |

Manufacturing Procedure
1. Mix ingredients 1, 2 and 3 in a suitable mixer for 30 minutes.
2. Add ingredients 4 and 5 and mix for 3 minutes.
3. Fill into a suitable capsule.

A compound of the present invention, lactose and corn starch are firstly mixed in a mixer and then in a comminuting machine. The mixture is returned to the mixer; the talc is added thereto and mixed thoapproximatively. The mixture is filled by machine into suitable capsules, e.g. hard gelatin capsules.

Injection Solutions of the Following Composition are Manufactured:

| Ingredient | mg/injection solution. |
| --- | --- |
| Compound | 3 |
| Polyethylene Glycol 400 | 150 |
| acetic acid | q.s. ad pH 5.0 |
| water for injection solutions | ad 1.0 ml |

The invention is illustrated hereinafter by Examples, which have no limiting character.

In case the preparative examples are obtained as a mixture of enantiomers, the pure enantiomers can be obtained by methods described herein or by methods known to those skilled in the art, such as e.g. chiral chromatography or crystallization.

EXAMPLES

The following examples are provided for illustration of the invention. They should not be considered as limiting the scope of the invention, but merely as being representative thereof.

Synthesis of Intermediates

Substituted indazoles (II) are known or can be prepared in analogy to known methods or using the methods described below.

6-Bromo-4,7-dichloro-1H-indazole

Step 1: 4-Bromo-3,6-dichloro-2-fluorobenzaldehyde

A solution of 1-bromo-2,5-dichloro-3-fluorobenzene (9.414 g) in tetrahydrofuran (70 ml) was cooled in a dry ice/acetone bath. LDA, 2 mol/l in THF (21.2 ml) was added and the mixture was stirred at −75° C. for 20 min. N,N-dimethylformamide (2.82 g) was added dropwise and stirred for 1 h. A solution of AcOH in Et2O (1:1, 10 ml) was added. The mixture was allowed to warm to room temperature. Water was added and the mixture was extracted with EtOAc. The organic layers were washed with water, dried (MgSO$_4$), filtered and concentrated in vacuo to give the crude title compound (11.323 g) as light yellow solid. The compound was used for the next step without further purification.

Step 2: 6-Bromo-4,7-dichloro-1H-indazole

To a solution of 4-bromo-3,6-dichloro-2-fluorobenzaldehyde (10.5 g) in Dioxane (50 ml) was added hydrazine hydrate (3.86 g). The mixture was stirred at room temperature for 3 days. Hydrazine hydrate (386 mg) was added and the mixture was warmed to 70° C. for 7 h. After cooling to room temperature water was added and the precipitated solid was collected by filtration. To the solid was added a small amount of acetonitrile and stirred for 2 h. The solid was collected by filtration, washed with a small amount of acetonitrile and dried to give the title compound (7.842 g) as off-white solid. MS: m/e=267.0 ([M+H]$^+$, Br)

6-Bromo-4-chloro-7-methyl-1H-indazole

Step 1: 4-Bromo-6-chloro-2-fluoro-3-methylbenzaldehyde

In analogy to the synthesis of 4-bromo-3,6-dichloro-2-fluorobenzaldehyde, 1-bromo-5-chloro fluoro-2-methylbenzene was first treated with LDA in Tetrahydrofuran at −75° C. followed by treatment with N,N-dimethylformamide. Workup in analogy to the synthesis of 4-bromo-3,6-dichloro-2-fluorobenzaldehyde gave the crude title compound as orange solid.

Step 2: 6-Bromo-4-chloro-7-methyl-1H-indazole

In analogy to the synthesis of 6-bromo-4-chloro-7-methoxy-2H-indazole, a solution of 4-bromo-6-chloro-2-fluoro-3-methylbenzaldehyde was heated with an excess (12 equivalents) of hydrazine hydrate to give the title compound as yellow solid.

6-Bromo-4,7-dimethyl-1H-indazole

Step 1: 1-Bromo-2,4,5-trimethyl-3-nitrobenzene, in mixture with 1-bromo-2,4,5-trimethyl-3,6-dinitrobenzene and 2-bromo-1,4,5-trimethyl-3-nitrobenzene 1-Bromo-2,4,5-trimethylbenzene (10 g) was dissolved in chloroform (50 ml) and cooled to −10° C. After addition of sulfuric acid (69 g) a mixture of sulfuric acid (4.93 g) and nitric acid (3.32 g) was added dropwise at −10-0° C. within 15 min under vigorous stirring. The temperature was allowed to rise from −8° C. to +7° C. within 1 h under vigorous stirring. The mixture was poured on ice water and extracted with dichloromethane. The org layers were washed with sat sodium carbonate solution, combined, dried over sodium sulfate and concentrated to give a solid (11.9 g) containing the desired product (approx. 41% by UV detection), the mono-nitro isomer and the di-nitrated compound. Chromatographic purification could be used to enrich the desired product.

Step 2: 3-Bromo-2,5,6-trimethylaniline

The compound mixture obtained in step (4.2 g) was dissolved in ethanol (92 ml) and THF (92 ml). After addition of ammonium chloride (9.2 g), zinc (9 g) and water (92 ml) the mixture was stirred 90 min at rt. The suspension was filtered, rinsed with water and ethyl acetate. The organic layer was washed with brine, dried over sodium sulfate, concentrated and purified by chromatography (SiO2, 0-40% EtOAc in n-heptane) to give the title compound (1.72 g) as off-white solid. MS: m/e=214.1 ([M+H]$^+$)

Step 3: 6-Bromo-4,7-dimethyl-1H-indazole

3-Bromo-2,5,6-trimethylaniline (3.89 g), KOAc (2.71 g) and toluene (60 ml) were added to a 250 ml round bottom flask, followed by 1.46 ml of acetic acid. The mixture was stirred for 10 min, and 2.6 ml of tert-butyl nitrite was added dropwise over 10 min. The mixture was then heated to 45° C. for 18 h. Work-up: 25 ml of EtOAc and 25 ml of water were added to the reaction mixture. pH was adjusted to 10-11 by the addition of 15% NaOH. The water layer was separated and extracted twice with EtOAc. Organic layers were combined and washed twice with brine, followed by drying over MgSO$_4$ and in vacuo removing of solvent to give the title compound (3.92 g) in a 4:1 mixture with its regioisomer 4-bromo-6,7-dimethyl-1H-indazole which was used for the next step without further purification (separation of the isomers was easier after the next step).

6-Bromo-4-chloro-7-ethyl-1H-indazole

Step 1: Mixture of 1-Bromo-5-chloro-2-ethyl-3-fluorobenzene and 5-bromo-1-chloro-2-ethyl-3-fluorobenzene In analogy to the synthesis of 1-bromo-3-fluoro-5-(trifluoromethyl)benzene, 1-bromo-3-chloro-5-fluorobenzene was first treated with LDA followed by reaction with iodoethane. After workup the title compounds were obtained as regioisomeric mixture.

Step 2: Mixture of 4-bromo-6-chloro-3-ethyl-2-fluorobenzaldehyde and 6-bromo-4-chloro-3-ethyl-2-fluorobenzaldehyde In analogy to the synthesis of 4-bromo-3,6-dichloro-2-fluorobenzaldehyde, the regioisomeric mixture obtained in step 1 was first treated with LDA in Tetrahydrofuran at −75° C. followed by treatment with N,N-dimethylformamide. Workup in analogy to the synthesis of 4-bromo-3,6-dichloro-2-fluorobenzaldehyde gave the crude title compounds as regioisomeric mixture.

Step 3: 6-Bromo-4-chloro-7-ethyl-1H-indazole

In analogy to the synthesis of 6-bromo-4-chloro-7-methoxy-2H-indazole, a solution of the regioisomeric mixture obtained in step 2 was heated with an excess of hydrazine hydrate. The regioisomeric indazoles were separated by SFC chromatography to give the title compound as off-white semisolid. MS: m/e=261.1 ([M+H]$^+$)

4-(4-(7-Bromo-4-chloro-2H-indazol-6-yl)phenyl)morpholine

Step 1: 5-Chloro-3-fluoro-4'-morpholino-[1,1'-biphenyl]-2-amine

A mixture of 2-bromo-4-chloro-6-fluoroaniline (6 g), (4-morpholinophenyl)boronic acid (8.3 g) and Cs$_2$CO$_3$ (26.1 g) in THF (80 ml), water (20 ml) was degassed with argon for 10 min. PdCl$_2$(DPPF)-CH$_2$Cl$_2$ adduct (2.18 g) was added. The reaction mixture was stirred for 1 h at 60° C. The reaction mixture was poured into EtOAc and washed with H$_2$O, NaCl sat. The organic layer was dried over Na$_2$SO$_4$ and concentrated in vacuo. The crude material was purified by flash chromatography (silica gel, 80 g, 0% to 1% MeOH in DCM) to afford the title compound (7.94 g) as a white solid. MS: 307.1 ([M+H]$^+$)

Step 2: 4-(2'-Bromo-5'-chloro-3'-fluoro-[1,1'-biphenyl]-4-yl)morpholine

To a mixture of 5-chloro-3-fluoro-4'-morpholino-[1,1'-biphenyl]-2-amine (7.94 g) and copper (II) bromide (5.98 g) in acetonitrile (200 ml) was added tert-butyl nitrite (4 g) dropwise at 0° C. The reaction mixture was stirred for 3 h at 0° C. The reaction mixture was poured into EtOAc and washed with H$_2$O, NaCl sat. The organic layer was dried over Na$_2$SO$_4$ and concentrated in vacuo. The crude material was purified by flash chromatography (silica gel, 40 g, 0% to 10% EtOAc in heptane) to afford the title compound (5.03 g) as off-white solid. MS: 372.0 ([M+H]$^+$)

Step 3: 2-Bromo-5-chloro-3-fluoro-4'-morpholino-[1,1'-biphenyl]-4-carbaldehyde

In analogy to the synthesis of 4-bromo-3,6-dichloro-2-fluorobenzaldehyde, 4-(2'-bromo-5'-chloro-3'-fluoro-[1,1'-biphenyl]-4-yl)morpholine was first treated with LDA in Tetrahydrofuran at −75° C. followed by treatment with ethyl formate. Workup in analogy to the synthesis of 4-bromo-3,6-dichloro-2-fluorobenzaldehyde gave the title compound as yellow solid. MS: m/e=400.0 ([M+H]$^+$)

Step 4: 4-(4-(7-Bromo-4-chloro-2H-indazol-6-yl)phenyl)morpholine

In analogy to the synthesis of 6-bromo-4-chloro-7-methoxy-2H-indazole, a solution of 2-bromo-5-chloro-3-fluoro-4'-morpholino-[1,1'-biphenyl]-4-carbaldehyde in dioxane was heated with an excess (20 equivalents) of hydrazine hydrate to give the title compound as colorless solid.

General Method A: Alkylation of Indazoles

A mixture of indazole (II, 1 eq), ethyl 2-bromoacetate (2 eq) and N,N-dimethylacetamide (small amount to produce a solution) is heated to 100° C. until completion of the reaction (usually 5-48 h). After cooling to room temperature, ice is added and the precipitated solid is collected by filtration and washed with water. Purification of the desired regioisomer can be accomplished by chromatography or in certain cases by re-crystallization from solvents such as EtOH, acetonitrile or dichloromethane.

Using General Method A, the following intermediates (III) were prepared:

| Intermediate (III) | Indazole (II) | Alkylating agent | MS m/e |
|---|---|---|---|
| ethyl 2-(6-bromo-4-chloro-2H-indazol-2-yl)acetate | 6-bromo-4-chloro-1H-indazole (CAS 885518-99-0) | ethyl 2-bromo-acetate | 319.0 ([M + H]$^+$, Br) |
| ethyl 2-(6-bromo-4,7-dichloro-2H-indazol-2-yl)acetate | 6-bromo-4,7-dichloro-1H-indazole | ethyl 2-bromo-acetate | 353.0 ([M + H]$^+$, Br) |
| ethyl 2-(6-bromo-4-chloro-7-methyl-2H-indazol-2-yl)acetate | 6-bromo-4-chloro-7-methyl-1H-indazole | ethyl 2-bromo-acetate | |
| ethyl 2-(6-bromo-4,7-dimethyl-2H-indazol-2-yl)acetate | 6-bromo-4,7-dimethyl-1H-indazole | ethyl 2-bromo-acetate | 311.1 ([M + H]$^+$ |
| ethyl 2-(6-bromo-4-chloro-7-ethyl-2H-indazol-2-yl)acetate | 6-bromo-4-chloro-7-ethyl-1H-indazole | ethyl 2-bromo-acetate | 346.9977 ([M + H]$^+$ |
| ethyl 2-(7-bromo-4-chloro-6-(4-morpholinophenyl)-2H-indazol-2-yl)acetate | 4-(4-(7-bromo-4-chloro-2H-indazol-6-yl)phenyl)morpholine | ethyl 2-bromo-acetate | 479.9 ([M + H]$^+$ |

Boronic acid derivatives are known or can be prepared in analogy to known methods or using the methods described below.

(3S,4S)-4-(4-Bromophenyl)-1-ethyl-3-fluoro-piperidine and (3R,4R)-4-(4-bromophenyl)-1-ethyl-3-fluoro-piperidine Step 1: tert-Butyl (3S,4S)-4-(4-bromophenyl)-3-hydroxy-piperidine-1-carboxylate AND tert-butyl (3R,4R)-4-(4-bromophenyl)-3-hydroxy-piperidine-1-carboxylate In a 4-neck round-bottomed flask, tert-butyl 4-(4-bromophenyl)-3,6-dihydropyridine-1(2H)-carboxylate (CAS 273727-44-9, 4.56 g, 13.5 mmol, Eq: 1) was dissolved in 90 ml THF and cooled to 0° C. Borane tetrahydrofuran complex, 1.0 M solution in THF (28.4 ml, 28.4 mmol, Eq: 2.11) was added dropwise at 0° C. After the addition was complete, the ice bath was removed and the reaction mixture was stirred at room temperature overnight. The reaction mixture was cooled to 0° C. Sodium hydroxide-solution, 6.0 M (aq.) (6.41 ml, 38.5 mmol, Eq: 2.85) was added (gas evolution observed, exothermic, a precipitate had formed) and the reaction mixture was stirred at 0° C. for 10 minutes. Hydrogen peroxide, 35 wt. % solution in water (3.78 g, 3.4 ml, 38.9 mmol, Eq: 2.88) was added (exothermic) and the reaction mixture was stirred at 50° C. for 2.5 h. The reaction mixture was cooled to room temperature and the excess of peroxide was quenched by addition of 10% $Na_2S_2O_3$-solution (~100 ml). The mixture was poured into $H2O$ and extracted with AcOEt (2×). The organic layers were washed with brine, combined, dried over Na2SO4 and evaporated to dryness. The residue adsorbed on Isolute HM-N and chromatographed over 220 g Silica Gel with Heptane→EtOAc/Heptane, Gradient 0-100% EtOAc to give the title compound as a white solid (3.9 g, 90% purity, 73% yield). m/z 302.0 [M-tBu+H]+, ESI pos.

Step 2: tert-Butyl (3S,4S)-4-(4-bromophenyl)-3-fluoro-piperidine-1-carboxylate and tert-butyl (3R, 4R)-4-(4-bromophenyl)-3-fluoro-piperidine-1-carboxylate tert-Butyl (3S,4S)-4-(4-bromophenyl)-3-hydroxy-piperidine-1-carboxylate AND tert-butyl (3R,4R)-4-(4-bromophenyl)-3-hydroxy-piperidine-1-carboxylate (3.9 g, 10.4 mmol, Eq: 1) was dissolved in 60 ml Dichlormethane and cooled to −76° C. (dry ice/acetone). Deoxo-fluor (50% in THF) (4.88 g, 4.06 ml, 11 mmol, Eq: 1.06) was added dropwise at −76° C. The reaction mixture was allowed to slowly warm to room temperature and stirred at room temperature (6.5 h). The reaction mixture was extracted with sat. $NaHCO_3$-solution and two times EtOAc. The organic layers were extracted with water and brine, dried over $Na_2SO_4$ and evaporated to dryness. The crude material was purified by flash chromatography on silica gel (120 g, 0% to 100% EtOAc in heptane) to give the title compound (2.7 g, 71% purity, 52% yield) as a colorless oil. m/z 302.0 [M-tBu+H]+, ESI pos, Br isotopes.

Step 3: tert-Butyl (3R,4R)-4-(4-bromophenyl)-3-fluoro-piperidine-1-carboxylate OR tert-butyl (3S, 4S)-4-(4-bromophenyl)-3-fluoro-piperidine-1-carboxylate Tert-butyl (3S,4S)-4-(4-bromophenyl)-3-fluoro-piperidine-1-carboxylate and tert-butyl (3R,4R)-4-(4-bromophenyl)-3-fluoro-piperidine-1-carboxylate (1.7 g) was resolved by chiral SFC chromatography (column: IG, 12 nm, 5 µm, 250×30 mm, eluent: isocratic 5% ethanol) to give the separate enantiomers. First to elute: tert-butyl (3R,4R)-4-(4-bromophenyl)-3-fluoropiperidine-1-carboxylate OR tert-butyl (3S,4S)-4-(4-bromophenyl)-3-fluoropiperidine-1-carboxylate (456 mg colourless oil, 93% purity, 25% yield), rt 2.38 min (column: IG, 12 nm, 5 µm, 250×4.6 mm, 5-20% MeOH), m/z 304.1 [M-tBu+H]+, ESI pos, Br isotopes; second to elute: tert-butyl (3S,4S)-4-(4-bromophenyl)-3-fluoropiperidine-1-carboxylate OR tert-butyl (3R,4R)-4-(4-bromophenyl)-3-fluoropiperidine-1-carboxylate (423 mg colourless oil, 25% yield), rt 2.67 min (column: IG, 12 nm, 5 µm, 250×4.6 mm, 5-20% MeOH), m/z 302.1 [M-tBu+H]+, ESI pos, Br isotopes. The absolute stereochemistry was not determined.

Step 4: (3R,4R)-4-(4-Bromophenyl)-1-ethyl-3-fluoro-piperidine OR (3S,4S)-4-(4-bromophenyl)-1-ethyl-3-fluoro-piperidine tert-butyl (3R,4R)-4-(4-bromophenyl)-3-fluoropiperidine-1-carboxylate OR tert-butyl (3S,4S)-4-(4-bromophenyl)-3-fluoropiperidine-1-carboxylate (first fraction from Step 3, 451 mg, 1.26 mmol, Eq: 1) was dissolved in DCM (15 ml) and HCl 4M in dioxane (4.72 ml, 18.9 mmol, Eq: 15) was added under ice-bath cooling. The reaction mixture was stirred at rt. The mixture was stirred for 2.5 hr at 25° C. The reaction mixture was concentrated to dryness. The residue was suspended in DCM (15 ml), sodium acetate (310 mg, 3.78 mmol, Eq: 3), acetaldehyde (83.2 mg, 107 µl, 1.89 mmol, Eq: 1.5) and sodium triacetoxyborohydride (400 mg, 1.89 mmol, Eq: 1.5) were added under ice-bath cooling. The bath was removed and the reaction mixture was stirred 2 h at rt. The reaction mixture was extracted with sat. $NaHCO_3$-solution and two times DCM. The organic layers were extracted with water, dried over $Na_2SO_4$ and concentrated to dryness. The crude material was purified by flash chromatography (silica gel, 25 g, 0% to 100% EtOAc in heptane) to give the title compound (Compound A) as a light yellow oil (276 mg, 90% purity, 69% yield). m/z 288.1 [M+H]+, ESI pos, Br isotopes.

(3S,4S)-4-(4-Bromophenyl)-1-ethyl-3-fluoro-piperidine OR (3R,4R)-4-(4-bromophenyl)-1-ethyl-3-fluoro-piperidine (Compound B) was prepared similarly, using the second fraction from Step 3, as a light yellow oil (248 mg, 90% purity, 67% yield). m/z 286.1 [M+H]+, ESI pos.

(4-((3S,4S)-1-(tert-Butoxycarbonyl)-3-fluoropiperidin-4-yl)phenyl)boronic acid OR (4-((3R,4R)-1-(tert-Butoxycarbonyl)-3-fluoropiperidin-4-yl)phenyl) boronic acid In a 100 ml three-neck round-bottomed flask, tert-butyl (3S,4S)-4-(4-bromophenyl) fluoropiperidine-1-carboxylate OR tert-butyl (3R,4R)-4-(4-bromophenyl)-3-fluoropiperidine carboxylate (2.50 g, 6.63 mmol, Eq: 1) was dissolved in 27 ml THF and cooled to −76° C. n-Butyllithium, 1.6M solution in hexanes (4.6 ml, 7.36 mmol, Eq: 1.11) was added and the reaction mixture was stirred at −76° C. for 1.5 h. Triethyl borate (1.37 g, 1.6 ml, 9.4 mmol, Eq: 1.42) was added at −76° C. and the reaction mixture was stirred at −76° C. for 15 min. Then, the dry ice bath was removed and the reaction mixture was stirred at room temperature (1 h). The reaction mixture was quenched with 20 ml sat. $NH_4Cl$-solution and stirred at room temperature for 30 min. The reaction mixture was extracted with ~70 ml EtOAc. The aqueous layer was backextracted with ~70 ml EtOAc. The organic layers were washed with ~10 ml water and ~10 ml brine. The organic layers were combined, dried over Sodium sulfate, filtered and concentrated. The residue was adsorbed on isolute hm-n and chromatographed over 40 g Silica Gel with Heptane→EtOAc/Heptane, Gradient 0-100% EtOAc and then switched to Dichloromethane→Methanol/Dichloromethane, Gradient 0-10% Methanol. All fractions containing product were combined to give the title compound (1.29 g) as an off-white foam. MS: m/e=268.0 ([M-tBu+H]+

(4-((3R,4R)-1-(tert-Butoxycarbonyl)-3-fluoropiperidin-4-yl)phenyl)boronic acid OR (4-((3S,4S)-1-(tert-Butoxycarbonyl)-3-fluoropiperidin-4-yl)phenyl)boronic acid was prepared by analogy with (4-((3S,4S)-1-(tert-Butoxycarbonyl)-3-fluoropiperidin-4-yl)phenyl)boronic acid OR (4-((3R,4R)-

1-(tert-Butoxycarbonyl)-3-fluoropiperidin-4-yl)phenyl) boronic acid, using the other enantiomer of the starting material.

(4-((3S,4S)-1-Ethyl-3-fluoropiperidin-4-yl)phenyl)boronic acid OR (4-((3R,4R)-1-ethyl-3-fluoropiperidin-4-yl)phenyl)boronic acid was prepared by analogy with (4-((3S,4S)-1-(tert-Butoxycarbonyl)-3-fluoropiperidin-4-yl)phenyl)boronic acid OR (4-((3R,4R)-1-(tert-Butoxycarbonyl)-3-fluoropiperidin-4-yl)phenyl)boronic acid, using (3S,4S)-4-(4-bromophenyl)-1-ethyl-3-fluoro-piperidine OR (3R,4R)-4-(4-bromophenyl)-1-ethyl-3-fluoro-piperidine. m/z [M+H]$^+$=252.2.

(4-((3R,4R)-1-(tert-Butoxycarbonyl)-3-fluoropiperidin-4-yl)phenyl)boronic acid AND (4-((3S,4S)-1-(tert-butoxycarbonyl)-3-fluoropiperidin-4-yl)phenyl)boronic acid was prepared by analogy with (4-((3S,4S)-1-(tert-Butoxycarbonyl)-3-fluoropiperidin-4-yl)phenyl)boronic acid OR (4-((3R,4R)-1-(tert-Butoxycarbonyl)-3-fluoropiperidin-4-yl)phenyl)boronic acid, starting from tert-butyl (3S,4S)-4-(4-bromophenyl)-3-fluoro-piperidine-1-carboxylate and tert-butyl (3R,4R)-4-(4-bromophenyl)-3-fluoro-piperidine-1-carboxylate.

1-(2-Fluoroethyl)-4-(4-(4,4,5,5-tetramethyl-1,3,2-dioxaborolan-2-yl)phenyl)piperidine Step 1)
4-(4-Bromophenyl)-1-(2-fluoroethyl)piperidine To a solution of 4-(4-bromophenyl)piperidine (CAS 769944-79-8, 2 g) in THF (6 ml) were added 2-fluoroethyl 4-methylbenzenesulfonate (CAS 383-50-6, 2.18 g) and Hunig's base (8.61 g). The reaction mixture was stirred for 72 hours at 60° C. The reaction mixture was extracted with water and twice with EtOAc. The combined organic layer was washed with water and brine, dried over Na2SO4 and evaporated to dryness. The crude material was purified by flash chromatography on silica gel (80 g, 0% to 50% EtOAc in Heptane) to give 4-(4-bromophenyl)-1-(2-fluoroethyl) piperidine (2.03 g) as a colorless viscous oil. MS: m/e=288.0 ([M+H]+)

Step 2) 1-(2-Fluoroethyl)-4-(4-(4,4,5,5-tetramethyl-1,3,2-dioxaborolan-2-yl)phenyl)piperidine To a solution of 4-(4-bromophenyl)-1-(2-fluoroethyl)piperidine (2.1 g) in Dioxane (15 ml) and were added 4,4,4',4',5,5,5',5'-octamethyl-2,2'-bi(1,3,2-dioxaborolane) (2.24 g), potassium acetate (2.16 g) and PdCl2(DPPF)-CH2Cl2 adduct (537 mg) at room temperature under argon. The mixture was stirred for 2 hours at 90° C. The reaction mixture was concentrated and purified by flash chromatography on silica gel (80 g, 0% to 10% MeOH in DCM) to afford 1-(2-fluoroethyl)-4-(4-(4,4,5,5-tetramethyl-1,3,2-dioxaborolan-2-yl)phenyl)piperidine (2.5 g) was obtained as a dark red solid. MS: m/e=334.2 ([M+H]+)

(4-(2-((tert-Butoxycarbonyl)amino)ethoxy)-3-ethylphenyl)boronic acid

Step 1: tert-Butyl (2-(2-ethyl-4-(4,4,5,5-tetramethyl-1,3,2-dioxaborolan-2-yl)phenoxy)ethyl)carbamate 2-ethyl-4-(4,4,5,5-Tetramethyl-1,3,2-dioxaborolan-2-yl) phenol (CAS 2098426-15-2, 300 mg, tert-butyl (2-bromoethyl)carbamate (325 mg) and potassium carbonate (585 mg) were mixed with DMF (5 ml) and stirred for 2 h at 80° C. and overnight at 60° C. After cooling to room temperature, the mixture was diluted with EtOAc, washed with water, dried, filtered and concentrated. The product was purified by chromatography (SiO2, 0-35% EtOAc in n-heptane) to give the title compound (307 mg) as colorless oil. MS: m/e=292.2 ([M+H—BOC]$^+$)

Step 2: (4-(2-((tert-Butoxycarbonyl)amino)ethoxy)-3-ethylphenyl)boronic acid tert-butyl (2-(2-ethyl-4-(4,4,5,5-tetramethyl-1,3,2-dioxaborolan-2-yl)phenoxy)ethyl)carbamate (300 mg) was dissolved in acetone (5 ml). After addition of sodium periodate (574 mg), ammonium acetate (207 mg) and water (5 ml) the white suspension was stirred 22 h at room temperature. The solid was filtered off, rinsed well with acetone. The filtrate was partly evaporated (acetone), the resulting solid collected by filtration, rinsed well with water and dried to give the title compound (214 mg) as colorless solid. MS: m/e=210.1 ([M+H—BOC]$^+$)

(4-(1-(2-Fluoropropyl)piperidin-4-yl)phenyl)boronic acid

Step 1: 1-[4-(4-Bromophenyl)-1-piperidyl]propan-2-ol

To a solution of 4-(4-bromophenyl)piperidine (CAS 80980-89-8, 10 g, 41.6 mmol, Eq: 1) in MeOH (100 ml) was added 2-methyloxirane (CAS 75-56-9, 2.65 g, 3.2 ml, 45.7 mmol, Eq: 1.1). The reaction mixture was stirred at 70° C. overnight. The reaction mixture was concentrated in vacuo and purified by flash chromatography (silica gel, 330 g, 0% to 5% MeOH in DCM) to give the title compound (7.94 g, 61% yield) as an off-white solid. MS: m/e=298.1, 300.1 ([M+H]$^+$)

Step 2: 4-(4-Bromophenyl)-1-(2-fluoropropyl)piperidine

A solution of 1-[4-(4-bromophenyl)-1-piperidyl]propan-2-ol (7.94 g, 25.3 mmol, Eq: 1) in DCM (150 ml) was cooled to −76° C. Deoxofluor (CAS 202289-38-1, 12.3 g, 13.7 ml, 27.8 mmol, Eq: 1.1) was added dropwise at −76° C. The reaction mixture was allowed to slowly warm to room temperature and stirred at room temperature overnight. The reaction mixture was quenched with sat. aq. NaHCO$_3$ and washed with 140 ml sat. aq. NaHCO$_3$. The aqueous layer was back-extracted twice with EtOAc. The organic layers were combined, dried over Na$_2$SO$_4$, filtered and concentrated in vacuo. The crude material was purified by flash chromatography (silica gel, 330 g, 0% to 50% MeOH in EtOAc) to give the title compound (6.18 g, 79% yield) as a yellow liquid. MS: m/e=300.1, 302.1 ([M+H]$^+$)

Step 3: (4-(1-(2-Fluoropropyl)piperidin-4-yl)phenyl) boronic acid

A solution of 4-(4-bromophenyl)-1-(2-fluoropropyl)piperidine (400 mg, 1.33 mmol, Eq: 1) in THF (5.5 ml) was cooled to −78° C. n-Butyllithium (1.6 M in hexanes) (0.92 ml, 1.47 mmol, Eq: 1.1) was added dropwise and the reaction mixture was stirred at −78° C. for 1.5 h. Triethyl borate (292 mg, 0.34 ml, 2 mmol, Eq: 1.5) was added at −78° C. and the reaction mixture was stirred at −78° C. for 30 min and at room temperature for 2 h. The reaction mixture was quenched with sat. aq. NH$_4$Cl-solution (5.5 ml) and stirred at room temperature for 2 h. The reaction mixture was extracted with EtOAc. The aqueous layer was back-extracted with EtOAc. The organic layers were washed with water and brine. The combined organic layers were dried over $Na_2SO_4$ and concentrated in vacuo to give the title compound (335 mg, 90% purity, 85% yield) as an off-white foam which was used without further purification. MS: m/e=265.8 ([M+H]$^+$)

(4-(1-(2-Methoxyethyl)piperidin-4-yl)phenyl)boronic acid

Step 1:
4-(4-Bromophenyl)-1-(2-methoxyethyl)piperidine

To a solution of 4-(4-bromophenyl)piperidine (CAS 80980-89-8, 7 g, 29.1 mmol, Eq: 1) in acetonitrile (100 ml) were added Hunig's base (7.53 g, 10.2 ml, 58.3 mmol, Eq: 2) and 1-bromo-2-methoxyethane (CAS 6482-24-2, 4.86 g, 3.29 ml, 35 mmol, Eq: 1.2). The reaction mixture was stirred for 3 h at room temperature and for 16 h at 50° C. The reaction mixture was poured into water and extracted twice with EtOAc. The combined organic layers were dried over $Na_2SO_4$ and concentrated in vacuo. The crude material was purified by flash chromatography (silica gel, 80 g, 0% to 10% MeOH in DCM) to give the title compound (5.08 g, 58% yield) as a yellow semisolid. MS: m/e=300.1 ([M+H]$^+$)

Step 2: (4-(1-(2-Methoxyethyl)piperidin-4-yl)phenyl)boronic acid

A solution of 4-(4-bromophenyl)-1-(2-methoxyethyl)piperidine (1.62 g, 5.16 mmol, Eq: 1) in THF (22 ml) was cooled to −78° C. n-Butyllithium (1.6 M in hexanes) (3.5 ml, 5.6 mmol, Eq: 1.09) was added dropwise and the reaction mixture was stirred at −78° C. for 3 h. Triethyl borate (1.12 g, 1.3 ml, 7.64 mmol, Eq: 1.48) was added at −78° C. and the reaction mixture was stirred at −78° C. for 30 min and at room temperature for 1.5 h. The reaction mixture was quenched with sat. aq. $NH_4Cl$-solution (22 ml) and stirred at room temperature for 30 min. The reaction mixture was extracted with EtOAc. The aqueous layer was back-extracted with EtOAc. The organic layers were washed with water and brine. The combined organic layers were dried over $Na_2SO_4$ and concentrated in vacuo. The crude material was adsorbed on Isolute HM-N and purified by flash chromatography (silica gel, 40 g, 0% to 10% MeOH in DCM) to give the title compound (751 mg, 53% yield) as a light yellow oil. MS: m/e=264.1 ([M+H]$^+$)

(4-(2-(1,3-Dioxolan-2-yl)ethyl)phenyl)boronic acid

In a 50 ml three-neck round-bottomed flask, 2-(4-bromophenethyl)-1,3-dioxolane (CAS: 1312033-12-7) was dissolved in THF (20 ml) and cooled to −76° C. n-Butyllithium, 1.6M solution in hexanes (2.46 ml, 3.93 mmol, Eq: 1.11) was added and the reaction mixture was stirred at −76° C. for 1.5 h. Triethyl borate (775 mg, 903 µl, 5.31 mmol, Eq: 1.5) was added at −76° C. and the reaction mixture was stirred at −76° C. for 30 min. Then, the dry ice bath was removed and the reaction mixture was stirred at room temperature (1 h). The reaction mixture was quenched with 10 ml sat. NH4Cl-solution and stirred at room temperature for 30 min. The reaction mixture was extracted with ~50 ml EtOAc. The aqueous layer was backextracted with ~50 ml EtOAc. The organic layers were washed with ~5 ml water and ~5 ml brine. The organic layers were combined, dried over Sodium sulfate, filtered and concentrated to give the title compound (0.608 g) as light brown gum. MS: m/e=161.1 ([M−62+H]+).

(1-(4-(4,4,5,5-Tetramethyl-1,3,2-dioxaborolan-2-yl) benzyl)piperidin-4-yl)methanol Step 1: 1-[(4-Bromophenyl)methyl]piperidin-4-yl] methanol In a 250 mL round-bottomed flask, piperidin-4-ylmethanol (1.49 g, 13 mmol, Eq: 1.2) was combined with DCM (60 mL) to give a colorless solution. 4-Bromobenzaldehyde (2 g, 10.8 mmol, Eq: 1) and sodium triacetoxyborohydride (2.75 g, 13 mmol, Eq: 1.2) were added at 0° C. The ice-bath was removed and the reaction mixture was stirred at rt for 3 h. The reaction mixture was poured into sat. aq. $NaHCO_3$ and extracted with DCM (2×). The crude material was purified by flash chromatography (silica gel, 40 g, 0% to 100% (4:1 DCM/MeOH+0.5% $NH_4OH$) in DCM) to give title compound as a colorless liquid (2.90 g, 95% purity, 89% yield). m/z 284.1 [M+H]$^+$, ESI pos.

Step 2: (1-(4-(4,4,5,5-Tetramethyl-1,3,2-dioxaborolan-2-yl)benzyl)piperidin-4-yl)methanol A 150 mL round-bottomed flask was charged with [1-[(4-bromophenyl)methyl]-4-piperidyl]methanol (2.9 g, 10.2 mmol, Eq: 1), bis(pinacolato)diboron (3.11 g, 12.2 mmol, Eq: 1.2), potassium acetate (3 g, 30.6 mmol, Eq: 3), Pd(dppf) $Cl_2 \cdot CH_2Cl_2$ (833 mg, 1.02 mmol, Eq: 0.1) and dioxane (50 mL). The reaction mixture was flushed with argon and stirred at 90° C. for 2 h. The reaction mixture was cooled to rt, filtered and the solids were washed with dioxane. The filtrate was concentrated in vacuo. The crude material was adsorbed on Isolute HM-N and purified by flash chromatography (Si-amine, 40 g, then a second with 25 g, 0% to 80% (4:1 EtOAc/MeOH) in EtOAc)) to give the title compound as a colorless oil (3.60 g, 85% purity, 90% yield). m/z 332.3 [M+H]+, ESI pos.

(4-(2-(((tert-Butyldimethylsilyl)oxy)methyl)morpholino)phenyl)boronic acid

Step 1: 4-(4-Bromophenyl)-2-(((tert-butyldimethylsilyl)oxy)methyl)morpholine

Morpholin-2-ylmethanol hydrochloride (0.9 g) was suspended in CH2Cl2 (10 ml) Et3N (2.13 g) and TBDMS-Cl (1.59 g) was added at rt. The mixture was stirred for 2 hr at 20° C. The reaction mixture was extracted with sat. $NaHCO_3$-solution and two times MeCl2. The organic layers were extracted with water, dried over Na2SO4, filtered and evaporated to dryness. The crude residue (1.7 g) and 1-bromo-4-iodobenzene (1.6 g) were dissolved in 15 ml Toluene. Sodium tert-butoxide (1.48 g), XantPhos (298 mg) and Tris(dibenzylideneacetone)dipalladium (0) (235 mg) were added. The flask was carefully evacuated and back-filled with Argon. The reaction mixture was stirred at 90° C. (=oil bath temperature) for 6 h and at room temperature overnight. The reaction mixture was extracted with ~70 ml EtOAc and ~10 ml water. The aqueous layer was backextracted with ~70 ml EtOAc. The organic layers were washed with ~10 ml water and ~10 ml brine. The organic layers were combined, dried over Sodium sulfate, filtered and concentrated. The residue was adsorbed on isolute hm-n and chromatographed over 40 g Silica Gel with Heptane→E- tOAc/Heptane, Gradient 0-10% EtOAc. All fractions containing product were combined and concentrated to give the title compound (220 mg) as a yellow oil. MS: m/e=387.9 ([M+H]$^+$)

Step 2: (4-(2-(((tert-Butyldimethylsilyl)oxy)methyl) morpholino)phenyl)boronic acid In analogy to the synthesis of (4-((3S,4S)-1-(tert-butoxycarbonyl)-3-fluoropiperidin-4-yl)phenyl)boronic acid, 4-(4-bromophenyl)-2-(((tert-butyldimethylsilyl)oxy)methyl) morpholine was first treated with n-Butyllithium at –76° C. and then was reacted with triethyl borate to give the title compound as light brown gum. MS: m/e=352.0 ([M+H]$^+$)

(4-(3-(((tert-Butyldimethylsilyl)oxy)methyl)cyclobutyl)phenyl)boronic acid

Step 1: 43-(4-Bromophenyl)cyclobutyl)methoxy) (tert-butyl)dimethylsilane

[3-(4-bromophenyl)cyclobutyl]methanol (CAS 1782303-81-4, 0.45 g) was dissolved in Dichloromethane (10 ml) imidazole (381 mg) and TBDMS-Cl (422 mg) were added at rt. The mixture was stirred for 16 hr at 20° C. The reaction mixture was extracted with sat. NaHCO$_3$-solution and two times MeCl$_2$. The organic layers were extracted with water, dried over Na$_2$SO$_4$, filtered and evaporated to dryness. The crude material was purified by flash chromatography (silica gel, 20 g, 0% to 50% EtOAc in heptane). All fractions containing product were combined and concentrated to give the title compound (410 mg) as a white solid. MS: m/e=356.3 ([M+H]+)

Step 2: (4-(3-(((tert-Butyldimethylsilyl)oxy)methyl) cyclobutyl)phenyl)boronic acid In analogy to the synthesis of (4-((3S,4S)-1-(tert-Butoxycarbonyl)-3-fluoropiperidin yl)phenyl)boronic acid, ((3-(4-bromophenyl)cyclobutyl)methoxy)(tert-butyl)dimethylsilane was first treated with n-Butyllithium at –76° C. and then was reacted with triethyl borate to give the title compound as light brown gum. MS: m/e=352.0 ([M+31+H]+)

1-(2-(4-(4,4,5,5-Tetramethyl-1,3,2-dioxaborolan-2-yl)phenoxy)ethyl)piperidin-4-ol Step 1: 1-(2-(4-Bromophenoxy)ethyl)piperidin-4-ol To a stirred solution of 2-(4-bromophenoxy)ethan-1-ol CAS: 34743-88-9 (4.6038 g) and triethylamine (3.65 g) in THF (50 ml) was added at 0° C. methanesulfonyl chloride (3.64 g), and the mixture was allowed to warm up to RT and stirred over the weekend. The mixture was added to iced water, then extracted 3 times with DCM:MeOH-9:1. The combined organic phases were dried over sodium sulphate and concentrated. 1 g of the residue was dissolved in DMF (9 ml) and piperidin-4-ol (343 mg) and DIPEA (1.31 g) were added. The reaction was heated to 80° C. and the reaction stirred for 4 hours. The reaction was quenched with deion. water. The reaction mixture was poured into 50 ml H$_2$O and was extracted with 3×50 ml DCM:MeOH 9:1. The crude product was purified by flash chromatography (silica gel, 40 g, 0-20% MeOH in DCM). The product was collected from the fractions and concentrated in vacuo to give the title compound as an off-white solid (708 mg). MS: m/e=302.1 ([M+H]+)

Step 2: 1-(2-(4-(4,4,5,5-Tetramethyl-1,3,2-dioxaborolan-2-yl)phenoxy)ethyl)piperidin-4-ol A microwave tube was charged with 1-(2-(4-bromophenoxy)ethyl)piperidin-4-ol (708.1 mg) 4,4,4',4',5,5,5',5'-octamethyl-2,2'-bi(1,3,2-dioxaborolane) (593 mg), potassium acetate (625 mg) PdCl2(DPPF)-CH$_2$Cl$_2$ adduct (155 mg) and dioxane (8 ml). The reaction mixture was flushed with argon and stirred at 90° C. for 3 hrs. The reaction mixture was cooled to room temperature, and dried under vacuum. It was then adsorbed on isolute hm-n and chromatographed over 25 g Silica Gel with 0-20% MeOH in DCM. All fractions containing product were combined and concentrated to give the title compound (587 mg) as a brown oil. MS: m/e=348.3 ([M+H]+)

2-(1-(4-(4,4,5,5-Tetramethyl-1,3,2-dioxaborolan-2-yl)benzyl)piperidin-4-yl)ethan-1-ol Step 1: 2-(1-(4-Bromobenzyl)piperidin-4-yl)ethan-1-ol To a solution of 2-(piperidin-4-yl)ethan-1-ol (CAS 622-26-4, 1.34 g, 10.4 mmol, Eq: 1.2) in DCM (50 ml) was added 4-bromobenzaldehyde (CAS 1122-91-4, 1.6 g, 8.65 mmol, Eq: 1) and sodium triacetoxyborohydride (2.2 g, 10.4 mmol, Eq: 1.2) at 0° C. The ice-bath was removed and the reaction mixture was stirred at room temperature for 3 h. The reaction mixture was poured into sat. aq. NaHCO$_3$-solution and extracted twice with DCM. The combined organic layers were dried over Na$_2$SO$_4$ and concentrated in vacuo. The crude material was purified by flash chromatography (silica gel, 40 g, 0% to 100% (DCM:MeOH (+0.5% NH$_4$OH) 4:1) in DCM) to give the title compound (2.35 g, 87% yield) as a colorless liquid. MS: m/e=299.8 ([M+H]$^+$)

Step 2: 2-(1-(4-(4,4,5,5-Tetramethyl-1,3,2-dioxaborolan-2-yl)benzyl)piperidin-4-yl)ethan-1-ol A mixture of 2-(1-(4-bromobenzyl)piperidin-4-yl)ethan-1-ol (2.35 g, 7.88 mmol, Eq: 1), bis(pinacolato)diboron (2.4 g, 9.46 mmol, Eq: 1.2), potassium acetate (2.32 g, 23.6 mmol, Eq: 3), PdCl$_2$(dppf)-CH$_2$Cl$_2$ adduct (644 mg, 788 µmol, Eq: 0.1) in dioxane (50 ml) was flushed with argon and stirred at 90° C. for 2 h. The reaction mixture was cooled to room temperature, filtered and washed with dioxane. The filtrate was concentrated in vacuo. The crude material was adsorbed on Isolute HM-N and purified by flash chromatography (Si-amine, 40 g, then a second with 25 g, 0% to 80% (EtOAc/MeOH 4:1) in EtOAc) to give the title compound (2.93 g, 85% purity, 92% yield) as a brown oil. MS: m/e=346.3 ([M+H]$^+$)

7-(4-(4,4,5,5-Tetramethyl-1,3,2-dioxaborolan-2-yl) benzyl)-7-azaspiro[3.5]nonan-2-ol Step 1: 7-(4-Bromobenzyl)-7-azaspiro[3.5]nonan-2-ol 1-Bromo-4-(bromomethyl)benzene (377 mg) was dissolved in DMF (4 ml) and 7-azaspiro[3.5]nonan-2-ol hydrochloride (452 mg) and DIPEA (780 mg) were added. The reaction was heated to 50° C. and stirred overnight for 16 hours. The reaction was quenched with deion. water. The reaction mixture was poured into 50 ml H2O and was extracted with 3×50 ml DCM:MeOH 9:1. The crude product was purified by flash chromatography (silica gel, 24 g, MeOH in DCM, 0-10%). All fractions containing product were combined and concentrated to give the title compound (434 mg) as a light brown oil. MS: m/e=311.8 ([M+H]+)

Step 2: 7-(4-(4,4,5,5-Tetramethyl-1,3,2-dioxaborolan-2-yl)benzyl)-7-azaspiro[3.5]nonan-2-ol A microwave tube was charged with 7-(4-bromobenzyl)-7-azaspiro[3.5]nonan-2-ol (334 mg) 4,4,4',4',5,5,5',5'-octamethyl-2,2'-bi(1,3,2-dioxaborolane) (301 mg), potassium acetate (317 mg), PdCl2(DPPF)-CH2Cl2 adduct (78.8 mg) and Dioxane (5 ml). The reaction mixture was flushed with Argon and stirred at 90° C. for 2 hrs. The reaction mixture was cooled to room temperature, and dried under vacuum. It was then adsorbed on isolute hm-n and chromatographed over 25 g Silica Gel with 0-20% MeOH in DCM. All fractions containing product were combined and concentrated to give the title compound (60 mg) as a light brown oil. MS: m/e=358.3 ([M+H]+)

7-(2-(4-(4,4,5,5-Tetramethyl-1,3,2-dioxaborolan-2-yl)phenoxy)ethyl)-7-azaspiro[3.5]nonan-2-ol Step 1: 7-(2-(4-Bromophenoxy)ethyl)-7-azaspiro[3.5]nonan-2-ol To a solution of 2-(4-bromophenoxy)ethyl methanesulfonate (CAS 945999-94-0, 580 mg, 1.97 mmol, Eq: 1) in DMF (4 ml) were added 7-azaspiro[3.5]nonan-2-ol hydrochloride (CAS 587869-08-7, 453 mg, 1.97 mmol, Eq: 1, 77% purity) and Hunig's base (1.02 g, 1.37 ml, 7.86 mmol, Eq: 4). The reaction mixture was heated to 80° C. and stirred for 4 h. The reaction mixture was quenched with deion. water. The reaction mixture was poured into water and was extracted three times with a mixture of DCM:MeOH 9:1. The combined organic layers were dried over $Na_2SO_4$ and concentrated in vacuo. The crude material was purified by flash chromatography (silica gel, 40 g, 0% to 20% MeOH in DCM) to give the title compound (212 mg, 32% yield) as a red oil. MS: m/e=341.8 ([M+H]$^+$)

Step 2: 7-(2-(4-(4,4,5,5-Tetramethyl-1,3,2-dioxaborolan-2-yl)phenoxy)ethyl)-7-azaspiro[3.5]nonan-2-ol A mixture of 7-(2-(4-bromophenoxy)ethyl)-7-azaspiro[3.5]nonan-2-ol (100 mg, 0.294 mmol, Eq: 1), bis(pinacolato)diboron (82 mg, 0.323 mmol, Eq: 1.1), potassium acetate (87 mg, 0.882 mmol, Eq: 3), PdCl$_2$(dppf)-CH$_2$Cl$_2$ adduct (21 mg, 0.029 mmol, Eq: 0.1) in dioxane (2 ml) was flushed with argon and stirred at 90° C. for 1.5 h. The reaction mixture was cooled to room temperature and concentrated in vacuo. The crude material was adsorbed on Isolute HM-N and purified by flash chromatography (silica gel, 25 g, 0% to 20% MeOH in DCM) to give the title compound (93 mg, 82% purity, 67% yield) as a brown gum. MS: m/e=388.3 ([M+H]$^+$)

(4-((7R,8aS)-7-((tert-Butyldimethylsilyl)oxy)hexahydropyrrolo[1,2-a]pyrazin-2(1H)-yl)phenyl)boronic acid Step 1: (7R,8aS)-7-((tert-Butyldimethylsilyl)oxy)octahydropyrrolo[1,2-a]pyrazine 2,6-Lutidine (1.58 g) was added to a solution of (7R,8aS)-octahydropyrrolo[1,2-a]pyrazin-7-ol (CAS 879399-07-2, 420 mg) in DCM (29.5 ml) at 0° C. under argon. The resulting mixture was cooled to −40° C., and tert-butyldimethylsilyl trifluoromethylsulfonate (2.34 g) was added dropwise by syringe, and the reaction was allowed to warm slowly to rt. After 18 h, MeOH (5 mL) was added, and the reaction was concentrated in vacuo. The residue was purified by flash chromatography (NH2-silica, 40 g, 50% EtOAc/heptane), then dried on high vacuum for 1 h to give the title compound (667 mg, 84% yield) as a pale yellow oil. MS: m/e=257.5 ([M+H]$^+$).

Step 2: (7R,8aS)-2-(4-Bromophenyl)-7-((tert-butyldimethylsilyl)oxy)octahydropyrrolo[1,2-a]pyrazine To a dry vial was added 1-bromo-4-iodobenzene (908 mg), (7R,8aS)-7-((tert-butyldimethylsilyl)oxy)octahydropyrrolo[1,2-a]pyrazine (633 mg), Xantphos (179 mg) and sodium tert-butoxide (712 mg). Dioxane (6.17 ml) was added and the vial was sparged with Ar with sonication for 10 min. Pd$_2$(dba)$_3$ (113 mg) was then added, the vial was sealed, and the reaction was heated at 80 degrees. After 3 h the reaction was cooled to rt and filtered through Celite (eluent EtOAc), then concentrated onto silica. Purification by flash chromatography (silica gel, 70 g, 0-15% 75:25:2 EtOAc-EtOH-aq. NH$_3$/heptane), followed by repurification of mixed fractions (silica gel, 40 g, 0-10% 75:25:2 EtOAc-EtOH-aq. NH$_3$/heptane) gave the title compound (865 mg, 81% yield) as a yellow solid. MS: m/e=411.1, 412.7 ([M+H]$^+$).

Step 3: (4-((7R,8aS)-7-((tert-Butyldimethylsilyl)oxy)hexahydropyrrolo[1,2-a]pyrazin-2(1H)-yl)phenyl)boronic acid (7R,8aS)-2-(4-bromophenyl)-7-((tert-butyldimethylsilyl)oxy)octahydropyrrolo[1,2-a]pyrazine (410 mg) was dissolved in THF (4.73 ml) and cooled to −78° C. n-Butyllithium (1.6 M in hexanes) (710 µl) was added dropwise, and the reaction was stirred for 30 min, then triisopropyl borate (249 mg) was added and the reaction was allowed to warm slowly to rt overnight. After 15 h, the reaction was quenched with water (10 mL) and sat. aq. NH$_4$Cl (10 mL), and extracted with TBME (3×20 mL). The combined organic layers were washed with water (30 mL) and brine (30 mL), dried (Na$_2$SO$_4$), filtered and concentrated in vacuo. The residue was concentrated twice from toluene, and dried in vacuo to give the title compound as a brown gum (391 mg, ~50% purity) which was used without further purification. MS: m/e=377.2 ([M+H]$^+$).

(1-(2-(4-(4,4,5,5-Tetramethyl-1,3,2-dioxaborolan-2-yl)phenoxy)ethyl)piperidin-4-yl)methanol To a mixture of [1-[2-(4-bromophenoxy)ethyl]-4-piperidyl]methanol (CAS 1226008-23-6, 1.3 g, 4.14 mmol, Eq: 1), bis(pinacolato)diboron (1.16 g, 4.55 mmol, Eq: 1.1), potassium acetate (1.22 g, 12.4 mmol, Eq: 3) in 1,4-dioxane (15 mL) was added Pd(dppf)Cl$_2$·CH$_2$Cl$_2$ (303 mg, 414 µmol, Eq: 0.1). The reaction mixture was flushed with argon and stirred for 3 h at 90° C. The reaction mixture was concentrated in vacuo and purified by flash chromatography (silica gel, 50 g, 0% to 20% MeOH in DCM) to give the title compound as a dark brown oil (1.45 g, 80% purity, 77% yield). m/z 362.2 [M+H]$^+$, ESI pos.

(4-(1-Ethylpiperidin-4-yl)phenyl)boronic acid hydrobromide

To a stirred solution of 1-ethyl-4-(4-(4,4,5,5-tetramethyl-1,3,2-dioxaborolan-2-yl)phenyl)piperidine (CAS 656257-45-3, 158.8 mg) in CH2Cl2 (4 ml) was added BBr3, 1 M in dichloromethane (1 ml), then the mixture was stirred at RT for 30 min. A brown gum was formed at the bottom of the flask, which contained the product. The dichloromethane phase was decanted, the remaining material was dried under high vacuum, then combined with diethyl ether. The suspension was filtered, and the solid was washed with diethyl ether, then dried under high vacuum to afford (4-(1-ethylpiperidin-4-yl)phenyl)boronic acid hydrobromide (171 mg) as a light brown solid.

1-(2-Fluoropropyl)-4-(4-(4,4,5,5-tetramethyl-1,3,2-dioxaborolan-2-yl)phenyl)piperidine To a mixture of 4-(4-bromophenyl)-1-(2-fluoropropyl)piperidine (1.5 g, 5 mmol, Eq: 1), bis(pinacolato)diboron (1.16 g, 4.55 mmol, Eq: 1.1), potassium acetate (1.22 g, 12.4 mmol, Eq: 3) in 1,4-dioxane (17 mL) was added Pd(dppf)Cl$_2$·CH$_2$Cl$_2$ (366 mg, 500 µmol, Eq: 0.1). The reaction mixture was flushed with argon and stirred for 3 h at 90° C. The reaction mixture was concentrated in vacuo and purified by flash chromatography (silica gel, 25 g, 0% to 30% EtOAc in heptane) to give the title compound as a dark brown oil (1.45 g, 77% yield). m/z 348.1 [M+H]$^+$, ESI pos.

1-[1-[2-[4-(4,4,5,5-Tetramethyl-1,3,2-dioxaborolan-2-yl)phenyl]ethyl]-4-piperidyl]ethanol

Step 1: 1-[1-[2-(4-Bromophenyl)ethyl]-4-piperidyl]ethanol

To a solution of 2-(4-bromophenyl)acetaldehyde (CAS 27200-79-9, 1.00 g, 5.02 mmol, Eq: 1) and 1-(4-piperidyl)ethanol (CAS 6457-48-3, 844 mg, 6.53 mmol, Eq: 1.3) in DCM (10 mL) was added sodium triacetoxyborohydride (3.19 g, 15.1 mmol, Eq: 3). The reaction mixture was stirred for 16 h at rt. The reaction mixture was quenched with sat. aq. Na$_2$CO$_3$ and extracted twice with EtOAc. The organic layers were washed with water and brine. The combined organic layers were dried over Na$_2$SO$_4$ and concentrated in vacuo. The crude material was purified by flash chromatography (silica gel, 80 g, 0% to 20% MeOH in DCM) to give the title compound as a colorless oil (1.15 g, 23% yield). m/z 314.0 [M+H]$^+$, ESI pos.

Step 2: 1-[1-[2-[4-(4,4,5,5-Tetramethyl-1,3,2-dioxaborolan-2-yl)phenyl]ethyl]-4-piperidyl]ethanol A mixture of 1-[1-[2-(4-bromophenyl)ethyl]-4-piperidyl]ethanol (1.15 g, 3.68 mmol, Eq: 1), bis(pinacolato)diboron (1.12 g, 4.42 mmol, Eq: 1.2) and potassium acetate (1.08 g, 11 mmol, Eq: 3) in 1,4-dioxane (25 mL) was flushed with argon and Pd(dppf)Cl$_2$·CH$_2$Cl$_2$ (301 mg, 0.368 mmol, Eq: 0.1) was added. The reaction mixture was flushed with argon and stirred for 3 h at 90° C. The reaction mixture was filtered, washed with dioxane and concentrated in vacuo. The crude material was purified by flash chromatography (silica gel, 24 g, 0% to 100% (DCM:MeOH:NH$_4$OH 9:1: 0.05) in DCM) to give the title compound as a dark brown oil (1.35 g, 60% purity, 61% yield). m/z 360.3 [M+H]$^+$, ESI pos.

Other Intermediates:

3-(4-(4-Bromophenyl)piperidin-1-yl)cyclobutan-1-ol

To a solution of 4-(4-bromophenyl)piperidine hydrochloride (CAS 769944-79-8, 330 mg) in dichloroethane (15 ml), triethylamine (362 mg) and molecular sieves were added. The resulting mixture was stirred at room temperature for 10 mins then 3-hydroxycyclobutan-1-one (103 mg) was added and the resulting reaction mixture was stirred at 45° C. for 1 hour. Sodium triacetoxyborohydride (759 mg, 3.58 mmol, Eq: 3) was added and to reaction mixture was stirred at room temperature for 2 days. The reaction mixture was diluted with saturated sodium bicarbonate solution and the product was extracted with ethylacetate (3×50 ml). The combined organic layer was dried over magnesium sulfate and concentrated under vacuo. The crude was purified by silica gel chromatography (silica gel, 25 g, 0% to 20% methanol in dichloromethane) to give The crude was purified by silica gel chromatography (silica gel, 330 g, 0% to 20% EtOAc in heptane) to give 1-bromo-2-(difluoromethyl)-3-fluoro-5-(trifluoromethyl)benzene (153 mg, 33.1 mmol, 49.2% yield) as a yellow oil. MS: m/e=312.1 ([M+H]+)

(3aR,6aS)-5-(4-Bromophenyl)-2-ethyloctahydrocyclopenta[c]pyrrole

Step 1: cis-tert-Butyl (3aR,6aS)-5-(4-bromophenyl)-5-hydroxyhexahydrocyclopenta[c]pyrrole-2(1H)-carboxylate To a stirred solution of 1,4-dibromobenzene (2.09 g) in THF (14.2 ml) under argon atmosphere was added dropwise at −78° C. BuLi, 1.6 M in hexane (5.55 ml), and the mixture was stirred at the same temperature for 30 min. Then cis-tert-butyl (3aR,6aS)-5-oxohexahydrocyclopenta[c]pyrrole-2(1H)-carboxylate (CAS 146231-54-1, 2 g) dissolved in THF (7 ml) was added dropwise at −78° C., then the mixture was allowed to slowly warm up to room temperature and stirred overnight at RT. The mixture was quenched with saturated NH$_4$Cl solution in an ice bath, partitioned between ethyl acetate and water, and the phases were separated. The aqueous layer was extracted 2 times with EtOAc. The combined organic layers were washed with water and brine, dried over Na$_2$SO$_4$, then concentrated in vacuo. The crude product was purified by flash chromatography (120 g Si-Amine column, 0% to 30% EtOAc in heptane, detection at 230 nm) to afford cis-tert-butyl (3aR,6aS)-5-(4-bromophenyl)-5-hydroxyhexahydrocyclopenta[c]pyrrole-2(1H)-carboxylate (2.24 g) as a white solid. MS: m/e=382.2 ([M+H]+)

Step 2: Mixture of cis-(3aR,6aS)-5-(4-Bromophenyl)-1,2,3,3a,4,6a-hexahydrocyclopenta[c] and (3aS,6aR)-5-(4-Bromophenyl)-1,2,3,3a,4,6a-hexahydrocyclopenta[c]pyrrole tert-butyl (3aR,6aS)-5-(4-bromophenyl)-5-hydroxyhexahydrocyclopenta[c]pyrrole-2(1H)-carboxylate (2.2 g) was combined with 2,2,2-trifluoroacetic acid (11.8 g) and the mixture was stirred at room temperature overnight. The reaction mixture was concentrated under vacuo, then 1 M NaHCO$_3$ solution was added. The aqueous phase was extracted three times with dichloromethane:MeOH-95:5, dried over Na$_2$SO$_4$, and concentrated under vacuo to afford a crude mixture of the desired products cis-(3aR,6aS)-5-(4-bromophenyl)-1,2,3,3a,4,6a-hexahydrocyclopenta[c]pyrrole and cis-(3aS,6aR)-5-(4-bromophenyl)-1,2,3,3a,4,6a-hexahydrocyclopenta[c]pyrrole (1.58 g) as a brown solid which was used for the next step without further purification. MS: m/e=266.1 ([M+H]$^+$)

Step 3: Mixture of cis-(3aR,6aS)-5-(4-Bromophenyl)-2-ethyl-1,2,3,3a,4,6a-hexahydrocyclopenta[c]pyrrole and (3aS,6aR)-5-(4-Bromophenyl)-2-ethyl-1,2,3,3a,4,6a-hexahydrocyclopenta[c]pyrrole To a stirred solution of the mixture of (3aR,6aS)-5-(4-bromophenyl)-1,2,3,3a,4,6a-hexahydrocyclopenta[c] and (3aS,6aR)-5-(4-bromophenyl)-1,2,3,3a,4,6a-hexahydrocyclopenta[c]pyrrole (300 mg) in DMF (5.68 ml) at room temperature were added iodoethane (213 mg) and Hunig's base (440 mg). The reaction mixture was stirred at 60° C. for 1 hour. The reaction mixture was diluted with water and extracted twice with dichloromethane/methanol 9:1. The combined organic layers were washed with water and brine, dried over sodium sulfate and concentrated to give crude mixture of cis-(3aR,6aS)-5-(4-bromophenyl)-2-ethyl-1,2,3,3a,4,6a-hexahydrocyclopenta[c]pyrrole and cis-(3aS,6aR)-5-(4-bromophenyl)-2-ethyl-1,2,3,3a,4,6a-hexahydrocyclopenta[c]pyrrole (289 mg) used for the next step without further purification. MS: m/e=292.2 ([M+H]$^+$)

Step 4: cis-(3aR,6aS)-5-(4-Bromophenyl)-2-ethyloctahydrocyclopenta[c]pyrrole To the mixture of cis-(3aR,6aS)-5-(4-bromophenyl)-2-ethyl-1,2,3,3a,4,6a-hexahydrocyclopenta[c]pyrrole and (3aS,6aR)-5-(4-bromophenyl)-2-ethyl-1,2,3,3a,4,6a-hexahydrocyclopenta[c]pyrrole (160 mg) dissolved in ethylacetate (6 ml) and N,N-dimethylformamide (1 ml) was added platinum (IV) oxide hydrate (CAS 52785-06-5, 40 mg). The reaction mixture was hydrogenated at 8 bars and 50° C. for 18 hours. The reaction mixture was filtered and the filtercake was rinsed with ethylacetate. The combined filtrate was evaporated under vacuo to give crude cis-(3aR,6aS)-5-(4-bromophenyl)-2-ethyloctahydrocyclopenta[c]pyrrole (99 mg). MS: m/e=294.2 ([M+H]$^+$)

(1-((3-(4-Bromophenyl)bicyclo[1.1.1]pentan-1-yl)methyl)piperidin-4-yl)methanol

Step 1: (3-(4-Bromophenyl)bicyclo[1.1.1]pentan-1-yl)methanol

In a dry flask under argon, 3-(4-bromophenyl)bicyclo[1.1.1]pentane-1-carboxylic acid (CAS 1980054-39-4, 400 mg) was dissolved in THF (3 mL), and the mixture was cooled to 0° C. Borane-methyl sulfide complex (2 M in THF) (818 µl) was added dropwise, and allowed to warm to rt overnight. After 20 h, the reaction was quenched by careful addition of MeOH (10 mL), then concentrated under reduced pressure. Sat. aq. Na$_2$CO$_3$ (20 mL) was added, and the reaction was extracted with TBME (3×20 mL). The combined organic layers were washed with brine (50 mL) and dried (MgSO$_4$), filtered and concentrated in vacuo. Purification by flash column chromatography (silica gel, 25 g, 0-30% EtOAc/heptane) gave the title compound (330 mg, 86% purity, 79% yield) as a colourless solid. MS: m/e=235.1, 237.1 ([M+H]$^+$).

Step 2: 3-(4-Bromophenyl)bicyclo[1.1.1]pentane-1-carbaldehyde

To a solution of (3-(4-bromophenyl)bicyclo[1.1.1]pentan-1-yl)methanol (326 mg) in dry DCM (8.59 mL) at 0° C. under argon was added Dess-Martin periodinane (574 mg). The reaction was stirred at 0° C. for 1 h, then warmed to rt. Ater 1 h, the reaction was diluted with diethyl ether (30 mL) and filtered through a glass frit. The filtrate was washed with 1 M aq. NaOH (30 mL), 5% aq. Ns$_2$S$_2$O$_3$ (30 mL) and brine (30 mL), dried (MgSO$_4$), filtered and concentrated in vacuo to give the title compound (306 mg, 90% yield) as a colourless solid which was used without further purification. $^1$H NMR (300 MHz, chloroform-d) δ ppm 9.68 (s, 1H) 7.42-7.48 (m, 2H) 7.07-7.13 (m, 2H) 2.30 (s, 6H).

Step 3: (1-((3-(4-Bromophenyl)bicyclo[1.1.1]pentan-1-yl)methyl)piperidin-4-yl)methanol 3-(4-Bromophenyl)bicyclo[1.1.1]pentane-1-carbaldehyde (100 mg) was placed in a 10 mL flask and dissolved in DCM (1.99 ml). Piperidin-4-ylmethanol (55 mg) was added in one portion to the stirred solution. Then, sodium triacetoxyborohydride (127 mg) was added. The reaction was stirred for 1.5 h at room temperature. The reaction was quenched with sat. aq. NaHCO$_3$ (30 mL) and the mixture extracted with DCM (3×50 mL). The combined organic layers were washed with brine, dried over anhydrous sodium sulfate and concentrated under reduced pressure to give the title compound (137 mg, 86% purity, 84% yield) as an off-white solid. MS: m/e: 350.2, 352.1 ([M+H]$^+$).

1-((1-(4-Bromophenyl)azetidin-3-yl)methyl)-4-((((tert-butyldimethylsilyl)oxy)methyl)piperidine

Step 1: Methyl 1-(4-bromophenyl)azetidine-3-carboxylate

To a solution of methyl 1-(4-aminophenyl)azetidine-3-carboxylate (CAS 887595-92-08, 264 mg) in acetonitrile (8.53 ml) were successively added tetraethylammonium bromide (269 mg), tert-butyl nitrite (185 mg) and copper (I) bromide (18.4 mg) at room temperature. The reaction mixture was stirred at room temperature for 40 min, and then at 60 degrees for 2 hours. The mixture was added to water, and the mixture was extracted with diethyl ether. The organic layer was dried over Na2SO4, and concentrated under reduced pressure. The crude was purified by silica gel chromatography (silica gel, 25 g, 0% to 30% EtOAc in heptane) to give methyl 1-(4-bromophenyl)azetidine-3-carboxylate (167 mg) as a brown liquid. MS: m/e=272.1 ([M+H]$^+$)

2) 1-(4-Bromophenyl)azetidine-3-carboxylic acid

To a solution of methyl 1-(4-bromophenyl)azetidine-3-carboxylate (167 mg) in THF (1.55 ml) and MeOH (1.55 ml) was added lithium hydroxide (1.85 ml). The mixture was stirred at room temperature for 1 hour. The mixture was acidified to pH=2 using 2N HCl. The aqueous phase was extracted with ethyl acetate (3×5 ml). The combined organic phases were dried over Na2SO4, filtered and evaporated to dryness to give crude 1-(4-bromophenyl)azetidine carboxylic acid (113 mg) as an off white solid. MS: m/e=256.0 ([M+H]$^+$)

Step 2: (1-(4-Bromophenyl)azetidin-3-yl)(4-(hydroxymethyl)piperidin-1-yl)methanone 1-(4-bromophenyl)azetidine-3-carboxylic acid (113 mg), piperidin-4-ylmethanol (CAS 6457-49-4, 50.8 mg), HATU (201 mg) and triethylamine (134 mg) were dissolved in N,N-dimethylformamide and the reaction mixture was stirred for 2 hours at room temperature. LC/MS showed full conversion. Water was added to the reaction mixture and it was extracted twice with TBME. The organic layers were combined and dried over Na2SO4, filtered and evaporated in vacuo to give (1-((1-(4-bromophenyl)azetidin-3-yl)methyl)piperidin-4-yl)methanol (60 mg) as a light yellow solid. MS: m/e=535.1 ([M+H]$^+$)

Step 3: 1-41-(4-Bromophenyl)azetidin-3-yl)methyl)-4-(((tert-butyldimethylsilyl)oxy)methyl)piperidine To a mixture of (1-((1-(4-bromophenyl)azetidin-3-yl)methyl)piperidin-4-yl)methanol (60 mg, 177 μmol, Eq: 1) and tert-butylchlorodimethylsilane (32 mg) in N,N-dimethylformamide was added imidazole (CAS 288-32-4, 28.9 mg). The reaction mixture was stirred for 2 hours at room temperature. The reaction mixture was diluted with EtOAc and washed with water. The organic layer was dried over Na2SO4 and evaporated. The crude was purified by silica gel chromatography (silica gel, 4 g, 0% to 10% EtOAc in heptane) to give 1-((1-(4-bromophenyl)azetidin-3-yl)methyl)-4-(((tert-butyldimethylsilyl)oxy)methyl)piperidine (34 mg) as a brown liquid. MS: m/e=455.2 ([M+H]$^+$)

(1-(2-(4-Bromophenoxy)ethyl)piperidin-4-yl)methanol

Step 1: 2-(4-Bromophenoxy)ethyl methanesulfonate

To a solution of 2-(4-bromophenoxy)ethanol (1 g, 4.61 mmol, Eq: 1, CAS 34743-88-9) and triethylamine (793 mg, 1.09 ml, 7.83 mmol, Eq: 1.7) in THF (18 ml) was added methanesulfonyl chloride (792 mg, 538 μl, 6.91 mmol, Eq: 1.5) at 0° C. The reaction mixture was allowed to warm up to rt and stirred overnight at rt. The reaction mixture was added to ice water, then extracted with DCM/MeOH 9:1 (3×). The combined organic phases were dried over Na2SO4 and concentrated in vacuo to give the title compound as an off-white solid (1.4 g, 98% yield, 95% purity). $^1$H NMR (300 MHz, DMSO-d$_6$) δ ppm 3.23 (s, 3H) 4.22-4.28 (m, 2H) 4.49-4.55 (m, 2H) 6.96 (d, J=7.91 Hz, 2H) 7.47 (d, J=7.96 Hz, 2H).

Step 2: (1-(2-(4-Bromophenoxy)ethyl)piperidin-4-yl)methanol

To a solution of 2-(4-bromophenoxy)ethyl methanesulfonate (654.76 mg, 2.22 mmol, Eq: 1) in DMF (6 ml) were added piperidin-4-ylmethanol (256 mg, 2.22 mmol, Eq: 1, CAS 6457-49-4) and DIPEA (860 mg, 1.16 ml, 6.66 mmol, Eq: 3). The reaction mixture was stirred at 80° C. for 4 h. The reaction mixture was poured into water (50 mL) and extracted with DCM/MeOH 9:1 (3×50 mL). The crude product was purified by flash chromatography (silica gel, 40 g, 0% to 10% MeOH in DCM) to afford the title compound as a yellow oil (298 mg, 40% yield, 93% purity). m/z 315.8 [M+H]$^+$, ESI pos.

tert-Butyl 2-(4-bromophenyl)-2,7-diazaspiro[3.5]nonane-7-carboxylate

To a dry vial was added 1-bromo-4-iodobenzene (424 mg), tert butyl 2,7-diazaspiro[3.5]nonane-7-carboxylic acid (CAS 896464-16-7, 170 mg), xantphos (34.7 mg) and sodium tert-butoxide (288 mg). Dioxane (2.5 ml) was added and the vial was sparged with Ar for 10 min. Pd$_2$(dba)$_3$ (22.9 mg) was then added, the vial was sealed, and the reaction was heated at 80° C. After 16 h the reaction was cooled to rt and filtered through Celite (eluent EtOAc), then concentrated onto silica. Purification by flash chromatography (silica gel, 25 g, 0-25% EtOAc/heptane) gave the title compound (175 mg, 45% yield) as a yellow solid. MS: m/e=381.1, 383.1 ([M+H]$^+$).

4-(4-Bromophenyl)-1,4-diazabicyclo[3.2.1]octane

1-Bromo-4-iodobenzene (1.88 g), 1,4-diazabicyclo[3.2.1]octane dihydrochloride (CAS 5492-61-5, 945 mg), sodium tert-butoxide (2.45 g), xantphos (369 mg) and Pd$_2$(dba)$_3$ (234 mg) were dissolved in toluene (10 ml), followed by stirring at 85° C. for 1 h. The reaction mixture was diluted with water and extracted two times with EtOAc. The organic layers were washed with water and brine, dried over Na$_2$SO$_4$, filtered and concentrated in vacuo. The crude material was purified by flash chromatography (silica gel, 40 g, 0 to 100% (DCM:MeOH:NH$_4$OH 9:1:0.05) in DCM) to give the title compound as a light yellow solid (596 mg, 90% purity, 39% yield). m/z 268.7 [M+H]+, ESI pos.

tert-Butyl 2-(4-bromophenyl)-2,6-diazaspiro[3.5]nonane-6-carboxylate

To a dry vial was added 1-bromo-4-iodobenzene (325 mg, 1.15 mmol, Eq: 1.3), tert-butyl 2,6-diazaspiro[3.5]nonane-6-carboxylate (CAS 885272-17-3, 200 mg, 884 μmol, Eq: 1), xantphos (63.9 mg, 110 μmol, Eq: 0.125) and sodium tert-butoxide (255 mg, 2.65 mmol, Eq: 3). Dioxane (2.5 mL) was added and the vial was sparged with Ar with sonication for 30 min. Dioxane (1 mL) was added. The vial was sparged with Ar with sonication for 10 min. Pd$_2$(dba)$_3$ (40.5 mg, 44.2 μmol, Eq: 0.05) was then added, the vial was sealed, and the reaction was heated at 80° C. and stirred for 3 h. The reaction mixture was partitioned between ethyl acetate (75 mL) and water (40 mL). The layers were separated. The aqueous layer was extracted with two 20 mL portions of ethyl acetate. The combined organic layers were washed with one 15 mL portion of brine, dried over anhydrous sodium sulfate and concentrated in vacuo. The crude material was purified by flash chromatography (SiO$_2$, 12 g, n-heptane/ethyl acetate: 100:0 to 80:20) to give the title compound (129 mg, 72% purity, 28% yield) as yellow oil. m/z 383.1 [M+H]+, ESI pos.

(1-(2-((4-Bromophenyl)(methyl)amino)ethyl)piperidin-4-yl)methanol

Step 1: 2-((4-Bromophenyl)(methyl)amino)ethyl methanesulfonate

A solution of 2-((4-bromophenyl)(methyl)amino)ethan-1-ol (CAS 252949-11-4, 570 mg, 2.35 mmol, Eq: 1) in dichloromethane (11 ml) was cooled to 0° C. Triethylamine (494 mg, 0.68 ml, 4.88 mmol, Eq: 2.07) was added at 0° C. followed by methanesulfonyl chloride (353 mg, 0.24 ml, 3.08 mmol, Eq: 1.31). The reaction mixture was stirred at 0° C. for 1 h and then let come to room temperature (45 min). The reaction mixture was quenched with water and extracted twice with dichloromethane. The combined organic layers were dried over Na$_2$SO$_4$ and concentrated in vacuo to give the title compound (872 mg, 80% purity, 96% yield) as a yellow oil which was used without further purification. MS: m/e=307.9, 309.8 ([M+H]$^+$).

Step 2: (1-(2-((4-Bromophenyl)(methyl)amino)ethyl)piperidin-4-yl)methanol

A mixture of 2-((4-bromophenyl)(methyl)amino)ethyl methanesulfonate (865 mg, 2.25 mmol, Eq: 1, 80% purity), piperidin-4-ylmethanol (CAS 6457-49-4, 776 mg, 6.74 mmol, Eq: 3) and Hunig's base (888 mg, 1.2 ml, 6.87 mmol, Eq: 3.06) in acetonitrile (6.0 ml) was stirred at 60° C. for 16 h. The reaction mixture was cooled to room temperature and extracted with EtOAc and water. The aqueous layer was back-extracted with EtOAc. The organic layers were washed with brine. The combined organic layers were dried over $Na_2SO_4$ and concentrated in vacuo. The crude material was adsorbed on Isolute HM-N and purified by flash chromatography (silica gel, 24 g, 0% to 70% (DCM:MeOH:$NH_4OH$ 9:1:0.05) in DCM) to give the title compound (651 mg, 84% yield) as a yellow oil. MS: m/e=327.0, 328.8 ([M+H]$^+$)

1-(2-((4-Bromophenyl)(methyl)amino)ethyl)piperidin-4-ol

A mixture of 2-((4-bromophenyl)(methyl)amino)ethyl methanesulfonate (840 mg, 2.32 mmol, Eq: 1, 85% purity), piperidin-4-ol (CAS 5382-16-1,703 mg, 6.95 mmol, Eq: 3) and Hunig's base (962 mg, 1.3 ml, 7.44 mmol, Eq: 3.21) in acetonitrile (6.0 ml) was stirred at 60° C. for 16 h. The reaction mixture was cooled to room temperature and extracted with EtOAc and water. The aqueous layer was back-extracted with EtOAc. The organic layers were washed with brine. The combined organic layers were dried over $Na_2SO_4$ and concentrated in vacuo. The crude material was adsorbed on Isolute HM-N and purified by flash chromatography (silica gel, 24 g, 0% to 70% (DCM:MeOH:$NH_4OH$ 9:1:0.05) in DCM) to give the title compound (607 mg, 80% yield) as an off-white solid. MS: m/e=313.1, 314.9 ([M+H]$^+$)

tert-Butyl (3aR,6aS)-5-(4-bromophenyl)hexahydropyrrolo[3,4-c]pyrrole-2(1H)-carboxylate A solution of 1-bromo-4-iodobenzene (346 mg, 1.22 mmol, Eq: 1.3), tert-butyl (3aR,6aS)-hexahydropyrrolo[3,4-c]pyrrole-2(1H)-carboxylate (CAS 250275-15-1, 200 mg, 942 µmol, Eq: 1) and sodium tert-butoxide (272 mg, 2.83 mmol, Eq: 3) in dioxane (2.5 ml) was degassed with Ar for 5 min. Xantphos (68.1 mg, 118 µmol, Eq: 0.125) and $Pd_2(dba)_3$ (43.1 mg, 47.1 µmol, Eq: 0.05) were added. The reaction mixture was heated at 80° C. for 3 h. The reaction mixture was partitioned between ethyl acetate (50 mL) and water (50 mL). The layers were separated. The aqueous layer was extracted with two 30 mL portions of ethyl acetate. The combined organic layers were washed with one 50 mL portion of brine, dried over anhydrous sodium sulfate and concentrated in vacuo. The crude material was purified by flash chromatography ($SiO_2$, 25 g, n-heptane/ethyl acetate: 100:0 to 80:20) to afford the title compound (230 mg, 66% yield) as brown solid. m/z 368.9 ([M+H]+), ESI pos.

tert-Butyl 6-(4-bromophenyl)-2,6-diazaspiro[3.5]nonane-2-carboxylate

A suspension of 1-bromo-4-iodobenzene (325 mg, 1.15 mmol, Eq: 1.3), tert-butyl 2,6-diazaspiro[3.5]nonane-2-carboxylate (CAS 1086394-57-1, 200 mg, 884 µmol, Eq: 1) and sodium tert-butoxide (255 mg, 2.65 mmol, Eq: 3) in dioxane (2.5 ml) was degassed with Ar for 5 min. Then $Pd_2(dba)_3$ (40.5 mg, 44.2 µmol, Eq: 0.05) and xantphos (63.9 mg, 110 µmol, Eq: 0.125) were added. The reaction mixture was heated at 80° C. for 3 h. The reaction mixture was partitioned between ethyl acetate (50 mL) and water (50 mL). The layers were separated. The aqueous layer was extracted with two 30 mL portions of ethyl acetate. The combined organic layers were washed with one 50 mL portion of brine, dried over anhydrous sodium sulfate and concentrated in vacuo. The crude material was purified by flash chromatography ($SiO_2$, 25 g, n-heptane/ethyl acetate: 100:0 to 80:20) to afford the title compound (245 mg, 72% yield) as light yellow solid. m/z 382.9 ([M+H]+), ESI pos.

2-(2-(4-Bromophenoxy)ethyl)-2-azaspiro[3.3]heptan-6-ol

A mixture of 2-(4-bromophenoxy)ethyl methanesulfonate (CAS 945999-94-0, 500 mg, 1.69 mmol, Eq: 1), 2-azaspiro[3.3]heptan-6-ol hydrochloride (304 mg, 2.03 mmol, Eq: 1.2)) and Hunig's base (876 mg, 1.18 ml, 6.78 mmol, Eq: 4) in acetonitrile (15 ml) was stirred at 60° C. for 18 h. The reaction mixture was cooled to room temperature and extracted with EtOAc and water. The aqueous layer was back-extracted with EtOAc. The organic layers were washed with brine. The combined organic layers were dried over $Na_2SO_4$ and concentrated in vacuo. The crude material was adsorbed on Isolute HM-N and purified by flash chromatography (silica gel, 25 g, 0% to 20% MeOH (+0.5%: $NH_4OH$) in DCM) to give the title compound (300 mg, 54% yield) as a colorless oil. MS: m/e=312.1 ([M+H]$^+$)

(1-(2-((4-Bromophenyl)(methyl)amino)ethyl)azetidin-3-yl)methanol

A mixture of 2-((4-bromophenyl)(methyl)amino)ethyl methanesulfonate (830 mg, 2.29 mmol, Eq: 1, 85% purity), azetidin-3-ylmethanol (CAS 95849-02-8, 578 mg, 6.64 mmol, Eq: 2.9) and Hunig's base (888 mg, 1.2 ml, 6.87 mmol, Eq: 3) in acetonitrile (5.6 ml) was stirred at 60° C. for 16 h. A mixture of azetidin-3-ylmethanol (300 mg, 3.44 mmol, Eq: 1.5) in acetonitrile (2.0 ml) was added at room temperature. The reaction mixture was stirred at 70° C. for 7 h and at 60° C. for 16 h. The reaction mixture was cooled to room temperature and extracted with EtOAc and water. The aqueous layer was back-extracted with EtOAc. The organic layers were washed with brine. The combined organic layers were dried over $Na_2SO_4$ and concentrated in vacuo. The crude material was adsorbed on Isolute HM-N and purified by flash chromatography (silica gel, 12 g, 0% to 100% (DCM:MeOH:$NH_4OH$ 9:1:0.05) in DCM) to give the title compound (208 mg, 90% purity, 27% yield) as a light yellow oil. MS: m/e=299.0, 300.9 ([M+H]$^+$)

1-(2-((4-Bromophenyl)(methyl)amino)ethyl)azetidin-3-ol

A mixture of 2-((4-bromophenyl)(methyl)amino)ethyl methanesulfonate (830 mg, 2.29 mmol, Eq: 1, 85% purity), azetidin-3-ol (CAS 45347-82-8, 485 mg, 6.64 mmol, Eq: 2.9) and Hunig's base (888 mg, 1.2 ml, 6.87 mmol, Eq: 3) in acetonitrile (6.0 ml) was stirred at 60° C. for 16 h. The reaction mixture was cooled to room temperature and extracted with EtOAc and water. The aqueous layer was back-extracted with EtOAc. The organic layers were washed with brine. The combined organic layers were dried over $Na_2SO_4$ and concentrated in vacuo. The crude material was adsorbed on Isolute HM-N and purified by flash chromatography (silica gel, 24 g, 0% to 70% (DCM:MeOH:$NH_4OH$ 9:1:0.05) in DCM) to give the title compound (334 mg, 49% yield) as an off-white solid. MS: m/e=285.0, 286.9 ([M+H]⁺)

1-(1-(4-Bromophenethyl)azetidin-3-yl)ethan-1-ol

To a solution of 1-(azetidin-3-yl)ethan-1-ol hydrochloride (CAS 2068152-34-9, 158 mg) in dichloroethane (7.65 ml), triethylamine (349 mg) and molecular sieves were added. The resulting mixture was stirred at room temperature for 10 minutes. To this mixture, 2-(4-bromophenyl)acetaldehyde (CAS 27200-79-9, 251 mg) was added and the resulting reaction mixture was stirred at 45° C. for 1 hour. Then sodium triacetoxyhydroborate (730 mg) was added and this mixture was stirred at 45° C. for 3 hours. The reaction mixture was diluted with saturated sodium bicarbonate solution and the product was extracted with EtOAc (3×50 ml). The combined organic layer was dried over sodium sulfate and concentrated under vacuo. The crude material was purified by flash chromatography (SiO2-NH2, 24 g, 0 to 5% MeOH in dichloromethane) to give 1-(1-(4-bromophenethyl)azetidin-3-yl)ethan-1-ol (160 mg) as a yellow solid. MS: m/e=285.7 ([M+H]+) tert-Butyl (4-bromophenethyl)(2-methoxyethyl)carbamate Step 1:
N-(4-Bromophenethyl)-2-methoxyethan-1-amine In a 25 mL pear-shaped flask, 2-(4-bromophenyl)acetaldehyde (500 mg), 2-methoxyethan amine (245 mg) and sodium triacetoxyborohydride (852 mg) were combined with DCM (6 ml) to give a off-white suspension. the mixture was stirred at RT, the reaction mixture was diluted with 250 ml sat. NaHCO3 and extracted with 2×250 ml DCM:MeOH 9:1. The organic layers were combined and dried over sodium sulfate and concentrated in vacuo. The residue was chromatographed over 24 g Si-Amine (0% to 20% MeOH in EtOAc). All fractions containing product were combined and concentrated to give the title compound (150 mg) as a colorless liquid. MS: m/e=260.1 ([M+H]+)

Step 2: tert-Butyl
(4-bromophenethyl)(2-methoxyethyl)carbamate

In a 25 mL round-bottomed flask, N-(4-bromophenethyl)-2-methoxyethan-1-amine (77.79 mg) was combined with CH₂Cl₂ (1.5 ml) N,N-diisopropylethylamine (46.7 mg) was added. A solution of Boc-Anhydride (72.3 mg) in CH₂Cl₂ (1 ml) was added at 0° C. The ice-bath was removed and the reaction mixture was stirred at rt. The reaction mixture was poured into H2O+1M KHSO₄ sol. and extracted with DCM (2×). The organic layers were combined, dried over Na₂SO₄ and concentrated in vacuo to give the title compound (108 mg) as a colorless oil. MS: m/e=302.0 ([M-Tertbutyl+H]+)

tert-Butyl
4-(4-bromophenyl)-1,4-diazepane-1-carboxylate

To a dry vial was added 1-bromo-4-iodobenzene (551 mg, 1.95 mmol, Eq: 1.3), tert-butyl 1,4-diazepane-1-carboxylate (CAS 112275-50-0, 300 mg, 1.5 mmol, Eq: 1), xantphos (108 mg, 187 µmol, Eq: 0.125) and sodium tert-butoxide (720 mg, 7.49 mmol, Eq: 5). Dioxane (2.5 ml) was added and the vial was sparged with Ar with sonication for 30 min. Dioxane (2.5 ml) was added. The vial was sparged with Ar with sonication for 30 min. Pd₂(dba)₃ (68.6 mg, 74.9 µmol, Eq: 0.05) was then added, the vial was sealed, and the reaction was heated at 80° C. for 1 h. The reaction mixture was partitioned between ethyl acetate (50 mL) and water (30 mL). The layers were separated. The aqueous layer was extracted with two 30 mL portions of ethyl acetate. The combined organic layers were washed with one 15 mL portion of brine, dried over anhydrous sodium sulfate and concentrated in vacuo. The crude material was purified by flash chromatography (SiO₂, 12 g, dichloromethane/methanol: 100:0 to 80:20) to afford the title compound (388 mg, 70% yield) as yellow solid. m/z 356.9 [M+H]+, ESI pos.

Example 25

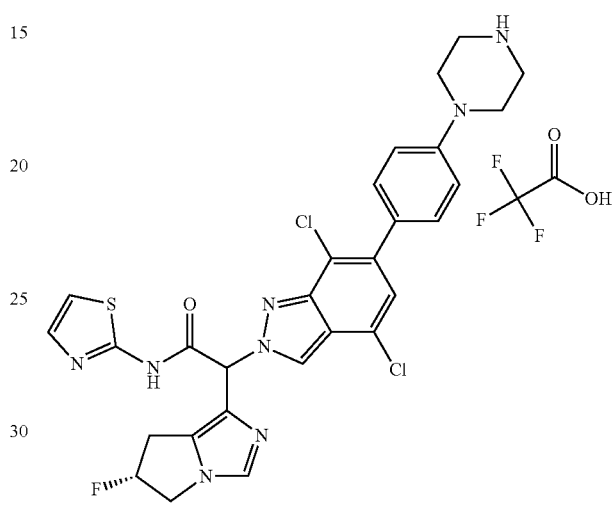

2-(4,7-Dichloro-6-(4-(piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide 2,2,2-trifluoroacetate Step 1: tert-Butyl (2S,4R)-2-(2-(6-bromo-4,7-dichloro-2H-indazol-2-yl)-3-ethoxy-3-oxopropanoyl)-4-fluoropyrrolidine-1-carboxylate A solution of (2S,4R)-1-(tert-butoxycarbonyl)-4-fluoropyrrolidine-2-carboxylic acid (2.34 g) in Tetrahydrofuran (11 ml) was cooled in an ice bath. Carbonyldiimidazole (1.63 g) was added. The cooling bath was removed and the mixture was stirred for 3 h to give solution A. A solution of ethyl 2-(6-bromo-4,7-dichloro-2H-indazol-2-yl)acetate (2.28 g) in tetrahydrofuran (11 ml) was cooled to −75° C. LDA, 2 mol/l in THF (5.02 ml) was added dropwise within 5 min. The mixture was stirred for 30 min at −75° C. Solution A was added dropwise within 5 min. The mixture was allowed to warm to room temperature in the cooling bath overnight. After addition of sat. aqueous NH₄Cl-solution, the mixture was extracted twice with EtOAc. The organic layers were washed with water, combined, dried over sodium sulphate and concentrated to dryness to give the crude title compound (4.23 g) which was used for the next step without further purification. MS: m/e=568.1 ([M+H]⁺, Br)

Step 2: Ethyl 2-(6-bromo-4,7-dichloro-2H-indazol-2-yl)-2-((R)-6-fluoro-3-thioxo-2,5,6,7-tetrahydro-3H-pyrrolo[1,2-c]imidazol-1-yl)acetate A solution of tert-butyl (2S,4R)-2-(2-(6-bromo-4,7-dichloro-2H-indazol-2-yl)-3-ethoxy oxopropanoyl)-4-fluoropyrrolidine-1-carboxylate (4.23 g) in HCl, 4M in dioxane (11.2 ml) was stirred for 1 h at room temperature. The mixture was concentrated to dryness. The residue was dissolved in Ethanol (37 ml), potassium thiocyanate (829 mg) and HCl, 1 M in EtOH (12.8 ml) were added and stirred for 40 h at room temperature. Water was added and the mixture was extracted with EtOAc. The organic layers were washed with water, dried over sodium sulfate, filtered, concentrated and dried to give the crude title compound as a brown semisolid (3.08 g) which was used for the next step without further purification. MS: m/e=509.0 ([M+H]$^+$, Br)

Step 3: Ethyl 2-(6-bromo-4,7-dichloro-2H-indazol-2-yl)-2-((R)-6-fluoro-6,7-dihydro-5H-pyrrolo[1,2-c]imidazol-1-yl)acetate A suspension of ethyl 2-(6-bromo-4,7-dichloro-2H-indazol-2-yl)-2-((R)-6-fluoro-3-thioxo-2,5,6,7-tetrahydro-3H-pyrrolo[1,2-c]imidazol-1-yl)acetate (10.8 g) in AcOH (72 ml) was placed in a room-temperature water bath. Hydrogen peroxide, 35% (6.61 g) was added dropwise. The reaction mixture was stirred for 75 min at room temperature. The excess of hydrogen peroxide was destroyed by addition of saturated sodium sulfite solution. After addition of some water (just enough to dissolve all salts) and EtOAc the mixture was brought to pH 9 by careful addition of solid sodium carbonate. The mixture was extracted with EtOAc. The organic layers were washed with water, dried over sodium sulphate and concentrated. The product was purified by chromatography (SiO$_2$, EtOAc) to give the title compound (4.45 g) as off-white solid. MS: m/e=475.0 ([M+H]$^+$, Br)

Step 4: tert-Butyl 4-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)piperazine-1-carboxylate Ethyl 2-(6-bromo-4,7-dichloro-2H-indazol-2-yl)-2-((R)-6-fluoro-6,7-dihydro-5H-pyrrolo[1,2-c]imidazol-1-yl)acetate (200 mg), (4-(4-(tert-butoxycarbonyl)piperazin-1-yl)phenyl)boronic acid (386 mg) and cesium carbonate (411 mg) were mixed with toluene (4 ml), degassed by bubbling argon through the mixture under ultra sonic treatment. [1,1'-Bis(diphenylphosphino)ferrocene]dichloropalladium (II) (31 mg) was added and the mixture was stirred for 30 min at 115° C. in a sealed tube. The mixture was cooled to room temperature, diluted with EtOAc, washed with water, dried over sodium sulphate and concentrated. The crude material was purified by flash chromatography (SiO$_2$, 0% to 100% EtOAc in n-heptane) to give the title compound (141 mg) as light brown solid. MS: m/e=657.3 ([M+H]$^+$)

Step 5: tert-Butyl 4-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)piperazine-1-carboxylate To a solution of tert-butyl 4-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)piperazine-1-carboxylate (140 mg) in THF (4.13 ml) were added LiOH 1M (255 µl) and Water (1.39 ml). The mixture was stirred for 1 h at room temperature. The mixture was concentrated and dried. The residue was dissolved in DMF (4.13 ml). After addition of thiazol-2-amine (20.5 mg), HATU (77.7 mg) and Hunig's base (66 mg) the mixture was stirred for 1 h at room temperature. After a second addition of thiazol-2-amine (8.53 mg) and HATU (32.4 mg) the mixture was stirred further 30 min at room temperature. Water was added and the mixture was extracted with EtOAc. The org layers were combined, dried, filtered and concentrated. The crude material was purified by flash chromatography (SiO$_2$, 0% to 40% MeOH in AcOEt) followed by another chromatography (SiO$_2$, 0% to 20% MeOH in dichloromethane) to give the slightly impure title compound (86.5 mg) as light brown solid. MS: m/e=709.2 ([M–H]$^-$)

Step 6: 2-(4,7-Dichloro-6-(4-(piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide 2,2,2-trifluoroacetate To a solution of tert-butyl 4-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)piperazine-1-carboxylate (86 mg) in dichloromethane (10 ml) and methanol (5 ml) was added HCl, 4M in dioxan (3.47 ml). The mixture was stirred for 1 h at room temperature. The mixture was basified with sat. sodium carbonate solution and extracted with dichloromethane. The organic layers were dried over sodium sulphate, concentrated and dried. The compound was purified by preparative reverse-phase HPLC to give the title compound (62 mg) as off-white solid. MS: m/e=609.1 ([M–H]$^-$)

Example 26

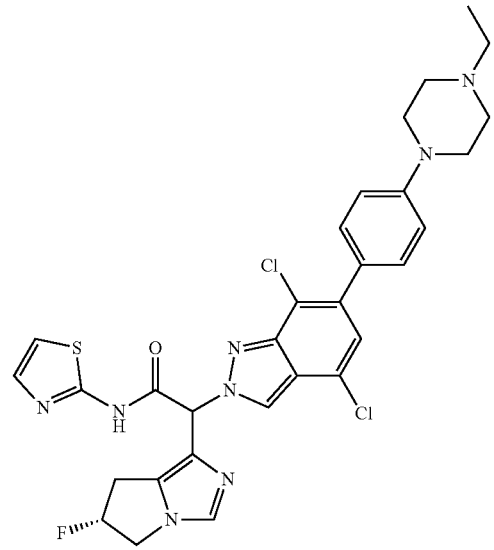 [SMILES: CCN1CCN(c2ccc(-c3cc(Cl)c4cn(C(C(=O)Nc5nccs5)c5ncn6c5C[C@@H](F)C6)nc4c3Cl)cc2)CC1]

2-(4,7-Dichloro-6-(4-(4-ethylpiperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide To a solution of 2-(4,7-dichloro-6-(4-(piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide 2,2,2-trifluoroacetate (Example 25, 54.1 mg) in N,N-dimethylformamide (2 ml) were added iodoethane (17.4 mg) and Hunig's base (38.5 mg) and the mixture was stirred overnight. The reaction mixture was poured into H2O and extracted with EtOAc, dried, filtered and concentrated. The material was dried under high vacuum at 60° C. for 2 h to give the title compound (30 mg) as off-white solid. MS: m/e=637.1 ([M−H]⁻)

Example 27

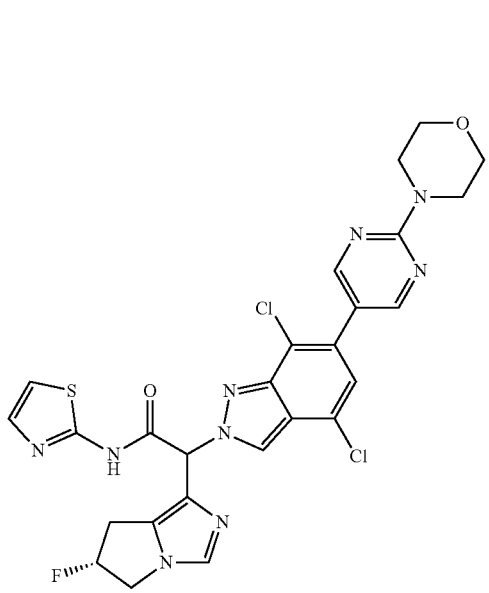 [SMILES: O=C(Nc1nccs1)C(c1ncn2c1C[C@@H](F)C2)n1cc2c(Cl)cc(-c3cnc(N4CCOCC4)nc3)c(Cl)c2n1]

2-(4,7-Dichloro-6-(2-morpholinopyrimidin-5-yl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(4,7-dichloro-6-(2-morpholinopyrimidin-5-yl)-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with 2-morpholinopyrimidin-5-ylboronic acid in a mixture of toluene and dimethylacetamide in the presence of [1,1'-bis(diphenylphosphino)ferrocene]dichloropalladium(II) and cesium carbonate to give the title compound as light brown solid. MS: m/e=558.2 ([M−H]⁻)

Step 2: 2-(4,7-Dichloro-6-(2-morpholinopyrimidin-5-yl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4,7-dichloro-6-(2-morpholinopyrimidin-5-yl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as off-white solid. MS: m/e=612.1 ([M−H]⁻)

Example 28

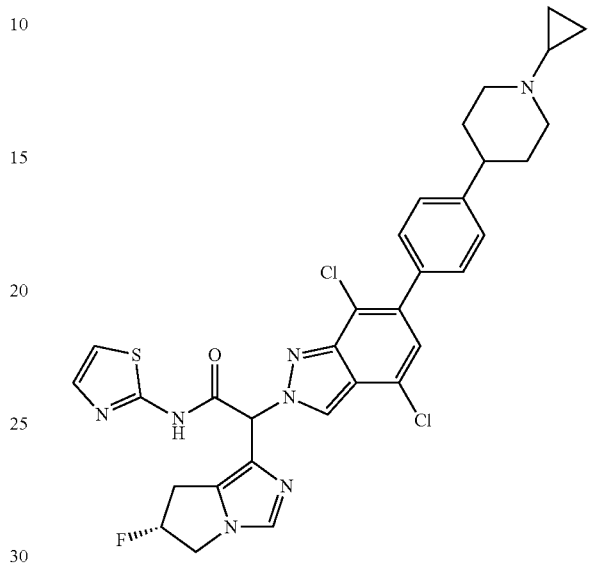

2-(4,7-Dichloro-6-(4-(1-cyclopropylpiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(4,7-dichloro-6-(4-(1-cyclopropylpiperidin-4-yl)phenyl)-2H-indazol-2-yl) ((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with 1-cyclopropyl-4-(4-(4,4,5,5-tetramethyl-1,3,2-dioxaborolan-2-yl)phenyl)piperidine (CAS #2244702-81-4) in a mixture of THF and water in the presence of [1,1'-bis(diphenylphosphino)ferrocene]dichloropalladium (II) and cesium carbonate to give the title compound as light brown solid. MS: m/e=594.4 ([M−H]⁻)

Step 2: 2-(4,7-Dichloro-6-(4-(1-cyclopropylpiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4,7-dichloro-6-(4-(1-cyclopropylpiperidin-4-yl)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as off-white solid. MS: m/e=648.2 ([M−H]⁻)

Example 29

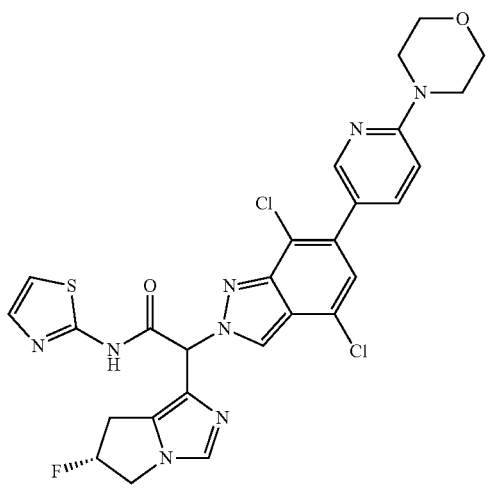 [SMILES: O=C(Nc1nccs1)C(c1ncn2c1C[C@@H](F)C2)n1cc2c(Cl)cc(-c3ccc(N4CCOCC4)nc3)c(Cl)c2n1]

2-[4,7-Dichloro-6-(6-morpholin-4-ylpyridin-3-yl)
indazol-2-yl]-2-[rac-(6R)-6-fluoro-6,7-dihydro-5H-
pyrrolo[1,2-c]imidazol-1-yl]-N-(1,3-thiazol-2-yl)
acetamide Step 1: Ethyl 2-(4,7-dichloro-6-(6-morpholinopyridin-3-yl)-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (6-morpholinopyridin-3-yl)boronic acid in a mixture of toluene and dimethylacetamide in the presence of [1,1'-bis(diphenylphosphino)ferrocene]dichloropalladium(II) and cesium carbonate to give the title compound as brown solid. MS: m/e=557.2 ([M−H]⁻)

Step 2: 2-[4,7-Dichloro-6-(6-morpholin-4-ylpyridin-3-yl)indazol-2-yl]-2-[rac-(6R)-6-fluoro-6,7-dihydro-5H-pyrrolo[1,2-c]imidazol-1-yl]-thiazol-2-yl)acetamide In analogy to Example 25, step 5, ethyl 2-(4,7-dichloro-6-(6-morpholinopyridin-3-yl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=611.3 ([M−H]⁻)

Example 30

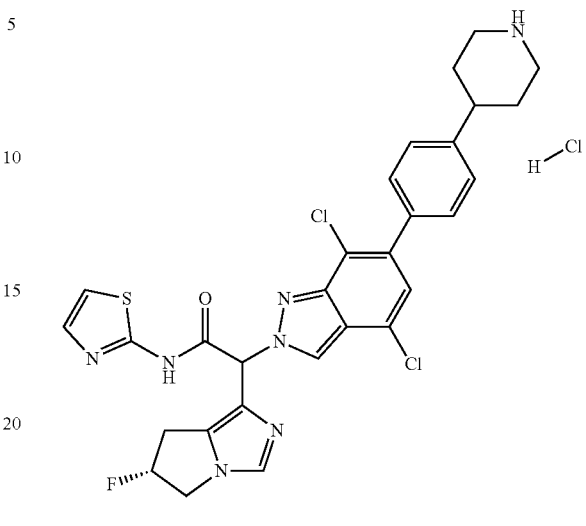

2-[4,7-Dichloro-6-(4-piperidin-4-ylphenyl)indazol-
2-yl]-2-[rac-(6R)-6-fluoro-6,7-dihydro-5H-pyrrolo
[1,2-c]imidazol-1-yl]-N-(1,3-thiazol-2-yl)acetamide
hydrochloride Step 1: 2-(6-(4-(1-(tert-Butoxycarbonyl)piperidin-4-yl)phenyl)-4,7-dichloro-2H-indazol-2-yl)-2-((R)-6-fluoro-6,7-dihydro-5H-pyrrolo[1,2-c]imidazol-1-yl) acetic acid In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (4-(1-(tert-butoxycarbonyl)piperidin-4-yl)phenyl)boronic acid in toluene in the presence of [1,1'-bis(diphenylphosphino)ferrocene]dichloropalladium(II) and cesium carbonate to give the title compound as light brown solid. MS: m/e=656.3 ([M+H]⁺)

Step 2: tert-Butyl 4-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)piperidine-1-carboxylate In analogy to Example 25, step 5, 2-(6-(4-(1-(tert-butoxycarbonyl)piperidin-4-yl)phenyl)-4,7-dichloro-2H-indazol-2-yl)-2-((R)-6-fluoro-6,7-dihydro-5H-pyrrolo[1,2-c]imidazol-1-yl)acetic acid was first treated with LiOH and the resulting salt was reacted with thiazol-2-amine in the presence of HATU and Hunig's base to give the title compound as off-white solid. MS: m/e=708.2 ([M−H]⁻)

Step 3: 2-[4,7-Dichloro-6-(4-piperidin-4-ylphenyl)indazol-2-yl]-2-[rac-(6R)-6-fluoro-6,7-dihydro-5H-pyrrolo[1,2-c]imidazol-1-yl]-N-(1,3-thiazol-2-yl)acetamide hydrochloride In analogy to Example 25, step 6, a solution of tert-butyl 4-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)piperidine-1-carboxylate in dichloromethane and methanol was treated with HCl in dioxane to give the title compound as off-white solid. MS: m/e=608.2 ([M−H]⁻)

Example 31

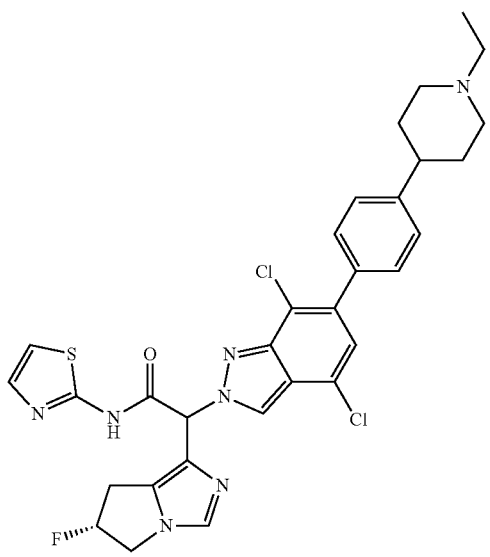 [SMILES: CCN1CCC(c2ccc(-c3cc(Cl)c4cn(C(C(=O)Nc5nccs5)c5ncn6c5C[C@@H](F)C6)nc4c3Cl)cc2)CC1]

2-[4,7-Dichloro-6-[4-(1-ethylpiperidin-4-yl)phenyl]indazol-2-yl]-2-[rac-(6R)-6-fluoro-6,7-dihydro-5H-pyrrolo[1,2-c]imidazol-1-yl]-N-(1,3-thiazol-2-yl)acetamide In analogy to Example 26, 2-[4,7-dichloro-6-(4-piperidin-4-ylphenyl)indazol-2-yl]-2-[rac-(6R)-6-fluoro-6,7-dihydro-5H-pyrrolo[1,2-c]imidazol-1-yl]-N-(1,3-thiazol-2-yl)acetamide hydrochloride was treated with iodoethane in the presence of Hunig's base to give the title compound as colorless solid. MS: m/e=636.3 ([M−H]⁻)

Example 32

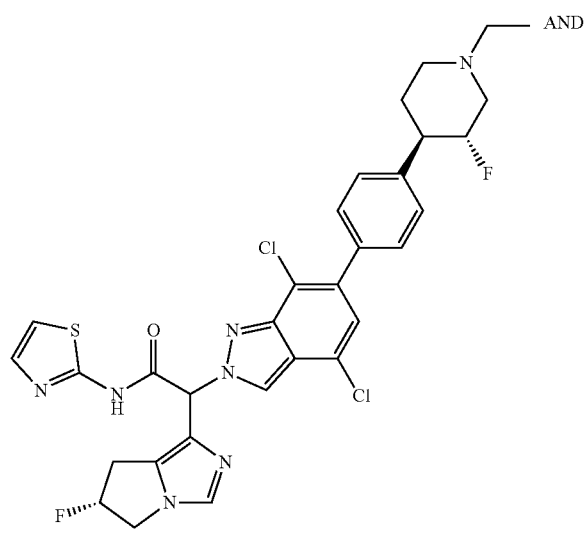

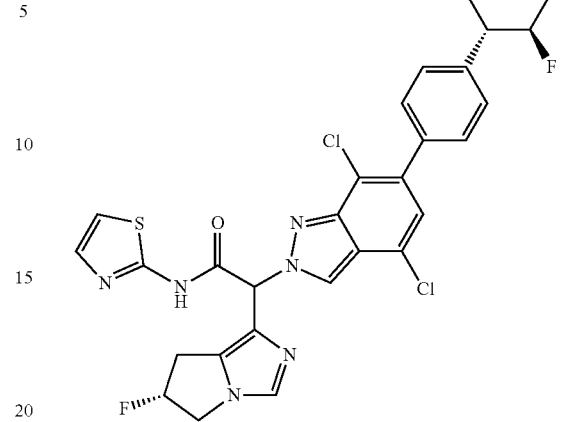

2-(4,7-Dichloro-6-(4-(rac-(3R,4R)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: tert-Butyl rac-(3R,4R)-4-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)-3-fluoropiperidine-1-carboxylate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (4-((3R,4R)-1-(tert-butoxycarbonyl)-3-fluoropiperidin-4-yl)phenyl)boronic acid AND (4-((3S,4S)-1-(tert-butoxycarbonyl)-3-fluoropiperidin-4-yl)phenyl)boronic acid in toluene in the presence of [1,1'-bis(diphenylphosphino)ferrocene]dichloropalladium(II) and cesium carbonate to give the title compound as brown solid. MS: m/e=674.3 ([M+H]⁺)

Step 2: tert-Butyl rac-(3R,4R)-4-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)-3-fluoropiperidine-1-carboxylate In analogy to Example 25, step 5, tert-butyl rac-(3R,4R)-4-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl) fluoropiperidine-1-carboxylate was first treated with LiOH and the resulting salt was reacted with thiazol-2-amine in the presence of HATU and Hunig's base to give the title compound as yellow oil. MS: m/e=728.3 ([M+H]⁺)

Step 3: 2-(4,7-Dichloro-6-(4-(rac-(3R,4R)-3-fluoropiperidin-4-yl)phenyl)-2H-indazol-2-yl) ((R)-6-fluoro-6,7-dihydro-5H-pyrrolo[1,2-c]imidazol-1-yl)-N-(thiazol-2-yl)acetamide In analogy to Example 25, step 6, a solution of tert-butyl rac-(3R,4R)-4-(4-(4,7-dichloro-2-(1-((R)-6-fluoro-6,7-dihydro-5H-pyrrolo[1,2-c]imidazol-1-yl)-2-oxo-2-(thiazol-2- ylamino)ethyl)-2H-indazol-6-yl)phenyl)-3-fluoropiperidine-1-carboxylate in dichloromethane and methanol was treated with HCl in dioxane to give the title compound as brown solid. MS: m/e=628.2 ([M+H]+)

Step 4: 2-(4,7-Dichloro-6-(4-(rac-(3R,4R)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 26, 2-(4,7-dichloro-6-(4-(rac-(3R,4R)-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide was treated with iodoethane in the presence of Hunig's base to give the title compound as yellow solid. MS: m/e=656.3 ([M+H]+)

Example 33

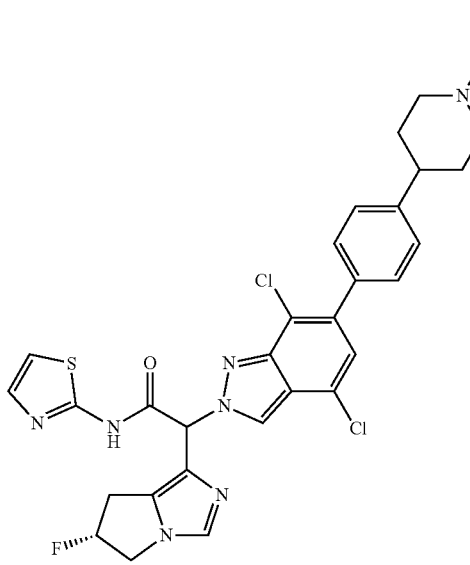

2-(4,7-Dichloro-6-(4-(1-(2-fluoroethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(4,7-dichloro-6-(4-(1-(2-fluoroethyl)piperidin-4-yl)phenyl)-2H-indazol-2-yl) ((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with 1-(2-fluoro ethyl)-4-(4-(4,4,5,5-tetramethyl-1,3,2-dioxaborolan-2-yl)phenyl)piperidine in a mixture of dioxane and water in the presence of [1,1'-bis(diphenylphosphino)ferrocene]dichloropalladium(II) and cesium carbonate to give the title compound as brown solid. MS: m/e=602.3 ([M+H]+)

Step 2: 2-(4,7-Dichloro-6-(4-(1-(2-fluoroethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4,7-dichloro-6-(4-(1-(2-fluoroethyl)piperidin-4-yl)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=656.3 ([M+H]+)

Example 34

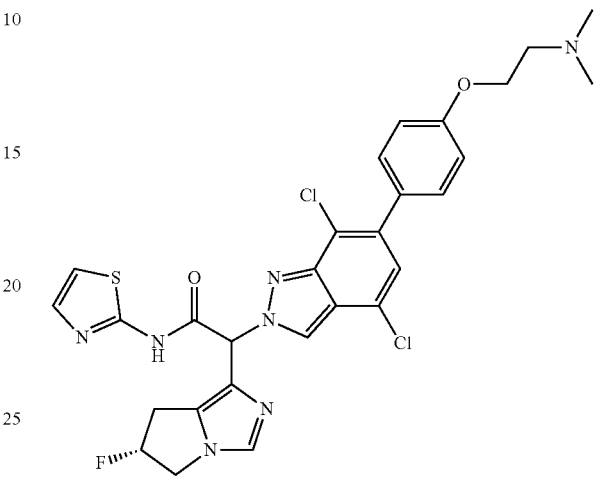

2-[4,7-Dichloro-6-[4-[2-(dimethylamino)ethoxy]phenyl]indazol-2-yl]-2-[rac-(6R)-6-fluoro-6,7-dihydro-5H-pyrrolo[1,2-c]imidazol-1-yl]-N-(1,3-thiazol-2-yl)acetamide Step 1: rac-Ethyl 2-(6-(4-(2-((tert-butoxycarbonyl)amino)ethoxy)phenyl)-4,7-dichloro-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (4-(2-((tert-butoxycarbonyl)amino)ethoxy)phenyl)boronic acid in a mixture of toluene and dimethylacetamide in the presence of [1,1'-bis(diphenylphosphino)ferrocene]dichloropalladium(II) and cesium carbonate to give the title compound as light yellow gum. MS: m/e=630.2 ([M−H]−)

Step 2: rac-tert-Butyl (2-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenoxy)ethyl)carbamate In analogy to Example 25, step 5, rac-ethyl 2-(6-(4-(2-((tert-butoxycarbonyl)amino)ethoxy)phenyl)-4,7-dichloro-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as off-white solid. MS: m/e=686.3 ([M+H]+)

Step 3: rac-2-(6-(4-(2-Aminoethoxy)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of rac-tert-butyl (2-(4-(4,7-dichloro-2-(1-((R)-6-fluoro-6,7-dihydro- 5H-pyrrolo[1,2-c]imidazol-1-yl)-2-oxo-2-(thiazol-2-ylamino)ethyl)-2H-indazol-6-yl)phenoxy)ethyl)carbamate in dichloromethane and methanol was treated with HCl in dioxane to give the title compound as light brown oil. MS: m/e=586.1 ([M+H]$^+$)

Step 4: 2-[4,7-Dichloro-6-[4-[2-(dimethylamino)ethoxy]phenyl]indazol-2-yl]-2-[rac-(6R)-6-fluoro-6,7-dihydro-5H-pyrrolo[1,2-c]imidazol-1-yl]-N-(1,3-thiazol-2-yl)acetamide rac-2-(6-(4-(2-Aminoethoxy)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide (30 mg) and formaldehyde 37% in water (12.5 mg) were combined with ethanol (684 µl) under argon. After 10 min stirring, sodium triacetoxyborohydride (32.5 mg) was added. The reaction mixture was stirred at room temperature for 2 h. Sodium triacetoxyborohydride (10×32.5 mg) and formaldehyde 37% in water (10×12.5 mg) were added in portions over 4 h until the reaction was complete. The reaction mixture was poured into sat. aqueous NaHCO$_3$ and extracted with EtOAc. The organic layers were combined and washed with sat NaCl. The organic layers were dried over Na$_2$SO$_4$, filtered and concentrated in vacuo to give the title compound as off-white solid. MS: m/e=612.3 ([M−H]$^−$)

Example 35

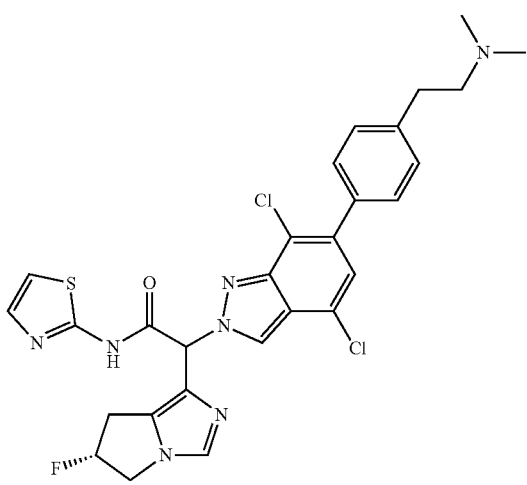 [SMILES: CN(C)CCc1ccc(-c2cc(Cl)c3cn(C(C(=O)Nc4nccs4)c4ncn5c4C[C@@H](F)C5)nc3c2Cl)cc1]

2-(4,7-Dichloro-6-(4-(2-(dimethylamino)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(6-(4-(2-((tert-butoxycarbonyl)amino)ethyl)phenyl)-4,7-dichloro-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (4-(2-((tert-butoxycarbonyl)amino)ethyl)phenyl)boronic acid in toluene in the presence of [1,1'-bis(diphenylphosphino)ferrocene]dichloropalladium(II) and cesium carbonate to give the title compound as light brown solid. MS: m/e=616.3 ([M+H]$^+$)

Step 2: tert-Butyl (4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenethyl)carbamate In analogy to Example 25, step 5, ethyl 2-(6-(4-(2-((tert-butoxycarbonyl)amino)ethyl)phenyl)-4,7-dichloro-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as off-white solid. MS: m/e=670.3 ([M+H]$^+$)

Step 3: 2-(6-(4-(2-Aminoethyl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of tert-butyl (4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-2-yl)phenethyl)carbamate in dichloromethane and methanol was treated with HCl in dioxane to give the title compound as off-white solid. MS: m/e=570.2 ([M+H]$^+$)

Step 4: 2-(4,7-Dichloro-6-(4-(2-(dimethylamino)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 34, step 4, 2-(6-(4-(2-aminoethyl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide was reacted with formaldehyde in the presence of sodium triacetoxyborohydride to give the title compound as off-white solid. MS: m/e=598.2 ([M+H]$^+$)

Example 36

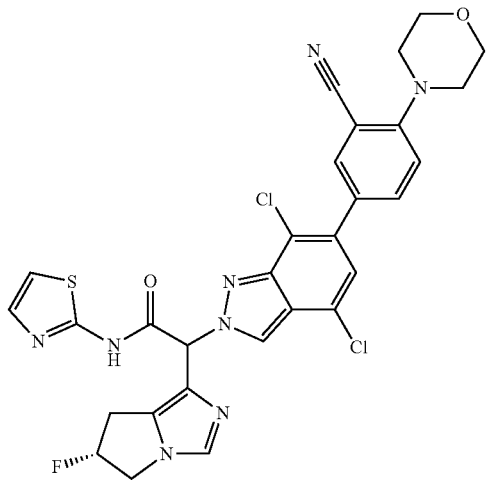 [SMILES: N#Cc1cc(-c2cc(Cl)c3cn(C(C(=O)Nc4nccs4)c4ncn5c4C[C@@H](F)C5)nc3c2Cl)ccc1N1CCOCC1]

rac-2-(4,7-Dichloro-6-(3-cyano-4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with 4,4,4',4',5,5,5',5'-octamethyl-2,2'-bi(1,3,2-dioxaborolane) in dioxane in the presence of [1,1'-bis(diphenylphosphino)ferrocene]dichloropalladium(II) and potassium acetate to give the impure title compound as brown solid which was used for the next step without further purification. MS: m/e=523.3 ([M+H]$^+$)

Step 2: rac-Ethyl 2-(4,7-dichloro-6-(3-cyano-4-morpholinophenyl)-2H-indazol-2-yl)-2-((R)-6-fluoro-6,7-dihydro-5H-pyrrolo[1,2-c]imidazol-1-yl)acetate In analogy to Example 25, step 4, ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol yl)acetate was reacted with 5-bromo-2-morpholinobenzonitrile in a mixture of THF and water in the presence of [1,1'-bis(diphenylphosphino)ferrocene]dichloropalladium(II) and cesium carbonate to give the title compound as light brown semisolid. MS: m/e=583.3 ([M+H]$^+$)

Step 3: rac-2-(4,7-Dichloro-6-(3-cyano-4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(4,7-dichloro-6-(3-cyano-4-morpholinophenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as off-white solid. MS: m/e=637.3 ([M+H]$^+$)

Example 37

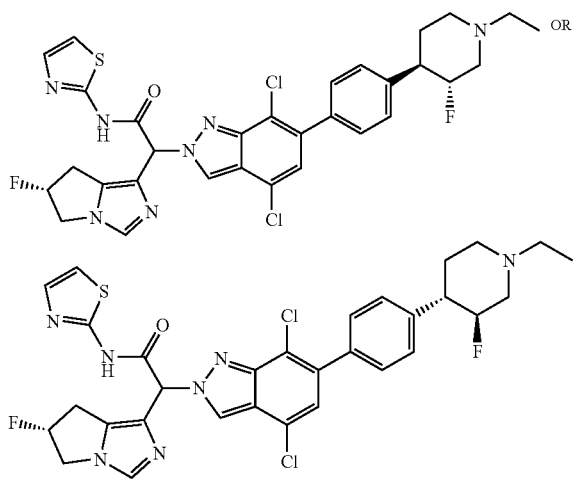

2-(4,7-Dichloro-6-(4-((3R,4R)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide OR 2-(4,7-dichloro-6-(4-((3S,4S)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-[4,7-dichloro-6-(4,4,5,5-tetramethyl-1,3,2-dioxaborolan-2-yl)indazol-2-yl]-2-[(6R)-6-fluoro-6,7-dihydro-5H-pyrrolo[1,2-c]imidazol-1-yl]acetate To a solution of ethyl 2-(6-bromo-4,7-dichloro-indazol-2-yl)-2-[rac-(6R)-6-fluoro-6,7-dihydro-5H-pyrrolo[1,2-c]imidazol-1-yl]acetate (3 g, 6.3 mmol, Eq: 1, Example 25, step 3) in 1,4-dioxane (18 mL) were added bis(pinacolato)diboron (2.08 g, 8.19 mmol, Eq: 1.3), KOAc (3.09 g, 31.5 mmol, Eq: 5) and Pd(dppf)Cl$_2$·CH$_2$Cl$_2$ (922 mg, 1.26 mmol, Eq: 0.2) under nitrogen at rt. The reaction mixture was stirred at 90° C. for 3 h. The reaction mixture was treated with water and extracted with (DCM/MeOH 9:1). The aqueous layer was extracted twice with (DCM/MeOH 9:1). The combined organic layers were washed with water and brine, dried over Na2SO4, filtered and concentrated in vacuo. The crude material was purified by flash chromatography (silica gel, 24 g, 0% to 5% MeOH in DCM) to give the title compound as a brown solid (2.3 g, 59% yield, 85% purity). m/z 523.3 [M+H]$^+$, ESI pos.

Step 2: Ethyl 2-[4,7-dichloro-6-[4-[(3R,4R)-1-ethyl-3-fluoro-4-piperidyl]phenyl]indazol-2-yl]-2-[(6R)-6-fluoro-6,7-dihydro-5H-pyrrolo[1,2-c]imidazol-1-yl]acetate OR ethyl 2-[4,7-dichloro-6-[4-[(3S,4S)-1-ethyl-3-fluoro-4-piperidyl]phenyl]indazol-2-yl]-2-[(6R)-6-fluoro-6,7-dihydro-5H-pyrrolo[1,2-c]imidazol-1-yl]acetate A mixture of ethyl 2-[4,7-dichloro-6-(4,4,5,5-tetramethyl-1,3,2-dioxaborolan-2-yl)indazol-2-yl]-2-[(6R)-6-fluoro-6,7-dihydro-5H-pyrrolo[1,2-c]imidazol-1-yl]acetate (310 mg, 415 mol, Eq: 1), (3R,4R)-4-(4-bromophenyl)-1-ethyl-3-fluoro-piperidine OR (3S,4S)-4-(4-bromophenyl)-1-ethyl-3-fluoro-piperidine (Compound A, 119 mg, 415 mol, Eq: 1), Cs$_2$CO$_3$, (405 mg, 1.24 mmol, Eq: 3) and Pd(dppf)Cl$_2$·CH$_2$Cl$_2$ (33.9 mg, 41.5 mol, Eq: 0.1) in THF (4 mL) and water (1 mL) was purged with argon and stirred at 55° C. for 2.5 h. The reaction mixture was poured into water and extracted with AcOEt (2×). The organic layers were combined, dried over Na$_2$SO$_4$ and concentrated in vacuo. The crude material was purified by flash chromatography (silica gel, 25 g, 0% to 14% MeOH in EtOAc) to give the title compound as a brown foam. (111 mg, 42% yield, 95% purity) m/z 602.3 [M+H]$^+$, ESI pos.

Step 3: 2-[4,7-Dichloro-6-[4-[(3R,4R)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide OR 2-[4,7-Dichloro-6-[4-[(3S,4S)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide To a mixture of ethyl 2-[4,7-dichloro-6-[4-[(3R,4R)-1-ethyl-3-fluoro-4-piperidyl]phenyl]indazol-2-yl]-2-[(6R)-6- fluoro-6,7-dihydro-5H-pyrrolo[1,2-c]imidazol-1-yl]acetate OR ethyl 2-[4,7-dichloro-6-[4-[(3S,4S)-1-ethyl-3-fluoro-4-piperidyl]phenyl]indazol-2-yl]-2-[(6R)-6-fluoro-6,7-dihydro-5H-pyrrolo[1,2-c]imidazol-1-yl]acetate (110 mg, 183 mol, Eq: 1) in THF (1.5 ml) and MeOH (1.5 ml) was added LiOH (1 M aq., 237 µl, 237 µmol, Eq: 1.3). The reaction mixture was stirred at rt for 2 h. The crude reaction mixture was concentrated in vacuo, co-evaporated with toluene and dried in vacuo. The resulting salt was suspended in DMF (3 mL), DIPEA (70.8 mg, 95.7 µl, 548 mol, Eq: 3), thiazol-2-amine (23.8 mg, 237 µmol, Eq: 1.3) and HATU (90.2 mg, 237 µmol, Eq: 1.3) were added. The reaction mixture was poured into H2O and extracted with AcOEt (2x). The organic layers were combined, dried over Na2SO4 and concentrated in vacuo. The crude material was purified by flash chromatography (Si-amine, 25 g, 0% to 20% MeOH in EtOAc) to give the title compound as a light brown solid (120 mg, 53% yield, 95% purity). m/z 656.3 [M+H]+, ESI pos.

Example 38

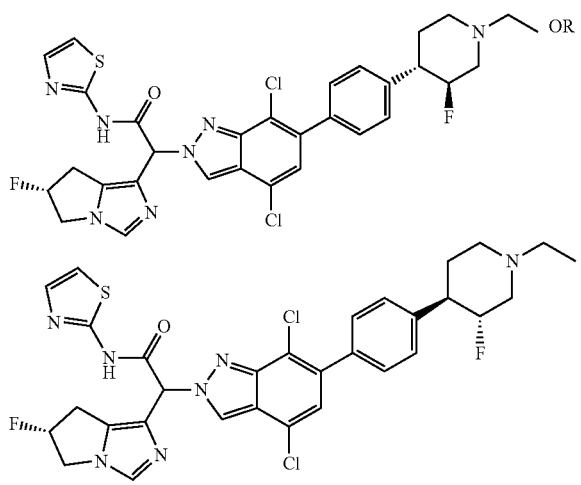

2-[4,7-Dichloro-6-[4-[rac-(3S,4S)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide OR 2-[4,7-Dichloro-6-[4-[rac-(3R,4R)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide Step 1: Ethyl 2-[4,7-dichloro-6-[4-[(3S,4S)-1-ethyl-3-fluoro-4-piperidyl]phenyl]indazol-2-yl]-2-[(6R)-6-fluoro-6,7-dihydro-5H-pyrrolo[1,2-c]imidazol-1-yl]acetate OR ethyl 2-[4,7-dichloro-6-[4-[(3R,4R)-1-ethyl-3-fluoro-4-piperidyl]phenyl]indazol-2-yl]-2-[(6R)-6-fluoro-6,7-dihydro-5H-pyrrolo[1,2-c]imidazol-1-yl]acetate By analogy with Example 37, Step 2, ethyl 2-[4,7-dichloro-6-(4,4,5,5-tetramethyl-1,3,2-dioxaborolan-2-yl)indazol-2-yl]-2-[(6R)-6-fluoro-6,7-dihydro-5H-pyrrolo[1,2-c]imidazol-1-yl]acetate (310 mg, 415 µmol, Eq: 1) was treated with (3S,4S)-4-(4-bromophenyl)-1-ethyl-3-fluoro-piperi- dine OR (3R,4R)-4-(4-bromophenyl)-1-ethyl-3-fluoro-piperidine (119 mg, 415 Eq: 1, Compound B), Cs2CO3, (405 mg, 1.24 mmol, Eq: 3) and Pd(dppf)Cl2·CH2Cl2 (33.9 mg, 41.5 µmol, Eq: 0.1) in THF (4 mL) and water (1 mL). Purification by flash chromatography (Si-Amine, 12 g, 0% to 14% MeOH in EtOAc) gave the title compound as a brown foam (48 mg, 56% yield, 95% purity). m/z 602.3 [M+H]+, ESI pos.

Step 2: 2-[4,7-Dichloro-6-[4-[rac-(3S,4S)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide OR 2-[4,7-Dichloro-6-[4-[rac-(3R,4R)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide By analogy with Example 37 Step 3, ethyl 2-[4,7-dichloro-6-[4-[(3S,4S)-1-ethyl-3-fluoro piperidyl]phenyl]indazol-2-yl]-2-[(6R)-6-fluoro-6,7-dihydro-5H-pyrrolo[1,2-c]imidazol-1-yl]acetate OR ethyl 2-[4,7-dichloro-6-[4-[(3R,4R)-1-ethyl-3-fluoro-4-piperidyl]phenyl]indazol-2-yl]-2-[(6R)-6-fluoro-6,7-dihydro-5H-pyrrolo[1,2-c]imidazol-1-yl]acetate (148 mg, 246 mol, Eq: 1) was initially treated with LiOH, and the resulting salt was reacted with 2-aminothiazole in the presence of HATU and DIPEA. Purification by flash chromatography (Si-Amine, 12 g, 0% to 20% MeOH in EtOAc) gave the title compound as a light brown solid (81 mg, 47% yield, 95% purity). m/z 656.4 [M+H]+, ESI pos.

Example 39

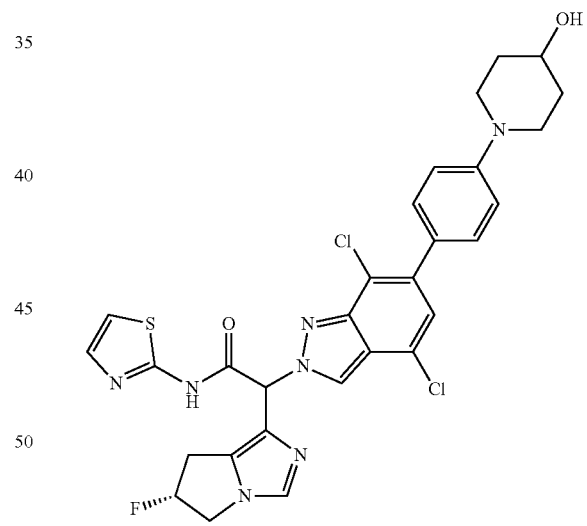

rac-2-(4,7-Dichloro-6-(4-(4-hydroxypiperidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-Ethyl 2-(6-(4-(4-((tert-butyldimethylsilyl)oxy)piperidin-1-yl)phenyl)-4,7-dichloro-2H-indazol-2-yl)-2-((R)-6-fluoro-6,7-dihydro-5H-pyrrolo[1,2-c]imidazol-1-yl)acetate In analogy to Example 25, step 4, rac-ethyl 2-(4,7-dichloro-6-(4,4,5,5-tetramethyl-1,3,2-dioxaborolan-2-yl)-

2H-indazol-2-yl)-2-((R)-6-fluoro-6,7-dihydro-5H-pyrrolo[1,2-c]imidazol yl)acetate (Example 36, step 1) was reacted with 1-(4-bromophenyl)-4-((tert-butyldimethylsilyl)oxy)piperidine (CAS 1374144-25-8) in a mixture of THF and water in the presence of [1,1'-bis(diphenylphosphino)ferrocene]dichloropalladium(II) and cesium carbonate to give the title compound as light brown solid. MS: m/e=343.3 ([M+H]$^{2+}$)

Step 2: rac-2-(6-(4-(4-((tert-Butyldimethylsilyl)oxy)piperidin-1-yl)phenyl)-4,7-dichloro-2H-indazol-2-yl)-2-((R)-6-fluoro-6,7-dihydro-5H-pyrrolo[1,2-c]imidazol-1-yl)-N-(thiazol yl)acetamide In analogy to Example 25, step 5, rac-ethyl 2-(6-(4-(4-((tert-butyldimethylsilyl)oxy)piperidin-1-yl)phenyl)-4,7-dichloro-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light yellow solid. MS: m/e=738.4 ([M−H]$^-$)

Step 3: rac-2-(4,7-Dichloro-6-(4-(4-hydroxypiperidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide To a solution of rac-2-(6-(4-(4-((tert-butyldimethylsilyl)oxy)piperidin-1-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide (37.5 mg) in THF (2.7 ml) tetrabutylammonium fluoride, 1M in THF (58.2 µl) was added and the mixture was stirred at room temperature for 1.5 h. The mixture was diluted with EtOAc, washed with water dried over MgSO4 and concentrated. The product was purified by chromatography (SiO$_2$, EtOAc to EtOAc/MeOH 3:2) to give the title compound (11 mg) as off-white solid. MS: m/e=624.5 ([M−H]$^-$)

Example 40

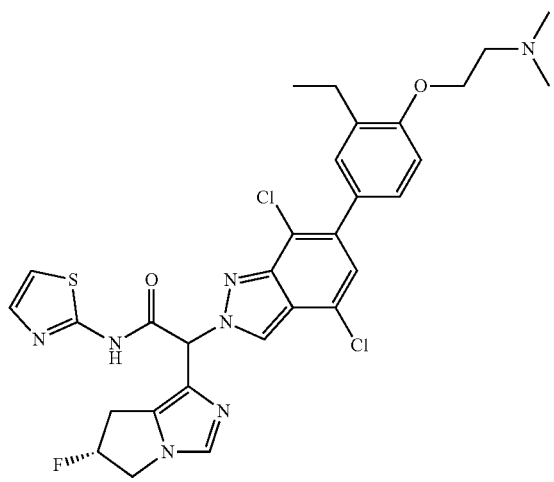 [SMILES: CCc1cc(-c2cc(Cl)c3cn(C(C(=O)Nc4nccs4)c4ncn5c4C[C@@H](F)C5)nc3c2Cl)ccc1OCCN(C)C]

2-(4,7-Dichloro-6-(4-(2-(dimethylamino)ethoxy)-3-ethylphenyl)-2H-indazol-2-yl)-2-((R)-6-fluoro-6,7-dihydro-5H-pyrrolo[1,2-c]imidazol-1-yl)-N-(thiazol-2-yl)acetamide

Step 1: Ethyl 2-(6-(4-(2-((tert-butoxycarbonyl)amino)ethoxy)-3-ethylphenyl)-4,7-dichloro-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (4-(2-((tert-butoxycarbonyl)amino)ethoxy)-3-ethylphenyl)boronic acid in toluene in the presence of [1,1'-bis(diphenylphosphino)ferrocene]dichloropalladium(II) and cesium carbonate to give the title compound as light brown gum. MS: m/e=660.3 ([M+H]$^+$)

Step 2: tert-Butyl (2-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)-2-ethylphenoxy)ethyl)carbamate In analogy to Example 25, step 5, ethyl 2-(6-(4-(2-((tert-butoxycarbonyl)amino)ethoxy)-3-ethylphenyl)-4,7-dichloro-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=714.4 ([M+H]$^+$)

Step 3: 2-(6-(4-(2-Aminoethoxy)-3-ethylphenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of tert-butyl (2-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)-2-ethylphenoxy)ethyl)carbamate in dichloromethane and methanol was treated with HCl in dioxane to give the title compound as off-white solid. MS: m/e=614.3 ([M+H]$^+$)

Step 4: 2-(4,7-Dichloro-6-(4-(2-(dimethylamino)ethoxy)-3-ethylphenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 34, step 4, 2-(6-(4-(2-aminoethoxy)-3-ethylphenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide was reacted with formaldehyde in the presence of sodium triacetoxyborohydride to give the title compound as off-white solid. MS: m/e=642.3 ([M+H]$^+$)

Example 41

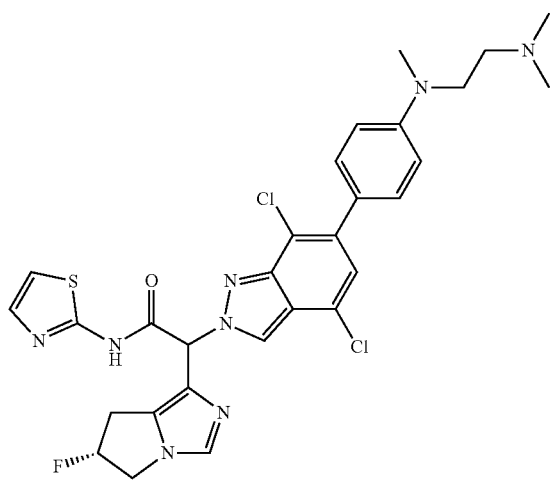 [SMILES: CN(C)CCN(C)c1ccc(-c2cc(Cl)c3cn(C(C(=O)Nc4nccs4)c4ncn5c4C[C@@H](F)C5)nc3c2Cl)cc1]

rac-2-(4,7-Dichloro-6-(4-((2-(dimethylamino)ethyl)
(methyl)amino)phenyl)-2H-indazol-2-yl)-2-((R)-6-
fluoro-6,7-dihydro-5H-pyrrolo[1,2-c]imidazol-1-yl)-
N-(thiazol-2-yl)acetamide Step 1: tert-Butyl (2-((4-iodophenyl)(methyl)amino)
ethyl)(methyl)carbamate A vial was charged with 1,4-diiodobenzene (1.5 g), copper(I) iodide (176 mg), (R)-(+)-1,1'-bi-2-naphthol (265 mg) and potassium phosphate (1.96 g). The vial was then degassed with argon using ultrasonication. tert-butyl methyl (2-(methylamino)ethyl)carbamate (1.3 g) and DMF (6.53 ml) were then added. The resulting mixture was stirred for 3 d at 75° C. The mixture was diluted with EtOAc, filtered through a cake of celite and the filtrate was then concentrated to give the crude product. The crude material was purified by flash chromatography (SiO2, 0% to 60% EtOAc in n-heptane) to give the impure title compound (407 mg) as colorless oil which was used for the next step without further purification.

Step 2: rac-Ethyl 2-(6-(4-((2-((tert-butoxycarbonyl)
(methyl)amino)ethyl)(methyl)amino)phenyl)-4,7-
dichloro-2H-indazol-2-yl)-2-((R)-6-fluoro-6,7-di-
hydro-5H-pyrrolo[1,2-c]imidazol-1-yl)acetate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with tert-butyl (2-((4-iodophenyl)(methyl)amino)ethyl)(methyl)carbamate in a mixture of THF and water in the presence of [1,1'-bis(diphenylphosphino)ferrocene]dichloropalladium(II) and cesium carbonate to give the title compound as light brown oil. MS: m/e=657.4 ([M−H]−)

Step 3: rac-tert-Butyl (2-((4-(4,7-dichloro-2-(1-((R)-
6-fluoro-6,7-dihydro-5H-pyrrolo[1,2-c]imidazol-1-
yl)-2-oxo-2-(thiazol-2-ylamino)ethyl)-2H-indazol-1-
yl)phenyl)(methyl)amino)ethyl)(methyl)carbamate In analogy to Example 25, step 5, rac-ethyl 2-(6-(4-((2-((tert-butoxycarbonyl)(methyl)amino)ethyl)(methyl)amino) phenyl)-4,7-dichloro-2H-indazol-2-yl) ((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the impure title compound as off-white solid.

Step 4: rac-2-(4,7-Dichloro-6-(4-(methyl(2-(methyl-
amino)ethyl)amino)phenyl)-2H-indazol-2-yl)-2-((R)-
6-fluoro-6,7-dihydro-5H-pyrrolo[1,2-c]imidazol-1-
yl)-N-(thiazol-2-yl)acetamide In analogy to Example 25, step 6, a solution of rac-tert-butyl (2-((4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)(methyl)amino) ethyl)(methyl)carbamate in dichloromethane and methanol was treated with HCl in dioxane to give the title compound as off-white solid. MS: m/e=611.2 ([M−H]−)

Step 5: rac-2-(4,7-Dichloro-6-(4-((2-(dimethyl-
amino)ethyl)(methyl)amino)phenyl)-2H-indazol-2-
yl)-2-((R)-6-fluoro-6,7-dihydro-5H-pyrrolo[1,2-c]
imidazol-1-yl)-N-(thiazol-2-yl)acetamide In analogy to Example 34, step 4, rac-2-(4,7-dichloro-6-(4-(methyl(2-(methylamino)ethyl)amino)phenyl)-2H-indazol-2-yl)-2-((R)-6-fluoro-6,7-dihydro-5H-pyrrolo[1,2-c] imidazol-1-yl)-N-(thiazol-2-yl)acetamide was reacted with formaldehyde in the presence of sodium triacetoxyborohydride to give the title compound as light brown solid. MS: m/e=625.3 ([M−H]−)

Example 42

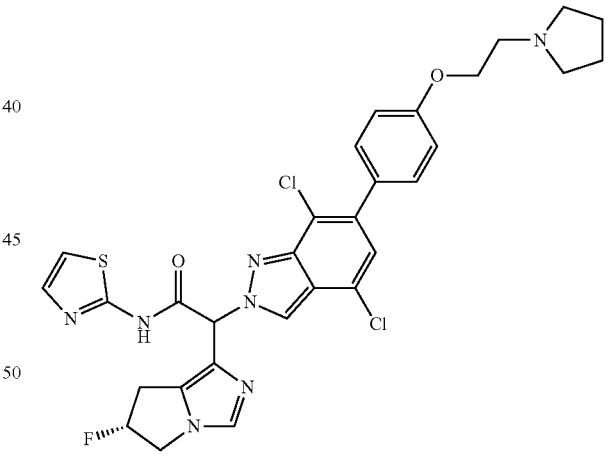

2-(4,7-Dichloro-6-(4-(2-(pyrrolidin-1-yl)ethoxy)
phenyl)-2H-indazol-2-yl)-2-((R)-6-fluoro-6,7-di-
hydro-5H-pyrrolo[1,2-c]imidazol-1-yl)-N-(thiazol-2-
yl)acetamide Step 1: Ethyl 2-(4,7-dichloro-6-(4-(2-(pyrrolidin-1-
yl)ethoxy)phenyl)-2H-indazol-2-yl)-2-((R)-6-fluoro-
6,7-dihydro-5H-pyrrolo[1,2-c]imidazol-1-yl)acetate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo

[1,2-c]imidazol-1-yl)acetate (Example 36, step 1) was reacted with 1-(2-(4-bromophenoxy)ethyl)pyrrolidine (CAS 1081-73-8) in a mixture of THF and water in the presence of [1,1'-bis(diphenylphosphino)ferrocene]dichloropalladium(II) and cesium carbonate to give the title compound as light yellow foam. MS: m/e=586.4 ([M+H]$^+$)

Step 2: 2-(4,7-Dichloro-6-(4-(2-(pyrrolidin-1-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4,7-dichloro-6-(4-(2-(pyrrolidin-1-yl)ethoxy)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=638.5 ([M−H]$^-$)

Example 43

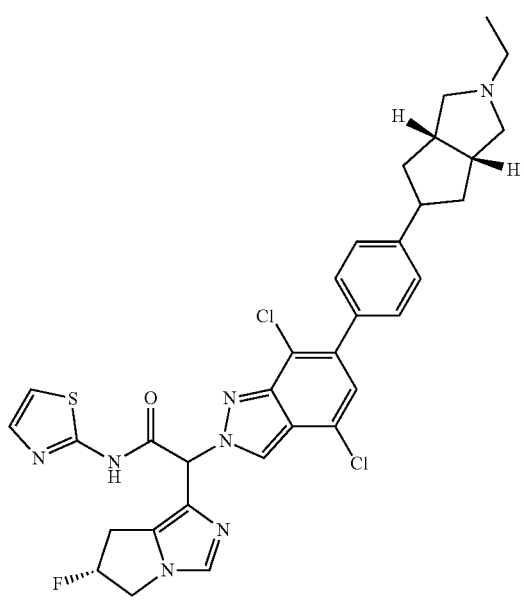 [SMILES: CCN1C[C@H]2CC(c3ccc(-c4cc(Cl)c5cn(C(C(=O)Nc6nccs6)c6ncn7c6C[C@@H](F)C7)nc5c4Cl)cc3)C[C@H]2C1]

2-(4,7-Dichloro-6-(4-((3aR,6aS)-2-ethyloctahydrocyclopenta[c]pyrrol-5-yl)phenyl)-2H-indazol-2-yl)-2-((R)-6-fluoro-6,7-dihydro-5H-pyrrolo[1,2-c]imidazol-1-yl)-N-(thiazol yl)acetamide Step 1: Ethyl 2-(4,7-dichloro-6-(4-((3aR,6aS)-2-ethyloctahydrocyclopenta[c]pyrrol-5-yl)phenyl)-2H-indazol-2-yl)-2-((R)-6-fluoro-6,7-dihydro-5H-pyrrolo[1,2-c]imidazol-1-yl)acetate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with (3aR,6aS)-5-(4-bromophenyl)-2-ethyloctahydrocyclopenta[c]pyrrole in a mixture of THF and water in the presence of [1,1'-bis(diphenylphosphino)ferrocene]di-chloropalladium(II) and cesium carbonate to give the title compound as brown gum. MS: m/e=610.3 ([M+H]$^+$)

Step 2: 2-(4,7-Dichloro-6-(4-((3aR,6aS)-2-ethyloctahydrocyclopenta[c]pyrrol-5-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4,7-dichloro-6-(4-((3aR,6aS)-2-ethyloctahydrocyclopenta[c]pyrrol-5-yl)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=664.4 ([M+H]$^+$)

Example 44

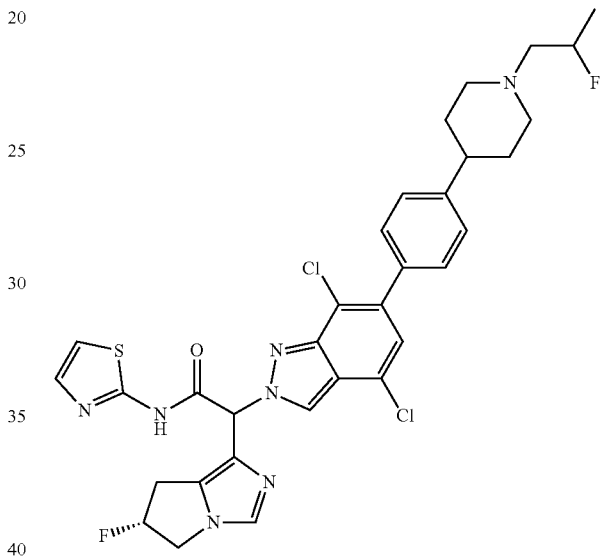

2-(4,7-Dichloro-6-(4-(1-(2-fluoropropyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(4,7-dichloro-6-(4-(1-(2-fluoropropyl)piperidin-4-yl)phenyl)-2H-indazol-2-yl) ((R)-6-fluoro-6,7-dihydro-5H-pyrrolo[1,2-c]imidazol-1-yl) acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (4-(1-(2-fluoropropyl)piperidin-4-yl)phenyl)boronic acid in toluene in the presence of [1,1'-bis(diphenylphosphino)ferrocene]dichloropalladium(II) and cesium carbonate to give the title compound as brown oil. MS: m/e=616.3 ([M+H]$^+$)

Step 2: 2-(4,7-Dichloro-6-(4-(1-(2-fluoropropyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4,7-dichloro-6-(4-(1-(2-fluoropropyl)piperidin-4-yl)phenyl)-2H-indazol- 2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown foam. MS: m/e=670.5 ([M+H]$^+$)

Example 45

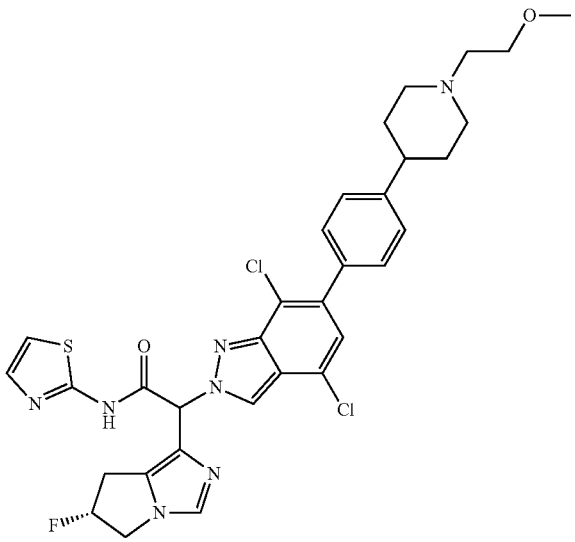 [SMILES: COCCN1CCC(c2ccc(-c3cc(Cl)c4cn(C(C(=O)Nc5nccs5)c5ncn6c5C[C@@H](F)C6)nc4c3Cl)cc2)CC1]

2-(4,7-Dichloro-6-(4-(1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(4,7-dichloro-6-(4-(1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (4-(1-(2-Methoxyethyl)piperidin-4-yl)phenyl)boronic acid in toluene in the presence of [1,1'-bis(diphenylphosphino)ferrocene]dichloropalladium(II) and cesium carbonate to give the title compound as brown foam. MS: m/e=614.4 ([M+H]$^+$)

Step 2: 2-(4,7-Dichloro-6-(4-(1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4,7-dichloro-6-(4-(1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown foam. MS: m/e=668.3 ([M+H]$^+$)

Example 47

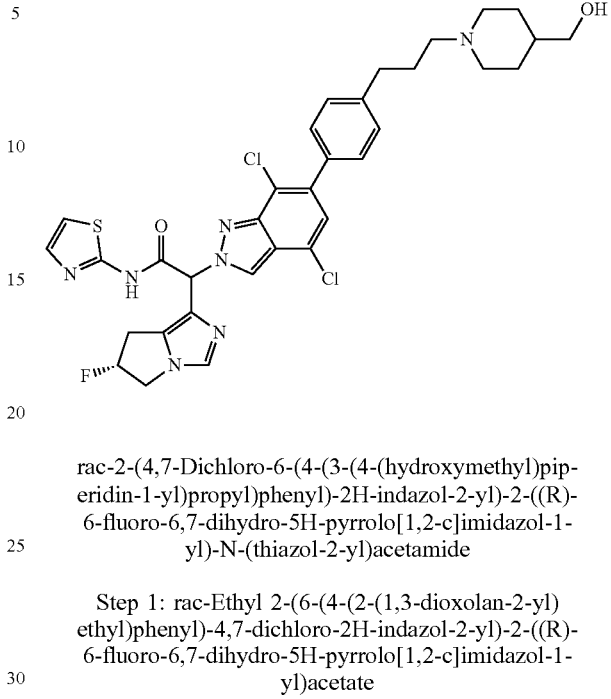

rac-2-(4,7-Dichloro-6-(4-(3-(4-(hydroxymethyl)piperidin-1-yl)propyl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-Ethyl 2-(6-(4-(2-(1,3-dioxolan-2-yl)ethyl)phenyl)-4,7-dichloro-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (4-(2-(1,3-dioxolan-2-yl)ethyl)phenyl)boronic acid in toluene in the presence of [1,1'-bis(diphenylphosphino)ferrocene]dichloropalladium(II) and cesium carbonate to give the title compound as brown foam. MS: m/e=573.3 ([M+H]$^+$)

Step 2: rac-2-(6-(4-(2-(1,3-Dioxolan-2-yl)ethyl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(6-(4-(2-(1,3-dioxolan-2-yl)ethyl)phenyl)-4,7-dichloro-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as brown oil. MS: m/e=627.2 ([M+H]$^+$)

Step 3: rac-2-(4,7-Dichloro-6-(4-(3-oxopropyl)phenyl)-2H-indazol-2-yl)-2-((R)-6-fluoro-6,7-dihydro-5H-pyrrolo[1,2-c]imidazol-1-yl)-N-(thiazol-2-yl)acetamide rac-2-(6-(4-(2-(1,3-Dioxolan-2-yl)ethyl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide (0.41 g) was dissolved in dioxane (10 ml) and HCl 4N Aqu. (1.63 ml) was added at rt. The mixture was stirred for 4 h at 20° C. Additional 2 equ HCl were added and stirred for 1 h. The reaction mixture was extracted with sat. Na$_2$CO$_3$-solution and two times EtOAc. The organic layers were washed with water and brine, dried over Na$_2$SO$_4$, filtered and concentrated to dryness. The crude material was purified by flash chromatography (silica gel, 20 g, 0% to 10% MeOH in MeCl₂) to give the title compound (0.3 g) as yellow foam. MS: m/e=583.3 ([M+H]⁺)

Step 4: rac-2-(4,7-Dichloro-6-(4-(3-(4-(hydroxymethyl)piperidin-1-yl)propyl)phenyl)-2H-indazol-2-yl)-2-((R)-6-fluoro-6,7-dihydro-5H-pyrrolo[1,2-c]imidazol-1-yl)-N-(thiazol-2-yl)acetamide rac-2-(4,7-Dichloro-6-(4-(3-oxopropyl)phenyl)-2H-indazol-2-yl)-2-((R)-6-fluoro-6,7-dihydro-5H-pyrrolo[1,2-c]imidazol-1-yl)-N-(thiazol-2-yl)acetamide (0.025 g) was dissolved in CH₂Cl₂ (0.5 ml). Piperidin-4-ylmethanol (7.4 mg) and sodium triacetoxyborohydride (10.9 mg) were added at rt. The mixture was stirred for 1 hr at 20° C. The reaction mixture was washed with sat. NaHCO₃-solution. The organic layers were loaded directly to silica gel column. The crude material was purified by flash chromatography (silica gel, 4 g, 0% to 10% MeOH in MeCl2) to give the title compound (0.01 g) as yellow oil. MS: m/e=682.3 ([M+H]⁺)

Example 48

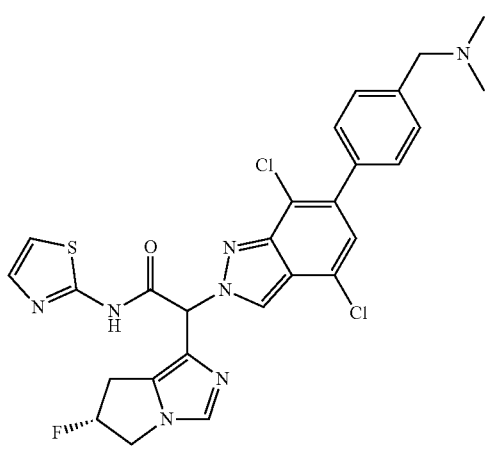 [SMILES: CN(C)Cc1ccc(-c2cc(Cl)c3cn(C(C(=O)Nc4nccs4)c4ncn5c4C[C@@H](F)C5)nc3c2Cl)cc1]

rac-2-(4,7-Dichloro-6-(4-((dimethylamino)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(4,7-dichloro-6-(4-formylphenyl)-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (4-formylphenyl)boronic acid in toluene in the presence of [1,1'-bis(diphenylphosphino)ferrocene]dichloropalladium(II) and cesium carbonate to give the title compound as brown foam. MS: m/e=501.1 ([M+H]+)

Step 2: rac-Ethyl 2-(4,7-dichloro-6-(4-((dimethylamino)methyl)phenyl)-2H-indazol-2-yl)-2-((R)-6-fluoro-6,7-dihydro-5H-pyrrolo[1,2-c]imidazol-1-yl)acetate Ethyl 2-(4,7-dichloro-6-(4-formylphenyl)-2H-indazol-2-yl)-2-((R)-6-fluoro-6,7-dihydro-5H-pyrrolo[1,2-c]imidazol-1-yl)acetate (92 mg) was dissolved in dichloromethane (0.75 ml) and dimethylamine (101 µl) and sodium triacetoxyborohydride (62.2 mg) were added at rt. The mixture was stirred for 3 hr at rt. The reaction mixture was washed with sat. NaHCO₃-solution and extracted with dichloromethane. The organic layers were dried over Na₂SO₄ and concentrated to dryness. The crude material was purified by flash chromatography on silica gel (12 g, 0% to 6% MeOH in dichloromethane) to give the title compound (61 mg) as off-white solid. MS: m/e=530.3 ([M+H]⁺)

Step 3: rac-2-(4,7-Dichloro-6-(4-((dimethylamino)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(4,7-dichloro-6-(4-((dimethylamino)methyl)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as off-white solid. MS: m/e=582.4 ([M–H]⁻)

Example 49

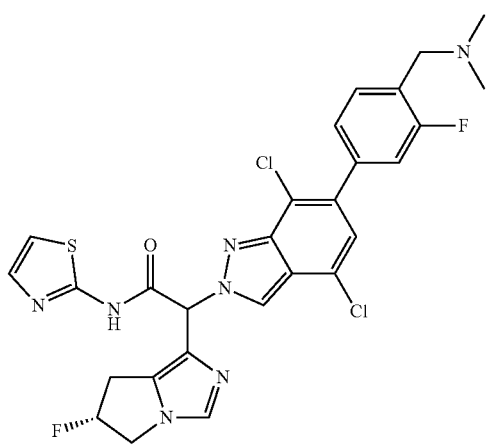 [SMILES: CN(C)Cc1ccc(-c2cc(Cl)c3cn(C(C(=O)Nc4nccs4)c4ncn5c4C[C@@H](F)C5)nc3c2Cl)cc1F]

rac-2-(4,7-Dichloro-6-(4-((dimethylamino)methyl)-3-fluorophenyl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(4,7-dichloro-6-(3-fluoro-4-formylphenyl)-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (3-fluoro-4-formylphenyl)boronic acid in a mixture of water and THF in the presence of [1,1'-bis(diphenylphosphino)ferrocene]dichloropalladium(II) and cesium carbonate to give the title compound as light brown solid. MS: m/e=519.2 ([M+H]⁺)

Step 2: rac-Ethyl 2-(4,7-dichloro-6-(4-((dimethyl-amino)methyl)-3-fluorophenyl)-2H-indazol-2-yl)-2-((R)-6-fluoro-6,7-dihydro-5H-pyrrolo[1,2-c]imidazol-1-yl)acetate In analogy to Example 48, step 2, ethyl 2-(4,7-dichloro-6-(3-fluoro-4-formylphenyl)-2H-indazol-2-yl)-2-((R)-6-fluoro-6,7-dihydro-5H-pyrrolo[1,2-c]imidazol-1-yl)acetate was reacted with dimethylamine in the presence of sodium triacetoxyborohydride to give the title compound as off-white solid. MS: m/e=548.3 ([M+H]⁺)

Step 3: rac-2-(4,7-Dichloro-6-(4-((dimethylamino)methyl)-3-fluorophenyl)-2H-indazol-2-yl) ((R)-6-fluoro-6,7-dihydro-5H-pyrrolo[1,2-c]imidazol-1-yl)-N-(thiazol-2-yl)acetamide In analogy to Example 25, step 5, rac-ethyl 2-(4,7-dichloro-6-(4-((dimethylamino)methyl)-3-fluorophenyl)-2H-indazol-2-yl)-2-((R)-6-fluoro-6,7-dihydro-5H-pyrrolo[1,2-c]imidazol yl)acetate was first treated with LiOH and the resulting salt was reacted with thiazol-2-amine in the presence of HATU and Hunig's base to give the title compound as off-white solid. MS: m/e=600.4 ([M−H]⁻)

Example 50

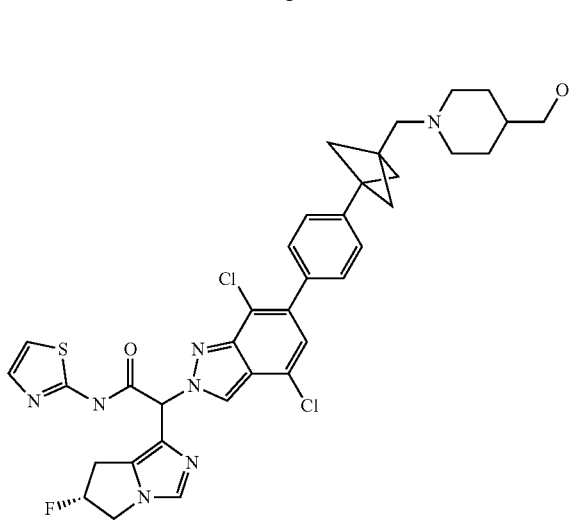

rac-2-(4,7-Dichloro-6-(4-(3-((4-(hydroxymethyl)piperidin-1-yl)methyl)bicyclo[1.1.1]pentan-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-Ethyl 2-(4,7-dichloro-6-(4-(3-((4-(hydroxymethyl)piperidin-1-yl)methyl)bicyclo[1.1.1]pentan-1-yl)phenyl)-2H-indazol-2-yl)-2-((R)-6-fluoro-6,7-dihydro-5H-pyrrolo[1,2-c]imidazol-1-yl)acetate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with (1-((3-(4-bromophenyl)bicyclo[1.1.1]pentan-1-yl)methyl)piperidin-4-yl)methanol in a mixture of THF and water in the presence of [1,1'-bis(diphenylphosphino)ferrocene]dichloropalladium(II) and sodium carbonate to give the title compound as brown solid. MS: m/e=666.4 ([M+H]⁺)

Step 2: rac-2-(4,7-Dichloro-6-(4-(3-((4-(hydroxymethyl)piperidin-1-yl)methyl)bicyclo[1.1.1]pentan-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(4,7-dichloro-6-(4-(3-((4-(hydroxymethyl)piperidin-1-yl)methyl)bicyclo[1.1.1]pentan-1-yl)phenyl)-2H-indazol-2-yl)((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as brown solid. MS: m/e=720.3 ([M+H]⁺)

Example 51

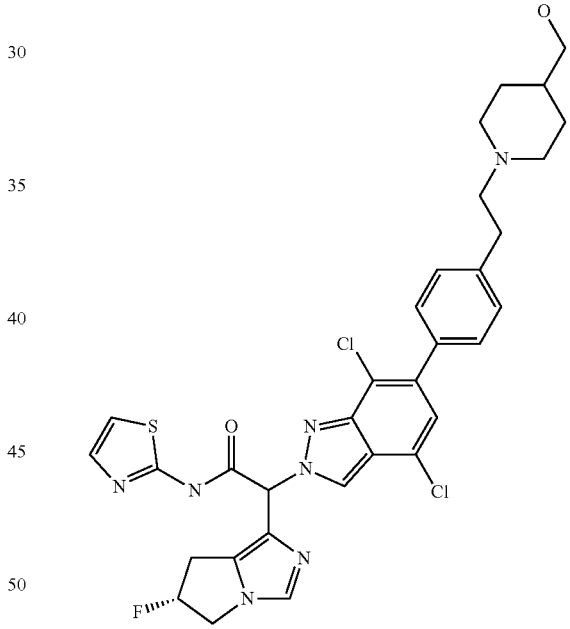

rac-2-(4,7-Dichloro-6-(4-(2-(4-(hydroxymethyl)piperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 64, step 5, rac-4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenethyl methanesulfonate (Example 64, step 4) was reacted with piperidin-4-ylmethanol in the presence of triethylamine to give the title compound as light brown oil. MS: m/e=668.2 ([M+H]⁺)

Example 52

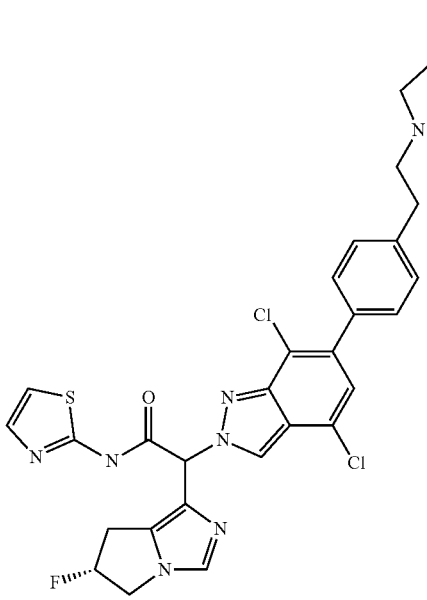

rac-2-(4,7-Dichloro-6-(4-(2-(3-(hydroxymethyl)pyr-rolidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 64, step 5, rac-4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenethyl methanesulfonate (Example 64, step 4) was reacted with pyrrolidin-3-ylmethanol in the presence of triethylamine to give the title compound as brown foam. MS: m/e=654.3 ([M+H]$^+$)

Example 53

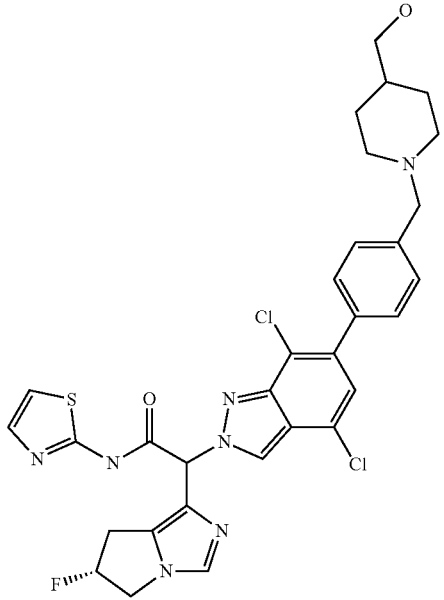 [SMILES: O=C(Nc1nccs1)C(c1ncn2c1C[C@@H](F)C2)n1cc2c(Cl)cc(-c3ccc(CN4CCC(CO)CC4)cc3)c(Cl)c2n1]

rac-2-(4,7-Dichloro-6-(4-04-(hydroxymethyl)piperi-din-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(4,7-dichloro-6-(4-((4-(hydroxym-ethyl)piperidin-1-yl)methyl)phenyl)-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (1-(4-(4,4,5,5-tetramethyl-1,3,2-dioxaborolan-2-yl)benzyl)piperidin-4-yl)methanol in a mixture of THF and water in the presence of [1,1'-bis(diphenylphosphino)ferrocene]dichloropalladium(II) and cesium carbonate to give the title compound as light brown foam. MS: m/e=600.2 ([M+H]$^+$)

Step 2: rac-2-(4,7-Dichloro-6-(4-((4-(hydroxym-ethyl)piperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4,7-dichloro-6-(4-((4-(hydroxymethyl)piperidin-1-yl)methyl)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=654.2 ([M+H]$^+$)

Example 54

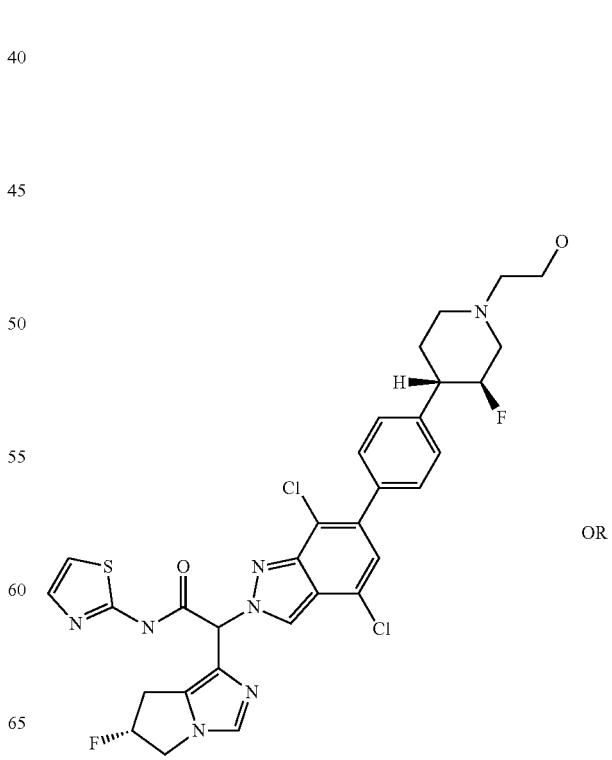

OR

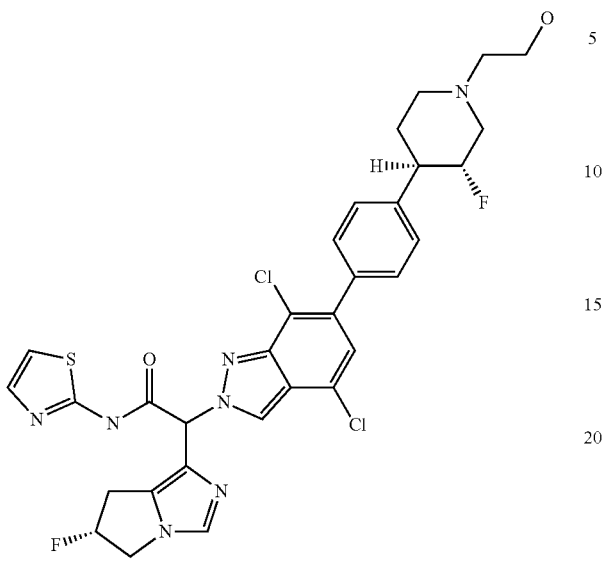

2-(4,7-Dichloro-6-(4-((3S,4S)-3-fluoro-1-(2-hydroxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol yl)acetamide OR 2-(4,7-Dichloro-6-(4-03R,4R)-3-fluoro-1-(2-hydroxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: tert-Butyl (3S,4S)-4-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)-3-fluoropiperidine-1-carboxylate or tert-Butyl (3R,4R)-4-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)-3-fluoropiperidine-1-carboxylate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (4-((3S,4S)-1-(tert-butoxycarbonyl)-3-fluoropiperidin-4-yl)phenyl)boronic acid OR (4-((3R,4R)-1-(tert-butoxycarbonyl)-3-fluoropiperidin-4-yl)phenyl)boronic acid in toluene in the presence of [1,1'-bis(diphenylphosphino)ferrocene]dichloropalladium(II) and cesium carbonate to give the title compound as brown oil. MS: m/e=675.4 ([M+H]+)

Step 2: tert-Butyl (3S,4S)-4-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)-3-fluoropiperidine-1-carboxylate OR tert-Butyl (3R,4R)-4-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)-3-fluoropiperidine-1-carboxylate In analogy to Example 25, step 5, tert-butyl (3S,4S)-4-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)-3-fluoropiperidine-1-carboxylate or tert-butyl (3R,4R)-4-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)-3-fluoropiperidine-1-carboxylate was first treated with LiOH and the resulting salt was reacted with thiazol-2-amine in the presence of HATU and Hunig's base to give the title compound as light brown solid. MS: m/e=726.3 ([M−H]−)

Step 3: 2-(4,7-Dichloro-6-(4-((3S,4S)-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide OR 2-(4,7-dichloro-6-(4-((3R,4R)-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of tert-butyl (3S,4S)-4-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)-3-fluoropiperidine-1-carboxylate OR tert-butyl (3R,4R)-4-(4-(4,7-dichloro-2-(1-((R)-6-fluoro-6,7-dihydro-5H-pyrrolo[1,2-c]imidazol-1-yl)-2-oxo-2-(thiazol ylamino)ethyl)-2H-indazol-6-yl)phenyl)-3-fluoropiperidine-1-carboxylate in dichloromethane and methanol was treated with HCl in dioxane to give the title compound as light brown solid. MS: m/e=628.1 ([M+H]+)

Step 4: 2-(4,7-Dichloro-6-(4-((3S,4S)-3-fluoro-1-(2-hydroxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide OR 2-(4,7-dichloro-6-(4-((3R,4R)-3-fluoro-1-(2-hydroxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 34, step 4, 2-(4,7-dichloro-6-(4-((3S,4S)-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide OR 2-(4,7-dichloro-6-(4-((3R,4R)-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide was reacted with 2-hydroxyacetaldehyde in the presence of sodium triacetoxyborohydride to give the title compound. MS: m/e=670.2 ([M−H]−)

Example 55

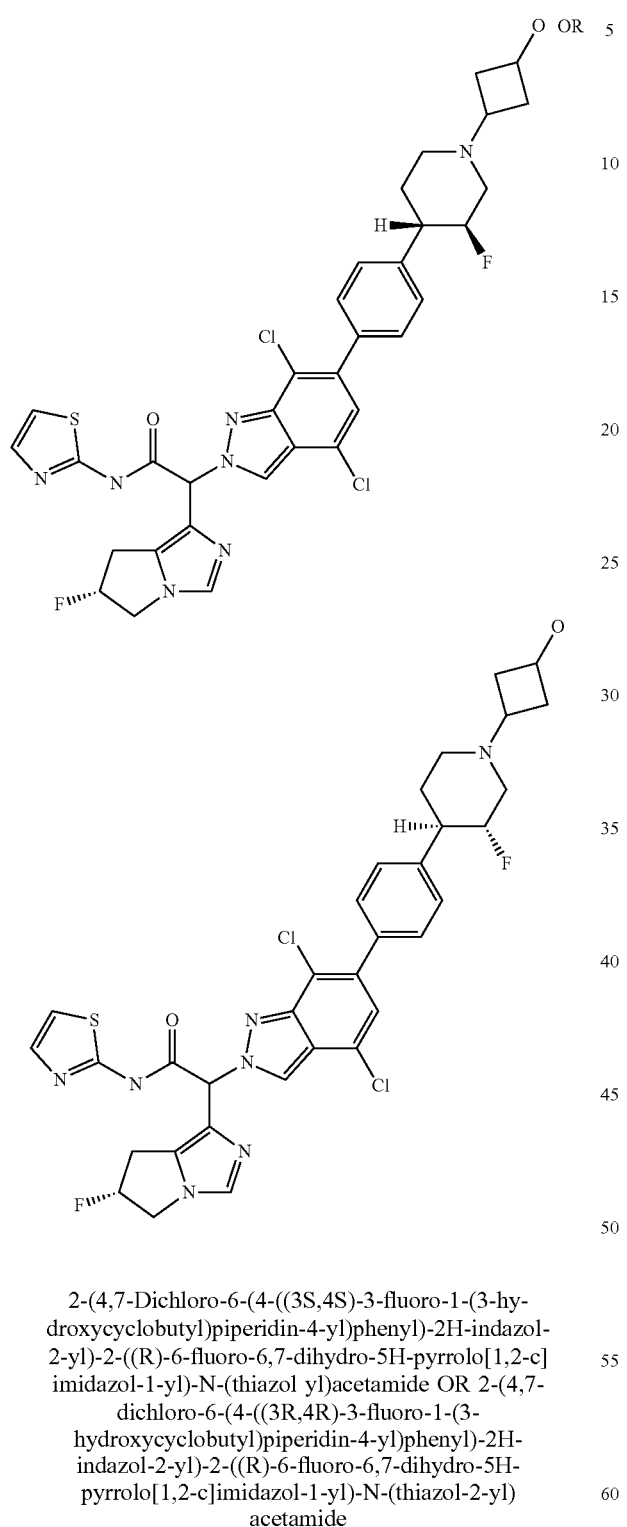

2-(4,7-Dichloro-6-(4-((3S,4S)-3-fluoro-1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol yl)acetamide OR 2-(4,7-dichloro-6-(4-((3R,4R)-3-fluoro-1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 34, step 4, 2-(4,7-dichloro-6-(4-((3S,4S)-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol yl)acetamide OR 2-(4,7-dichloro-6-(4-((3R,4R)-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide (Example 54, step 3) was reacted with 3-hydroxycyclobutan-1-one in the presence of sodium triacetoxyborohydride to give the title compound. MS: m/e=696.3 ([M–H]⁻)

Example 56

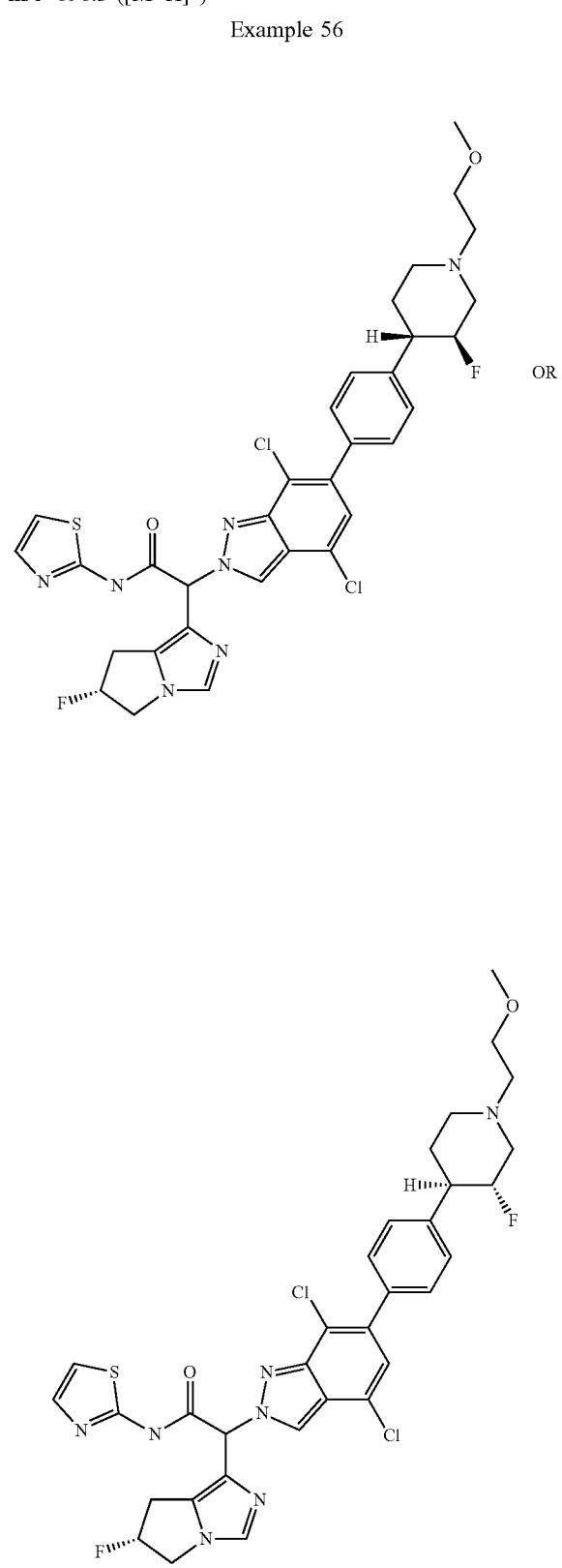

2-(4,7-Dichloro-6-(4-((3S,4S)-3-fluoro-1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide OR 2-(4,7-dichloro-6-(4-((3R,4R)-3-fluoro-1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide 2-(4,7-Dichloro-6-(4-((3S,4S)-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide OR 2-(4,7-dichloro-6-(4-((3R,4R)-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide (Example 54, step 3, 70 mg) and 1-bromo-2-methoxyethane (16.9 mg) were dissolved in DMF (700 µL) and DIPEA (35.2 mg) were added. The reaction mixture was stirred at 50° C. for 22 h. The reaction mixture was cooled to room temperature and then extracted with EtOAc, water and sat. NaCl solution. The organic layers were combined, dried over sodium sulfate, filtered and concentrated. The crude material chromatographed over 4 g silica gel with dichloromethane→methanol/dichloromethane, Gradient 0-20% methanol. All fractions containing product were combined and concentrated to give the title compound (18.4 mg) as a brown solid. MS: m/e=684.3 ([M−H]−)

Example 57

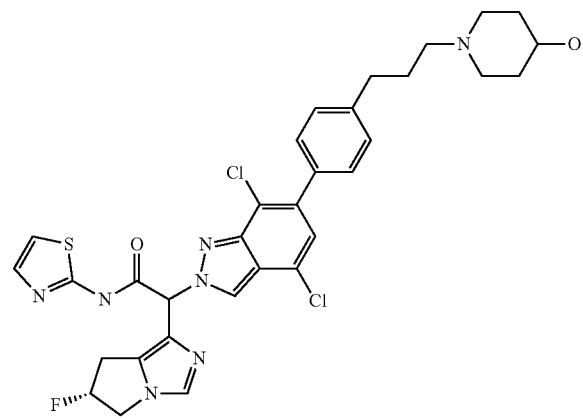 [SMILES: O=C(Nc1nccs1)C(c1ncn2c1C[C@@H](F)C2)n1cc2c(Cl)cc(-c3ccc(CCCN4CCC(O)CC4)cc3)c(Cl)c2n1]

rac-2-(4,7-Dichloro-6-(4-(3-(4-hydroxypiperidin-1-yl)propyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 47, step 4, rac-2-(4,7-Dichloro-6-(4-(3-oxopropyl)phenyl)-2H-indazol-2-yl)-2-((R)-6-fluoro-6,7-dihydro-5H-pyrrolo[1,2-c]imidazol-1-yl)-N-(thiazol-2-yl)acetamide (Example 47, step 3) was reacted with piperidin-4-ol in the presence of sodium triacetoxyborohydride to give the title compound as off-white solid. MS: m/e=668.2 ([M+H]+)

Example 58

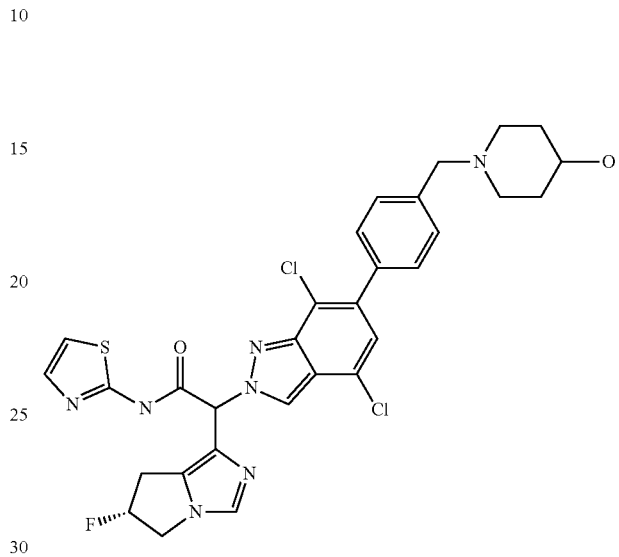

rac-2-(4,7-Dichloro-6-(4-((4-hydroxypiperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-Ethyl 2-(4,7-dichloro-6-(4-((4-hydroxypiperidin-1-yl)methyl)phenyl)-2H-indazol-2-yl)-2-((R)-6-fluoro-6,7-dihydro-5H-pyrrolo[1,2-c]imidazol-1-yl)acetate In analogy to Example 47, step 4, rac-ethyl 2-(4,7-dichloro-6-(4-formylphenyl)-2H-indazol-2-yl)-2-((R)-6-fluoro-6,7-dihydro-5H-pyrrolo[1,2-c]imidazol-1-yl)acetate (Example 48, step 1) was reacted with piperidin-4-ol in the presence of sodium triacetoxyborohydride to give the title compound as light brown solid. MS: m/e=586.2 ([M+H]+)

Step 2: rac-2-(4,7-Dichloro-6-(4-((4-hydroxypiperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(4,7-dichloro-6-(4-((4-hydroxypiperidin-1-yl)methyl)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=640 ([M+H]+)

Example 59

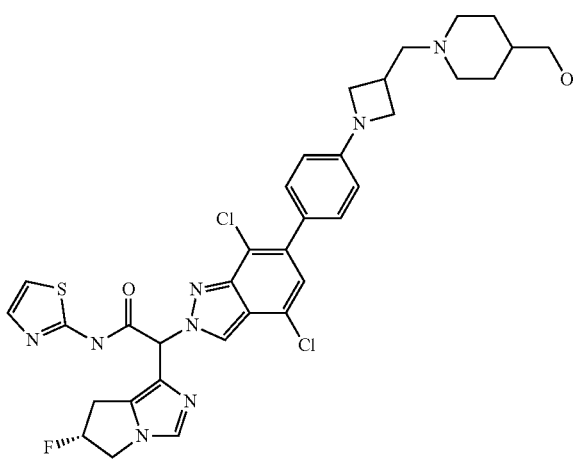 [SMILES: O=C(Nc1nccs1)C(c1ncn2c1C[C@@H](F)C2)n1cc2c(Cl)cc(-c3ccc(N4CC(CN5CCC(CO)CC5)C4)cc3)c(Cl)c2n1]

rac-2-(4,7-Dichloro-6-(4-(3-((4-(hydroxymethyl)piperidin-1-yl)methyl)azetidin yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-Ethyl 2-(6-(4-(3-((4-(((tert-butyldimethylsilyl)oxy)methyl)piperidin yl)methyl)azetidin-1-yl)phenyl)-4,7-dichloro-2H-indazol-2-yl)-2-((R)-6-fluoro-6,7-dihydro-5H-pyrrolo[1,2-c]imidazol-1-yl)acetate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with 1-((1-(4-bromophenyl)azetidin-3-yl)methyl)-4-(((tert-butyldimethylsilyl)oxy)methyl)piperidine in a mixture of THF and water in the presence of [1,1'-bis(diphenylphosphino)ferrocene]dichloropalladium(II) and cesium carbonate to give the title compound as brown solid. MS: m/e=771.3 ([M+H]+)

Step 2: rac-2-(6-(4-(3-((4-(((tert-Butyldimethylsilyl)oxy)methyl)piperidin-1-yl)methyl)azetidin-1-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(6-(4-(3-((4-(((tert-butyldimethylsilyl)oxy)methyl)piperidin-1-yl)methyl)azetidin-1-yl)phenyl)-4,7-dichloro-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown oil. MS: m/e=824.3 ([M+H]+)

Step 3: rac-2-(4,7-Dichloro-6-(4-(3-((4-(hydroxymethyl)piperidin-1-yl)methyl)azetidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 39, step 3, rac-2-(6-(4-(34(4-(((tert-butyldimethylsilyl)oxy)methyl)piperidin-1-yl)methyl)azetidin-1-yl)phenyl)-4,7-dichloro-2H-indazol-2-yl)-2-((R)-6-fluoro-6,7-dihydro-5H-pyrrolo[1,2-c]imidazol-1-yl)-N-(thiazol yl)acetamide was reacted with tetrabutylammonium fluoride to give the title compound as off-white solid. MS: m/e=707.3 ([M−H]−)

Example 60

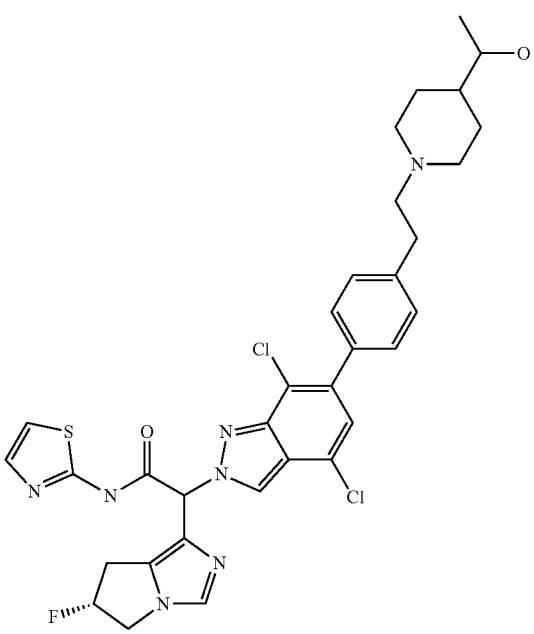 [SMILES: CC(O)C1CCN(CCc2ccc(-c3cc(Cl)c4cn(C(C(=O)Nc5nccs5)c5ncn6c5C[C@@H](F)C6)nc4c3Cl)cc2)CC1]

rac-2-(4,7-Dichloro-6-(4-(2-(4-(1-hydroxyethyl)piperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide To a solution of 2-[4-[4,7-dichloro-2-[2-oxo-1-[rac-(6R)-6-fluoro-6,7-dihydro-5H-pyrrolo[1,2-c]imidazol-1-yl]-2-(thiazol-2-ylamino)ethyl]indazol-6-yl]phenyl]ethyl methanesulfonate prepared as described in Example 64 Step 4 (50 mg, 77 μmol, Eq: 1) in acetonitrile (1 mL) was added 1-(4-piperidyl)ethanol (14.9 mg, 114 μmol, Eq: 1.5, CAS 6457-48-3) and triethylamine (23.4 mg, 32.2 μl, 231 μmol, Eq: 3). The reaction mixture was stirred at 60° C. for 16 h. The reaction mixture was concentrated in vacuo. The reaction mixture was poured into NaHCO3 solution and extracted with AcOEt (2×). The organic layers were combined, dried over Na2SO4 and concentrated in vacuo. The crude material was purified by flash chromatography (silica gel, 12 g, 0% to 20% MeOH in DCM) to give the title compound as a yellow foam (26 mg, 50% yield, 90% purity). m/z 682.2 [M+H]+, ESI pos.

Example 61

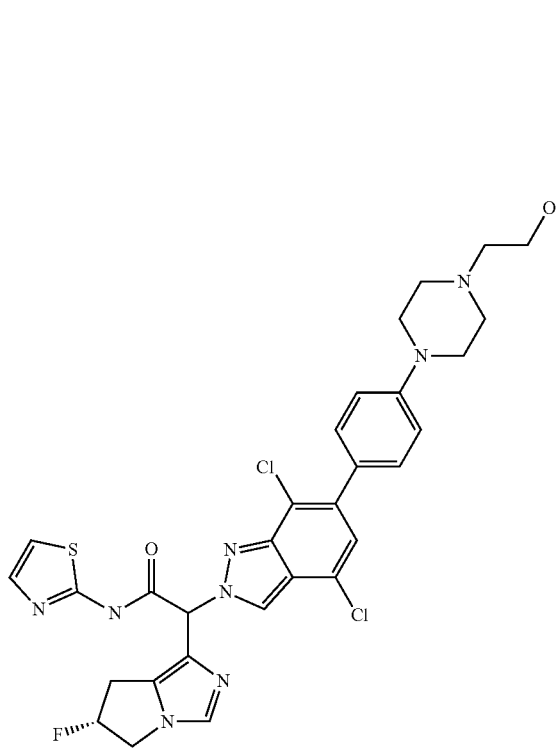 [SMILES: O=C(Nc1nccs1)C(c1ncn2c1C[C@@H](F)C2)n1cc2c(Cl)cc(-c3ccc(N4CCN(CCO)CC4)cc3)c(Cl)c2n1]

rac-2-(4,7-Dichloro-6-(4-(4-(2-hydroxyethyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide

Step 1: rac-2-(4,7-Dichloro-6-(4-(piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of tert-butyl 4-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)piperazine-1-carboxylate (Example 25, step 5) in dichloromethane and methanol was treated with HCl in dioxane to give the title compound as yellow solid. MS: m/e=611.1 ([M+H]$^+$)

Step 2: rac-2-(4,7-Dichloro-6-(4-(4-(2-hydroxyethyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 26, rac-2-(4,7-dichloro-6-(4-(piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide was treated with 2-iodoethane-1-ol in the presence of N,N-diisopropylethylamine to give the title compound as orange solid. MS: m/e=655.2 ([M+H]$^+$)

Example 62

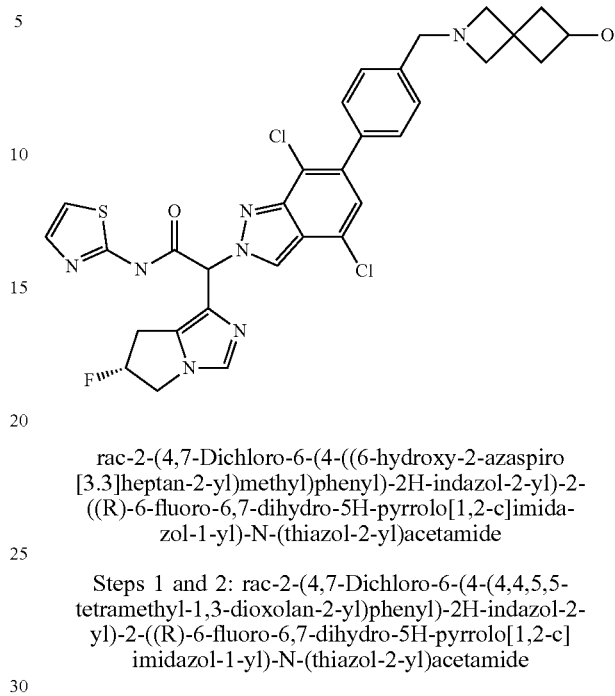

rac-2-(4,7-Dichloro-6-(4-((6-hydroxy-2-azaspiro[3.3]heptan-2-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide

Steps 1 and 2: rac-2-(4,7-Dichloro-6-(4-(4,4,5,5-tetramethyl-1,3-dioxolan-2-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with 4,4,5,5-tetramethyl-2-(4-(4,4,5,5-tetramethyl-1,3-dioxolan-2-yl)phenyl)-1,3,2-dioxaborolane in a mixture of THF and water in the presence of [1,1'-bis(diphenylphosphino)ferrocene]dichloropalladium(II) and cesium carbonate. The crude product of this reaction was reacted with thiazol-2-amine in the presence of HATU and Hunig's base to give the title compound as light brown solid. MS: m/e=656.1 ([M+H]$^+$)

Step 3: rac-2-(4,7-Dichloro-6-(4-formylphenyl)-2H-indazol-2-yl)-2-((R)-6-fluoro-6,7-dihydro-5H-pyrrolo[1,2-c]imidazol-1-yl)-N-(thiazol-2-yl)acetamide To a solution of rac-2-(4,7-dichloro-6-(4-(4,4,5,5-tetramethyl-1,3-dioxolan-2-yl)phenyl)-2H-indazol-2-yl)-2-((R)-6-fluoro-6,7-dihydro-5H-pyrrolo[1,2-c]imidazol-1-yl)-N-(thiazol-2-yl)acetamide (0.385 g) in acetone (4 ml) was added 2 M hydrochloric acid (1.47 ml) at room temperature. The reaction mixture was heated at 50° C. for 4 h. The reaction mixture was partitioned between ethyl acetate (50 ml) and 1 M sodium bicarbonate solution (30 ml). The layers were separated. The aqueous layer was extracted with two 50-ml portions of ethyl acetate. The combined organic layers were washed with one 30-ml portion of brine, dried over anhydrous magnesium sulfate, filtered and concentrated in vacuo to give the crude title compound (0.265 g) as light brown solid which was used in the next step without further purification.

Step 4: rac-2-(4,7-Dichloro-6-(4-((6-hydroxy-2-azaspiro[3.3]heptan-2-yl)methyl)phenyl)-2H-indazol-2-yl)-2-((R)-6-fluoro-6,7-dihydro-5H-pyrrolo[1,2-c]imidazol-1-yl)-N-(thiazol yl)acetamide In analogy to Example 48, step 2, rac-2-(4,7-dichloro-6-(4-formylphenyl)-2H-indazol-2-yl)-2-((R)-6-fluoro-6,7-dihydro-5H-pyrrolo[1,2-c]imidazol-1-yl)-N-(thiazol-2-yl)acetamide was reacted with 2-azaspiro[3.3]heptan-6-ol in the presence of sodium triacetoxyborohydride to give the title compound as light brown solid. MS: m/e=650.2 ([M−H]⁻)

Example 63

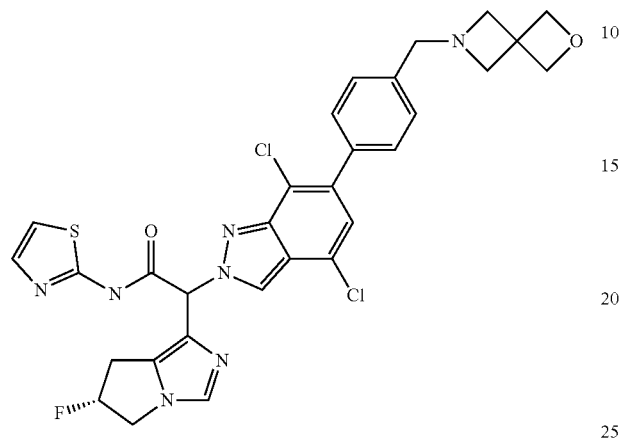

rac-2-(6-(4-((2-Oxa-6-azaspiro[3.3]heptan-6-yl)methyl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 48, step 2, rac-2-(4,7-dichloro-6-(4-formylphenyl)-2H-indazol-2-yl)-2-((R)-6-fluoro-6,7-dihydro-5H-pyrrolo[1,2-c]imidazol-1-yl)-N-(thiazol-2-yl)acetamide (Example 62, step 3) was reacted with 2-oxa-6-azaspiro[3.3]heptane hemioxalate in the presence of sodium triacetoxyborohydride to give the title compound as light yellow solid. MS: m/e=636.3 ([M−H]⁻)

Example 64

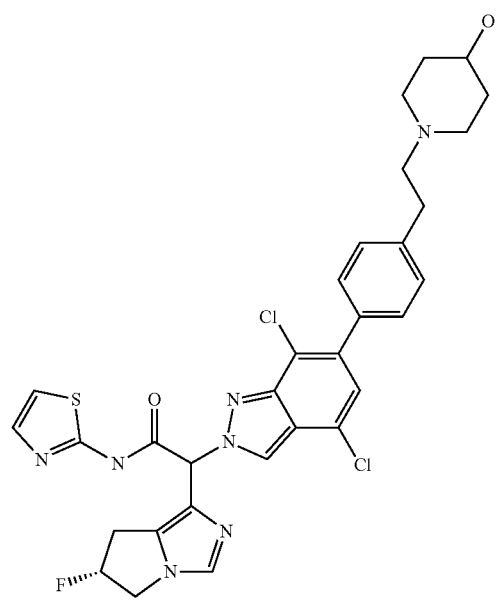 [SMILES: O=C(Nc1nccs1)C(c1ncn2c1C[C@@H](F)C2)n1cc2c(Cl)cc(-c3ccc(CCN4CCC(O)CC4)cc3)c(Cl)c2n1]

rac-2-(4,7-Dichloro-6-(4-(2-(4-hydroxypiperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-Ethyl 2-(6-(4-(2-((tert-butyldimethylsilyl)oxy)ethyl)phenyl)-4,7-dichloro-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (4-(2-((tert-butyldimethylsilyl)oxy)ethyl)phenyl)boronic acid in toluene in the presence of [1,1'-bis(diphenylphosphino)ferrocene]dichloropalladium(II) and cesium carbonate to give the title compound as light brown oil. MS: m/e=632.2 ([M+H]⁺)

Step 2: rac-2-(6-(4-(2-((tert-Butyldimethylsilyl)oxy)ethyl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(6-(4-(2-((tert-butyldimethylsilyl)oxy)ethyl)phenyl)-4,7-dichloro-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=685.2 ([M+H]⁺)

Step 3: rac-2-(4,7-Dichloro-6-(4-(2-hydroxyethyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 39, step 3, rac-2-(6-(4-(2-((tert-butyldimethylsilyl)oxy)ethyl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide was reacted with tetrabutylammonium fluoride to give the title compound as brown solid. MS: m/e=571.1 ([M+H]⁺)

Step 4: rac-4-(4,7-Dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenethyl methanesulfonate rac-2-(4,7-Dichloro-6-(4-(2-hydroxyethyl)phenyl)-2H-indazol-2-yl)-2-((R)-6-fluoro-6,7-dihydro-5H-pyrrolo[1,2-c]imidazol-1-yl)-N-(thiazol-2-yl)acetamide (495 mg) was dissolved in DCM (4 ml). Et₃N (149 mg) and Mesyl-Cl (101 mg) were added at 0° C., followed by stirring at 20° C. for 1.5 h. Another portion of Mesyl-Cl (101 mg) was added at 0° C., followed by stirring at 20° C. for 1.5 h. Another portion of Et₃N (149 mg) and Mesyl-Cl (101 mg) were added at 0° C., followed by stirring at 20° C. for 30 min. Another portion of Et₃N (74.5 mg) and Mesyl-Cl (50.6 mg) were added at 0° C., followed by stirring at 20° C. for 30 min. The reaction mixture was washed with sat. NaHCO3-solution and extracted with DCM. The organic layers were washed with water, dried over Na₂SO₄, filtered and concentrated to afford the title compound (700 mg) as a dark brown solid. MS: m/e=649.2 ([M+H]⁺)

Step 5: rac-2-(4,7-Dichloro-6-(4-(2-(4-hydroxypiperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide rac-4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenethyl methanesulfonate (50 mg) was dissolved in acetonitrile (1 ml). Piperidin-4-ol (8.18 mg) and Et$_3$N (16.4 mg) were added at rt, followed by stirring at 60° C. for 16 h. The reaction mixture was concentrated in vacuo and extracted with sat. NaHCO$_3$-solution and two times EtOAc. The organic layers were washed with water and brine, dried over Na$_2$SO$_4$, filtered and concentrated in vacuo. The crude material was purified by flash chromatography on amine gel (12 g, 0-5% MeOH in DCM to give the title compound (4.9 mg) as a yellow solid. MS: m/e=654.2 ([M+H]$^+$)

Example 65

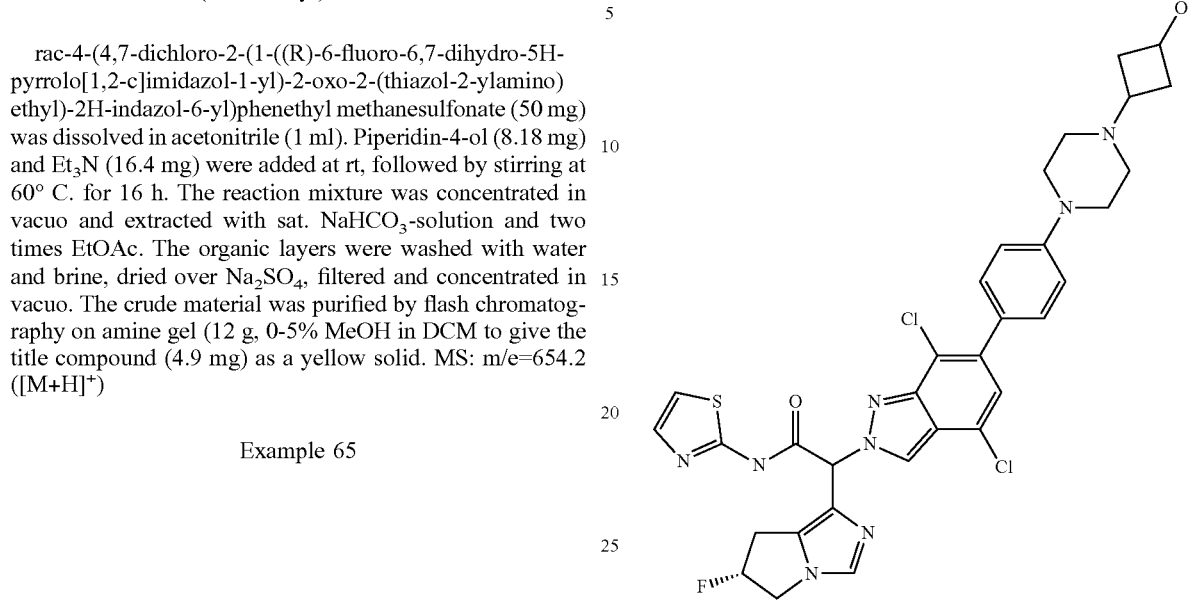

2-(4,7-Dichloro-6-(4-((4-fluoro-4-(hydroxymethyl)piperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 48, step 2, rac-2-(4,7-dichloro-6-(4-formylphenyl)-2H-indazol-2-yl)-2-((R)-6-fluoro-6,7-dihydro-5H-pyrrolo[1,2-c]imidazol-1-yl)-N-(thiazol-2-yl)acetamide (Example 62, step 3) was reacted with (4-fluoropiperidin-4-yl)methanol hydrochloride in the presence of sodium triacetoxyborohydride to give the title compound as light yellow solid. MS: m/e=672.4 ([M+H]$^+$)

Example 66

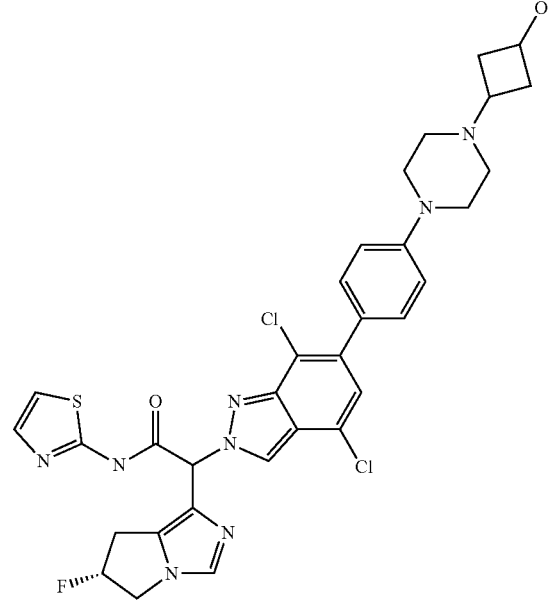 [SMILES: O=C(Nc1nccs1)C(c1ncn2c1C[C@@H](F)C2)n1cc2c(Cl)cc(-c3ccc(N4CCN(C5CC(O)C5)CC4)cc3)c(Cl)c2n1]

rac-2-(4,7-Dichloro-6-(4-(4-(3-hydroxycyclobutyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 48, step 2, rac-2-(4,7-dichloro-6-(4-(piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide (Example 61, step 1) was reacted with 3-hydroxycyclobutan-1-one in the presence of sodium triacetoxyborohydride to give the title compound as colorless solid. MS: m/e=681.1 ([M+H]$^+$)

Example 67

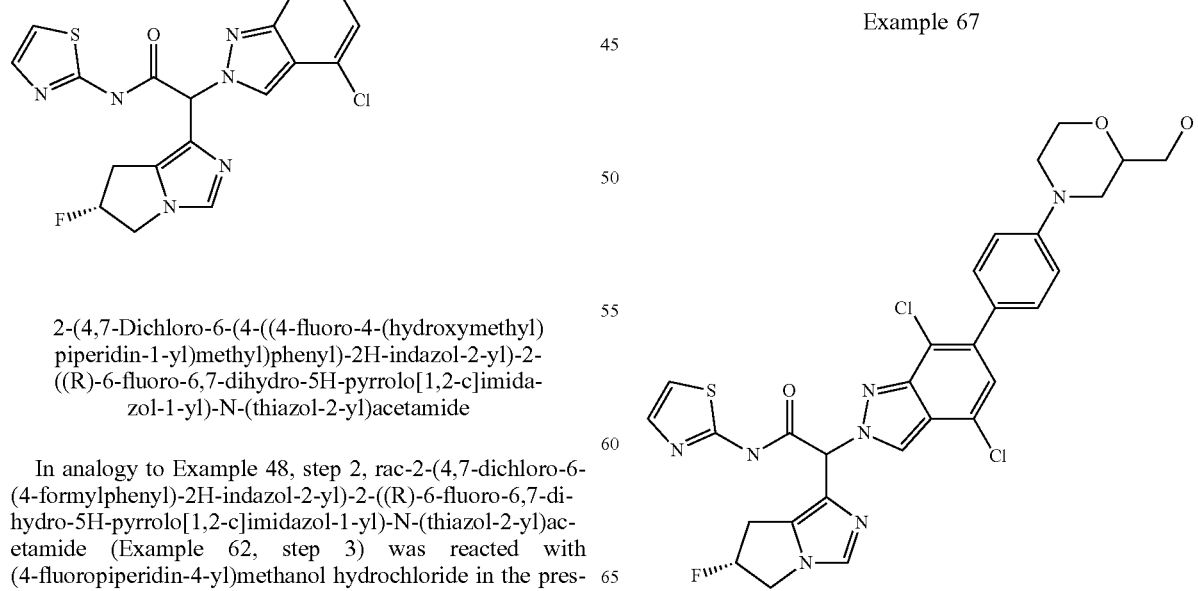

rac-2-(4,7-Dichloro-6-(4-(2-(hydroxymethyl)morpholino)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-Ethyl 2-(6-(4-(2-(((tert-butyldimethylsilyl)oxy)methyl)morpholino)phenyl)-4,7-dichloro-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (4-(2-(((tert-butyldimethylsilyl)oxy)methyl)morpholino)phenyl)boronic acid in toluene in the presence of [1,1'-bis(diphenylphosphino)ferrocene]dichloropalladium(II) and cesium carbonate to give the title compound as light brown oil. MS: m/e=702.3 ([M+H]$^+$)

Step 2: rac-2-(6-(4-(2-(((tert-Butyldimethylsilyl)oxy)methyl)morpholino)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(6-(4-(2-(((tert-butyldimethylsilyl)oxy)methyl)morpholino)phenyl)-4,7-dichloro-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light yellow solid. MS: m/e=756.3 ([M+H]$^+$)

Step 3: rac-2-(4,7-Dichloro-6-(4-(2-(hydroxymethyl)morpholino)phenyl)-2H-indazol-2-yl) ((R)-6-fluoro-6,7-dihydro-5H-pyrrolo[1,2-c]imidazol-1-yl)-N-(thiazol-2-yl)acetamide In analogy to Example 39, step 3, rac-2-(6-(4-(2-(((tert-butyldimethylsilyl)oxy)methyl)morpholino)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide was reacted with tetrabutylammonium fluoride to give the title compound as off-white solid. MS: m/e=642.1 ([M+H]$^+$)

Example 68

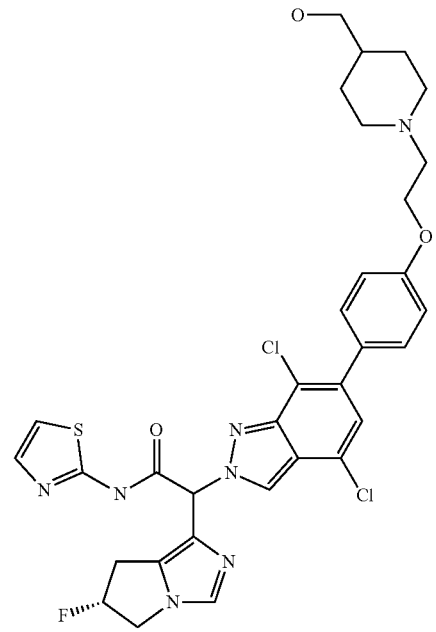 [SMILES: O=C(Nc1nccs1)C(c1ncn2c1C[C@@H](F)C2)n1cc2c(Cl)cc(-c3ccc(OCCN4CCC(CO)CC4)cc3)c(Cl)c2n1]

rac-2-(4,7-Dichloro-6-(4-(2-(4-(hydroxymethyl)piperidin-1-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-Ethyl 2-(4,7-dichloro-6-(4-(2-(4-(hydroxymethyl)piperidin-1-yl)ethoxy)phenyl)-2H-indazol-2-yl)-2-((R)-6-fluoro-6,7-dihydro-5H-pyrrolo[1,2-c]imidazol-1-yl)acetate In analogy to Example 25, step 4, rac-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)boronic acid (Example 59, step 1) was reacted with (1-(2-(4-bromophenoxy)ethyl)piperidin-4-yl)methanol in a mixture of THF and water in the presence of [1,1'-bis(diphenylphosphino)ferrocene]dichloropalladium(II) and cesium carbonate to give the title compound as brown solid. MS: m/e=630.3 ([M+H]$^+$)

Step 2: rac-2-(4,7-Dichloro-6-(4-(2-(4-(hydroxymethyl)piperidin-1-yl)ethoxy)phenyl)-2H-indazol-2-yl)-2-((R)-6-fluoro-6,7-dihydro-5H-pyrrolo[1,2-c]imidazol-1-yl)-N-(thiazol yl)acetamide In analogy to Example 25, step 5, rac-ethyl 2-(4,7-dichloro-6-(4-(2-(4-(hydroxymethyl)piperidin-1-yl)ethoxy)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as off-white solid. MS: m/e=682.3 ([M+H]$^+$)

Example 69

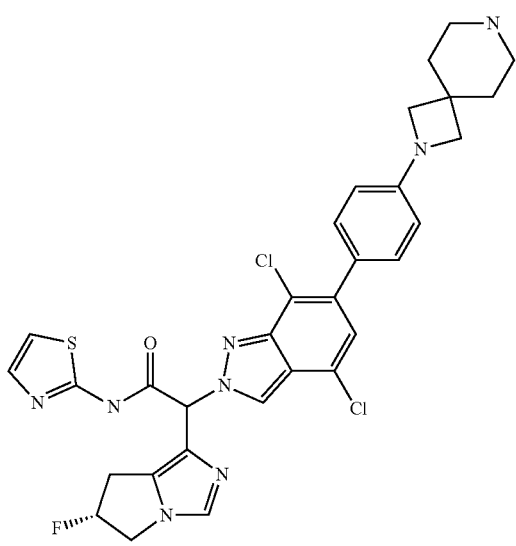 [SMILES: O=C(Nc1nccs1)C(c1ncn2c1C[C@@H](F)C2)n1cc2c(Cl)cc(-c3ccc(N4CC5(CCNCC5)C4)cc3)c(Cl)c2n1]

2-(6-(4-(2,7-Diazaspiro[3.5]nonan-2-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide Step 1: tert-Butyl 2-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)-2,7-diazaspiro[3.5]nonane-7-carboxylate In analogy to Example 25, step 4, rac-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)boronic acid (Example 59, step 1) was reacted with tert-butyl 2-(4-bromophenyl)-2,7-diazaspiro[3.5]nonane-7-carboxylate in a mixture of THF and water in the presence of [1,1'-bis(diphenylphosphino)ferrocene]dichloropalladium(II) and cesium carbonate to give the title compound as brown solid. MS: m/e=699.3 ([M+H]⁺)

Step 2: tert-Butyl 2-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)-2,7-diazaspiro[3.5]nonane-7-carboxylate In analogy to Example 25, step 5, tert-butyl 2-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)-2,7-diazaspiro[3.5]nonane-7-carboxylate was first treated with LiOH and the resulting salt was reacted with thiazol-2-amine in the presence of HATU and Hunig's base to give the title compound as yellow solid. MS: m/e=752.9 ([M+H]⁺)

Step 3: 2-(6-(4-(2,7-Diazaspiro[3.5]nonan-2-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of tert-butyl 2-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)-2,7-diazaspiro[3.5]nonane-7-carboxylate in dichloromethane and methanol was treated with HCl in dioxane to give the title compound as light yellow solid. MS: m/e=649.3 ([M−H]⁻)

Example 70

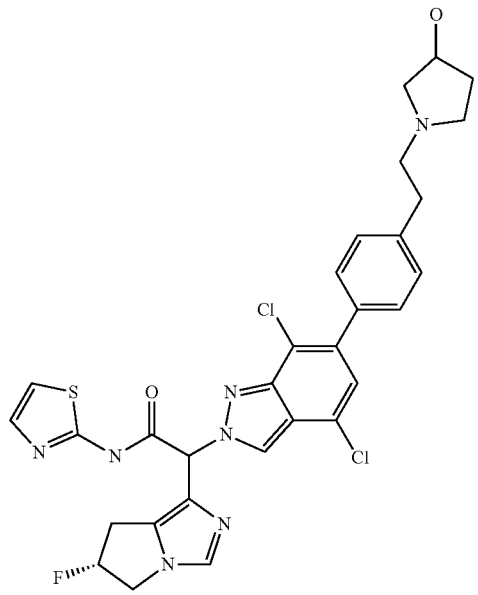 [SMILES: O=C(Nc1nccs1)C(c1ncn2c1C[C@@H](F)C2)n1cc2c(Cl)cc(-c3ccc(CCN4CCC(O)C4)cc3)c(Cl)c2n1]

rac-2-(4,7-Dichloro-6-(4-(2-(3-hydroxypyrrolidin-1-yl)ethyl)phenyl)-2H-indazol-2-yl) ((R)-6-fluoro-6,7-dihydro-5H-pyrrolo[1,2-c]imidazol-1-yl)-N-(thiazol-2-yl)acetamide In analogy to Example 64, step 5, rac-4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenethyl methanesulfonate (Example 64, step 4) was reacted with pyrrolidin-3-ol in the presence of triethylamine to give the title compound as off-white solid. MS: m/e=640.2 ([M+H]⁺)

Example 71

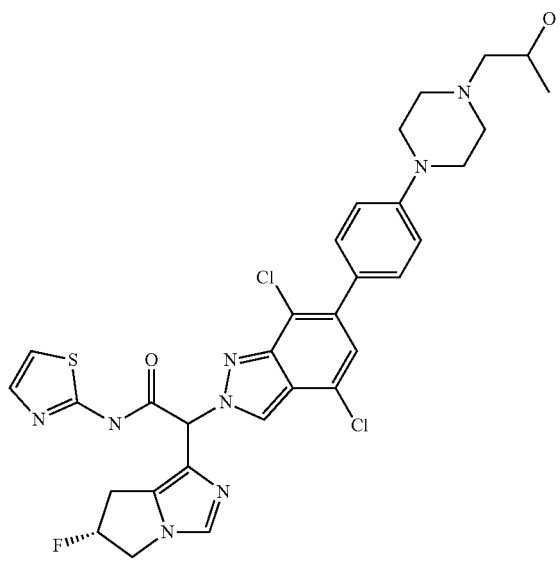 [SMILES: CC(O)CN1CCN(c2ccc(-c3cc(Cl)c4cn(C(C(=O)Nc5nccs5)c5ncn6c5C[C@@H](F)C6)nc4c3Cl)cc2)CC1]

rac-2-(4,7-Dichloro-6-(4-(4-(2-hydroxypropyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 26, rac-2-(4,7-dichloro-6-(4-(piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide (Example 61, step 1) was treated with 1-bromopropan-2-ol in the presence of N,N-diisopropylethylamine to give the title compound as colorless solid. MS: m/e=669.2 ([M+H]+)

Example 72

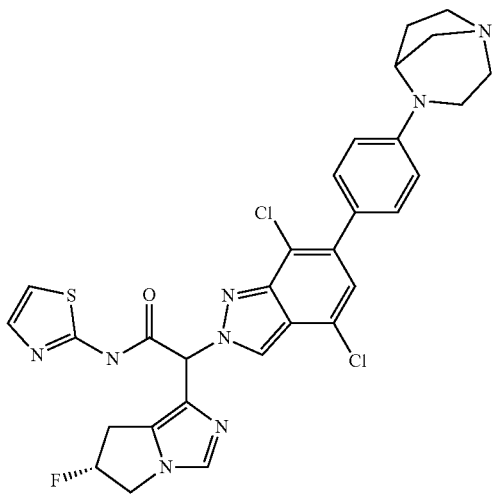 [SMILES: O=C(Nc1nccs1)C(c1ncn2c1C[C@@H](F)C2)n1cc2c(Cl)cc(-c3ccc(N4CCN5CCC4C5)cc3)c(Cl)c2n1]

rac-2-(6-(4-(1,4-Diazabicyclo[3.2.1]octan-4-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide Step 1: rac-Ethyl 2-(6-(4-(1,4-diazabicyclo[3.2.1]octan-4-yl)phenyl)-4,7-dichloro-2H-indazol-2-yl)-2-((R)-6-fluoro-6,7-dihydro-5H-pyrrolo[1,2-c]imidazol-1-yl)acetate In analogy to Example 25, step 4, rac-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)boronic acid (Example 59, step 1) was reacted with 4-(4-bromophenyl)-1,4-diazabicyclo[3.2.1]octane in a mixture of THF and water in the presence of [1,1'-bis(diphenylphosphino)ferrocene]dichloropalladium(II) and cesium carbonate to give the title compound as brown solid. MS: m/e=583.2 ([M+H]+)

Step 2: rac-2-(6-(4-(1,4-Diazabicyclo[3.2.1]octan-4-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(6-(4-(1,4-diazabicyclo[3.2.1]octan-4-yl)phenyl)-4,7-dichloro-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as off-white solid. MS: m/e=638.2 ([M+H]+)

Example 73

2-(4,7-Dichloro-6-(4-(6-ethyl-2,6-diazaspiro[3.5]nonan-2-yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-tert-Butyl 2-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)-2,6-diazaspiro[3.5]nonane carboxylate In analogy to Example 25, step 4, rac-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)boronic acid (Example 59, step 1) was reacted with tert-butyl 2-(4-bromophenyl)-2,6-diazaspiro[3.5]nonane-6-carboxylate in a mixture of THF and water in the presence of [1,1'-bis(diphenylphosphino)ferrocene]dichloropalladium(II) and cesium carbonate to give the title compound as orange solid. MS: m/e=699.3 ([M+H]$^+$)

Step 2: rac-tert-Butyl 2-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)-2,6-diazaspiro[3.5]nonane-6-carboxylate In analogy to Example 25, step 5, rac-tert-butyl 2-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)-2,6-diazaspiro[3.5]nonane-6-carboxylate was first treated with LiOH and the resulting salt was reacted with thiazol-2-amine in the presence of HATU and Hunig's base to give the title compound as orange solid. MS: m/e=751.3 ([M+H]$^+$)

Step 3: rac-2-(6-(4-(2,6-Diazaspiro[3.5]nonan-2-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of rac-tert-butyl 2-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)-2,6-diazaspiro[3.5]nonane-6-carboxylate in dichloromethane and methanol was treated with HCl in dioxane to give the title compound as brown solid. MS: m/e=651.2 ([M+H]$^+$)

Step 4: 2-(4,7-Dichloro-6-(4-(6-ethyl-2,6-diazaspiro[3.5]nonan-2-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 48, step 2, 2-(4,7-Dichloro-6-(4-(6-ethyl-2,6-diazaspiro[3.5]nonan-2-yl)phenyl)-2H-indazol-2-yl)-2-((R)-6-fluoro-6,7-dihydro-5H-pyrrolo[1,2-c]imidazol-1-yl)-N-(thiazol-2-yl)acetamide was reacted with acetaldehyde in the presence of sodium triacetoxyborohydride to give the title compound as yellow solid. MS: m/e=680.1 ([M+H]$^+$)

Example 74

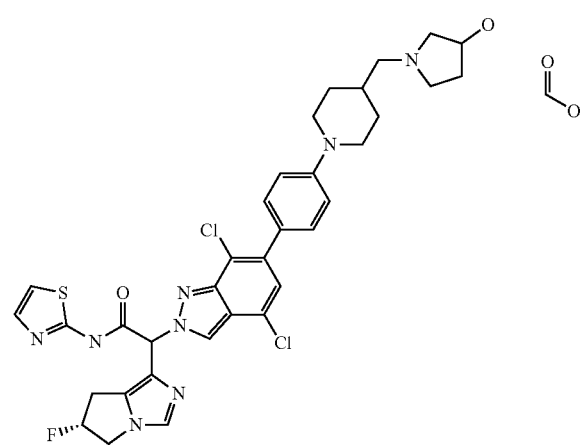 [SMILES: O=C(Nc1nccs1)C(c1ncn2c1C[C@@H](F)C2)n1cc2c(Cl)cc(-c3ccc(N4CCC(CN5CCC(O)C5)CC4)cc3)c(Cl)c2n1 ; O=CO]

rac-2-(4,7-Dichloro-6-(4-(4-((3-hydroxypyrrolidin-1-yl)methyl)piperidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-Ethyl 2-(4,7-dichloro-6-(4-(4-(hydroxymethyl)piperidin-1-yl)phenyl)-2H-indazol-2-yl)-2-((R)-6-fluoro-6,7-dihydro-5H-pyrrolo[1,2-c]imidazol-1-yl)acetate In analogy to Example 25, step 4, rac-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)boronic acid (Example 59, step 1) was reacted with (1-(4-bromophenyl)piperidin-4-yl)methanol in a mixture of THF and water in the presence of [1,1'-bis(diphenylphosphino)ferrocene]dichloropalladium(II) and cesium carbonate to give the title compound as brown solid. MS: m/e=586.2 ([M+H]$^+$)

Step 2: rac-2-(4,7-Dichloro-6-(4-(4-(hydroxymethyl)piperidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(4,7-dichloro-6-(4-(4-(hydroxymethyl)piperidin-1-yl)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as brown solid. MS: m/e=640.3 ([M+H]$^+$)

Step 3: rac-(1-(4-(4,7-Dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)piperidin-4-yl)methyl methanesulfonate In analogy to Example 64, step 4, rac-2-(4,7-dichloro-6-(4-(4-(hydroxymethyl)piperidin yl)phenyl)-2H-indazol-2-yl)-2-((R)-6-fluoro-6,7-dihydro-5H-pyrrolo[1,2-c]imidazol-1-yl)-N-(thiazol-2-yl)acetamide was treated with methanesulfonyl chloride in the presence of triethylamine to give the title compound as off-white solid. MS: m/e=718.2 ([M+H]+)

Step 4: rac-2-(4,7-Dichloro-6-(4-(4-((3-hydroxypyrrolidin-1-yl)methyl)piperidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 64, step 5, rac-(1-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)piperidin-4-yl)methyl methanesulfonate was reacted with azetidin-3-ol in the presence of Hunig's base to give the title compound as brown solid. MS: m/e=695.2 ([M+H]$^+$)

Example 75

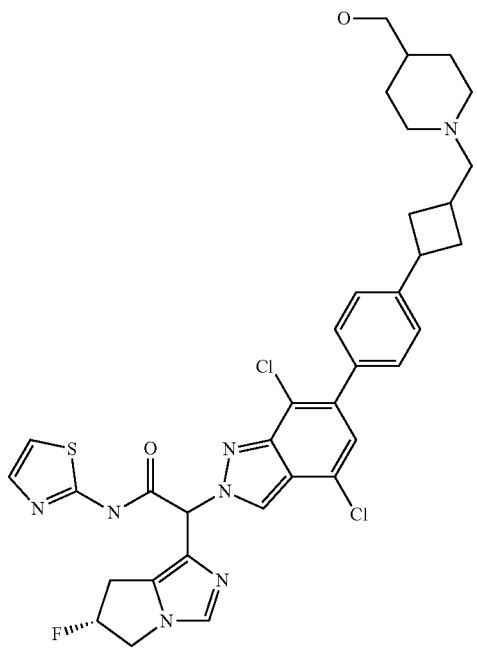 [SMILES: O=C(Nc1nccs1)C(c1ncn2c1C[C@@H](F)C2)n1cc2c(Cl)cc(-c3ccc(C4CC(CN5CCC(CO)CC5)C4)cc3)c(Cl)c2n1]

rac-2-(4,7-Dichloro-6-(4-(34(4-(hydroxymethyl)
piperidin-1-yl)methyl)cyclobutyl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-Ethyl 2-(6-(4-(3-(((tert-butyldimethylsilyl)oxy)methyl)cyclobutyl)phenyl)-4,7-dichloro-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (4-(3-(((tert-butyldimethylsilyl)oxy)methyl)cyclobutyl)phenyl)boronic acid in toluene in the presence of [1,1'-bis(diphenylphosphino)ferrocene]dichloropalladium(II) and cesium carbonate to give the title compound as light brown oil. MS: m/e=673.3 ([M+H]$^+$)

Step 2: rac-2-(6-(4-(3-(((tert-Butyldimethylsilyl)oxy)methyl)cyclobutyl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(6-(4-(3-(((tert-butyldimethylsilyl)oxy)methyl)cyclobutyl)phenyl)-4,7-dichloro-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light yellow solid. MS: m/e=727.3 ([M+H]$^+$)

Step 3: rac-2-(4,7-Dichloro-6-(4-(3-(hydroxymethyl)cyclobutyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 39, step 3, rac-2-(6-(4-(3-(((tert-butyldimethylsilyl)oxy)methyl)cyclobutyl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide was reacted with tetrabutylammonium fluoride to give the title compound as yellow solid. MS: m/e=611.1 ([M+H]$^+$)

Step 3: rac-(3-(4-(4,7-Dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)cyclobutyl)methyl methanesulfonate In analogy to Example 64, step 4, rac-2-(4,7-dichloro-6-(4-(3-(hydroxymethyl)cyclobutyl)phenyl)-2H-indazol-2-yl)-2-((R)-6-fluoro-6,7-dihydro-5H-pyrrolo[1,2-c]imidazol-1-yl)-N-(thiazol-2-yl)acetamide was treated with methanesulfonyl chloride in the presence of triethylamine to give the title compound as light brown oil. MS: m/e=691.2 ([M+H]+)

Step 4: rac-2-(4,7-Dichloro-6-(4-(3-((4-(hydroxymethyl)piperidin-1-yl)methyl)cyclobutyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 64, step 5, rac-(3-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-2-yl)phenyl)cyclobutyl)methyl methanesulfonate was reacted with piperidin-4-ylmethanol in the presence of Hunig's base to give the title compound as yellow solid. MS: m/e=708.2 ([M+H]$^+$)

Example 76

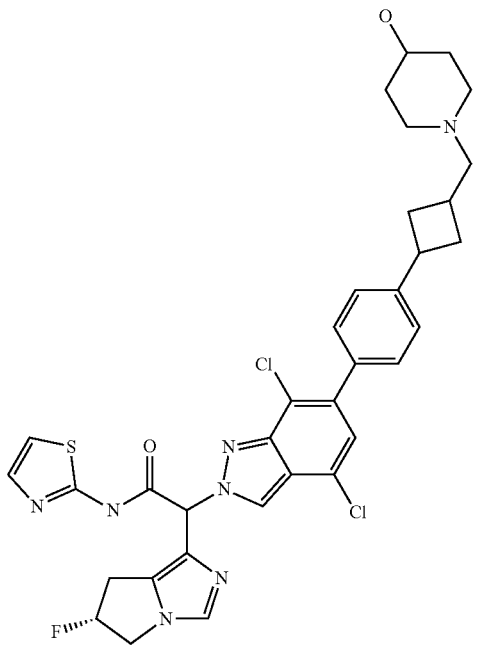 [SMILES: O=C(Nc1nccs1)C(c1ncn2c1C[C@@H](F)C2)n1cc2c(Cl)cc(-c3ccc(C4CC(CN5CCC(O)CC5)C4)cc3)c(Cl)c2n1]

rac-2-(4,7-Dichloro-6-(4-(34(4-hydroxypiperidin-1-yl)methyl)cyclobutyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 64, step 5, rac-(3-(4-(4,7-dichloro-2-(1-((R)-6-fluoro-6,7-dihydro-5H-pyrrolo[1,2-c]imidazol- 1-yl)-2-oxo-2-(thiazol-2-ylamino)ethyl)-2H-indazol-6-yl)
phenyl)cyclobutyl)methyl methanesulfonate (Example 75,
step 3) was reacted with piperidin-4-ol in the presence of
Hunig's base to give the title compound as yellow solid. MS:
m/e=694.2 ([M+H]⁺)

Example 77

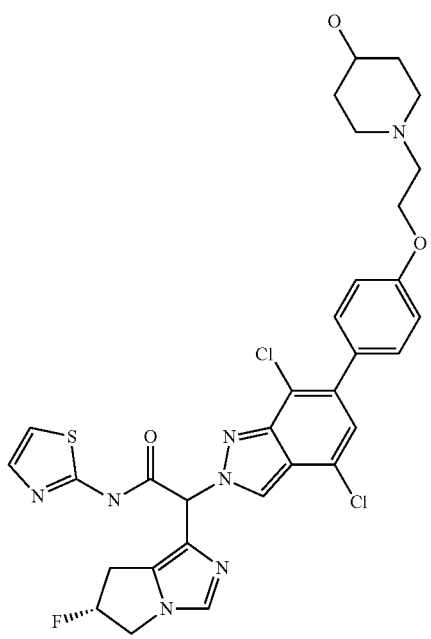 [SMILES: O=C(Nc1nccs1)C(c1ncn2c1C[C@@H](F)C2)n1cc2c(Cl)cc(-c3ccc(OCCN4CCC(O)CC4)cc3)c(Cl)c2n1]

rac-2-(4,7-Dichloro-6-(4-(2-(4-hydroxypiperidin-1-
yl)ethoxy)phenyl)-2H-indazol-2-yl)-2-((R)-6-fluoro-
6,7-dihydro-5H-pyrrolo[1,2-c]imidazol-1-yl)-N-
(thiazol-2-yl)acetamide Step 1: rac-Ethyl 2-(4,7-dichloro-6-(4-(2-(4-hy-
droxypiperidin-1-yl)ethoxy)phenyl)-2H-indazol-2-
yl)-2-((R)-6-fluoro-6,7-dihydro-5H-pyrrolo[1,2-c]
imidazol-1-yl)acetate In analogy to Example 25, step 4, ethyl 2-(6-bromo-4,7-
dichloro-2H-indazol-2-yl)-2-((R)-6-fluoro-6,7-dihydro-5H-
pyrrolo[1,2-c]imidazol-1-yl)acetate (Example 25, step 3)
was reacted with 1-(2-(4-(4,4,5,5-tetramethyl-1,3,2-dioxa-
borolan-2-yl)phenoxy)ethyl)piperidin-4-ol in a mixture of
THF and water in the presence of [1,1'-bis(diphenylphos-
phino)ferrocene]dichloropalladium(II) and cesium carbon-
ate to give the title compound as brown solid. MS:
m/e=616.2 ([M+H]⁺)

Step 2: rac-2-(4,7-Dichloro-6-(4-(2-(4-hydroxypip-
eridin-1-yl)ethoxy)phenyl)-2H-indazol-2-yl)-24R)-6-
fluoro-6,7-dihydro-5H-pyrrolo[1,2-c]imidazol-1-yl)-
N-(thiazol-2-yl)acetamide In analogy to Example 25, step 5, rac-ethyl 2-(4,7-
dichloro-6-(4-(2-(4-hydroxypiperidin-1-yl)ethoxy)phenyl)-
2H-indazol-2-yl)-2-((R)-6-fluoro-6,7-dihydro-5H-pyrrolo
[1,2-c]imidazol-1-yl)acetate was first treated with LiOH and
the resulting salt was reacted with thiazol-2-amine in the
presence of HATU and Hunig's base to give the title
compound as light brown solid. MS: m/e=668.3 ([M−H]⁻)

Example 78

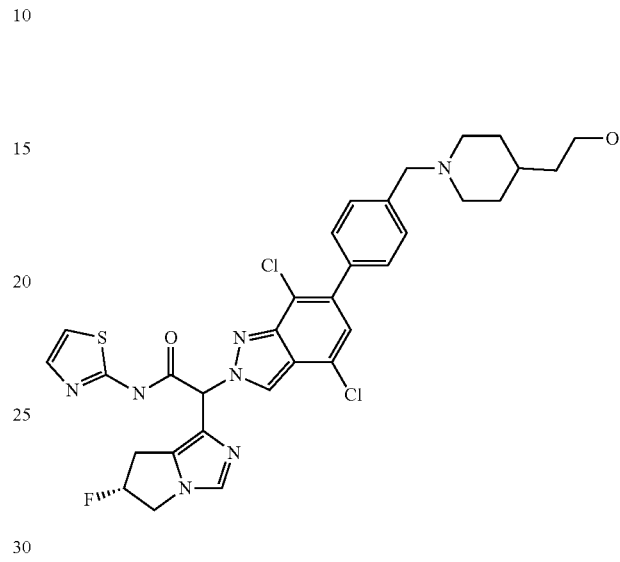

2-(4,7-Dichloro-6-(4-((4-(2-hydroxyethyl)piperidin-
1-yl)methyl)phenyl)-2H-indazol-2-yl)-2-((R)-6-
fluoro-6,7-dihydro-5H-pyrrolo[1,2-c]imidazol-1-yl)-
N-(thiazol-2-yl)acetamide Step 1: rac-Ethyl 2-(4,7-dichloro-6-(4-((4-(2-hy-
droxyethyl)piperidin-1-yl)methyl)phenyl)-2H-inda-
zol-2-yl)-2-((R)-6-fluoro-6,7-dihydro-5H-pyrrolo[1,
2-c]imidazol-1-yl)acetate In analogy to Example 25, step 4, ethyl 2-(6-bromo-4,7-
dichloro-2H-indazol-2-yl)-2-((R)-6-fluoro-6,7-dihydro-5H-
pyrrolo[1,2-c]imidazol-1-yl)acetate (Example 25, step 3)
was reacted with 2-(1-(4-(4,4,5,5-tetramethyl-1,3,2-dioxa-
borolan-2-yl)benzyl)piperidin-4-yl)ethan-1-ol in a mixture
of THF and water in the presence of [1,1'-bis(diphenylphos-
phino)ferrocene]dichloropalladium(II) and cesium carbon-
ate to give the title compound as brown solid. MS:
m/e=614.2 ([M+H]⁺)

Step 2: 2-(4,7-Dichloro-6-(4-((4-(2-hydroxyethyl)
piperidin-1-yl)methyl)phenyl)-2H-indazol-2-yl)-2-
((R)-6-fluoro-6,7-dihydro-5H-pyrrolo[1,2-c]imida-
zol-1-yl)-N-(thiazol-2-yl)acetamide In analogy to Example 25, step 5, rac-ethyl 2-(4,7-
dichloro-6-(4-((4-(2-hydroxyethyl)piperidin-1-yl)methyl)
phenyl)-2H-indazol-2-yl)-2-((R)-6-fluoro-6,7-dihydro-5H-
pyrrolo[1,2-c]imidazol-1-yl)acetate was first treated with
LiOH and the resulting salt was reacted with thiazol-2-
amine in the presence of HATU and Hunig's base to give the
title compound as brown solid. MS: m/e=668.3 ([M+H]⁺)

Example 79

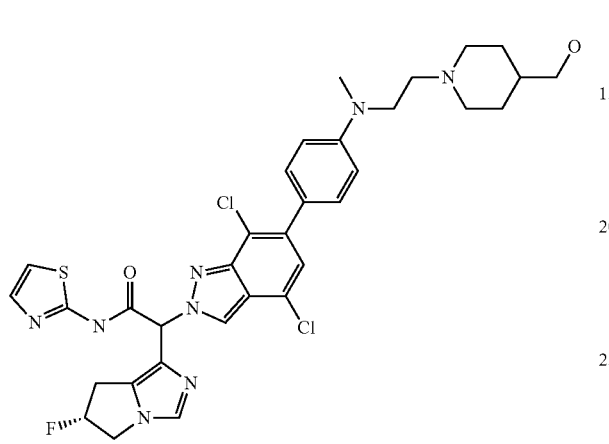

2-(4,7-Dichloro-6-(4-02-(4-(hydroxymethyl)piperidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(4,7-dichloro-6-(4-((2-(4-(hydroxymethyl)piperidin-1-yl)ethyl)(methyl)amino)phenyl)-2H-indazol-2-yl)-2-((R)-6-fluoro-6,7-dihydro-5H-pyrrolo[1,2-c]imidazol-1-yl)acetate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with (1-(2-((4-Bromophenyl)(methyl)amino)ethyl)piperidin-4-yl)methanol in a mixture of THF and water in the presence of [1,1'-bis(diphenylphosphino)ferrocene]dichloropalladium(II) and sodium carbonate to give the title compound as brown solid. MS: m/e=643.3 ([M+H]$^+$)

Step 2: 2-(4,7-Dichloro-6-(4-((2-(4-(hydroxymethyl)piperidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4,7-dichloro-6-(4-((2-(4-(hydroxymethyl)piperidin-1-yl)ethyl)(methyl)amino)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as brown solid. MS: m/e=697.2 ([M+H]$^+$)

Example 80

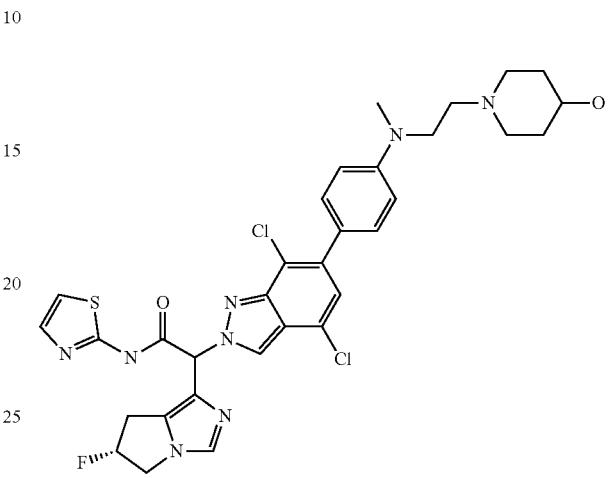

2-(4,7-Dichloro-6-(4-02-(4-hydroxypiperidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(4,7-dichloro-6-(4-((2-(4-hydroxypiperidin-1-yl)ethyl)(methyl)amino)phenyl)-2H-indazol-2-yl)-2-((R)-6-fluoro-6,7-dihydro-5H-pyrrolo[1,2-c]imidazol-1-yl)acetate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with 1-(2-((4-bromophenyl)(methyl)amino)ethyl)piperidin-4-ol in a mixture of THF and water in the presence of [1,1'-bis(diphenylphosphino)ferrocene]dichloropalladium(II) and cesium carbonate to give the title compound as brown solid. MS: m/e=629.2 ([M+H]$^+$)

Step 2: 2-(4,7-Dichloro-6-(4-((2-(4-hydroxypiperidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4,7-dichloro-6-(4-((2-(4-hydroxypiperidin-1-yl)ethyl)(methyl)amino)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as brown solid. MS: m/e=683.3 ([M+H]$^+$)

Example 81

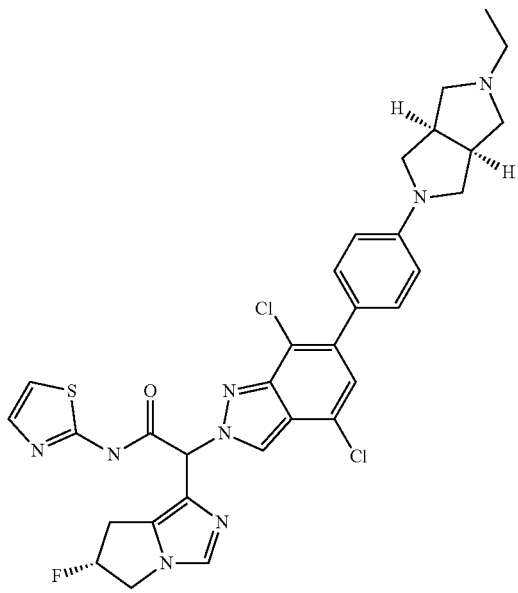 [SMILES: CCN1C[C@@H]2CN(c3ccc(-c4cc(Cl)c5cn(C(C(=O)Nc6nccs6)c6ncn7c6C[C@@H](F)C7)nc5c4Cl)cc3)C[C@@H]2C1]

2-(4,7-Dichloro-6-(4-((3aR,6aS)-5-ethylhexahydropyrrolo[3,4-c]pyrrol-2(1H)-yl)phenyl)-2H-indazol-2-yl)-2-((R)-6-fluoro-6,7-dihydro-5H-pyrrolo[1,2-c]imidazol-1-yl)-N-(thiazol-2-yl)acetamide

Step 1: tert-Butyl (3aR,6aS)-5-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)hexahydropyrrolo[3,4-c]pyrrole-2(1H)-carboxylate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with tert-butyl (3aR,6aS)-5-(4-bromophenyl)hexahydropyrrolo[3,4-c]pyrrole-2(1H)-carboxylate in a mixture of THF and water in the presence of [1,1'-bis(diphenylphosphino)ferrocene]dichloropalladium(II) and cesium carbonate to give the title compound as brown solid. MS: m/e=681.3 ([M−H]⁻)

Step 2: tert-butyl (3aR,6aS)-5-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)hexahydropyrrolo[3,4-c]pyrrole-2(1H)-carboxylate In analogy to Example 25, step 5, tert-butyl (3aR,6aS)-5-(4-(4,7-dichloro-2-(2-ethoxy ((R)-6-fluoro-6,7-dihydro-5H-pyrrolo[1,2-c]imidazol-1-yl)-2-oxoethyl)-2H-indazol-2-yl)phenyl)hexahydropyrrolo[3,4-c]pyrrole-2(1H)-carboxylate was first treated with LiOH and the resulting salt was reacted with thiazol-2-amine in the presence of HATU and Hunig's base to give the title compound as brown solid. MS: m/e=738.2 ([M+H]⁺)

Step 3: 2-(4,7-Dichloro-6-(4-((3aR,6aS)-hexahydropyrrolo[3,4-c]pyrrol-2(1H)-yl)phenyl)-2H-indazol-2-yl)-2-((R)-6-fluoro-6,7-dihydro-5H-pyrrolo[1,2-c]imidazol-1-yl)-N-(thiazol yl)acetamide In analogy to Example 25, step 6, a solution of tert-butyl (3aR,6aS)-5-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)hexahydropyrrolo[3,4-c]pyrrole-2(1H)-carboxylate in dichloromethane was treated with trifluoroacetic acid to give the title compound as light brown solid. MS: m/e=637.1 ([M+H]⁺)

Step 4: 2-(4,7-Dichloro-6-(4-((3aR,6aS)-5-ethylhexahydropyrrolo[3,4-c]pyrrol-2(1H)-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 48, step 2, 2-(4,7-dichloro-6-(4-((3aR,6aS)-hexahydropyrrolo[3,4-c]pyrrol-2(1H)-yl)phenyl)-2H-indazol-2-yl)-2-((R)-6-fluoro-6,7-dihydro-5H-pyrrolo[1,2-c]imidazol-1-yl)-N-(thiazol-2-yl)acetamide was reacted with acetaldehyde in the presence of sodium triacetoxyborohydride to give the title compound as light brown solid. MS: m/e=666.8 ([M+H]⁺)

Example 82

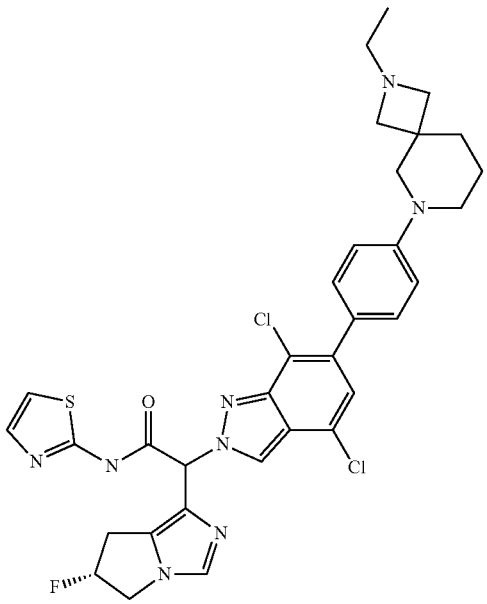 [SMILES: CCN1CC2(CCCN(c3ccc(-c4cc(Cl)c5cn(C(C(=O)Nc6nccs6)c6ncn7c6C[C@@H](F)C7)nc5c4Cl)cc3)C2)C1]

2-(4,7-Dichloro-6-(4-(2-ethyl-2,6-diazaspiro[3.5] nonan-6-yl)phenyl)-2H-indazol-2-((R)-6-fluoro-6,7-dihydro-5H-pyrrolo[1,2-c]imidazol-1-yl)-N-(thiazol-2-yl)acetamide

Step 1: tert-Butyl 6-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)-2,6-diazaspiro[3.5]nonane-2-carboxylate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with tert-butyl 6-(4-bromophenyl)-2,6-diazaspiro[3.5]nonane-2-carboxylate in a mixture of THF and water in the presence of [1,1'-bis(diphenylphosphino)ferrocene]dichloropalladium(II) and cesium carbonate to give the title compound as light brown oil. MS: m/e=697.2 ([M+H]$^+$)

Step 2: tert-Butyl 6-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)-2,6-diazaspiro[3.5]nonane-2-carboxylate In analogy to Example 25, step 5, tert-butyl 6-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)-2,6-diazaspiro[3.5]nonane-2-carboxylate was first treated with LiOH and the resulting salt was reacted with thiazol-2-amine in the presence of HATU and Hunig's base to give the title compound as brown solid. MS: m/e=749.3 ([M−H]$^-$)

Step 3: 2-(6-(4-(2,6-Diazaspiro[3.5]nonan-6-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of tert-butyl 6-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)-2,6-diazaspiro[3.5]nonane-2-carboxylate in dichloromethane was treated with trifluoroacetic acid to give the title compound as light brown solid. MS: m/e=652.6 ([M+H]$^+$)

Step 4: 2-(4,7-Dichloro-6-(4-(2-ethyl-2,6-diazaspiro[3.5]nonan-6-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 48, step 2, 2-(6-(4-(2,6-diazaspiro[3.5]nonan-6-yl)phenyl)-4,7-dichloro-2H-indazol-2-yl)-2-((R)-6-fluoro-6,7-dihydro-5H-pyrrolo[1,2-c]imidazol-1-yl)-N-(thiazol yl)acetamide was reacted with acetaldehyde in the presence of sodium triacetoxyborohydride to give the title compound as light brown solid. MS: m/e=680.9 ([M+H]$^+$)

Example 83

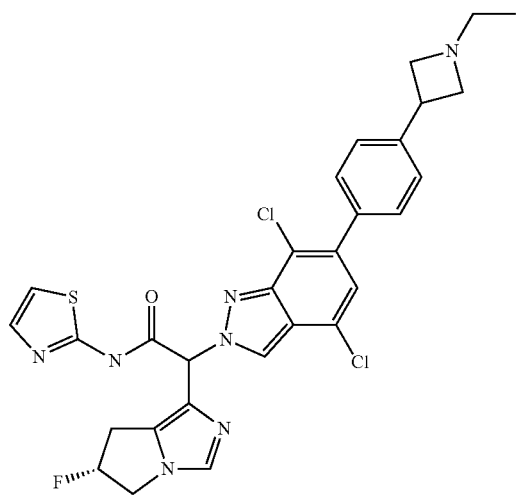 [SMILES: CCN1CC(c2ccc(-c3cc(Cl)c4cn(C(C(=O)Nc5nccs5)c5ncn6c5C[C@@H](F)C6)nc4c3Cl)cc2)C1]

2-(4,7-Dichloro-6-(4-(1-ethylazetidin-3-yl)phenyl)-2H-indazol-2-yl)-2-((R)-6-fluoro-6,7-dihydro-5H-pyrrolo[1,2-c]imidazol-1-yl)-N-(thiazol-2-yl)acetamide

Step 1: rac-tert-Butyl 3-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)azetidine-1-carboxylate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with tert-butyl 3-(4-bromophenyl)azetidine-1-carboxylate (CAS: 1203681-52-0) in a mixture of THF and water in the presence of [1,1'-bis(diphenylphosphino)ferrocene]dichloropalladium(II) and potassium carbonate to give the title compound as off-white foam. MS: m/e=628.2 ([M+H]$^+$)

Step 2: tert-Butyl 3-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)azetidine-1-carboxylate In analogy to Example 25, step 5, rac-tert-butyl 3-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)azetidine-1-carboxylate was first treated with LiOH and the resulting salt was reacted with thiazol-2-amine in the presence of HATU and Hunig's base to give the title compound as off-white foam. MS: m/e=682.2 ([M+H]$^+$)

Step 3: 2-(6-(4-(Azetidin-3-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of tert-butyl 3-(4-(4,7-dichloro-2-(1-((R)-6-fluoro-6,7-dihydro-5H-pyrrolo[1,2-c]imidazol-1-yl)-2-oxo-2-(thiazol-2-ylamino)

ethyl)-2H-indazol-6-yl)phenyl)azetidine-1-carboxylate in dichloromethane was treated with trifluoroacetic acid to give the title compound as brown solid. MS: m/e=582.1 ([M+H]⁺)

Step 4: 2-(4,7-Dichloro-6-(4-(1-ethylazetidin-3-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 26, 2-(6-(4-(azetidin-3-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide was treated with iodoethane in the presence of N,N-diisopropylethylamine to give the title compound as colorless solid. MS: m/e=610.2 ([M+H]+)

Example 84

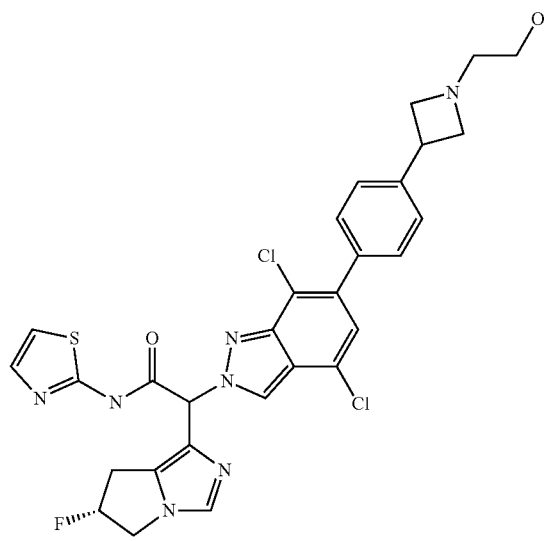 [SMILES: O=C(Nc1nccs1)C(c1ncn2c1C[C@@H](F)C2)n1cc2c(Cl)cc(-c3ccc(C4CN(CCO)C4)cc3)c(Cl)c2n1]

2-(4,7-Dichloro-6-(4-(1-(2-hydroxyethyl)azetidin-3-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 26, 2-(6-(4-(azetidin-3-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide (Example 83, step 3) was treated with 2-iodoethane-1-ol in the presence of N,N-diisopropylethylamine to give the title compound as colorless solid. MS: m/e=626.2 ([M+H]⁺)

Example 85

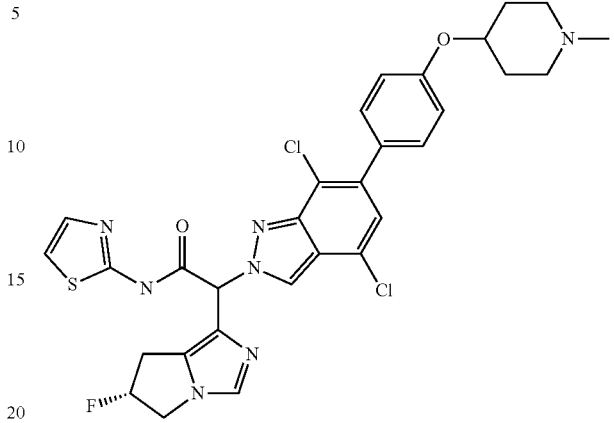

2-(4,7-Dichloro-6-(4-((1-methylpiperidin-4-yl)oxy)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-2-(6-(4-41-(tert-Butoxycarbonyl)piperidin-4-yl)oxy)phenyl)-4,7-dichloro-2H-indazol-2-yl)-2-((R)-6-fluoro-6,7-dihydro-5H-pyrrolo[1,2-c]imidazol-1-yl)acetic acid In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with commercially available tert-butyl 4-(4-(4,4,5,5-tetramethyl-1,3,2-dioxaborolan-2-yl)phenoxy)piperidine-1-carboxylate in a mixture of THF and water in the presence of [1,1'-bis(diphenylphosphino)ferrocene]dichloropalladium(II) and cesium carbonate to give the title compound as brown oil. MS: m/e=644.2 ([M+H]⁺)

Step 2: rac-tert-butyl 4-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenoxy)piperidine-1-carboxylate In analogy to Example 25, step 5, rac-2-(6-(4-((1-(tert-butoxycarbonyl)piperidin-4-yl)oxy)phenyl)-4,7-dichloro-2H-indazol-2-yl)-2-((R)-6-fluoro-6,7-dihydro-5H-pyrrolo[1,2-c]imidazol-1-yl)acetic acid was reacted with thiazol-2-amine in the presence of HATU and Hunig's base to give the title compound as brown solid. MS: m/e=724.3 ([M-H]⁻)

Step 3: rac-2-(4,7-dichloro-6-(4-(piperidin-4-yloxy)phenyl)-2H-indazol-2-yl)-2-((R)-6-fluoro-6,7-dihydro-5H-pyrrolo[1,2-c]imidazol-1-yl)-N-(thiazol-2-yl)acetamide dihydrochloride To a solution of acetyl chloride (264 mg) in ethanol (1 ml), which was stirred for 5 min at 0-5° C., was added a solution of rac-tert-butyl 4-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-2-yl)phenoxy)piperidine-1-carboxylate (0.305 g) in ethanol (2 ml). The reaction mixture was heated at 50° C. for 1 h. The solvent was evaporated in vacuo to give the crude title compound (0.275 g, purity 84%) as light brown solid. MS: m/e=624.2 ([M−H]⁻)

Step 4: rac-2-(4,7-Dichloro-6-(4-(1-methylpiperidin-4-yl)oxy)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 34, step 4, rac-2-(4,7-dichloro-6-(4-(piperidin-4-yloxy)phenyl)-2H-indazol-2-yl)-2-((R)-6-fluoro-6,7-dihydro-5H-pyrrolo[1,2-c]imidazol-1-yl)-N-(thiazol-2-yl)acetamide dihydrochloride was reacted with formaldehyde in the presence of sodium triacetoxyborohydride to give the title compound as light brown solid. MS: m/e=638.2 ([M−H]⁻)

Example 86

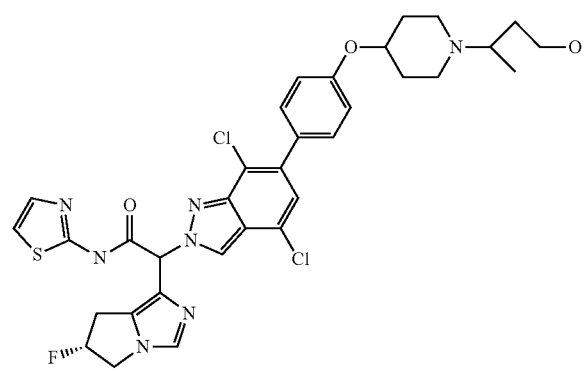 [SMILES: CC(CCO)N1CCC(Oc2ccc(-c3cc(Cl)c4cn(C(C(=O)Nc5nccs5)c5ncn6c5C[C@@H](F)C6)nc4c3Cl)cc2)CC1]

2-[4,7-Dichloro-6-[4-[[1-(3-hydroxy-1-methyl-propyl)-4-piperidyl]oxy]phenyl]indazol-2-yl]-2-[rac-(6R)-6-fluoro-6,7-dihydro-5H-pyrrolo[1,2-c]imidazol-1-yl]-N-thiazol-2-yl-acetamide In analogy to Example 34, step 4, rac-2-(4,7-dichloro-6-(4-(piperidin-4-yloxy)phenyl)-2H-indazol-2-yl)-2-((R)-6-fluoro-6,7-dihydro-5H-pyrrolo[1,2-c]imidazol-1-yl)-N-(thiazol-2-yl)acetamide dihydrochloride (Example 85, step 3) was reacted with 3-hydroxycyclobutan-1-one in the presence of sodium triacetoxyborohydride to give the title compound as light brown solid. MS: m/e=696.3 ([M−H]⁻)

Example 87

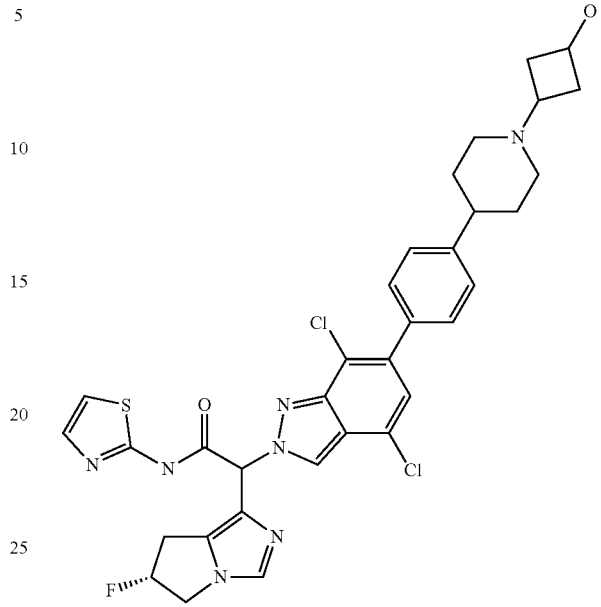

rac-2-(4,7-Dichloro-6-(4-(1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-Ethyl 2-(4,7-dichloro-6-(4-(1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)acetate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with 3-(4-(4-bromophenyl)piperidin-1-yl)cyclobutan-1-ol in a mixture of THF and water in the presence of [1,1'-bis(diphenylphosphino)ferrocene]dichloropalladium (II) and cesium carbonate to give the title compound as light brown solid. MS: m/e=626.3 ([M+H]⁺)

Step 2: rac-2-(4,7-Dichloro-6-(4-(1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(4,7-dichloro-6-(4-(1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light yellow solid. MS: m/e=682.2 ([M+H]⁺).

Example 88

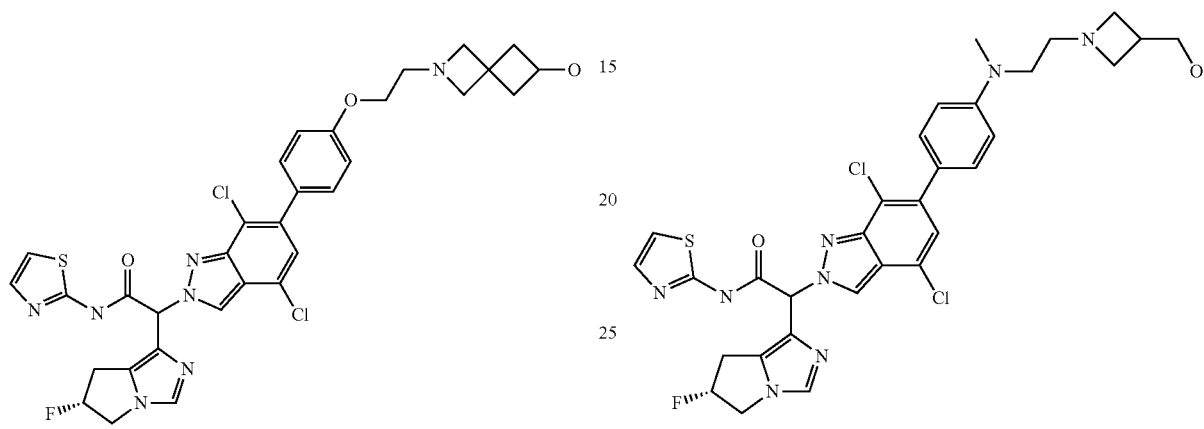

2-(4,7-Dichloro-6-(4-(2-(6-hydroxy-2-azaspiro[3.3]
heptan-2-yl)ethoxy)phenyl)-2H-indazol-2-yl)-2-((R)-
6-fluoro-6,7-dihydro-5H-pyrrolo[1,2-c]imidazol-1-
yl)-N-(thiazol-2-yl)acetamide

Step 1: rac-Ethyl 2-(4,7-dichloro-6-(4-(2-(6-hydroxy-2-azaspiro[3.3]heptan-2-yl)ethoxy)phenyl)-2H-indazol-2-yl)-2-((R)-6-fluoro-6,7-dihydro-5H-pyrrolo[1,2-c]imidazol-1-yl)acetate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with 2-(2-(4-bromophenoxy)ethyl)-2-azaspiro[3.3]heptan-6-ol in a mixture of THF and water in the presence of [1,1'-bis(diphenylphosphino)ferrocene]dichloropalladium(II) and potassium carbonate to give the title compound as brown foam. MS: m/e=628.2 ([M+H]⁺)

Step 2: 2-(4,7-Dichloro-6-(4-(2-(6-hydroxy-2-azaspiro[3.3]heptan-2-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(4,7-dichloro-6-(4-(2-(6-hydroxy-2-azaspiro[3.3]heptan-2-yl)ethoxy)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=682.2 ([M+H]⁺)

Example 89

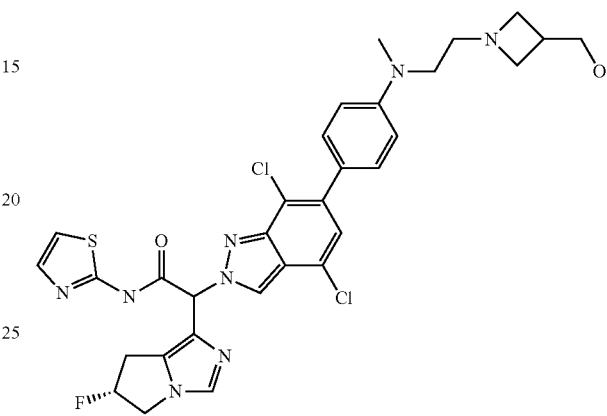

2-(4,7-Dichloro-6-(4-02-(3-(hydroxymethyl)azetidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide

Step 1: Ethyl 2-(4,7-dichloro-6-(4-((2-(3-(hydroxymethyl)azetidin-1-yl)ethyl)(methyl)amino)phenyl)-2H-indazol-2-yl)-2-((R)-6-fluoro-6,7-dihydro-5H-pyrrolo[1,2-c]imidazol-1-yl)acetate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with (1-(2-((4-Bromophenyl)(methyl)amino)ethyl)azetidin-3-yl)methanol in a mixture of THF and water in the presence of [1,1'-bis(diphenylphosphino)ferrocene]dichloropalladium(II) and cesium carbonate to give the title compound as brown oil. MS: m/e=615.2 ([M+H]⁺)

Step 2: 2-(4,7-Dichloro-6-(4-((2-(3-(hydroxymethyl)azetidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4,7-dichloro-6-(4-((2-(3-(hydroxymethyl)azetidin-1-yl)ethyl)(methyl)amino)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light yellow solid. MS: m/e=669.3 ([M+H]⁺)

Example 90

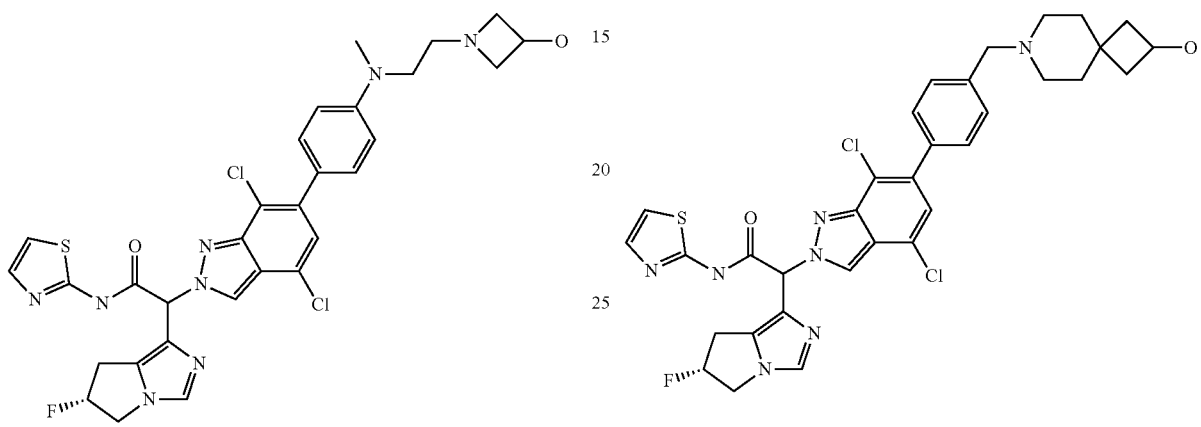

2-(4,7-Dichloro-6-(4-02-(3-hydroxyazetidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide

Step 1: Ethyl 2-(4,7-dichloro-6-(4-((2-(3-hydroxyazetidin-1-yl)ethyl)(methyl)amino)phenyl)-2H-indazol-2-yl)-2-((R)-6-fluoro-6,7-dihydro-5H-pyrrolo[1,2-c]imidazol-1-yl)acetate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with 1-(2-((4-bromophenyl)(methyl)amino)ethyl)azetidin-3-ol in a mixture of THF and water in the presence of [1,1'-bis(diphenylphosphino)ferrocene]dichloropalladium(II) and cesium carbonate to give the title compound as brown oil. MS: m/e=601.1 ([M+H]+)

Step 2: 2-(4,7-Dichloro-6-(4-((2-(3-hydroxyazetidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4,7-dichloro-6-(4-((2-(3-hydroxyazetidin-1-yl)ethyl)(methyl)amino)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light yellow solid. MS: m/e=655.2 ([M+H]+)

Example 91 rac-2-(4,7-Dichloro-6-(4-((2-hydroxy-7-azaspiro[3.5]nonan-7-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide

Step 1: rac-Ethyl 2-(4,7-dichloro-6-(4-((2-hydroxy-7-azaspiro[3.5]nonan-7-yl)methyl)phenyl)-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with 7-(4-(4,4,5,5-tetramethyl-1,3,2-dioxaborolan-2-yl)benzyl)-7-azaspiro[3.5]nonan-2-ol in a mixture of THF and water in the presence of [1,1'-bis(diphenylphosphino)ferrocene]dichloropalladium(II) and cesium carbonate to give the title compound as red oil. MS: m/e=626.2 ([M+H]+)

Step 2: rac-2-(4,7-Dichloro-6-(4-((2-hydroxy-7-azaspiro[3.5]nonan-7-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(4,7-dichloro-6-(4-((2-hydroxy-7-azaspiro[3.5]nonan-7-yl)methyl)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as brown solid. MS: m/e=678.2 ([M−H]−)

Example 92

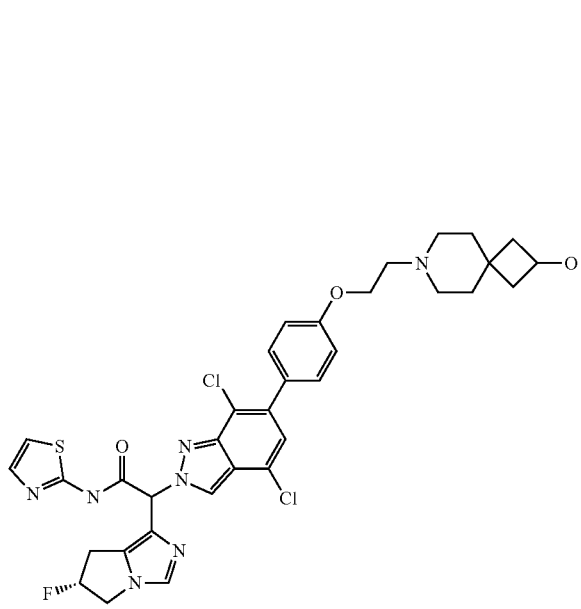 [SMILES: O=C(Nc1nccs1)C(c1ncn2c1C[C@@H](F)C2)n1cc2c(Cl)cc(-c3ccc(OCCN4CCC5(CC4)CC(O)C5)cc3)c(Cl)c2n1]

rac-2-(4,7-Dichloro-6-(4-(2-(2-hydroxy-7-azaspiro[3.5]nonan-7-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide

Step 1: rac-Ethyl 2-(4,7-dichloro-6-(4-(2-(2-hydroxy-7-azaspiro[3.5]nonan-7-yl)ethoxy)phenyl)-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with 7-(2-(4-(4,4,5,5-tetramethyl-1,3,2-dioxaborolan-2-yl)phenoxy)ethyl)-7-azaspiro[3.5]nonan-2-ol in a mixture of THF and water in the presence of [1,1'-bis(diphenylphosphino)ferrocene]dichloropalladium(II) and cesium carbonate to give the title compound as light yellow oil. MS: m/e=656.2 ([M+H]$^+$)

Step 2: rac-2-(4,7-Dichloro-6-(4-(2-(2-hydroxy-7-azaspiro[3.5]nonan-7-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(4,7-dichloro-6-(4-(2-(2-hydroxy-7-azaspiro[3.5]nonan-7-yl)ethoxy)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as brown solid. MS: m/e=708.3 ([M−H]$^−$)

Example 93

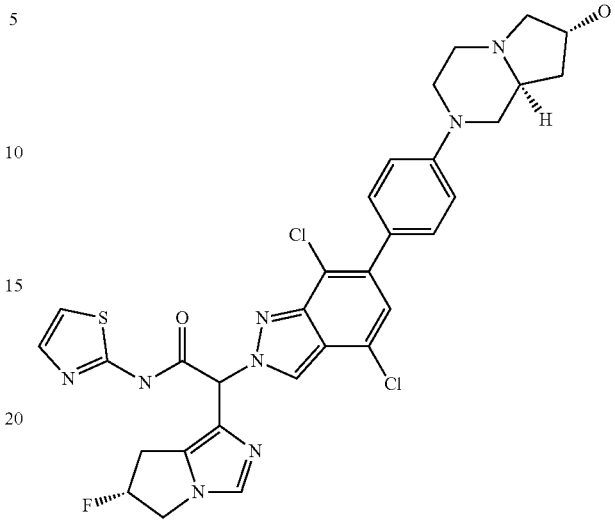

2-(4,7-Dichloro-6-(4-((7R,8aS)-7-hydroxyhexahydropyrrolo[1,2-a]pyrazin-2(1H)-yl)phenyl)-2H-indazol-2-yl)-2-((R)-6-fluoro-6,7-dihydro-5H-pyrrolo[1,2-c]imidazol-1-yl)-N-(thiazol-2-yl)acetamide

Step 1: Ethyl 2-(6-(4-((7R,8aS)-7-((tert-butyldimethylsilyl)oxy)hexahydropyrrolo[1,2-a]pyrazin-2(1H)-yl)phenyl)-4,7-dichloro-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate (Example 25, step 3) was reacted with (4-((7R,8aS)-7-((tert-butyldimethylsilyl)oxy)hexahydropyrrolo[1,2-a]pyrazin-2(1H)-yl)phenyl)boronic acid in a mixture of Me-THF and water in the presence of [1,1'-bis(diphenylphosphino)ferrocene]dichloropalladium(II) and potassium carbonate to give the title compound as light yellow solid. MS: m/e=727.0 ([M+H]$^+$)

Step 2: 2-(6-(4-((7R,8aS)-7-((tert-Butyldimethylsilyl)oxy)hexahydropyrrolo[1,2-a]pyrazin-2(1H)-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(6-(4-((7R,8aS)-7-((tert-butyldimethylsilyl)oxy)hexahydropyrrolo[1,2-a]pyrazin-2(1H)-yl)phenyl)-4,7-dichloro-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light yellow solid. MS: m/e=779.3 ([M−H]$^−$)

Step 3: 2-(4,7-Dichloro-6-(4-((7R,8aS)-7-hydroxyhexahydropyrrolo[1,2-a]pyrazin-2(1H)-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 39, step 3, 2-(6-(4-((7R,8aS)-7-((tert-butyldimethylsilyl)oxy)hexahydropyrrolo[1,2-a]

pyrazin-2(1H)-yl)phenyl)-4,7-dichloro-2H-indazol-2-yl)-2-((R)-6-fluoro-6,7-dihydro-5H-pyrrolo[1,2-c]imidazol-1-yl)-N-(thiazol yl)acetamide was reacted with tetrabutylammonium fluoride to give the title compound as off-white solid. MS: m/e=665.3 ([M−H]⁻)

Example 94

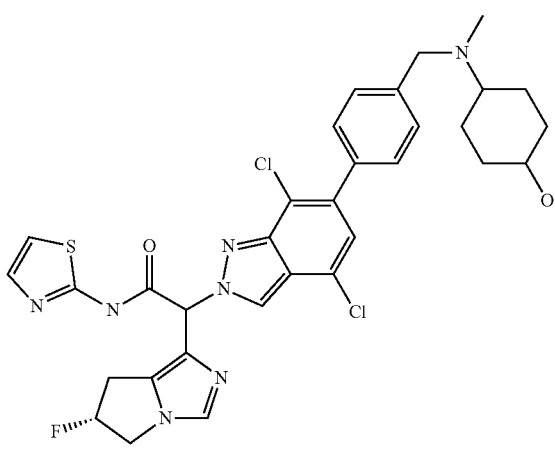 [SMILES: CN(Cc1ccc(-c2cc(Cl)c3cn(C(C(=O)Nc4nccs4)c4ncn5c4C[C@@H](F)C5)nc3c2Cl)cc1)C1CCC(O)CC1]

rac-2-(4,7-Dichloro-6-(4-(((4-hydroxycyclohexyl)(methyl)amino)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 48, step 2, rac-2-(4,7-dichloro-6-(4-formylphenyl)-2H-indazol-2-yl)-2-((R)-6-fluoro-6,7-dihydro-5H-pyrrolo[1,2-c]imidazol-1-yl)-N-(thiazol-2-yl)acetamide (Example 62, step 3) was reacted with 4-(methylamino)cyclohexan-1-ol in the presence of sodium triacetoxyborohydride to give the title compound as colorless solid. MS: m/e=666.3 ([M−H]⁻)

Example 95

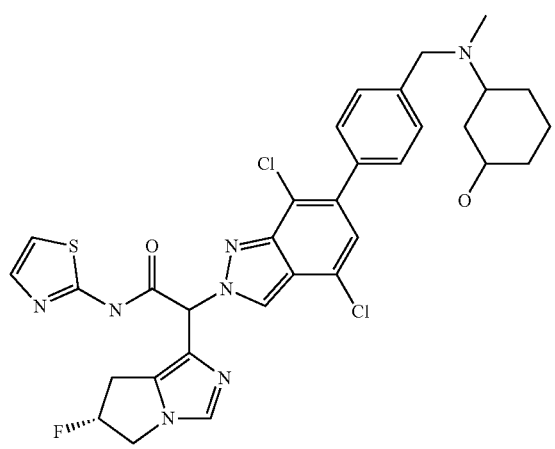 [SMILES: CN(Cc1ccc(-c2cc(Cl)c3cn(C(C(=O)Nc4nccs4)c4ncn5c4C[C@@H](F)C5)nc3c2Cl)cc1)C1CCCC(O)C1]

rac-2-(4,7-Dichloro-6-(4-(((3-hydroxycyclohexyl)(methyl)amino)methyl)phenyl)-2H-indazol-2-yl)-2-((R)-6-fluoro-6,7-dihydro-5H-pyrrolo[1,2-c]imidazol-1-yl)-N-(thiazol yl)acetamide In analogy to Example 48, step 2, rac-2-(4,7-dichloro-6-(4-formylphenyl)-2H-indazol-2-yl)-2-((R)-6-fluoro-6,7-dihydro-5H-pyrrolo[1,2-c]imidazol-1-yl)-N-(thiazol-2-yl)acetamide (Example 62, step 3) was reacted with 3-(methylamino)cyclohexan-1-ol in the presence of sodium triacetoxyborohydride to give the title compound as colorless solid. MS: m/e=666.3 ([M−H]⁻)

Example 96

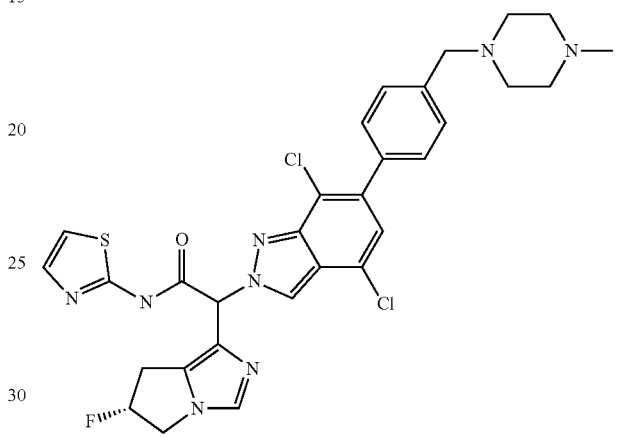

rac-2-(4,7-Dichloro-6-(4-((4-methylpiperazin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 48, step 2, rac-2-(4,7-dichloro-6-(4-formylphenyl)-2H-indazol-2-yl)-2-((R)-6-fluoro-6,7-dihydro-5H-pyrrolo[1,2-c]imidazol-1-yl)-N-(thiazol-2-yl)acetamide (Example 62, step 3) was reacted with 1-methylpiperazine in the presence of sodium triacetoxyborohydride to give the title compound as light brown solid. MS: m/e=637.2 ([M−H]⁻)

Example 97

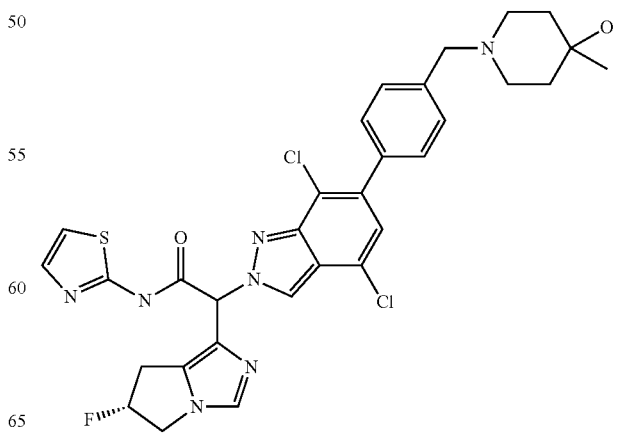

rac-2-(4,7-Dichloro-6-(4-((4-hydroxy-4-methylpiperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 48, step 2, rac-2-(4,7-dichloro-6-(4-formylphenyl)-2H-indazol-2-yl)-2-((R)-6-fluoro-6,7-dihydro-5H-pyrrolo[1,2-c]imidazol-1-yl)-N-(thiazol-2-yl)acetamide (Example 62, step 3) was reacted with 4-methylpiperidin-4-ol in the presence of sodium triacetoxyborohydride to give the title compound as light brown solid. MS: m/e=652.2 ([M−H]⁻)

Example 98

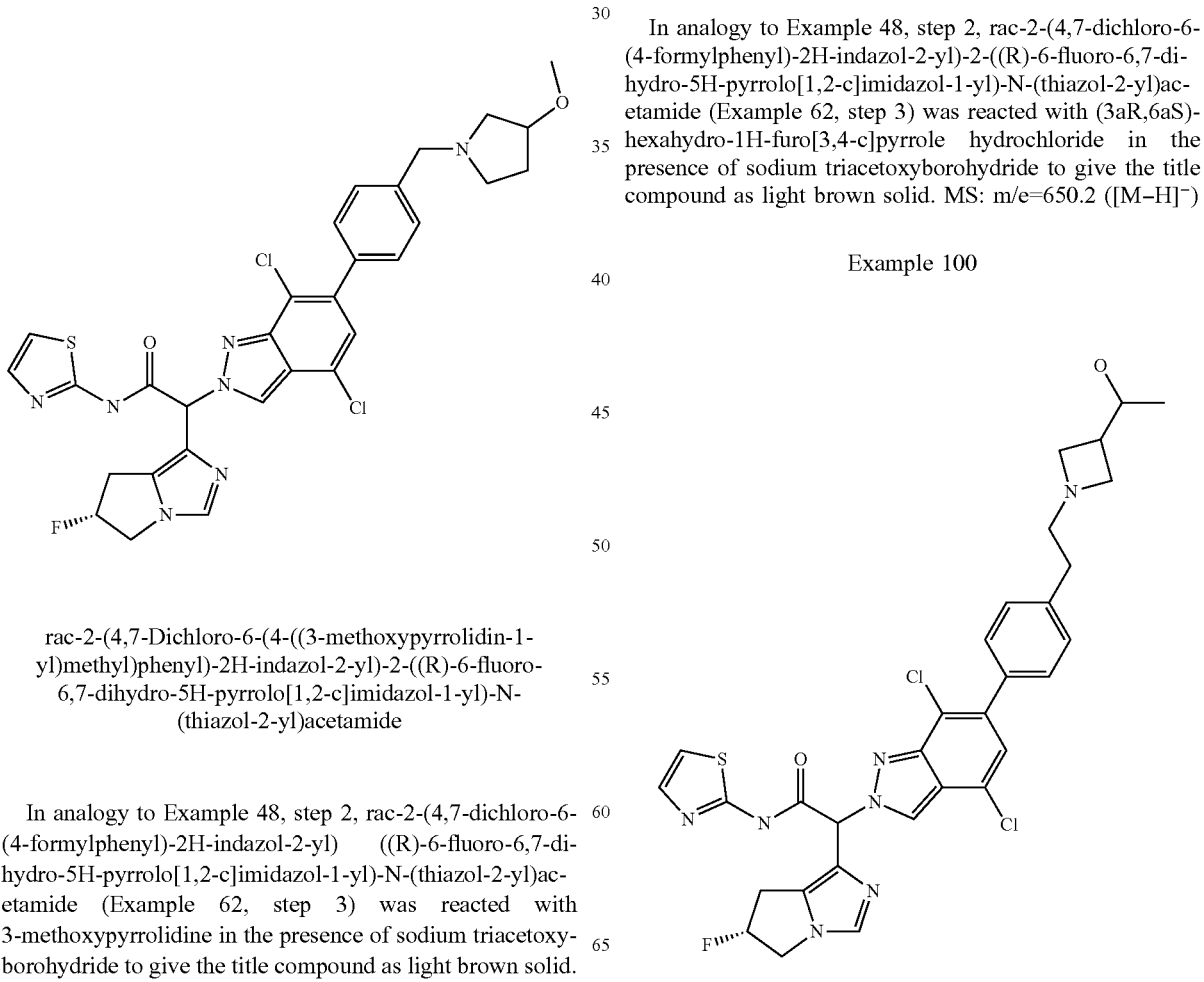

rac-2-(4,7-Dichloro-6-(4-((3-methoxypyrrolidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 48, step 2, rac-2-(4,7-dichloro-6-(4-formylphenyl)-2H-indazol-2-yl) ((R)-6-fluoro-6,7-dihydro-5H-pyrrolo[1,2-c]imidazol-1-yl)-N-(thiazol-2-yl)acetamide (Example 62, step 3) was reacted with 3-methoxypyrrolidine in the presence of sodium triacetoxyborohydride to give the title compound as light brown solid. MS: m/e=638.2 ([M−H]⁻)

Example 99

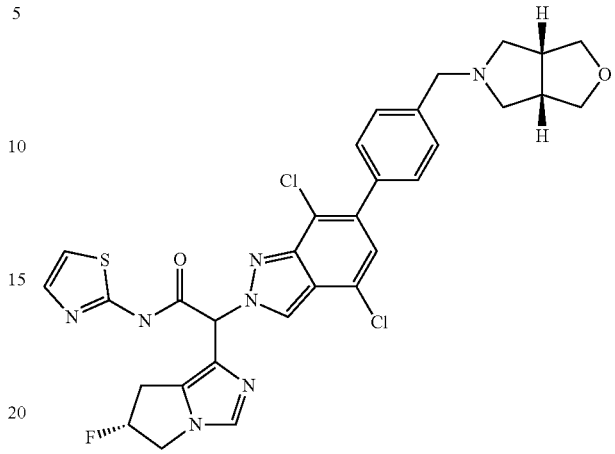

rac-2-(4,7-Dichloro-6-(4-0(3aR,6aS)-tetrahydro-1H-furo[3,4-c]pyrrol-5(3H)-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 48, step 2, rac-2-(4,7-dichloro-6-(4-formylphenyl)-2H-indazol-2-yl)-2-((R)-6-fluoro-6,7-dihydro-5H-pyrrolo[1,2-c]imidazol-1-yl)-N-(thiazol-2-yl)acetamide (Example 62, step 3) was reacted with (3aR,6aS)-hexahydro-1H-furo[3,4-c]pyrrole hydrochloride in the presence of sodium triacetoxyborohydride to give the title compound as light brown solid. MS: m/e=650.2 ([M−H]⁻)

Example 100

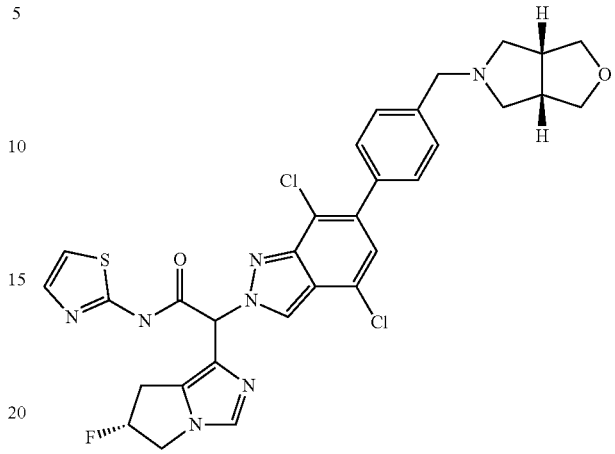

rac-2-(4,7-Dichloro-6-(4-(2-(3-(1-hydroxyethyl)azetidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide

Step 1: rac-Ethyl 2-(4,7-dichloro-6-(4-(2-(3-(1-hydroxyethyl)azetidin-1-yl)ethyl)phenyl)-2H-indazol-2-yl)-2-((R)-6-fluoro-6,7-dihydro-5H-pyrrolo[1,2-c]imidazol-1-yl)acetate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with 1-(1-(4-bromophenethyl)azetidin-3-yl)ethan-1-ol in a mixture of THF and water in the presence of [1,1'-bis(diphenylphosphino)ferrocene]dichloropalladium(II) and cesium carbonate to give the title compound as brown foam. MS: m/e=600.3 ([M+H]$^+$)

Step 2: rac-2-(4,7-Dichloro-6-(4-(2-(3-(1-hydroxyethyl)azetidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(4,7-dichloro-6-(4-(2-(3-(1-hydroxyethyl)azetidin-1-yl)ethyl)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=654.2 ([M+H]$^+$)

Example 101

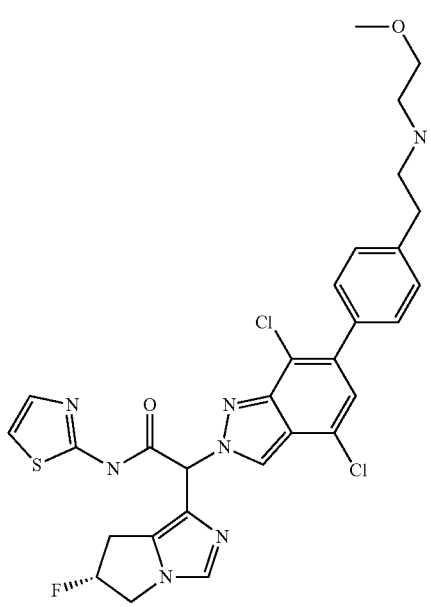 [SMILES: COCCNCCc1ccc(-c2cc(Cl)c3cn(C(C(=O)Nc4nccs4)c4ncn5c4C[C@@H](F)C5)nc3c2Cl)cc1]

rac-2-(4,7-Dichloro-6-(4-(2-((2-methoxyethyl)amino)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide

Step 1: rac-Ethyl 2-(6-(4-(2-((tert-butoxycarbonyl)(2-methoxyethyl)amino)ethyl)phenyl)-4,7-dichloro-2H-indazol-2-yl)-2-((R)-6-fluoro-6,7-dihydro-5H-pyrrolo[1,2-c]imidazol-1-yl)acetate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with tert-butyl (4-bromophenethyl)(2-methoxyethyl)carbamate in a mixture of THF and water in the presence of [1,1'-bis(diphenylphosphino)ferrocene]dichloropalladium(II) and cesium carbonate to give the title compound as brown oil. MS: m/e=674.3 ([M+H]$^+$)

Step 2: rac-tert-Butyl (4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenethyl)(2-methoxyethyl)carbamate In analogy to Example 25, step 5, rac-ethyl 2-(6-(4-(2-((tert-butoxycarbonyl)(2-methoxyethyl)amino)ethyl)phenyl)-4,7-dichloro-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as brown gum. MS: m/e=728.3 ([M+H]$^+$)

Step 3: rac-2-(4,7-Dichloro-6-(4-(2-((2-methoxyethyl)amino)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of rac-tert-butyl (4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenethyl)(2-methoxyethyl)carbamate in dichloromethane was treated with HCl in dioxane to give the title compound as light yellow solid. MS: m/e=626.2 ([M–H]$^-$)

Example 102

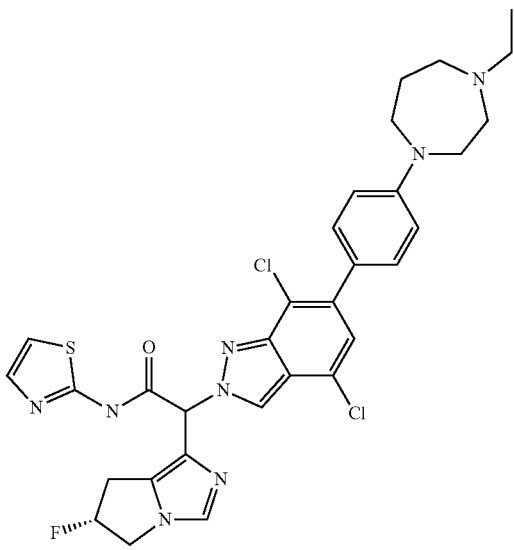 [SMILES: CCN1CCCN(c2ccc(-c3cc(Cl)c4cn(C(C(=O)Nc5nccs5)c5ncn6c5C[C@@H](F)C6)nc4c3Cl)cc2)CC1]

rac-2-(4,7-Dichloro-6-(4-(4-ethyl-1,4-diazepan-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-tert-Butyl 4-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)-1,4-diazepane-1-carboxylate In analogy to Example 25, step 4, rac-ethyl 2-(4,7-dichloro-6-(4,4,5,5-tetramethyl-1,3,2-dioxaborolan-2-yl)-2H-indazol-2-yl)-2-((R)-6-fluoro-6,7-dihydro-5H-pyrrolo[1,2-c]imidazol-1-yl)acetate (Example 36, step 1) was reacted with tert-butyl 4-(4-bromophenyl)-1,4-diazepane-1-carboxylate in a mixture of THF and water in the presence of [1,1'-bis(diphenylphosphino)ferrocene]dichloropalladium(II) and cesium carbonate to give the title compound as orange solid. MS: m/e=671.2 ([M+H]$^+$)

Step 2: rac-tert-Butyl 4-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)-1,4-diazepane-1-carboxylate In analogy to Example 25, step 5, rac-tert-butyl 4-(4-(4,7-dichloro-2-(2-ethoxy-1-((R)-6-fluoro-6,7-dihydro-5H-pyrrolo[1,2-c]imidazol-1-yl)-2-oxoethyl)-2H-indazol-6-yl)phenyl)-1,4-diazepane-1-carboxylate was first treated with LiOH and the resulting salt was reacted with thiazol-2-amine in the presence of HATU and Hunig's base to give the title compound as light brown solid. MS: m/e=727.1 ([M+H]$^+$)

Step 3: rac-2-(6-(4-(1,4-Diazepan-1-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of rac-tert-butyl 4-(4-(4,7-dichloro-2-(1-((R)-6-fluoro-6,7-dihydro-5H-pyrrolo[1,2-c]imidazol-1-yl)-2-oxo-2-(thiazol-2-ylamino)ethyl)-2H-indazol-6-yl)phenyl)-1,4-diazepane-1-carboxylate in chloroform was treated with trifluoroacetic acid to give the title compound as brown solid. MS: m/e=623.2 ([M–H]$^-$)

Step 4: rac-2-(4,7-Dichloro-6-(4-(4-ethyl-1,4-diazepan-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 34, step 4, rac-2-(6-(4-(1,4-diazepan-1-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide was reacted with acetaldehyde in the presence of sodium triacetoxyborohydride to give the title compound as light brown solid. MS: m/e=651.2 ([M–H]$^-$)

Example 103

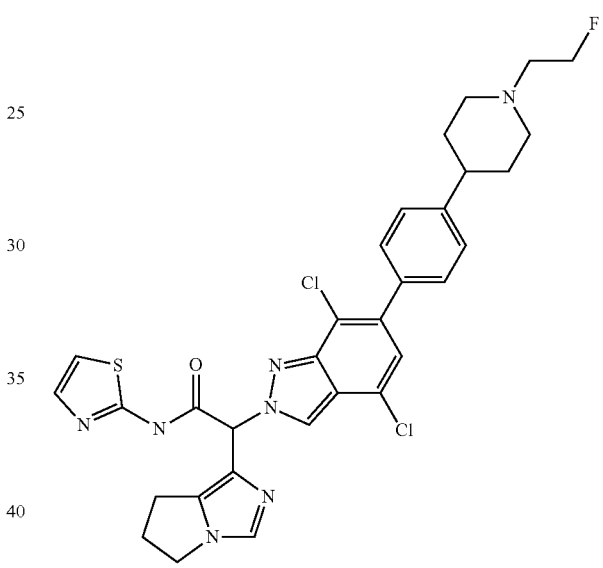

2-(4,7-Dichloro-6-(4-(1-(2-fluoroethyl)piperidin-4-yl)phenyl)-2H-indazol-2-yl)-2-(6,7-dihydro-5H-pyrrolo[1,2-c]imidazol-1-yl)-N-(thiazol-2-yl)acetamide Step 1: tert-Butyl (2S)-2-(2-(6-bromo-4,7-dichloro-2H-indazol-2-yl)-3-ethoxy-3-oxopropanoyl)pyrrolidine-1-carboxylate In analogy to Example 25, step 1, (tert-butoxycarbonyl)-L-proline was treated with carbonyldiimidazole to give solution A. Ethyl 2-(6-bromo-4,7-dichloro-2H-indazol-2-yl)acetate was deprotonated with LDA and treated with solution A at –78° C. After stirring at room temperature overnight and workup in analogy to Example 1, step 1, the crude title compound was obtained which was used for the next step without further purification. MS: m/e=550.2 ([M+H]$^+$)

Step 2: Ethyl 2-(6-bromo-4,7-dichloro-2H-indazol-2-yl)-2-(3-thioxo-2,5,6,7-tetrahydro-3H-pyrrolo[1,2-c]imidazol-1-yl)acetate In analogy to Example 25, step 2, tert-butyl (2S)-2-(2-(6-bromo-4,7-dichloro-2H-indazol-2-yl)-3-ethoxy-3-oxopropanoyl)pyrrolidine-1-carboxylate was deprotected using HCl in dioxane followed by reaction with potassium thiocyanate to give the crude title compound which was used for the next step without further purification. MS: m/e=491.1 ([M+H]⁺, Br)

Step 3: Ethyl 2-(6-bromo-4,7-dichloro-2H-indazol-2-yl)-2-(6,7-dihydro-5H-pyrrolo[1,2-c]imidazol-1-yl)acetate In analogy to Example 25, step 3, ethyl 2-(6-bromo-4,7-dichloro-2H-indazol-2-yl)-2-(3-thioxo-2,5,6,7-tetrahydro-3H-pyrrolo[1,2-c]imidazol-1-yl)acetate was treated with hydrogen peroxide in AcOH to give the title compound as light yellow solid. MS: m/e=457.1 ([M+H]⁺, Br)

Step 4: Ethyl 2-(4,7-dichloro-6-(4-(1-(2-fluoroethyl) piperidin-4-yl)phenyl)-2H-indazol-2-yl)-2-(6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-(6,7-dihydro-5H-pyrrolo[1,2-c]imidazol-1-yl)acetate was treated with 1-(2-fluoroethyl)-4-(4-(4,4,5,5-tetramethyl-1,3,2-dioxaborolan-2-yl)phenyl) piperidine in dioxane in the presence of water, cesium carbonate and [1,1'-bis(diphenylphosphino)ferrocene]dichloropalladium(II) to give the title compound as pink foam. MS: m/e=584.4 ([M+H]⁺)

Step 5: 2-(4,7-Dichloro-6-(4-(1-(2-fluoroethyl)piperidin-4-yl)phenyl)-2H-indazol-2-yl)-2-(6,7-dihydro-5H-pyrrolo[1,2-c]imidazol-1-yl)-N-(thiazol-2-yl) acetamide In analogy to Example 25, step 5, ethyl 2-(4,7-dichloro-6-(4-(1-(2-fluoroethyl)piperidin-4-yl)phenyl)-2H-indazol-2-yl)-2-(6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as off-white solid. MS: m/e=638.3 ([M+H]⁺)

Example 104

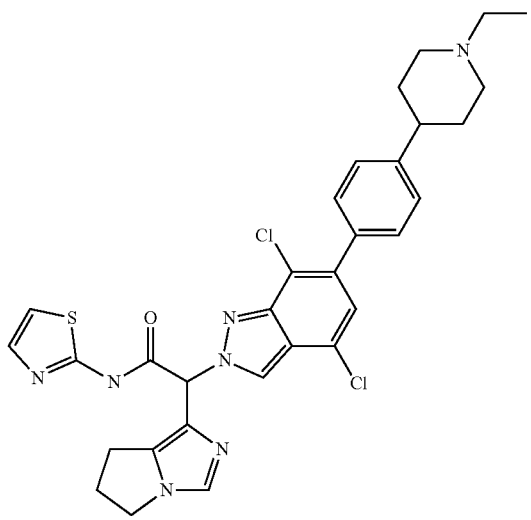 [SMILES: CCN1CCC(c2ccc(-c3cc(Cl)c4cn(C(C(=O)Nc5nccs5)c5ncn6c5CCC6)nc4c3Cl)cc2)CC1]

2-(4,7-Dichloro-6-(4-(1-ethylpiperidin-4-yl)phenyl)-2H-indazol-2-yl)-2-(6,7-dihydro-5H-pyrrolo[1,2-c] imidazol-1-yl)-N-(thiazol-2-yl)acetamide Step 1: 2-(4,7-Dichloro-6-(4-(1-ethylpiperidin-4-yl) phenyl)-2H-indazol-2-yl)-2-(6,7-dihydro-5H-pyrrolo [1,2-c]imidazol-1-yl)acetic acid In analogy to Example 25, step 4, ethyl 2-(6-bromo-4,7-dichloro-2H-indazol-2-yl)-2-(6,7-dihydro-5H-pyrrolo[1,2-c]imidazol-1-yl)acetate (Example 103, step 3) was treated with 1-ethyl-4-(4-(4,4,5,5-tetramethyl-1,3,2-dioxaborolan-2-yl)phenyl)piperidine (CAS #1415794-12-5) in a mixture of THF and water in the presence of cesium carbonate and [1,1'-bis(diphenylphosphino)ferrocene]dichloropalladium (II) to give the impure title compound as dark solid. MS: m/e=538.4 ([M+H]⁺)

Step 2: 2-(4,7-Dichloro-6-(4-(1-ethylpiperidin-4-yl) phenyl)-2H-indazol-2-yl)-2-(6,7-dihydro-5H-pyrrolo [1,2-c]imidazol-1-yl)-N-(thiazol-2-yl)acetamide In analogy to Example 25, step 5, 2-(4,7-dichloro-6-(4-(1-ethylpiperidin-4-yl)phenyl)-2H-indazol-2-yl)-2-(6,7-dihydro-5H-pyrrolo[1,2-c]imidazol-1-yl)acetic acid was reacted with thiazol-2-amine in the presence of HATU and Hunig's base to give the title compound as light brown solid. MS: m/e=620.4 ([M+H]⁺)

Example 105

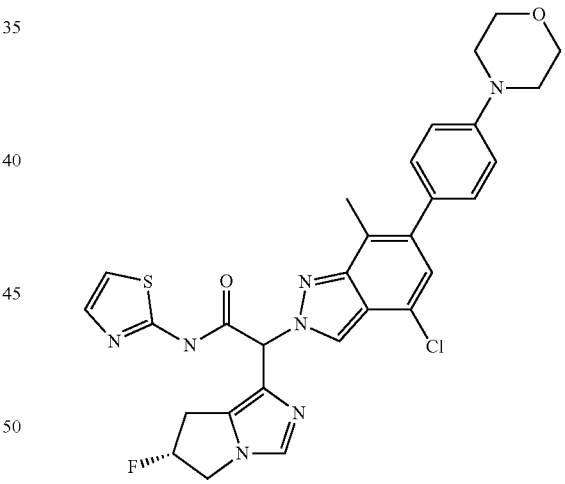

2-(4-Chloro-7-methyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide Step 1: tert-Butyl (2S,4R)-2-(2-(6-bromo-4-chloro-7-methyl-2H-indazol-2-yl)-3-ethoxy-3-oxopropanoyl)-4-fluoropyrrolidine-1-carboxylate In analogy to Example 25, step 1, (2S,4R)-1-(tert-butoxycarbonyl)-4-fluoropyrrolidine-2-carboxylic acid was treated with carbonyldiimidazole to give solution A. Ethyl 2-(6-bromo-4-chloro-7-methyl-2H-indazol-2-yl)acetate was deprotonated with LDA and treated with solution A at −78°

C. After stirring at room temperature overnight and workup in analogy to Example 25, step 1, the crude title compound was obtained which was used for the next step without further purification. MS: m/e=564.1 ([M+H]$^+$)

Step 2: Ethyl 2-(6-bromo-4-chloro-7-methyl-2H-indazol-2-yl)-2-((R)-6-fluoro-3-thioxo-2,5,6,7-tetrahydro-3H-pyrrolo[1,2-c]imidazol-1-yl)acetate In analogy to Example 25, step 2, tert-butyl (2S,4R)-2-(2-(6-bromo-4-chloro-7-methyl-2H-indazol-2-yl)-3-ethoxy-3-oxopropanoyl)-4-fluoropyrrolidine-1-carboxylate was deprotected using HCl in dioxane followed by reaction with potassium thiocyanate to give the crude title compound which was used for the next step without further purification. MS: m/e=485.0 ([M−H]$^-$)

Step 3: Ethyl 2-(6-bromo-4-chloro-7-methyl-2H-indazol-2-yl)-2-((R)-6-fluoro-6,7-dihydro-5H-pyrrolo[1,2-c]imidazol-1-yl)acetate In analogy to Example 25, step 3, ethyl 2-(6-bromo-4-chloro-7-methyl-2H-indazol-2-yl) ((R)-6-fluoro-3-thioxo-2,5,6,7-tetrahydro-3H-pyrrolo[1,2-c]imidazol-1-yl)acetate was treated with hydrogen peroxide in AcOH to give the title compound as light brown solid. MS: m/e=455.2 ([M+H]$^+$)

Step 4: Ethyl 2-(4-chloro-7-methyl-6-(4-morpholinophenyl)-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4-chloro-7-methyl-2H-indazol-2-yl) ((R)-6-fluoro-6,7-dihydro-5H-pyrrolo[1,2-c]imidazol-1-yl)acetate was reacted with (4-morpholinophenyl)boronic acid in toluene in the presence of [1,1'-bis(diphenylphosphino)ferrocene]dichloropalladium(II) and cesium carbonate to give the title compound as light brown solid. MS: m/e=538.3 ([M+H]$^+$)

Step 5: 2-(4-Chloro-7-methyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4-chloro-7-methyl-6-(4-morpholinophenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as colorless solid. MS: m/e=590.3 ([M−H]$^-$)

Example 106

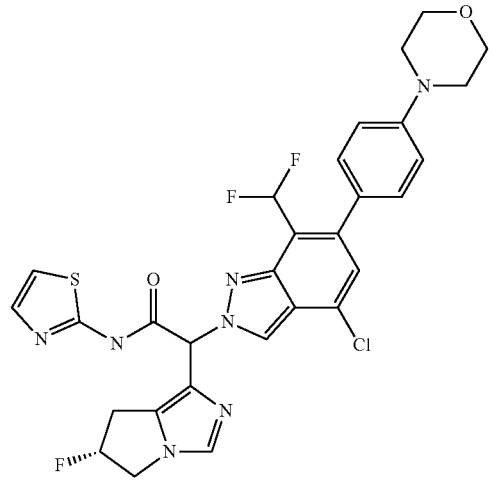 [SMILES: O=C(Nc1nccs1)C(c1ncn2c1C[C@@H](F)C2)n1cc2c(Cl)cc(-c3ccc(N4CCOCC4)cc3)c(C(F)F)c2n1]

rac-2-(4-Chloro-7-(difluoromethyl)-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide Step 1: 4-Bromo-2-chloro-6-fluoro-benzaldehyde and 2-Bromo-4-chloro-6-fluorobenzaldehyde (Regioisomeric Mixture 1:1)

In analogy to the synthesis of 4-bromo-3,6-dichloro-2-fluorobenzaldehyde, 1-bromo-3-chloro fluorobenzene was first treated with LDA in tetrahydrofuran at −75° C. followed by treatment with N,N-dimethylformamide. Workup in analogy to the synthesis of 4-bromo-3,6-dichloro fluorobenzaldehyde gave the crude title compound (mixture of regioisomers) as orange solid.

Step 2: 1-Bromo-5-chloro-2-(difluoromethyl)-3-fluorobenzene and 5-Bromo-1-chloro-2-(difluoromethyl)-3-fluorobenzene (Regioisomeric Mixture 1:1)

The regioisomeric mixture of 4-bromo-2-chloro-6-fluorobenzaldehyde and 2-bromo-4-chloro-6-fluorobenzaldehyde obtained in step 1 (6.368 g) was added to diethylaminosulfur trifluoride (8.65 g) in dichloromethane (70 ml) at 0° C. The mixture was stirred for 5 min at 0° C. and for 4 days at room temperature. Aqueous sat. NaHCO$_3$ was carefully added to the mixture and twice extracted using EtOAc. The organic layers were combined, washed with water, dried with MgSO$_4$ and concentrated. The product was purified by chromatography (SiO2, 0-10% EtOAc in n-heptane) to give the title compound (4.82 g) as light yellow oil.

Step 3: 4-Bromo-6-chloro-3-(difluoromethyl)-2-fluorobenzaldehyde and 6-Bromo-4-chloro-3-(difluoromethyl)-2-fluoro-benzaldehyde (Regioisomeric Mixture 1:1)

In analogy to the synthesis of 4-bromo-3,6-dichloro-2-fluorobenzaldehyde, the regioisomeric mixture of 1-bromo-5-chloro-2-(difluoromethyl)-3-fluorobenzene and 5-Bromo-1-chloro-2-(difluoromethyl)-3-fluorobenzene obtained in step 2 was first treated with LDA in Tetrahydrofuran at −75° C. followed by treatment with N,N-dimethylformamide. Workup in analogy to the synthesis of 4-bromo-3,6-dichloro-2-fluorobenzaldehyde gave the crude title compound (mixture of regioisomers) as red oil.

Step 4: 6-Bromo-4-chloro-7-(difluoromethyl)-1H-indazole and 4-Bromo-6-chloro-7-(difluoromethyl)-1H-indazole (Regioisomeric Mixture 1:1)

In analogy to the synthesis of 6-bromo-4-chloro-7-methoxy-2H-indazole, a solution of the regioisomeric mixture of 4-bromo-6-chloro-3-(difluoromethyl)-2-fluorobenzaldehyde and 6-bromo-4-chloro-3-(difluoromethyl)-2-fluoro-benzaldehyde obtained in step 3 in dioxane was heated with an excess of hydrazine hydrate to give the title compound as off-white solid. MS: m/e=281.0 ([M+H]⁺)

Step 5: Ethyl 2-(6-bromo-4-chloro-7-(difluoromethyl)-2H-indazol-2-yl)acetate and Ethyl 2-(4-bromo-6-chloro-7-(difluoromethyl)-2H-indazol-2-yl)acetate (Regioisomeric Mixture 1:1)

Using General Method A, the regioisomeric mixture of 6-bromo-4-chloro-7-(difluoromethyl)-1H-indazole and 4-bromo-6-chloro-7-(difluoromethyl)-1H-indazole obtained in step 4 was converted to the title compound by treatment with ethyl 2-bromoacetate. MS: m/e=367.0 ([M+H]⁺)

Step 6: Ethyl 2-(4-chloro-7-(difluoromethyl)-6-(4-morpholinophenyl)-2H-indazol-2-yl)acetate In analogy to Example 25, step 4, the regioisomeric mixture of ethyl 2-(6-bromo-4-chloro-7-(difluoromethyl)-2H-indazol-2-yl)acetate and ethyl 2-(4-bromo-6-chloro-7-(difluoromethyl)-2H-indazol-2-yl)acetate obtained in step 5 was reacted with (4-morpholinophenyl)boronic acid in toluene in the presence of [1,1'-bis(diphenylphosphino)ferrocene]dichloropalladium(II) and cesium carbonate to give after chromatographic separation of the regioisomers the title compound as off-white solid. MS: m/e=450.3 ([M+H]⁺)

Step 7: rac-tert-Butyl (2S,4R)-2-(2-(4-chloro-7-(difluoromethyl)-6-(4-morpholinophenyl)-2H-indazol-2-yl)-3-ethoxy-3-oxopropanoyl)-4-fluoropyrrolidine-1-carboxylate In analogy to Example 25, step 1, (2S,4R)-1-(tert-butoxycarbonyl)-4-fluoropyrrolidine-2-carboxylic acid was treated with carbonyldiimidazole to give solution A. ethyl 2-(4-chloro-7-(difluoromethyl)-6-(4-morpholinophenyl)-2H-indazol-2-yl)acetate was deprotonated with LDA and treated with solution A at −78° C. After stirring at room temperature overnight and workup in analogy to Example 25, step 1, the crude title compound was obtained which was used for the next step without further purification. MS: m/e=665.5 ([M+H]⁺)

Step 8: rac-Ethyl 2-(4-chloro-7-(difluoromethyl)-6-(4-morpholinophenyl)-2H-indazol-2-yl)-2-((R)-6-fluoro-3-thioxo-2,5,6,7-tetrahydro-3H-pyrrolo[1,2-c]imidazol-1-yl)acetate In analogy to Example 25, step 2, rac-tert-butyl (2S,4R)-2-(2-(4-chloro-7-(difluoromethyl)-6-(4-morpholinophenyl)-2H-indazol-2-yl)-3-ethoxy-3-oxopropanoyl)-4-fluoropyrrolidine-1-carboxylate was deprotected using HCl in dioxane followed by reaction with potassium thiocyanate to give the crude title compound which was used for the next step without further purification. MS: m/e=606.3 ([M+H]⁺)

Step 9: rac-Ethyl 2-(4-chloro-7-(difluoromethyl)-6-(4-morpholinophenyl)-2H-indazol-2-yl)-2-((R)-6-fluoro-6,7-dihydro-5H-pyrrolo[1,2-c]imidazol-1-yl)acetate In analogy to Example 25, step 3, rac-ethyl 2-(4-chloro-7-(difluoromethyl)-6-(4-morpholinophenyl)-2H-indazol-2-yl)-2-((R)-6-fluoro-3-thioxo-2,5,6,7-tetrahydro-3H-pyrrolo[1,2-c]imidazol-1-yl)acetate was treated with hydrogen peroxide in AcOH to give the title compound as off-white solid. MS: m/e=574.3 ([M+H]⁺)

Step 10: rac-2-(4-Chloro-7-(difluoromethyl)-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(4-chloro-7-(difluoromethyl)-6-(4-morpholinophenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as off-white solid. MS: m/e=628.3 ([M+H]⁺)

Example 117

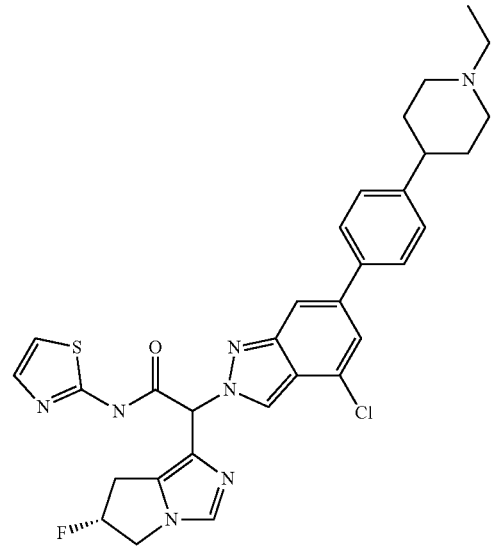 [SMILES: CCN1CCC(c2ccc(-c3cc(Cl)c4cn(C(C(=O)Nc5nccs5)c5ncn6c5C[C@@H](F)C6)nc4c3)cc2)CC1]

rac-2-(4-Chloro-6-(4-(1-ethylpiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-tert-Butyl (2S,4R)-2-(2-(6-bromo-4-chloro-2H-indazol-2-yl)-3-ethoxy-3-oxopropanoyl)-4-fluoropyrrolidine-1-carboxylate In analogy to Example 25, step 1, (2 S,4R)-1-(tert-butoxycarbonyl)-4-fluoropyrrolidine-2-carboxylic acid was treated with carbonyldiimidazole to give solution A. Ethyl 2-(6-bromo-4-chloro-2H-indazol-2-yl)acetate was deprotonated with LDA and treated with solution A at −78° C. After stirring at room temperature overnight and workup in analogy to Example 25, step 1, the crude title compound was obtained which was used for the next step without further purification. MS: m/e=534.1 ([M+H]$^+$)

Step 2: rac-Ethyl 2-(6-bromo-4-chloro-2H-indazol-2-yl)-2-((R)-6-fluoro-3-thioxo-2,5,6,7-tetrahydro-3H-pyrrolo[1,2-c]imidazol-1-yl)acetate In analogy to Example 25, step 2, rac-tert-butyl (2S,4R)-2-(2-(6-bromo-4-chloro-2H-indazol-2-yl)-3-ethoxy-3-oxopropanoyl)-4-fluoropyrrolidine-1-carboxylate was deprotected using HCl in dioxane followed by reaction with potassium thiocyanate to give the crude title compound which was used for the next step without further purification. MS: m/e=473.0, 475.0 ([M+H]$^+$)

Step 3: Ethyl 2-(6-bromo-4-chloro-2H-indazol-2-yl)-2-((R)-6-fluoro-6,7-dihydro-5H-pyrrolo[1,2-c]imidazol-1-yl)acetate In analogy to Example 25, step 3, rac-ethyl 2-(6-bromo-4-chloro-2H-indazol-2-yl)-2-((R)-6-fluoro-3-thioxo-2,5,6,7-tetrahydro-3H-pyrrolo[1,2-c]imidazol-1-yl)acetate was treated with hydrogen peroxide in AcOH to give the title compound as light yellow foam. MS: m/e=441.2, 443.0 ([M+H]$^+$)

Step 4: Ethyl 2-(4-chloro-6-(4-(1-ethylpiperidin-4-yl)phenyl)-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4-chloro-2H-indazol-2-yl)-2-((R)-6-fluoro-6,7-dihydro-5H-pyrrolo[1,2-c]imidazol-1-yl)acetate was reacted with (4-(1-ethylpiperidin-4-yl)phenyl)boronic acid hydrobromide in a mixture of toluene and dimethylacetamide in the presence of [1,1'-bis(diphenylphosphino)ferrocene]dichloropalladium (II) and cesium carbonate to give the title compound as light yellow solid. MS: m/e=550.3 ([M+H]$^+$)

Step 5: rac-2-(4-Chloro-6-(4-(1-ethylpiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4-chloro-6-(4-(1-ethylpiperidin-4-yl)phenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=604.3 ([M+H]$^+$)

Example 118

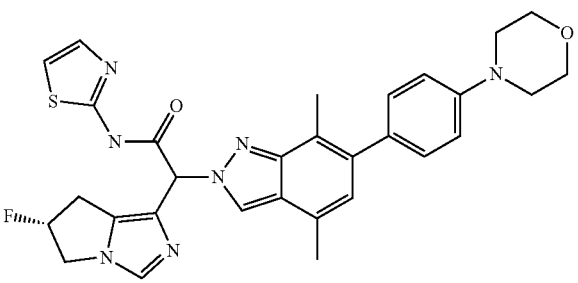 [SMILES: Cc1cc(-c2ccc(N3CCOCC3)cc2)c(C)c2nn(C(C(=O)Nc3nccs3)c3ncn4c3C[C@@H](F)C4)cc12]

2-(4,7-Dimethyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide Step 1: tert-Butyl (2S,4R)-2-(2-(6-bromo-4,7-dimethyl-2H-indazol-2-yl)-3-ethoxy oxopropanoyl)-4-fluoropyrrolidine-1-carboxylate (2S,4R)-1-(tert-Butoxycarbonyl)-4-fluoropyrrolidine-2-carboxylic acid (3.24 g) was dissolved under argon in dichloromethane (52 ml) and cooled to 0° C. 1,1'-Carbonyldiimidazole (2.25 g) was added portionwise. The mixture was stirred at 0° C. for 20 min and at room temperature for 2.5 h. The mixture was washed with water, sodium bicarbonate solution and brine. The organic layers were combined, dried over sodium sulfate, filtered, concentrated and dried.

Ethyl 2-(6-bromo-4,7-dimethyl-2H-indazol-2-yl)acetate (2.79 g) was dissolved in THF (50 ml) and cooled to −75° C. LDA (2 M, 6.95 ml) was added dropwise at −75° C. The reaction mixture was stirred at −75° C. for 30 min. Then, a solution of the above prepared activated amide in THF was added dropwise at −75° C. The mixture was stirred 30 min at −75° C., let slowly warm up to room temperature and stirred overnight. The reaction mixture was quenched with saturated NH$_4$Cl-solution and then extracted with EtOAc. The aqueous layer was backextracted with EtOAc. The organic layers were washed with brine. The organic layers were combined, dried over sodium sulfate, filtered and concentrated in vacuo to give the crude title compound (6.49 g, approx. 70% purity) which was used for the next step without further purification. MS: m/e=528.3 ([M+H]$^+$)

Step 2: Ethyl 2-(6-bromo-4,7-dimethyl-2H-indazol-2-yl)-2-((R)-6-fluoro-3-thioxo-2,5,6,7-tetrahydro-3H-pyrrolo[1,2-c]imidazol-1-yl)acetate In analogy to Example 25, step 2, tert-butyl (2S,4R)-2-(2-(6-bromo-4,7-dimethyl-2H-indazol-2-yl)-3-ethoxy-3-oxopropanoyl)-4-fluoropyrrolidine-1-carboxylate was deprotected using HCl in dioxane followed by reaction with potassium thiocyanate to give the crude title compound which was used for the next step without further purification. MS: m/e=469.2 ([M+H]$^+$)

Step 3: Ethyl 2-(6-bromo-4,7-dimethyl-2H-indazol-2-yl)-2-((R)-6-fluoro-6,7-dihydro-5H-pyrrolo[1,2-c]imidazol-1-yl)acetate In analogy to Example 25, step 3, ethyl 2-(6-bromo-4,7-dimethyl-2H-indazol-2-yl)-2-((R)-6-fluoro-3-thioxo-2,5,6, 7-tetrahydro-3H-pyrrolo[1,2-c]imidazol-1-yl)acetate was treated with hydrogen peroxide in AcOH to give the title compound as light brown solid. MS: m/e=435.2 ([M+H]$^+$)

Step 4: Ethyl 2-(4,7-dimethyl-6-(4-morpholinophenyl)-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dimethyl-2H-indazol-2-yl)-2-((R)-6-fluoro-6,7-dihydro-5H-pyrrolo[1,2-c]imidazol-1-yl)acetate was reacted with (4-morpholinophenyl)boronic acid in toluene in the presence of [1,1'-bis(diphenylphosphino)ferrocene]dichloropalladium(II) and cesium carbonate to give the title compound as light brown solid. MS: m/e=518.4 ([M+H]$^+$)

Step 5: 2-(4,7-Dimethyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4,7-dimethyl-6-(4-morpholinophenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as off-white solid. MS: m/e=570.5 ([M−H]$^−$)

Example 119

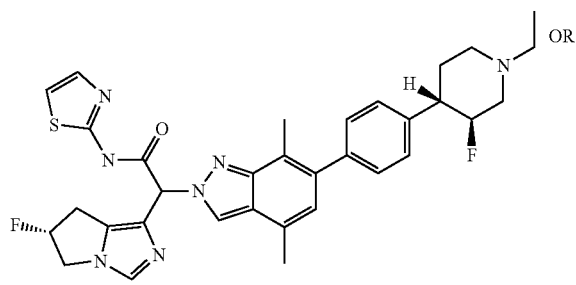

Example 120

2-(6-(4-((3S,4S)-1-Ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide OR 2-(6-(4-((3R,4R)-1-Ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(6-(4-((3S,4S)-1-ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)acetate OR Ethyl 2-(6-(4-((3R,4R)-1-ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dimethyl-2H-indazol-2-yl)-2-((R)-6-fluoro-6,7-dihydro-5H-pyrrolo[1,2-c]imidazol-1-yl)acetate (Example 118, step 3) was reacted with (4-((3S,4S)-1-ethyl-3-fluoropiperidin-4-yl)phenyl)boronic acid OR (4-((3R,4R)-1-ethyl fluoropiperidin-4-yl)phenyl)boronic acid in dioxane in the presence of [1,1'-bis(diphenylphosphino)ferrocene]dichloropalladium(II) and cesium carbonate to give the title compound as light brown solid. MS: m/e=562.4 ([M+H]$^+$)

Step 2: 2-(6-(4-((3S,4S)-1-Ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide OR 2-(6-(4-((3R,4R)-1-Ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(6-(4-((3S,4S)-1-ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)acetate OR ethyl 2-(6-(4-((3R,4R)-1-ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=614.5 ([M−H]$^−$)

Example 120

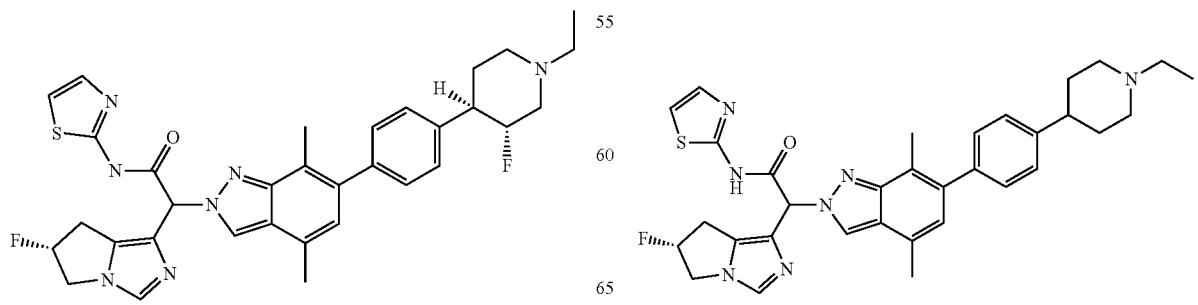

2-(6-(4-(1-Ethylpiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide Step 1: tert-Butyl 4-(4-(2-(2-ethoxy-1-((R)-6-fluoro-6,7-dihydro-5H-pyrrolo[1,2-c]imidazol-1-yl)-2-oxo-ethyl)-4,7-dimethyl-2H-indazol-6-yl)phenyl)piperidine-1-carboxylate In analogy to Example 25, step 4, ethyl 2-(6-bromo-4,7-dimethyl-2H-indazol-2-yl)-2-((R)-6-fluoro-6,7-dihydro-5H-pyrrolo[1,2-c]imidazol-1-yl)acetate (Example 118, step 3) was reacted with tert-butyl 4-(4-(4,4,5,5-tetramethyl-1,3,2-dioxaborolan-2-yl)phenyl)piperidine-1-carboxylate in dioxane in the presence of [1,1'-bis(diphenylphosphino)ferrocene]dichloropalladium(II) and cesium carbonate to give the title compound as light brown solid. MS: m/e=614.5 ([M−H]⁻)

Step 2: tert-Butyl 4-(4-(2-(1-((R)-6-fluoro-6,7-dihydro-5H-pyrrolo[1,2-c]imidazol-1-yl)-2-oxo (thiazol-2-ylamino)ethyl)-4,7-dimethyl-2H-indazol-6-yl)phenyl)piperidine-1-carboxylate In analogy to Example 25, step 5, tert-butyl 4-(4-(2-(2-ethoxy-1-((R)-6-fluoro-6,7-dihydro-5H-pyrrolo[1,2-c]imidazol-1-yl)-2-oxoethyl)-4,7-dimethyl-2H-indazol-6-yl)phenyl)piperidine-1-carboxylate was first treated with LiOH and the resulting salt was reacted with thiazol-2-amine in the presence of HATU and Hunig's base to give the title compound as yellow oil. MS: m/e=668.5 ([M−H]⁻)

Step 3: 2-(4,7-Dimethyl-6-(4-(piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of tert-butyl 4-(4-(2-(1-((R)-6-fluoro-6,7-dihydro-5H-pyrrolo[1,2-c]imidazol-1-yl)-2-oxo-2-(thiazol-2-ylamino)ethyl)-4,7-dimethyl-2H-indazol-6-yl)phenyl)piperidine-1-carboxylate in dichloromethane was treated with HCl in dioxane to give the title compound as yellow solid. MS: m/e=568.3 ([M−H]⁻)

Step 4: 2-(6-(4-(1-Ethylpiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide In analogy to Example 34, step 4, 2-(4,7-dimethyl-6-(4-(piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide was reacted with acetaldehyde in the presence of sodium triacetoxyborohydride to give the title compound as light brown solid. MS: m/e=596.4 ([M−H]⁻)

Example 121

2-(6-(4-(4-Ethylpiperazin-1-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide Step 1: tert-Butyl 4-(4-(2-(2-ethoxy-1-((R)-6-fluoro-6,7-dihydro-5H-pyrrolo[1,2-c]imidazol-1-yl)-2-oxo-ethyl)-4,7-dimethyl-2H-indazol-6-yl)phenyl)piperazine-1-carboxylate In analogy to Example 25, step 4, ethyl 2-(6-bromo-4,7-dimethyl-2H-indazol-2-yl)-2-((R)-6-fluoro-6,7-dihydro-5H-pyrrolo[1,2-c]imidazol-1-yl)acetate (Example 118, step 3) was reacted with (4-(4-(tert-butoxycarbonyl)piperazin-1-yl)phenyl)boronic acid in dioxane in the presence of [1,1'-bis(diphenylphosphino)ferrocene]dichloropalladium(II) and cesium carbonate to give the title compound as light brown oil. MS: m/e=617.4 ([M+H]⁺)

Step 2: tert-butyl 4-(4-(2-(1-((R)-6-fluoro-6,7-dihydro-5H-pyrrolo[1,2-c]imidazol-1-yl)-2-oxo-2-(thiazol-2-ylamino)ethyl)-4,7-dimethyl-2H-indazol-6-yl)phenyl)piperazine-1-carboxylate In analogy to Example 25, step 5, tert-butyl 4-(4-(2-(2-ethoxy-1-((R)-6-fluoro-6,7-dihydro-5H-pyrrolo[1,2-c]imidazol-1-yl)-2-oxoethyl)-4,7-dimethyl-2H-indazol-6-yl)phenyl)piperazine-1-carboxylate was first treated with LiOH and the resulting salt was reacted with thiazol-2-amine in the presence of HATU and Hunig's base to give the title compound as light brown solid. MS: m/e=669.5 ([M−H]⁻)

Step 3: 2-(6-(4-(4-Ethylpiperazin-1-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of tert-butyl 4-(4-(2-(1-((R)-6-fluoro-6,7-dihydro-5H-pyrrolo[1,2-c]imidazol-1-yl)-2-oxo-2-(thiazol-2-ylamino)ethyl)-4,7-dimethyl-2H-indazol-6-yl)phenyl)piperazine-1-carboxylate in dichloromethane was treated with HCl in dioxane. The product of this reaction was reacted in analogy to Example 34, step 4, with acetaldehyde in the presence of sodium triacetoxyborohydride to give the title compound as light yellow solid. MS: m/e=597.4 ([M−H]⁻)

Example 122

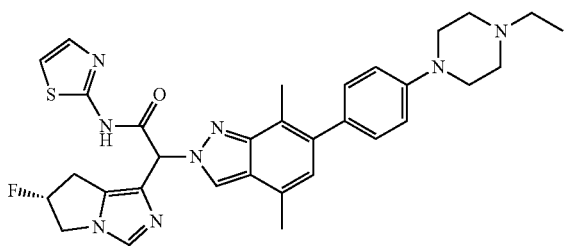 [SMILES: CCN1CCN(c2ccc(-c3cc(C)c4cn(C(C(=O)Nc5nccs5)c5ncn6c5C[C@@H](F)C6)nc4c3C)cc2)CC1]

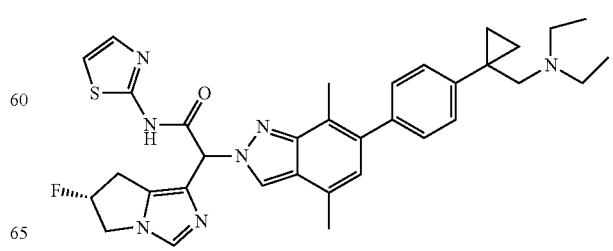

2-(6-(4-(1-((Diethylamino)methyl)cyclopropyl)phenyl)-4,7-dimethyl-2H-indazol-2-yl) ((R)-6-fluoro-6,7-dihydro-5H-pyrrolo[1,2-c]imidazol-1-yl)-N-(thiazol-2-yl)acetamide Step 1: Ethyl 2-(6-(4-(1-(((tert-butoxycarbonyl)amino)methyl)cyclopropyl)phenyl)-4,7-dimethyl-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dimethyl-2H-indazol-2-yl)-2-((R)-6-fluoro-6,7-dihydro-5H-pyrrolo[1,2-c]imidazol-1-yl)acetate (Example 118, step 3) was reacted with (4-(1-(((tert-butoxycarbonyl)amino)methyl)cyclopropyl)phenyl)boronic acid (CAS #2304493-23-8) in dioxane in the presence of [1,1'-bis(diphenylphosphino)ferrocene]dichloropalladium(II) and cesium carbonate to give the impure title compound as brown oil. MS: m/e=600.5 ([M–H]−)

Step 2: tert-Butyl 41-(4-(2-(1-((R)-6-fluoro-6,7-dihydro-5H-pyrrolo[1,2-c]imidazol-1-yl)-2-oxo-2-(thiazol-2-ylamino)ethyl)-4,7-dimethyl-2H-indazol-6-yl)phenyl)cyclopropyl)methyl)carbamate In analogy to Example 25, step 5, ethyl 2-(6-(4-(1-(((tert-butoxycarbonyl)amino)methyl)cyclopropyl)phenyl)-4,7-dimethyl-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the impure title compound as yellow oil. MS: m/e=654.5 ([M–H]−)

Step 3: 2-(6-(4-(1-((Diethylamino)methyl)cyclopropyl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of tert-butyl ((1-(4-(2-(1-((R)-6-fluoro-6,7-dihydro-5H-pyrrolo[1,2-c]imidazol-1-yl)-2-oxo-2-(thiazol-2-ylamino)ethyl)-4,7-dimethyl-2H-indazol-6-yl)phenyl)cyclopropyl)methyl)carbamate in dichloromethane was treated with HCl in dioxane. The product of this reaction was reacted in analogy to Example 34, step 4, with acetaldehyde in the presence of sodium triacetoxyborohydride to give the title compound as colorless solid. MS: m/e=612.3 ([M+H]+)

Example 123

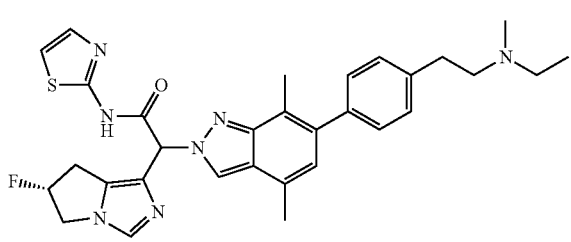 [SMILES: CCN(C)CCc1ccc(-c2cc(C)c3cn(C(C(=O)Nc4nccs4)c4ncn5c4C[C@@H](F)C5)nc3c2C)cc1]

2-(6-(4-(2-(Ethyl)methyl)amino)ethyl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(6-(4-(2-((tert-butoxycarbonyl)(methyl)amino)ethyl)phenyl)-4,7-dimethyl-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dimethyl-2H-indazol-2-yl)-2-((R)-6-fluoro-6,7-dihydro-5H-pyrrolo[1,2-c]imidazol-1-yl)acetate (Example 118, step 3) was reacted with (4-(2-((tert-butoxycarbonyl)(methyl)amino)ethyl)phenyl)boronic acid in dioxane in the presence of [1,1'-bis(diphenylphosphino)ferrocene]dichloropalladium(II) and cesium carbonate to give the title compound as brown oil. MS: m/e=588.5 ([M–H]−)

Step 2: tert-Butyl (4-(2-(1-((R)-6-fluoro-6,7-dihydro-5H-pyrrolo[1,2-c]imidazol-1-yl)-2-oxo-2-(thiazol-2-ylamino)ethyl)-4,7-dimethyl-2H-indazol-6-yl)phenethyl)(methyl)carbamate In analogy to Example 25, step 5, ethyl 2-(6-(4-(2-((tert-butoxycarbonyl)(methyl)amino)ethyl)phenyl)-4,7-dimethyl-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=642.4 ([M–H]−)

Step 3: 2-(6-(4-(2-(Ethyl(methyl)amino)ethyl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 6, a solution of tert-butyl (4-(2-(1-((R)-6-fluoro-6,7-dihydro-5H-pyrrolo[1,2-c]imidazol-1-yl)-2-oxo-2-(thiazol-2-ylamino)ethyl)-4,7-dimethyl-2H-indazol-6-yl)phenethyl)(methyl)carbamate in dichloromethane was treated with HCl in dioxane. The product of this reaction was reacted in analogy to Example 34, step 4, with acetaldehyde in the presence of sodium triacetoxyborohydride to give the title compound as off-white solid. MS: m/e=572.3 ([M+H]+)

Example 124

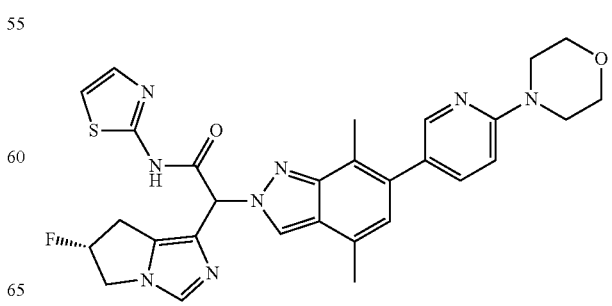

2-(4,7-Dimethyl-6-(6-morpholinopyridin-3-yl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(4,7-dimethyl-6-(6-morpholinopyridin-3-yl)-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4,7-dimethyl-2H-indazol-2-yl)-2-((R)-6-fluoro-6,7-dihydro-5H-pyrrolo[1,2-c]imidazol-1-yl)acetate (Example 118, step 3) was reacted with (6-morpholinopyridin-3-yl)boronic acid in dioxane in the presence of [1,1'-bis(diphenylphosphino)ferrocene]dichloropalladium(II) and cesium carbonate to give the title compound as light brown solid. MS: m/e=519.3 ([M+H]⁺)

Step 2: 2-(4,7-Dimethyl-6-(6-morpholinopyridin-3-yl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4,7-dimethyl-6-(6-morpholinopyridin-3-yl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light yellow solid. MS: m/e=573.2 ([M+H]⁺)

Example 125

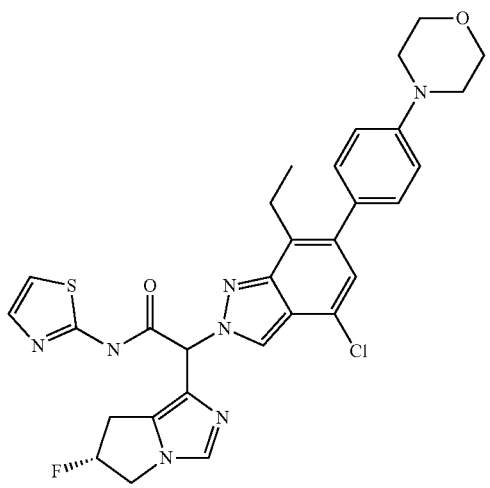 [SMILES: CCc1c(-c2ccc(N3CCOCC3)cc2)cc(Cl)c2cn(C(C(=O)Nc3nccs3)c3ncn4c3C[C@@H](F)C4)nc12]

2-(4-Chloro-7-ethyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide Step 1: rac-tert-Butyl (2S,4R)-2-(2-(6-bromo-4-chloro-7-ethyl-2H-indazol-2-yl)-3-ethoxy oxopropanoyl)-4-fluoropyrrolidine-1-carboxylate In analogy to Example 25, step 1, (2S,4R)-1-(tert-butoxycarbonyl)-4-fluoropyrrolidine carboxylic acid was treated with carbonyldiimidazole to give solution A. ethyl 2-(6-bromo chloro-7-ethyl-2H-indazol-2-yl)acetate was deprotonated with LDA and treated with solution A at −78° C. After stirring at room temperature overnight and workup in analogy to Example 25, step 1, the crude title compound was obtained which was used for the next step without further purification. MS: m/e=562.2 ([M+H]⁺)

Step 2: Ethyl 2-(6-bromo-4-chloro-7-ethyl-2H-indazol-2-yl)-2-((R)-6-fluoro-6,7-dihydro-5H-pyrrolo[1,2-c]imidazol-1-yl)acetate In analogy to Example 1, steps 2 and 3, rac-tert-butyl (2S,4R)-2-(2-(6-bromo-4-chloro-7-ethyl-2H-indazol-2-yl)-3-ethoxy-3-oxopropanoyl)-4-fluoropyrrolidine-1-carboxylate was deprotected using HCl in dioxane followed by reaction with potassium thiocyanate followed by treatment with hydrogen peroxide in acetic acid to give the crude title compound as light brown foam. MS: m/e=471.0 ([M+H]⁺)

Step 3: Ethyl 2-(4-chloro-7-ethyl-6-(4-morpholinophenyl)-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-4-chloro-7-ethyl-2H-indazol-2-yl)-2-((R)-6-fluoro-6,7-dihydro-5H-pyrrolo[1,2-c]imidazol-1-yl)acetate was reacted with (4-morpholinophenyl)boronic acid in dioxane in the presence of [1,1'-bis(diphenylphosphino)ferrocene]dichloropalladium(II) and cesium carbonate to give the title compound as light brown foam. MS: m/e=552.4 ([M+H]⁺)

Step 4: 2-(4-Chloro-7-ethyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, ethyl 2-(4-chloro-7-ethyl-6-(4-morpholinophenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as off-white solid. MS: m/e=606.4 ([M+H]⁺)

Example 126

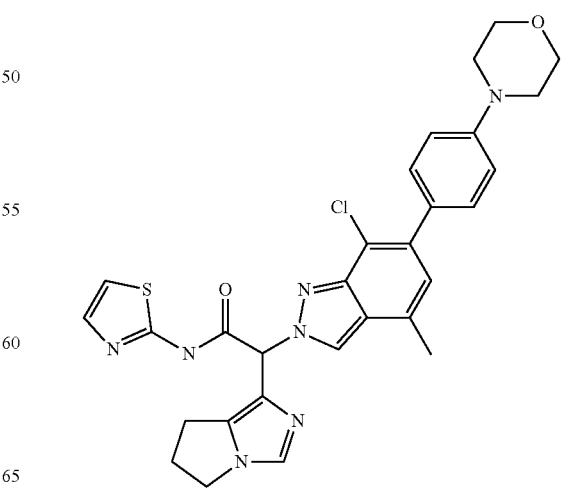

2-(7-Chloro-4-methyl-6-(4-morpholinophenyl)-2H-indazol-2-yl)-2-(6,7-dihydro-5H-pyrrolo[1,2-c]imidazol-1-yl)-N-(thiazol-2-yl)acetamide Step 1: Ethyl 2-(4,7-dichloro-6-(4-morpholinophenyl)-2H-indazol-2-yl)-2-(6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-(6,7-dihydro-5H-pyrrolo[1,2-c]imidazol-1-yl)acetate (Example 103, step 3) was treated with (4-morpholinophenyl)boronic acid in toluene in the presence of cesium carbonate and [1,1'-bis(diphenylphosphino)ferrocene]dichloropalladium(II) to give the title compound as light brown gum. MS: m/e=540.3 ([M+H]$^+$)

Step 2: Ethyl 2-(7-chloro-4-methyl-6-(4-morpholinophenyl)-2H-indazol-2-yl)-2-(6,7-dihydro-5H-pyrrolo[1,2-c]imidazol-1-yl)acetate A mixture of ethyl 2-(4,7-dichloro-6-(4-morpholinophenyl)-2H-indazol-2-yl)-2-(6,7-dihydro-5H-pyrrolo[1,2-c]imidazol-1-yl)acetate, trimethylboroxin (52.1 mg), PdCl$_2$(DPPF)-CH$_2$Cl$_2$ adduct (28.3 mg) and potassium carbonate (143 mg) in dioxane (4 ml) was purged with argon and stirred at 100° C. for 6 h. The reaction mixture was poured into H$_2$O and extracted with EtOAc. The organic layers were combined, dried over Na$_2$SO$_4$ and concentrated to dryness. The crude material was purified by flash chromatography (silica gel, 25 g, 0% to 30% (4:1 CH$_2$Cl$_2$/MeOH) in CH$_2$Cl$_2$)) to give the impure title compound (130 mg, purity 60%) as light brown foam. MS: m/e=520.4 ([M+H]$^+$)

Step 3: 2-(7-Chloro-4-methyl-6-(4-morpholinophenyl)-2H-indazol-2-yl)-2-(6,7-dihydro-5H-pyrrolo[1,2-c]imidazol-1-yl)-N-(thiazol-2-yl)acetamide In analogy to Example 25, step 5, ethyl 2-(7-chloro-4-methyl-6-(4-morpholinophenyl)-2H-indazol-2-yl)-2-(6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as colorless solid. MS: m/e=574.4 ([M+H]$^+$)

Example 127

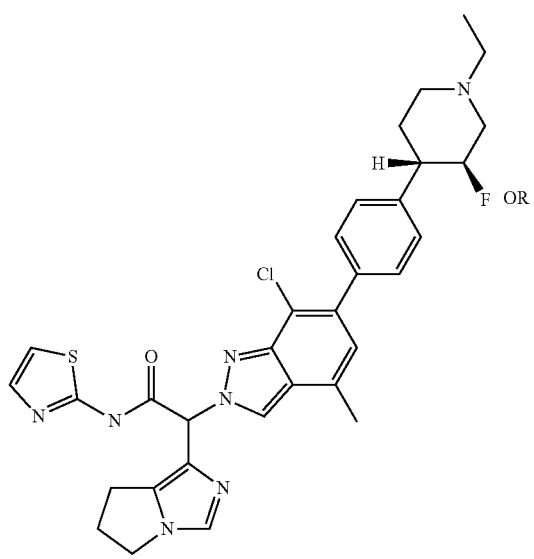

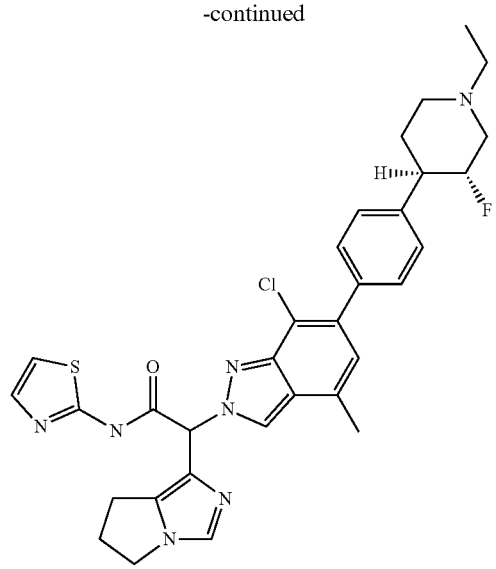

2-(7-Chloro-6-(4-((3S,4S)-1-ethyl-3-fluoropiperidin-4-yl)phenyl)-4-methyl-2H-indazol-2-yl)-2-(6,7-dihydro-5H-pyrrolo[1,2-c]imidazol-1-yl)-N-(thiazol-2-yl)acetamide OR 2-(7-Chloro-6-(4-((3R,4R)-1-ethyl-3-fluoropiperidin-4-yl)phenyl)-4-methyl-2H-indazol-2-yl)-2-(6,7-dihydro-5H-pyrrolo[1,2-c]imidazol-1-yl)-N-(thiazol-2-yl)acetamide Step 1: Ethyl 2-(4,7-dichloro-6-(4-((3S,4S)-1-ethyl-3-fluoropiperidin-4-yl)phenyl)-2H-indazol-2-yl)-2-(6,7-dihydro-5H-pyrrolo[1,2-c]imidazol-1-yl)acetate OR Ethyl 2-(4,7-dichloro-6-(4-((3R,4R)-1-ethyl-3-fluoropiperidin-4-yl)phenyl)-2H-indazol-2-yl)-2-(6,7-dihydro-5H-pyrrolo[1,2-c]imidazol-1-yl)acetate In analogy to Example 25, step 4, ethyl 2-(6-bromo-4,7-dichloro-2H-indazol-2-yl)-2-(6,7-dihydro-5H-pyrrolo[1,2-c]imidazol-1-yl)acetate was reacted with (4-((3S,4S)-1-ethyl-3-fluoropiperidin-4-yl)phenyl)boronic acid OR (4-((3R,4R)-1-ethyl-3-fluoropiperidin-4-yl)phenyl)boronic acid in dioxane in the presence of [1,1'-bis(diphenylphosphino)ferrocene]dichloropalladium(II) and cesium carbonate to give the title compound as light brown foam. MS: m/e=584.3 ([M+H]$^+$)

Step 2: Ethyl 2-(7-chloro-6-(4-((3S,4S)-1-ethyl-3-fluoropiperidin-4-yl)phenyl)-4-methyl-2H-indazol-2-yl)-2-(6,7-dihydro-5H-pyrrolo[1,2-c]imidazol-1-yl)acetate OR Ethyl 2-(7-chloro-6-(4-((3R,4R)-1-ethyl-3-fluoropiperidin-4-yl)phenyl)-4-methyl-2H-indazol-2-yl)-2-(6,7-dihydro-5H-pyrrolo[1,2-c]imidazol-1-yl)acetate In analogy to Example 126, step 2, ethyl 2-(4,7-dichloro-6-(4-((3S,4S)-1-ethyl-3-fluoropiperidin-4-yl)phenyl)-2H-indazol-2-yl)-2-(6,7-dihydro-5H-pyrrolo[1,2-c]imidazol-1-yl)acetate OR ethyl 2-(4,7-dichloro-6-(4-((3R,4R)-1-ethyl-3-fluoropiperidin-4-yl)phenyl)-2H-indazol-2-yl)-2-(6,7-dihydro-5H-pyrrolo[1,2-c]imidazol-1-yl)acetate was reacted with trimethylboroxin in the presence of PdCl$_2$(DPPF)-CH$_2$Cl$_2$ adduct and potassium carbonate in dioxane to give the title compound as off-white foam. MS: m/e=564.4 ([M+H]$^+$)

Step 3: 2-(7-Chloro-6-(4-((3S,4S)-1-ethyl-3-fluoropiperidin-4-yl)phenyl)-4-methyl-2H-indazol-2-yl)-2-(6,7-dihydro-5H-pyrrolo[1,2-c]imidazol-1-yl)-N-(thiazol-2-yl)acetamide OR 2-(7-Chloro-6-(4-((3R,4R)-1-ethyl-3-fluoropiperidin-4-yl)phenyl)-4-methyl-2H-indazol-2-yl)-2-(6,7-dihydro-5H-pyrrolo[1,2-c]imidazol-1-yl)-N-(thiazol-2-yl)acetamide In analogy to Example 25, step 5, ethyl 2-(7-chloro-6-(4-((3S,4S)-1-ethyl-3-fluoropiperidin-4-yl)phenyl)-4-methyl-2H-indazol-2-yl)-2-(6,7-dihydro-5H-pyrrolo[1,2-c]imidazol-1-yl)acetate OR ethyl 2-(7-chloro-6-(4-((3R,4R)-1-ethyl-3-fluoropiperidin-4-yl)phenyl)-4-methyl-2H-indazol-2-yl)-2-(6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as colorless solid. MS: m/e=618.4 ([M+H]⁺)

Example 128

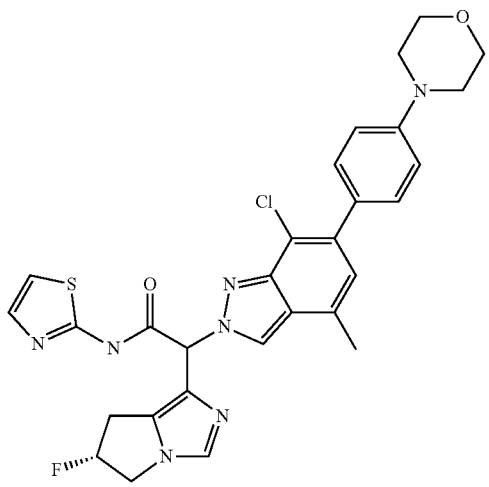 [SMILES: Cc1cc(-c2ccc(N3CCOCC3)cc2)c(Cl)c2nn(C(C(=O)Nc3nccs3)c3ncn4c3C[C@@H](F)C4)cc12]

2-(7-Chloro-4-methyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide Step 1: Ethyl 2-(7-chloro-4-methyl-6-(4-morpholinophenyl)-2H-indazol-2-yl)-2-((R)-6-fluoro-6,7-dihydro-5H-pyrrolo[1,2-c]imidazol-1-yl)acetate In analogy to Example 126, step 2, Ethyl 2-(4,7-dichloro-6-(4-morpholinophenyl)-2H-indazol-2-yl)-2-((R)-6-fluoro-6,7-dihydro-5H-pyrrolo[1,2-c]imidazol-1-yl)acetate (Example 25, step 3) was reacted with trimethylboroxin in the presence of PdCl₂(DPPF)-CH₂Cl₂ adduct and potassium carbonate in dioxane to give the title compound as brown foam. MS: m/e=538.4 ([M+H]⁺)

Step 2: 2-(7-Chloro-4-methyl-6-(4-morpholinophenyl)-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, Ethyl 2-(7-chloro-4-methyl-6-(4-morpholinophenyl)-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as brown foam. MS: m/e=592.4 ([M+H]⁺)

Example 129

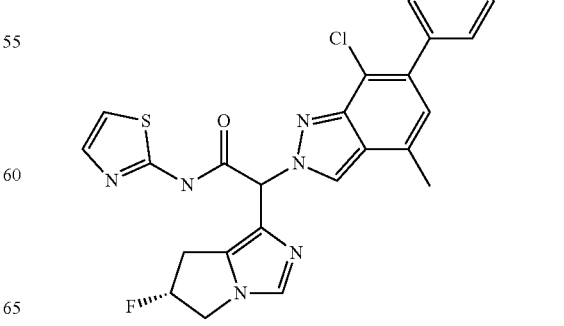

2-[7-Chloro-4-methyl-6-[4-[(3S,4S)-1-ethyl-3-
fluoro-4-piperidyl]phenyl]indazol-2-yl]-2-[(6R)-6-
fluoro-6,7-dihydro-5H-pyrrolo[1,2-c]imidazol-1-yl]-
N-thiazol-2-yl-acetamide OR 2-[7-Chloro-4-methyl-
6-[4-[(3R,4R)-1-ethyl-3-fluoro-4-piperidyl]phenyl]
indazol-2-yl]-2-[(6R)-6-fluoro-6,7-dihydro-5H-
pyrrolo[1,2-c]imidazol-1-yl]-N-thiazol-2-yl-
acetamide Step 1: Ethyl 2-(4,7-dichloro-6-(4-((3S,4S)-1-ethyl-
3-fluoropiperidin-4-yl)phenyl)-2H-indazol-2-yl)-2-
((S)-6-fluoro-6,7-dihydro-5H-pyrrolo[1,2-c]imida-
zol-1-yl)acetate OR Ethyl 2-(4,7-dichloro-6-(4-((3R,
4R)-1-ethyl-3-fluoropiperidin-4-yl)phenyl)-2H-
indazol-2-yl)-2-((S)-6-fluoro-6,7-dihydro-5H-
pyrrolo[1,2-c]imidazol-1-yl)acetate In analogy to Example 25, step 4, ethyl 2-(6-bromo-4,7-dichloro-2H-indazol-2-yl)-2-((R)-6-fluoro-6,7-dihydro-5H-pyrrolo[1,2-c]imidazol-1-yl)acetate was reacted with (4-((3S,4S)-1-ethyl-3-fluoropiperidin-4-yl)phenyl)boronic acid OR (4-((3R,4R)-1-ethyl-3-fluoropiperidin yl)phenyl)boronic acid in dioxane in the presence of [1,1'-bis(diphenylphosphino)ferrocene]dichloropalladium(II) and cesium carbonate to give the title compound as light brown foam. MS: m/e=602.3 ([M+H]$^+$)

Step 2: Ethyl 2-(7-chloro-6-(4-((3S,4S)-1-ethyl-3-
fluoropiperidin-4-yl)phenyl)-4-methyl-2H-indazol-2-
yl)-2-((S)-6-fluoro-6,7-dihydro-5H-pyrrolo[1,2-c]
imidazol-1-yl)acetate OR Ethyl 2-(7-chloro-6-(4-
((3R,4R)-1-ethyl-3-fluoropiperidin-4-yl)phenyl)-4-
methyl-2H-indazol-2-yl)-2-((S)-6-fluoro-6,7-
dihydro-5H-pyrrolo[1,2-c]imidazol-1-yl)acetate In analogy to Example 126, step 2, ethyl 2-(4,7-dichloro-6-(4-((3S,4S)-1-ethyl-3-fluoropiperidin-4-yl)phenyl)-2H-indazol-2-yl)-2-((S)-6-fluoro-6,7-dihydro-5H-pyrrolo[1,2-c]imidazol-1-yl)acetate OR Ethyl 2-(4,7-dichloro-6-(4-((3R,4R)-1-ethyl-3-fluoropiperidin-4-yl)phenyl)-2H-indazol-2-yl)-2-((S)-6-fluoro-6,7-dihydro-5H-pyrrolo[1,2-c]imidazol-1-yl)acetate was reacted with trimethylboroxin in the presence of PdCl$_2$(DPPF)-CH$_2$Cl$_2$ adduct and potassium carbonate in dioxane to give the title compound as off-white foam. MS: m/e=582.4 ([M+H]$^+$)

Step 3: 2-[7-Chloro-4-methyl-6-[4-[(3S,4S)-1-ethyl-
3-fluoro-4-piperidyl]phenyl]indazol-2-yl]-2-[(6R)-6-
fluoro-6,7-dihydro-5H-pyrrolo[1,2-c]imidazol-1-yl]-
N-thiazol-2-yl-acetamide OR 2-[7-Chloro-4-methyl-
6-[4-[(3R,4R)-1-ethyl-3-fluoro-4-piperidyl]phenyl]
indazol-2-yl]-2-[(6R)-6-fluoro-6,7-dihydro-5H-
pyrrolo[1,2-c]imidazol-1-yl]-N-thiazol-2-yl-
acetamide In analogy to Example 25, step 5, ethyl 2-(7-chloro-6-(4-((3S,4S)-1-ethyl-3-fluoropiperidin-4-yl)phenyl)-4-methyl-2H-indazol-2-yl)-2-((S)-6-fluoro-6,7-dihydro-5H-pyrrolo[1,2-c]imidazol-1-yl)acetate OR ethyl 2-(7-chloro-6-(4-((3R,4R)-1-ethyl-3-fluoropiperidin-4-yl)phenyl)-4-methyl-2H-indazol-2-yl)-2-((S)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=636.4 ([M+H]$^+$)

Example 130

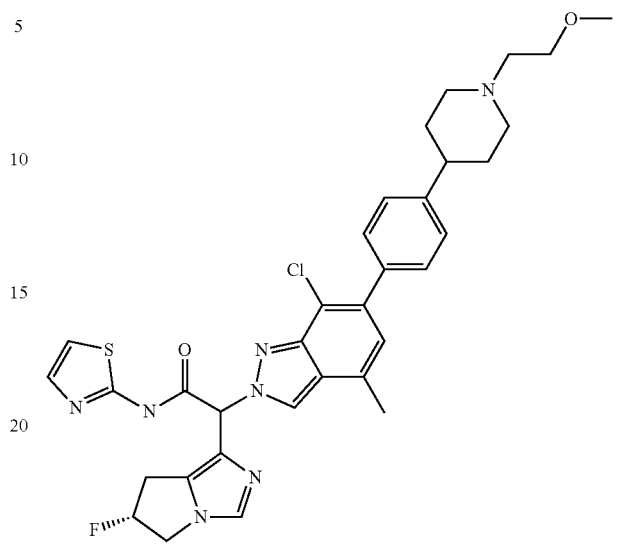

2-(7-Chloro-6-(4-(1-(2-methoxyethyl)piperidin-4-yl)
phenyl)-4-methyl-2H-indazol-2-yl)-2-((R)-6-fluoro-
6,7-dihydro-5H-pyrrolo[1,2-c]imidazol-1-yl)-N-
(thiazol-2-yl)acetamide Step 1:
4-Bromo-3-chloro-2-fluoro-6-methyl-benzaldehyde To a mixture of 1-bromo-2-chloro-3-fluoro-5-methyl-benzene (100.0 g, 447.5 mmol, 1.00 eq, CAS 1000576-14-6) in THF (1.00 L) was added LDA (2 M, 246.1 mL, 1.10 eq) at −70° C. and the mixture was stirred at −70° C. for 0.5 h. DMF (65.4 g, 895.0 mmol, 68.9 mL, 2.00 eq) was added to the mixture at −70° C. and the mixture stirred at −70° C. for 1 h. The mixture was poured into water (3.00 L) and the aqueous layer was extracted with EtOAc (2×3 L). The combined organic layers were washed with brine, dried over Na$_2$SO$_4$, filtered and concentrated in vacuo. The crude product was triturated with Petroleum ether at 15° C. for 30 min to give the title compound (155.0 g, 583.7 mmol, 43.5% yield, 94.7% purity) as light yellow solid. m/z 251.0 [M+H]+, ESI pos.

Step 2: 6-Bromo-7-chloro-4-methyl-2H-indazole

To a mixture of 4-bromo-3-chloro-2-fluoro-6-methyl-benzaldehyde (80.0 g, 318.1 mmol, 1.00 eq) in 1,4-dioxane (1.5 L) was added NH$_2$NH$_2$·H$_2$O (28.2 g, 552.1 mmol, 27.4 mL, 1.74 eq) in one portion at 25° C. under N$_2$. The mixture was stirred at 120° C. for 36 h. The mixture was concentrated in vacuo and the solvent was replaced with DMSO (1.5 L) at 25° C. The reaction mixture was stirred at 145° C. for 24 h. The mixture was poured into water (1 L) and the suspension was filtered to give the title compound as a yellow solid (120.0 g, 488.8 mmol, 76.8% yield). m/z 246.9 [M+H]+, ESI pos. The product was used directly without further purification.

Step 3: Ethyl 2-(6-bromo-7-chloro-4-methyl-inda-
zol-2-yl)acetate

To a mixture of 6-bromo-7-chloro-4-methyl-2H-indazole (120.0 g, 488.8 mmol, 1.00 eq) in DMF (100 mL) was added ethyl 2-bromoacetate (163.26 g, 977.58 mmol, 108.1 mL, 2.00 eq, CAS 105-36-2) at 15° C. The mixture was stirred at 125° C. for 16 h. The mixture was poured into water (400 mL) and extracted with EtOAc (3×500 mL). The combined organic layers were washed with brine, dried over $Na_2SO_4$, filtered and concentrated in vacuo. The crude product was purified by silica gel chromatography silica gel (petroleum ether/EtOAc 3:1) to give the title compound as a yellow solid (32.0 g, 94.0 mmol, 19.2% yield, 97.4% purity). m/z 554.4 [M+H]+, ESI pos.

Step 4: tert-Butyl rac-(2S,4R)-2-[2-(6-bromo-7-chloro-4-methyl-indazol-2-yl)-3-ethoxy-3-oxopropanoyl]-4-fluoro-pyrrolidine-1-carboxylate To a mixture of (2S,4R)-1-tert-butoxycarbonyl-4-fluoropyrrolidine-2-carboxylic acid (29.5 g, 126.7 mmol, 1.50 eq, CAS 203866-14-2) in THF (150 mL) was added CDI (20.5 g, 126.7 mmol, 1.50 eq) at 0° C. The mixture was stirred at 25° C. for 2 h. The mixture was washed with saturated aqueous $NaHCO_3$ (200.0 mL), extracted with EtOAc (3×500 mL). The combined organic layers were washed with brine, dried over $Na_2SO_4$, filtered and concentrated in vacuo to give the crude tert-butyl (2S,4R)-4-fluoro-2-(imidazole-1-carbonyl)pyrrolidine-1-carboxylate. To a mixture of ethyl 2-(6-bromo-7-chloro-4-methyl-indazol-2-yl)acetate (28.0 g, 84.4 mmol, 1.00 eq) in THF (150 mL) was added LDA (2 M, 50.7 mL, 1.20 eq) at −70° C. The mixture was stirred at −70° C. for 0.5 h and the previously-prepared tert-butyl (2S,4R)-4-fluoro-2-(imidazole-1-carbonyl)pyrrolidine-1-carboxylate in THF (150 mL) was added at −70° C. The mixture was allowed to warm up to 25° C., then stirred at 25° C. for 5 h. The mixture was poured into water (400 mL) and extracted with EtOAc (3×500 mL). The combined organic layers were washed with brine, dried over $Na_2SO_4$, filtered and concentrated in vacuo to give the title compound a yellow solid (55.0 g, crude). m/z 548.1 [M+H]$^+$, ESI pos. The crude product was used without further purification.

Step 5: Ethyl 2-(6-bromo-7-chloro-4-methyl-indazol-2-yl)-2-[rac-(6R)-6-fluoro-3-thioxo-2,5,6,7-tetrahydropyrrolo[1,2-c]imidazol-1-yl]acetate tert-Butyl rac-(2S,4R)-2-[2-(6-bromo-7-chloro-4-methyl-indazol-2-yl)-3-ethoxy-3-oxopropanoyl]-4-fluoro-pyrrolidine-1-carboxylate (50.0 g, 91.4 mmol, 1.00 eq) in HCl 4 M in 1,4-dioxane (228.6 mL, 10.0 eq) was stirred at 25° C. for 1 h. The reaction mixture was concentrated in vacuo. To this yellow residue (40.0 g) was added water (150 ml), KSCN (11.3 g, 116.4 mmol, 11.3 mL, 1.30 eq) and ethanol (300 mL) at 25° C. The reaction mixture was stirred at 85° C. for 5 h. The reaction mixture was concentrated in vacuo to remove ethanol, the suspension was filtered and washed with water (2×50 mL) to give the title compound as a yellow solid (30.0 g, 61.5 mmol, 68.7% yield). m/z 488.9 [M+H]$^+$, ESI pos. The crude product was used without further purification.

Step 6: Ethyl 2-(6-bromo-7-chloro-4-methyl-indazol-2-yl)-2-[rac-(6R)-6-fluoro-6,7-dihydro-5H-pyrrolo[1,2-c]imidazol-1-yl]acetate A mixture of ethyl 2-(6-bromo-7-chloro-4-methyl-indazol-2-yl)-2-[(6R)-6-fluoro-3-thioxo-2,5,6,7-tetrahydropyrrolo[1,2-c]imidazol-1-yl]acetate (15.0 g, 30.8 mmol, 1.00 eq) and $H_2O_2$ (11.8 g, 104.3 mmol, 10.0 mL, 30% purity, 3.39 eq) in AcOH (200 mL) was stirred at 25° C. for 4 h. The reaction mixture was poured into saturated aqueous $Na_2SO_3$ (200 mL) and extracted with EtOAc (3×500 mL). The combined organic layers were washed with brine (2×200 mL), dried over $Na_2SO_4$, filtered and concentrated under vacuum to give the residue. The residue was purified by silica gel chromatography (petroleum ether/EtOAc 10:1) to give the title compound as a yellow solid (12.20 g, 26.1 mmol, 42.5% yield, 97.7% purity). m/z 457.0 [M+H]$^+$, ESI pos.

Step 7: Ethyl 2-(7-chloro-6-(4-(1-(2-methoxyethyl)piperidin-4-yl)phenyl)-4-methyl-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-7-chloro-4-methyl-2H-indazol-2-yl)-2-((R)-6-fluoro-6,7-dihydro-5H-pyrrolo[1,2-c]imidazol-1-yl)acetate was reacted with 1-(2-methoxyethyl)-4-(4-(4,4,5,5-tetramethyl-1,3,2-dioxaborolan-2-yl)phenyl)piperidine hydrochloride in a mixture of THF and water in the presence of [1,1'-bis(diphenylphosphino)ferrocene]dichloropalladium(II) and cesium carbonate to give the title compound as light brown foam. MS: m/e=594.3 ([M+H]$^+$)

Step 8: 2-(7-Chloro-6-(4-(1-(2-methoxyethyl)piperidin-4-yl)phenyl)-4-methyl-2H-indazol-2-yl)-24R)-6-fluoro-6,7-dihydro-5H-pyrrolo[1,2-c]imidazol-1-yl)-N-(thiazol-2-yl)acetamide In analogy to Example 25, step 5, ethyl 2-(7-chloro-6-(4-(1-(2-methoxyethyl)piperidin-4-yl)phenyl)-4-methyl-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as brown solid. MS: m/e=648.3 ([M+H]$^+$)

Example 131

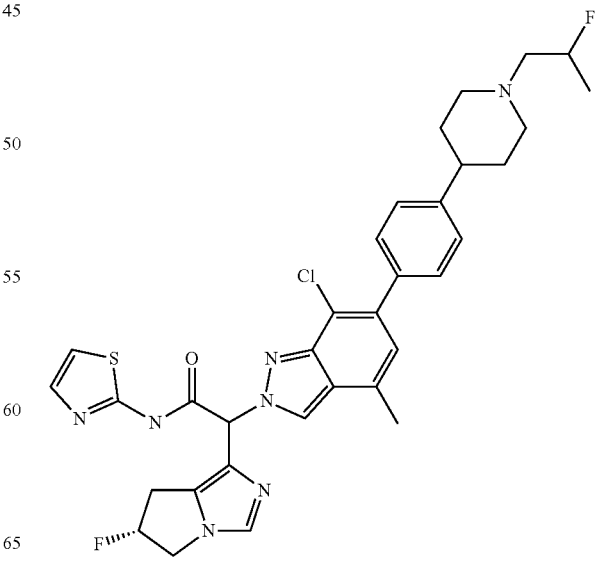

rac-2-(7-Chloro-6-(4-(1-(2-fluoropropyl)piperidin-4-yl)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide Step 1: rac-Ethyl 2-(7-chloro-6-(4-(1-(2-fluoropropyl)piperidin-4-yl)phenyl)-4-methyl-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-7-chloro-4-methyl-2H-indazol-2-yl)-2-((R)-6-fluoro-6,7-dihydro-5H-pyrrolo[1,2-c]imidazol-1-yl)acetate (Example 130, step 6) was reacted with 1-(2-fluoropropyl)-4-(4-(4,4,5,5-tetramethyl-1,3,2-dioxaborolan-2-yl)phenyl)piperidine in a mixture of THF and water in the presence of [1,1'-bis(diphenylphosphino)ferrocene]dichloropalladium(II) and cesium carbonate to give the title compound as brown oil. MS: m/e=596.2 ([M+H]$^+$)

Step 2: rac-2-(7-Chloro-6-(4-(1-(2-fluoropropyl)piperidin-4-yl)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(7-chloro-6-(4-(1-(2-fluoropropyl)piperidin-4-yl)phenyl)-4-methyl-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as light brown solid. MS: m/e=648.3 ([M−H]$^-$)

Example 132

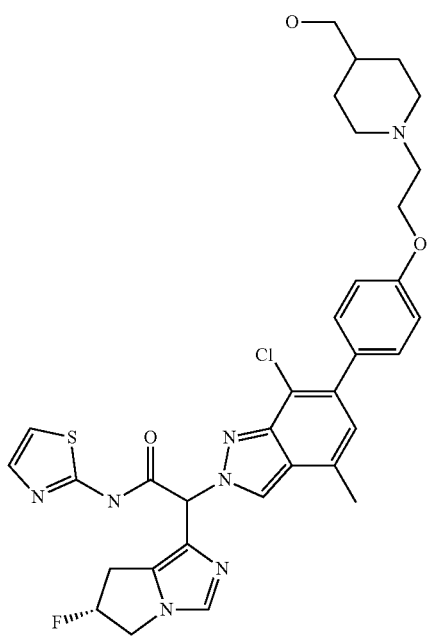 [SMILES: Cc1cc(-c2ccc(OCCN3CCC(CO)CC3)cc2)c(Cl)c2nn(C(C(=O)Nc3nccs3)c3ncn4c3C[C@@H](F)C4)cc12]

rac-2-(7-Chloro-6-(4-(2-(4-(hydroxymethyl)piperidin-1-yl)ethoxy)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide Step 1: rac-Ethyl 2-(7-chloro-6-(4-(2-(4-(hydroxymethyl)piperidin-1-yl)ethoxy)phenyl)-4-methyl-2H-indazol-2-yl)-2-((R)-6-fluoro-6,7-dihydro-5H-pyrrolo[1,2-c]imidazol-1-yl)acetate In analogy to Example 25, step 4, ethyl 2-(6-bromo-7-chloro-4-methyl-2H-indazol-2-yl)-2-((R)-6-fluoro-6,7-dihydro-5H-pyrrolo[1,2-c]imidazol-1-yl)acetate (Example 130, step 6) was reacted with (1-(2-(4-(4,4,5,5-tetramethyl-1,3,2-dioxaborolan-2-yl)phenoxy)ethyl)piperidin-4-yl)methanol in a mixture of THF and water in the presence of [1,1'-bis(diphenylphosphino)ferrocene]dichloropalladium (II) and cesium carbonate to give the title compound as brown gum. MS: m/e=610.2 ([M+H]$^+$)

Step 2: rac-2-(7-Chloro-6-(4-(2-(4-(hydroxymethyl)piperidin-1-yl)ethoxy)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide In analogy to Example 25, step 5, rac-ethyl 2-(7-chloro-6-(4-(2-(4-(hydroxymethyl)piperidin-1-yl)ethoxy)phenyl)-4-methyl-2H-indazol-2-yl)-2-((R)-6-fluoro-6,7-dihydro-5H-pyrrolo[1,2-c]imidazol-1-yl)acetate was first treated with LiOH and the resulting salt was reacted with thiazol-2-amine in the presence of HATU and Hunig's base to give the title compound as brown solid. MS: m/e=662.3 ([M−H]$^-$)

Example 134

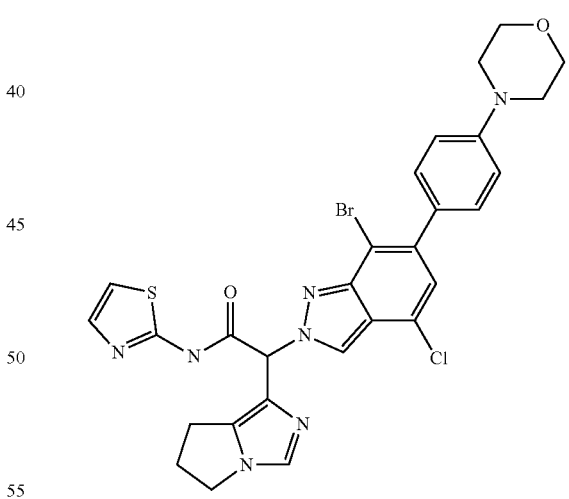

2-(7-Bromo-4-chloro-6-(4-morpholinophenyl)-2H-indazol-2-yl)-2-(6,7-dihydro-5H-pyrrolo[1,2-c]imidazol-1-yl)-N-(thiazol-2-yl)acetamide Step 1: tert-Butyl rac-(2R)-2-[2-[7-bromo-4-chloro-6-(4-morpholin-4-ylphenyl)indazol-2-yl]-3-ethoxy-3-oxopropanoyl]pyrrolidine-1-carboxylate A solution of ethyl 2-(7-bromo-4-chloro-6-(4-morpholinophenyl)-2H-indazol-2-yl)acetate (3.45 g), in THF (30 ml) was cooled to −70° C. NaHMDS (1 M, 8.43 ml) was added dropwise below −65° C. The reaction mixture was warmed up to −40° C., then cooled to −65° C. rac-tert-butyl (R)-2-(1H-imidazole-1-carbonyl)pyrrolidine-1-carboxylate (2.29 g) was added dropwise below −65° C. The reaction mixture was stirred for 30 min at −70° C. The CO2/acetone bath was removed, stirred for 2 h at room temperature. HCl 1 N was added (pH 5), NaHCO$_3$ was added (pH 7). The reaction mixture was poured into EtOAc and washed water, NaCl sat. The organic layer was dried over Na$_2$SO$_4$ and concentrated in vacuo. The crude material was purified by flash chromatography (silica gel, 80 g, 0% to 80% EtOAc/EtOH/NH$_3$ aq. 75:25:2 in heptane) to afford the title compound (4.28 g) as a yellow solid. MS: 677.2 ([M+H]$^+$)

Step 2: Ethyl 2-(7-bromo-4-chloro-6-(4-morpholinophenyl)-2H-indazol-2-yl)-2-(6,7-dihydro-5H-pyrrolo[1,2-c]imidazol-1-yl)acetate In analogy to Example 25, steps 2 and 3, tert-butyl rac-(2R)-2-[2-[7-bromo-4-chloro-6-(4-morpholin-4-ylphenyl)indazol-2-yl]-3-ethoxy-3-oxopropanoyl]pyrrolidine-1-carboxylate was deprotected using HCl in dioxane followed by reaction with potassium thiocyanate followed by treatment with hydrogen peroxide in acetic acid to give the title compound as yellow solid. MS: m/e=586.0 ([M+H]$^+$)

Step 3: 2-(7-Bromo-4-chloro-6-(4-morpholinophenyl)-2H-indazol-2-yl)-2-(6,7-dihydro-5H-pyrrolo[1,2-c]imidazol-1-yl)-N-(thiazol-2-yl)acetamide To a solution of thiazol-2-amine (15.4 mg) in THF (500 µl) was added tert-butylmagnesium chloride 1M in 2-methyl-THF (154 µl) dropwise at 0-5° C. The reaction mixture was stirred for 15 min at 0° C. Ethyl 2-(7-bromo-4-chloro-6-(4-morpholinophenyl)-2H-indazol-2-yl)-2-(6,7-dihydro-5H-pyrrolo[1,2-c]imidazol-1-yl)acetate (30 mg) in THF (250 µl) was added and washed with THF (250 µl). The ice bath was removed, stirring was continued at for 1 h at room temperature. Water was added. The reaction mixture was poured into EtOAc/THF 2:1. HCl 1 N was added (pH1). NaHCO3 sat. was added (pH 8). The organic layer was washed with NaCl sat., dried over Na$_2$SO$_4$ and concentrated in vacuo. The crude material was purified by flash chromatography (loaded as an impregnate; (SiO2, 12 g/15-40 um, cartridge), n-heptane/(ethyl acetate/ethanol/ammonia 75:25:2) 100:0→40:60) to afford the title compound (23.6 mg) as off-white solid. MS: 638.1 ([M+H]$^+$).

The invention claimed is:
1. A compound selected from:
2-(4,7-Dichloro-6-(4-(piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide 2,2,2-trifluoroacetate;
2-(4,7-Dichloro-6-(4-(4-ethylpiperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;
2-(4,7-Dichloro-6-(4-(1-cyclopropylpiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;
2-[4,7-Dichloro-6-(4-piperidin-4-ylphenyl)indazol-2-yl]-2-[rac-(6R)-6-fluoro-6,7-dihydro-5H-pyrrolo[1,2-c]imidazol-1-yl]-N-(1,3-thiazol-2-yl)acetamide hydrochloride;
2-[4,7-Dichloro-6-[4-(1-ethylpiperidin-4-yl)phenyl]indazol-2-yl]-2-[rac-(6R)-6-fluoro-6,7-dihydro-5H-pyrrolo[1,2-c]imidazol-1-yl]-N-(1,3-thiazol-2-yl)acetamide;
2-(4,7-Dichloro-6-(4-(rac-(3R,4R)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;
2-(4,7-Dichloro-6-(4-(1-(2-fluoroethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;
2-[4,7-Dichloro-6-[4-[2-(dimethylamino)ethoxy]phenyl]indazol-2-yl]-2-[rac-(6R)-6-fluoro-6,7-dihydro-5H-pyrrolo[1,2-c]imidazol-1-yl]-N-(1,3-thiazol-2-yl)acetamide;
2-(4,7-Dichloro-6-(4-(2-(dimethylamino)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;
2-(4,7-Dichloro-6-(4-((3R,4R)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;
2-(4,7-dichloro-6-(4-((3S,4S)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;
2-[4,7-Dichloro-6-[4-[rac-(3S,4S)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;
2-[4,7-Dichloro-6-[4-[rac-(3R,4R)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;
rac-2-(4,7-Dichloro-6-(4-(4-hydroxypiperidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;
2-(4,7-Dichloro-6-(4-(2-(dimethylamino)ethoxy)-3-ethylphenyl)-2H-indazol-2-yl)-2-((R)-6-fluoro-6,7-dihydro-5H-pyrrolo[1,2-c]imidazol-1-yl)-N-(thiazol-2-yl)acetamide;
rac-2-(4,7-Dichloro-6-(4-((2-(dimethylamino)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;
2-(4,7-Dichloro-6-(4-(2-(pyrrolidin-1-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;
2-(4,7-Dichloro-6-(4-((3aR,6aS)-2-ethyloctahydrocyclopenta[c]pyrrol-5-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;
2-(4,7-Dichloro-6-(4-(1-(2-fluoropropyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;
2-(4,7-Dichloro-6-(4-(1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;
rac-2-(4,7-Dichloro-6-(4-(3-(4-(hydroxymethyl)piperidin-1-yl)propyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((dimethylamino)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((dimethylamino)methyl)-3-fluorophenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-(hydroxymethyl)piperidin-1-yl)methyl)bicyclo[1.1.1]pentan-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-(hydroxymethyl)piperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(3-(hydroxymethyl)pyrrolidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-(hydroxymethyl)piperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3S,4S)-3-fluoro-1-(2-hydroxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3R,4R)-3-fluoro-1-(2-hydroxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3S,4S)-3-fluoro-1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-dichloro-6-(4-((3R,4R)-3-fluoro-1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3S,4S)-3-fluoro-1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-dichloro-6-(4-((3R,4R)-3-fluoro-1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-(4-hydroxypiperidin-1-yl)propyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-hydroxypiperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-(hydroxymethyl)piperidin-1-yl)methyl)azetidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-(1-hydroxyethyl)piperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-(2-hydroxyethyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((6-hydroxy-2-azaspiro[3.3]heptan-2-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(6-(4-((2-Oxa-6-azaspiro[3.3]heptan-6-yl)methyl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-hydroxypiperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((4-fluoro-4-(hydroxymethyl)piperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-(3-hydroxycyclobutyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-(hydroxymethyl)piperidin-1-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(2,7-Diazaspiro[3.5]nonan-2-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(3-hydroxypyrrolidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-(2-hydroxypropyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(6-(4-(1,4-Diazabicyclo[3.2.1]octan-4-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(6-ethyl-2,6-diazaspiro[3.5]nonan-2-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-((3-hydroxypyrrolidin-1-yl)methyl)piperidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-(hydroxymethyl)piperidin-1-yl)methyl)cyclobutyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-hydroxypiperidin-1-yl)methyl)cyclobutyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-hydroxypiperidin-1-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((4-(2-hydroxyethyl)piperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(4-(hydroxymethyl)piperidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(4-hydroxypiperidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3aR,6aS)-5-ethylhexahydropyrrolo[3,4-c]pyrrol-2(1H)-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(2-ethyl-2,6-diazaspiro[3.5]nonan-6-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-ethylazetidin-3-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-hydroxyethyl)azetidin-3-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((1-methylpiperidin-4-yl)oxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-[4,7-Dichloro-6-[4-[[1-(3-hydroxy-1-methyl-propyl)-4-piperidyl]oxy]phenyl]indazol-2-yl]-2-[rac-(6R)-6-fluoro-6,7-dihydro-5H-pyrrolo[1,2-c]imidazol-1-yl]-N-thiazol-2-yl-acetamide;

rac-2-(4,7-Dichloro-6-(4-(1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(2-(6-hydroxy-2-azaspiro[3.3]heptan-2-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(3-(hydroxymethyl)azetidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(3-hydroxyazetidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((2-hydroxy-7-azaspiro[3.5]nonan-7-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(2-hydroxy-7-azaspiro[3.5]nonan-7-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((7R,8aS)-7-hydroxyhexahydropyrrolo[1,2-a]pyrazin-2(1H)-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(((4-hydroxycyclohexyl)(methyl)amino)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(((3-hydroxycyclohexyl)(methyl)amino)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-methylpiperazin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-hydroxy-4-methylpiperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((3-methoxypyrrolidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(((3aR,6aS)-tetrahydro-1H-furo[3,4-c]pyrrol-5(3H)-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(3-(1-hydroxyethyl)azetidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-((2-methoxyethyl)amino)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-ethyl-1,4-diazepan-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-fluoroethyl)piperidin-4-yl)phenyl)-2H-indazol-2-yl)-2-(6,7-dihydro-5H-pyrrolo[1,2-c]imidazol-1-yl)-N-(thiazol-2-yl)acetamide;

2-(4,7-Dichloro-6-(4-(1-ethylpiperidin-4-yl)phenyl)-2H-indazol-2-yl)-2-(6,7-dihydro-5H-pyrrolo[1,2-c]imidazol-1-yl)-N-(thiazol-2-yl)acetamide;

rac-2-(4-Chloro-6-(4-(1-ethylpiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-((3S,4S)-1-Ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-((3R,4R)-1-Ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(1-Ethylpiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(4-Ethylpiperazin-1-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(1-((Diethylamino)methyl)cyclopropyl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(2-(Ethyl(methyl)amino)ethyl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(7-Chloro-6-(4-((3S,4S)-1-ethyl-3-fluoropiperidin-4-yl)phenyl)-4-methyl-2H-indazol-2-yl)-2-(6,7-dihydro-5H-pyrrolo[1,2-c]imidazol-1-yl)-N-(thiazol-2-yl)acetamide;

2-(7-Chloro-6-(4-((3R,4R)-1-ethyl-3-fluoropiperidin-4-yl)phenyl)-4-methyl-2H-indazol-2-yl)-2-(6,7-dihydro-5H-pyrrolo[1,2-c]imidazol-1-yl)-N-(thiazol-2-yl)acetamide;

2-[7-Chloro-4-methyl-6-[4-[(3S,4S)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;

2-[7-Chloro-4-methyl-6-[4-[(3R,4R)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;

2-(7-Chloro-6-(4-(1-(2-methoxyethyl)piperidin-4-yl)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide;

rac-2-(7-Chloro-6-(4-(1-(2-fluoropropyl)piperidin-4-yl)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide; and rac-2-(7-Chloro-6-(4-(2-(4-(hydroxymethyl)piperidin-1-yl)ethoxy)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide;

or a pharmaceutically acceptable salt thereof.

2. A compound according to claim 1 selected from:

2-(4,7-Dichloro-6-(4-(piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide 2,2,2-trifluoroacetate;

2-(4,7-Dichloro-6-(4-(4-ethylpiperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-cyclopropylpiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-[4,7-Dichloro-6-(4-piperidin-4-ylphenyl)indazol-2-yl]-2-[rac-(6R)-6-fluoro-6,7-dihydro-5H-pyrrolo[1,2-c]imidazol-1-yl]-N-(1,3-thiazol-2-yl)acetamide hydrochloride;

2-[4,7-Dichloro-6-[4-(1-ethylpiperidin-4-yl)phenyl]indazol-2-yl]-2-[rac-(6R)-6-fluoro-6,7-dihydro-5H-pyrrolo[1,2-c]imidazol-1-yl]-N-(1,3-thiazol-2-yl)acetamide;

2-(4,7-Dichloro-6-(4-(rac-(3R,4R)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-fluoroethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-[4,7-Dichloro-6-[4-[2-(dimethylamino)ethoxy]phenyl]indazol-2-yl]-2-[rac-(6R)-6-fluoro-6,7-dihydro-5H-pyrrolo[1,2-c]imidazol-1-yl]-N-(1,3-thiazol-2-yl)acetamide;

2-(4,7-Dichloro-6-(4-(2-(dimethylamino)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3R,4R)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-dichloro-6-(4-((3S,4S)-1-ethyl-3-fluoropiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-[4,7-Dichloro-6-[4-[rac-(3S,4S)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;

2-[4,7-Dichloro-6-[4-[rac-(3R,4R)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;

rac-2-(4,7-Dichloro-6-(4-(4-hydroxypiperidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(2-(dimethylamino)ethoxy)-3-ethylphenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((2-(dimethylamino)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(2-(pyrrolidin-1-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3aR,6aS)-2-ethyloctahydrocyclopenta[c]pyrrol-5-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-fluoropropyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-(4-(hydroxymethyl)piperidin-1-yl)propyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((dimethylamino)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((dimethylamino)methyl)-3-fluorophenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-(hydroxymethyl)piperidin-1-yl)methyl)bicyclo[1.1.1]pentan-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-(hydroxymethyl)piperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(3-(hydroxymethyl)pyrrolidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-(hydroxymethyl)piperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3S,4S)-3-fluoro-1-(2-hydroxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3R,4R)-3-fluoro-1-(2-hydroxy-ethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3S,4S)-3-fluoro-1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-dichloro-6-(4-((3R,4R)-3-fluoro-1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3S,4S)-3-fluoro-1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-dichloro-6-(4-((3R,4R)-3-fluoro-1-(2-methoxyethyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-(4-hydroxypiperidin-1-yl)propyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-hydroxypiperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-(hydroxymethyl)piperidin-1-yl)methyl)azetidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-(1-hydroxyethyl)piperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-(2-hydroxyethyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((6-hydroxy-2-azaspiro[3.3]heptan-2-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(6-(4-((2-Oxa-6-azaspiro[3.3]heptan-6-yl)methyl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-hydroxypiperidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((4-fluoro-4-(hydroxymethyl)piperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-(3-hydroxycyclobutyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-(hydroxymethyl)piperidin-1-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(2,7-Diazaspiro[3.5]nonan-2-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(3-hydroxypyrrolidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-(2-hydroxypropyl)piperazin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(6-(4-(1,4-Diazabicyclo[3.2.1]octan-4-yl)phenyl)-4,7-dichloro-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(6-ethyl-2,6-diazaspiro[3.5]nonan-2-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-((3-hydroxypyrrolidin-1-yl)methyl)piperidin-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-(hydroxymethyl)piperidin-1-yl)methyl)cyclobutyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(3-((4-hydroxypiperidin-1-yl)methyl)cyclobutyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(4-hydroxypiperidin-1-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((4-(2-hydroxyethyl)piperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(4-(hydroxymethyl)piperidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(4-hydroxypiperidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((3aR,6aS)-5-ethylhexahydropyrrolo[3,4-c]pyrrol-2(1H)-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(2-ethyl-2,6-diazaspiro[3.5]nonan-6-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-ethylazetidin-3-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-hydroxyethyl)azetidin-3-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((1-methylpiperidin-4-yl)oxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-[4,7-Dichloro-6-[4-[[1-(3-hydroxy-1-methyl-propyl)-4-piperidyl]oxy]phenyl]indazol-2-yl]-2-[rac-(6R)-6-fluoro-6,7-dihydro-5H-pyrrolo[1,2-c]imidazol-1-yl]-N-thiazol-2-yl-acetamide;

rac-2-(4,7-Dichloro-6-(4-(1-(3-hydroxycyclobutyl)piperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(2-(6-hydroxy-2-azaspiro[3.3]heptan-2-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(3-(hydroxymethyl)azetidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((2-(3-hydroxyazetidin-1-yl)ethyl)(methyl)amino)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((2-hydroxy-7-azaspiro[3.5]nonan-7-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-(2-hydroxy-7-azaspiro[3.5]nonan-7-yl)ethoxy)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-((7R,8aS)-7-hydroxyhexahydropyrrolo[1,2-a]pyrazin-2(1H)-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(((4-hydroxycyclohexyl)(methyl)amino)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(((3-hydroxycyclohexyl)(methyl)amino)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-methylpiperazin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((4-hydroxy-4-methylpiperidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-((3-methoxypyrrolidin-1-yl)methyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(((3aR,6aS)-tetrahydro-1H-furo[3,4-c]pyrrol-5(3H)-yl)methyl)phenyl)-2H-indazol-2-yl)-2-((R)-6-fluoro-6,7-dihydro-5H-pyrrolo[1,2-c]imidazol-2-yl)acetamide;

rac-2-(4,7-Dichloro-6-(4-(2-(3-(1-hydroxyethyl)azetidin-1-yl)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(2-((2-methoxyethyl)amino)ethyl)phenyl)-2H-indazol-2-yl)-2-((R)-6-fluoro-6,7-dihydro-5H-pyrrolo[1,2-c]imidazol-1-yl)-N-(thiazol-2-yl)acetamide;

rac-2-(4,7-Dichloro-6-(4-(4-ethyl-1,4-diazepan-1-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(4,7-Dichloro-6-(4-(1-(2-fluoroethyl)piperidin-4-yl)phenyl)-2H-indazol-2-yl)-2-(6,7-dihydro-5H-pyrrolo[1,2-c]imidazol-1-yl)-N-(thiazol-2-yl)acetamide;

2-(4,7-Dichloro-6-(4-(1-ethylpiperidin-4-yl)phenyl)-2H-indazol-2-yl)-2-(6,7-dihydro-5H-pyrrolo[1,2-c]imidazol-1-yl)-N-(thiazol-2-yl)acetamide;

rac-2-(4-Chloro-6-(4-(1-ethylpiperidin-4-yl)phenyl)-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-((3S,4S)-1-Ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-((3R,4R)-1-Ethyl-3-fluoropiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(1-Ethylpiperidin-4-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(4-Ethylpiperazin-1-yl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(1-((Diethylamino)methyl)cyclopropyl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(6-(4-(2-(Ethyl(methyl)amino)ethyl)phenyl)-4,7-dimethyl-2H-indazol-2-yl)-2-((R)-6-fluoro-6,7-dihydro-5H-pyrrolo[1,2-c]imidazol-1-yl)-N-(thiazol-2-yl)acetamide;

2-(7-Chloro-6-(4-((3S,4S)-1-ethyl-3-fluoropiperidin-4-yl)phenyl)-4-methyl-2H-indazol-2-yl)-2-(6,7-dihydro-5H-pyrrolo[1,2-c]imidazol-1-yl)-N-(thiazol-2-yl)acetamide;

2-(7-Chloro-6-(4-((3R,4R)-1-ethyl-3-fluoropiperidin-4-yl)phenyl)-4-methyl-2H-indazol-2-yl)-2-(6,7-dihydro-5H-pyrrolo[1,2-c]imidazol-1-yl)-N-(thiazol-2-yl)acetamide;

2-[7-Chloro-4-methyl-6-[4-[(3S,4S)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;

2-[7-Chloro-4-methyl-6-[4-[(3R,4R)-1-ethyl-3-fluoro-4-piperidyl]phenyl]indazol-2-yl]-2-[(6R)-6-fluoro-6,7-dihydro-5H-pyrrolo[1,2-c]imidazol-1-yl]-N-thiazol-2-yl-acetamide;

2-(7-Chloro-6-(4-(1-(2-methoxyethyl)piperidin-4-yl)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide;

rac-2-(7-Chloro-6-(4-(1-(2-fluoropropyl)piperidin-4-yl)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide; and rac-2-(7-Chloro-6-(4-(2-(4-(hydroxymethyl)piperidin-1-yl)ethoxy)phenyl)-4-methyl-2H-indazol-2-yl)-2-((R)-6-fluoro-6,7-dihydro-5H-pyrrolo[1,2-c]imidazol-1-yl)-N-(thiazol-2-yl)acetamide.

3. A pharmaceutical composition comprising a compound of claim 1 and a therapeutically inert carrier.

4. A method for the treatment or prophylaxis of cancer, which method comprises administering an effective amount of a compound of claim 1 or a pharmaceutically acceptable salt thereof.

5. A method for the treatment or prophylaxis of non-small cell lung cancer, which method comprises administering an effective amount of a compound of claim 1 or a pharmaceutically acceptable salt thereof.

6. A pharmaceutical composition comprising a compound of claim 2 and a therapeutically inert carrier.

7. A method for the treatment or prophylaxis of cancer, which method comprises administering an effective amount of a compound claim 2.

8. A method for the treatment or prophylaxis of non-small cell lung cancer, which method comprises administering an effective amount of a compound of claim 2.

\* \* \* \* \*